TAPE-TO-CARD CONVERTER CIRCUIT

Filed Jan. 29, 1952 94 Sheets-Sheet 1

INVENTORS R. N. BREED
W. B. GROTH
G. C. IRWIN
L. A. KILLE
G. RIGGS
BY John E. Cassidy
ATTORNEY INVENTORS R. N. BREED
W. B. GROTH
G. C. IRWIN
L. A. KILLE
G. RIGGS
BY John E Cassidy
ATTORNEY Feb. 5, 1957 R. N. BREED ET AL 2,780,410

TAPE-TO-CARD CONVERTER CIRCUIT

Filed Jan. 29, 1952 94 Sheets-Sheet 3

INVENTORS R. N. BREED
W. B. GROTH
G. C. IRWIN
L. A. KILLE
G. RIGGS

BY John E Cassidy

ATTORNEY

TAPE-TO-CARD CONVERTER CIRCUIT

Filed Jan. 29, 1952 94 Sheets-Sheet 4

INVENTORS R. N. BREED
W. B. GROTH
G. C. IRWIN
L. A. KILLE
G. RIGGS
BY John E Cassidy
ATTORNEY

INVENTORS R. N. BREED
W. B. GROTH
G. C. IRWIN
L. A. KILLE
G. RIGGS

BY John E. Cassidy
ATTORNEY

TAPE-TO-CARD CONVERTER CIRCUIT

Filed Jan. 29, 1952 94 Sheets-Sheet 6

INVENTORS R. N. BREED
W. B. GROTH
G. C. IRWIN
L. A. KILLE
G. RIGGS

BY John E. Cassidy
ATTORNEY

TAPE-TO-CARD CONVERTER CIRCUIT

Filed Jan. 29, 1952 94 Sheets-Sheet 7

INVENTORS R. N. BREED
W. B. GROTH
G. C. IRWIN
L. A. KILLE
G. RIGGS
BY John E. Cassidy
ATTORNEY INVENTORS R. N. BREED
W. B. GROTH
G. C. IRWIN
L. A. KILLE
G. RIGGS
BY John E. Cassidy
ATTORNEY INVENTORS R. N. BREED
W. B. GROTH
G. C. IRWIN
L. A. KILLE
G. RIGGS
BY John E. Cassidy
ATTORNEY

TAPE-TO-CARD CONVERTER CIRCUIT

Filed Jan. 29, 1952

INVENTORS R. N. BREED
W. B. GROTH
G. C. IRWIN
L. A. KILLE
G. RIGGS
BY John E. Cassidy
ATTORNEY INVENTORS R. N. BREED
W. B. GROTH
G. C. IRWIN
L. A. KILLE
G. RIGGS
BY John E. Cassidy
ATTORNEY INVENTORS R. N. BREED
W. B. GROTH
G. C. IRWIN
L. A. KILLE
G. RIGGS
BY John E Cassidy
ATTORNEY

TAPE-TO-CARD CONVERTER CIRCUIT

INVENTORS R. N. BREED
W. B. GROTH
G. C. IRWIN
L. A. KILLE
G. RIGGS
BY John E Cassidy
ATTORNEY Feb. 5, 1957 R. N. BREED ET AL 2,780,410

TAPE-TO-CARD CONVERTER CIRCUIT

Filed Jan. 29, 1952 94 Sheets-Sheet 14

INVENTORS R. N. BREED
W. B. GROTH
G. C. IRWIN
L. A. KILLE
G. RIGGS

BY John E. Cassidy

ATTORNEY

INVENTORS R. N. BREED
W. B. GROTH
G. C. IRWIN
L. A. KILLE
G. RIGGS
BY John E. Cassidy
ATTORNEY Feb. 5, 1957 R. N. BREED ET AL 2,780,410

TAPE-TO-CARD CONVERTER CIRCUIT

Filed Jan. 29, 1952 94 Sheets-Sheet 16

INVENTORS R. N. BREED
W. B. GROTH
G. C. IRWIN
L. A. KILLE
G. RIGGS

BY John E. Cassidy
ATTORNEY

Feb. 5, 1957 R. N. BREED ET AL 2,780,410

TAPE-TO-CARD CONVERTER CIRCUIT

Filed Jan. 29, 1952 94 Sheets-Sheet 17

INVENTORS R. N. BREED, W. B. GROTH, G. C. IRWIN, L. A. KILLE, G. RIGGS

BY John E. Cassidy

ATTORNEY

Feb. 5, 1957 R. N. BREED ET AL 2,780,410

TAPE-TO-CARD CONVERTER CIRCUIT

Filed Jan. 29, 1952 94 Sheets-Sheet 18

INVENTORS R. N. BREED
W. B. GROTH
G. C. IRWIN
L. A. KILLE
G. RIGGS

BY John E. Cassidy

ATTORNEY

INVENTORS R. N. BREED
W. B. GROTH
G. C. IRWIN
L. A. KILLE
G. RIGGS
BY John E. Cassidy
ATTORNEY Feb. 5, 1957 R. N. BREED ET AL 2,780,410

TAPE-TO-CARD CONVERTER CIRCUIT

Filed Jan. 29, 1952

94 Sheets-Sheet 20

INVENTORS R. N. BREED, W. B. GROTH, G. C. IRWIN, L. A. KILLE, G. RIGGS

BY

ATTORNEY

TAPE-TO-CARD CONVERTER CIRCUIT

Filed Jan. 29, 1952 94 Sheets-Sheet 21

INVENTORS R. N. BREED
W. D. GROTH
G. C. IRWIN
L. A. KILLE
G. RIGGS
BY John E Cassidy
ATTORNEY INVENTORS R.N. BREED
W.B. GROTH
G.C. IRWIN
L.A. KILLE
G. RIGGS
BY John E Cassidy
ATTORNEY

INVENTORS R. N. BREED
W. B. GROTH
G. C. IRWIN
L. A. KILLE
G. RIGGS

BY John E. Cassidy

ATTORNEY

Feb. 5, 1957 R. N. BREED ET AL 2,780,410

TAPE-TO-CARD CONVERTER CIRCUIT

Filed Jan. 29, 1952 94 Sheets-Sheet 24

INVENTORS R. N. BREED, W. B. GROTH, G. C. IRWIN, L. A. KILLE, G. RIGGS

BY John E. Cassidy

ATTORNEY

TAPE-TO-CARD CONVERTER CIRCUIT

Filed Jan. 29, 1952 94 Sheets-Sheet 25

INVENTORS R. N. BREED
W. E. GROTH
G. C. IRWIN
L. A. KILLE
G. RIGGS
BY John E. Cassidy
ATTORNEY

TAPE-TO-CARD CONVERTER CIRCUIT

Filed Jan. 29, 1952 94 Sheets-Sheet 26

INVENTORS R. N. BREED
W. B. GROTH
G. C. IRWIN
L. A. KILLE
G. RIGGS
BY John E. Cassidy
ATTORNEY

TAPE-TO-CARD CONVERTER CIRCUIT

INVENTORS R.N. BREED
W.B. GROTH
G.C. IRWIN
L.A. KILLE
G. RIGGS

BY John E. Cassidy

ATTORNEY

INVENTORS R.N. BREED
W.D. GROTH
G.C. IRWIN
L.A. KILLE
G. RIGGS
BY John E Cassidy
ATTORNEY

INVENTORS R.N. BREED
W.B. GROTH
G.C. IRWIN
L.A. KILLE
G. RIGGS

BY John E. Cassidy

ATTORNEY

INVENTORS
R. N. BREED
W. B. GROTH
G. C. IRWIN
L. A. KILLE
G. RIGGS
BY John E. Cassidy
ATTORNEY INVENTORS R. N. BREED
W. B. GROTH
G. C. IRWIN
L. A. KILLE
G. RIGGS
BY John E. Cassidy
ATTORNEY INVENTOR R. N. BREED
W. B. GROTH
G. C. IRWIN
L. A. KILLE
G. RIGGS
BY John E. Cassidy
ATTORNEY Feb. 5, 1957 R. N. BREED ET AL 2,780,410

TAPE-TO-CARD CONVERTER CIRCUIT

Filed Jan. 29, 1952 94 Sheets-Sheet 33

INVENTORS R. N. BREED W. B. GROTH G. C. IRWIN L. A. KILLE G. RIGGS

BY John E. Cassidy

ATTORNEY

TAPE-TO-CARD CONVERTER CIRCUIT

Filed Jan. 29, 1952

INVENTORS R. N. BREED
W. B. GROTH
G. C. IRWIN
L. A. KILLE
G. RIGGS
BY John E Cassidy
ATTORNEY INVENTORS
R. N. BREED
W. B. GROTH
G. C. IRWIN
L. A. KILLE
G. RIGGS
BY John E. Cassidy
ATTORNEY INVENTORS R. N. BREED
W. D. GROTH
G. C. IRWIN
L. A. KILLE
G. RIGGS
BY John E. Cassidy
ATTORNEY INVENTORS R. N. BREED
W. B. GROTH
G. C. IRWIN
L. A. KILLE
G. RIGGS
BY John E. Cassidy
ATTORNEY Feb. 5, 1957 R. N. BREED ET AL 2,780,410

TAPE-TO-CARD CONVERTER CIRCUIT

Filed Jan. 29, 1952 94 Sheets-Sheet 38

INVENTORS
R. N. BREED
W. B. GROTH
G. C. IRWIN
L. A. KILLE
G. RIGGS

BY John E. Cassidy

ATTORNEY

INVENTORS R. H. BREED
W. B. GROTH
G. C. IRWIN
L. A. KILLE
G. RIGGS
BY John E. Cassidy
ATTORNEY INVENTORS R. N. BREED
W. B. GROTH
G. C. IRWIN
L. A. KILLE
G. RIGGS
BY John E. Cassidy
ATTORNEY INVENTORS R.N.BREED
W.B.GROTH
G.C.IRWIN
L.A.KILLE
G.RIGGS
BY John E. Cassidy
ATTORNEY Feb. 5, 1957 R. N. BREED ET AL 2,780,410

TAPE-TO-CARD CONVERTER CIRCUIT

Filed Jan. 29, 1952 94 Sheets-Sheet 42

INVENTORS R. N. BREED
W. B. GROTH
G. C. IRWIN
L. A. KILLE
G. RIGGS

BY John E. Cassidy

ATTORNEY

INVENTORS R. N. BREED
W. B. GROTH
G. C. IRWIN
L. A. KILLE
G. RIGGS
BY John E. Cassidy
ATTORNEY Feb. 5, 1957 R. N. BREED ET AL 2,780,410

TAPE-TO-CARD CONVERTER CIRCUIT

Filed Jan. 29, 1952 94 Sheets-Sheet 44

INVENTORS R. N. BREED
W. B. GROTH
G. C. IRWIN
L. A. KILLE
E. RIGGS

BY John E. Cassidy

ATTORNEY

TAPE-TO-CARD CONVERTER CIRCUIT

Filed Jan. 29, 1952 94 Sheets-Sheet 45

INVENTORS R. N. BREED
W. B. GROTH
G. C. IRWIN
L. A. KILLE
G. RIGGS
BY John E. Cassidy
ATTORNEY Feb. 5, 1957 R. N. BREED ET AL 2,780,410

TAPE-TO-CARD CONVERTER CIRCUIT

Filed Jan. 29, 1952 94 Sheets-Sheet 46

INVENTORS
R. N. BREED
W. B. GROTH
G. C. IRWIN
L. A. KILLE
G. RIGGS
BY John E. Cassidy
ATTORNEY INVENTORS R.N. BREED
W.B. GROTH
G.C. IRWIN
L.A. KILLE
G. RIGGS
BY John E. Cassidy
ATTORNEY INVENTORS R. N. BREED
W. B. GROTH
G. C. IRWIN
L. A. KILLE
G. RIGGS
BY John E. Cassidy
ATTORNEY Feb. 5, 1957 R. N. BREED ET AL 2,780,410

TAPE-TO-CARD CONVERTER CIRCUIT

Filed Jan. 29, 1952 94 Sheets-Sheet 49

INVENTORS R. N. BREED, W. B. GROTH, G. C. IRWIN, L. A. KILLE, G. RIGGS

BY John E. Cassidy

ATTORNEY

INVENTORS R. N. BREED
W. B. GROTH
G. C. IRWIN
L. A. KILLE
G. RIGGS
BY John E. Cassidy
ATTORNEY Feb. 5, 1957 R. N. BREED ET AL 2,780,410

TAPE-TO-CARD CONVERTER CIRCUIT

Filed Jan. 29, 1952 94 Sheets-Sheet 51

INVENTORS R. N. BREED, W. B. GROTH, G. C. IRWIN, L. A. KILLE, G. RIGGS

BY John E. Cassidy

ATTORNEY

INVENTORS R. N. BREED W. B. GROTH G. C. IRWIN L. A. KILLE G. RIGGS
BY John E. Cassidy
ATTORNEY

TAPE-TO-CARD CONVERTER CIRCUIT

Filed Jan. 29, 1952

INVENTORS R.N. BREED
W.B. GROTH
G.C. IRWIN
L.A. KILLE
G. RIGGS
BY John E. Cassidy
ATTORNEY INVENTORS R.N. BREED
W.B. GROTH
G.C. IRWIN
L.A. KILLE
G. RIGGS
BY John E. Cassidy
ATTORNEY INVENTORS R. N. BREED
W. B. GROTH
G. C. IRWIN
L. A. KILLE
G. RIGGS
BY John E. Cassidy
ATTORNEY

INVENTORS R. N. BREED
W. B. GROTH
G. C. IRWIN
L. A. KILLE
G. RIGGS

BY John E. Cassidy

ATTORNEY

Feb. 5, 1957 R. N. BREED ET AL 2,780,410

TAPE-TO-CARD CONVERTER CIRCUIT

Filed Jan. 29, 1952 94 Sheets-Sheet 57

INVENTORS R. N. BREED
W. B. GROTH
G. C. IRWIN
L. A. KILLE
G. RIGGS

BY John E. Cassidy

ATTORNEY

INVENTORS R. N. BREED
W. B. GROTH
G. C. IRWIN
L. A. KILLE
G. RIGGS
BY John E. Cassidy
ATTORNEY

TAPE-TO-CARD CONVERTER CIRCUIT

Filed Jan. 29, 1952 94 Sheets-Sheet 59

INVENTORS R. N. BREED
W. B. GROTH
G. C. IRWIN
L. A. KILLE
G. RIGGS
BY John E. Cassidy
ATTORNEY

INVENTORS R. N. BREED
W. B. GROTH
G. C. IRWIN
L. A. KILLE
G. RIGGS

BY John E. Cassidy

ATTORNEY

Feb. 5, 1957 R. N. BREED ET AL 2,780,410

TAPE-TO-CARD CONVERTER CIRCUIT

Filed Jan. 29, 1952 94 Sheets-Sheet 61

INVENTORS R. N. BREED, W. B. GROTH, G. C. IRWIN, L. A. KILLE, G. RIGGS

BY John E Cassidy

ATTORNEY

Feb. 5, 1957 R. N. BREED ET AL 2,780,410

TAPE-TO-CARD CONVERTER CIRCUIT

Filed Jan. 29, 1952 94 Sheets-Sheet 62

INVENTORS R. N. BREED
W. B. GROTH
G. C. IRWIN
L. A. KILLE
G. RIGGS

BY John E. Cassidy

ATTORNEY

INVENTORS R. N. BREED
W. B. GROTH
G. C. IRWIN
L. A. KILLE
G. RIGGS

BY John C. Cassidy

ATTORNEY

INVENTORS R. N. BREED
W. D. GROTH
G. C. IRWIN
L. A. KILLE
G. RIGGS

BY John E. Cassidy

ATTORNEY

TAPE-TO-CARD CONVERTER CIRCUIT

Filed Jan. 29, 1952 94 Sheets-Sheet 65

INVENTORS R. N. BREED
W. B. GROTH
G. C. IRWIN
L. A. KILLE
G. RIGGS

BY John E. Cassidy

ATTORNEY

TAPE-TO-CARD CONVERTER CIRCUIT

Filed Jan. 29, 1952 94 Sheets-Sheet 66

INVENTORS R.N. BREED
W.B. GROTH
G.C. IRWIN
L.A. KILLE
G. RIGGS
BY John E. Cassidy
ATTORNEY INVENTORS R. N. BREED
W. B. GROTH
G. C. IRWIN
L. A. KILLE
G. RIGGS
BY John E. Cassidy
ATTORNEY INVENTORS R. N. BREED
W. B. GROTH
G. C. IRWIN
L. A. KILLE
G. RIGGS
BY John E. Cassidy
ATTORNEY

TAPE-TO-CARD CONVERTER CIRCUIT

Filed Jan. 29, 1952 94 Sheets-Sheet 69

INVENTORS R. N. BREED
W. B. GROTH
G. C. IRWIN
L. A. KILLE
G. RIGGS
BY John E. Cassidy
ATTORNEY INVENTORS R. N. BREED
W. B. GROTH
G. C. IRVIN
L. A. KILLE
G. RIGGS
BY John E. Cassidy
ATTORNEY

TAPE-TO-CARD CONVERTER CIRCUIT

INVENTORS R. N. BREED
W. B. GROTH
G. C. IRWIN
L. A. KILLE
G. RIGGS
BY John E. Cassidy
ATTORNEY INVENTORS R. N. BREED
W. B. GROTH
G. C. IRWIN
L. A. KILLE
G. RIGGS
BY John E Cassidy
ATTORNEY Feb. 5, 1957 R. N. BREED ET AL 2,780,410

TAPE-TO-CARD CONVERTER CIRCUIT

Filed Jan. 29, 1952 94 Sheets-Sheet 73

INVENTORS R. N. BREED
W. B. GROTH
G. C. IRWIN
L. A. KILLE
G. RIGGS
BY John E. Cassidy
ATTORNEY

TAPE-TO-CARD CONVERTER CIRCUIT

Filed Jan. 29, 1952 94 Sheets-Sheet 74

INVENTORS R. N. BREED
W. B. GROTH
G. C. IRWIN
L. A. KILLE
G. RIGGS
BY John E. Cassidy
ATTORNEY INVENTORS R. N. BREED
W. B. GROTH
G. C. IRWIN
L. A. KILLE
G. GRIGGS
BY John E. Cassidy
ATTORNEY Feb. 5, 1957 R. N. BREED ET AL 2,780,410

TAPE-TO-CARD CONVERTER CIRCUIT

Filed Jan. 29, 1952 94 Sheets-Sheet 76

INVENTORS R. N. BREED
W. B. GROTH
G. C. IRWIN
L. A. KILLE
G. RIGGS

BY John E. Cassidy

ATTORNEY

TAPE-TO-CARD CONVERTER CIRCUIT

Filed Jan. 29, 1952 94 Sheets-Sheet 77

INVENTOR R. N. BREED
W. B. GROTH
G. C. IRWIN
L. A. KILLE
G. RIGGS

BY John E. Cassidy
ATTORNEY

INVENTORS R. N. BREED
W. B. GROTH
G. C. IRWIN
L. A. KILLE
G. RIGGS
BY John E Cassidy
ATTORNEY Feb. 5, 1957 R. N. BREED ET AL 2,780,410

TAPE-TO-CARD CONVERTER CIRCUIT

Filed Jan. 29, 1952 94 Sheets-Sheet 79

INVENTORS R. N. BREED
W. B. GROTH
G. C. IRWIN
L. A. KILLE
G. RIGGS

BY John E. Cassidy

ATTORNEY

INVENTORS R. N. BREED
W. B. GROTH
G. C. IRWIN
L. A. KILLE
G. RIGGS
BY John E. Cassidy
ATTORNEY

TAPE-TO-CARD CONVERTER CIRCUIT

Filed Jan. 29, 1952

INVENTORS R. N. BREED
W. B. GROTH
G. C. IRWIN
L. A. KILLE
G. RIGGS
BY John E Cassidy
ATTORNEY INVENTOR
R. N. BREED
W. B. GROTH
G. C. IRWIN
L. A. KILLE
G. RIGGS
BY John E. Cassidy
ATTORNEY

INVENTORS R. N. BREED
W. B. GROTH
G. C. IRWIN
L. A. KILLE
G. RIGGS

BY John E. Cassidy
ATTORNEY

Feb. 5, 1957 R. N. BREED ET AL 2,780,410
TAPE-TO-CARD CONVERTER CIRCUIT
Filed Jan. 29, 1952 94 Sheets-Sheet 84
FIG. A
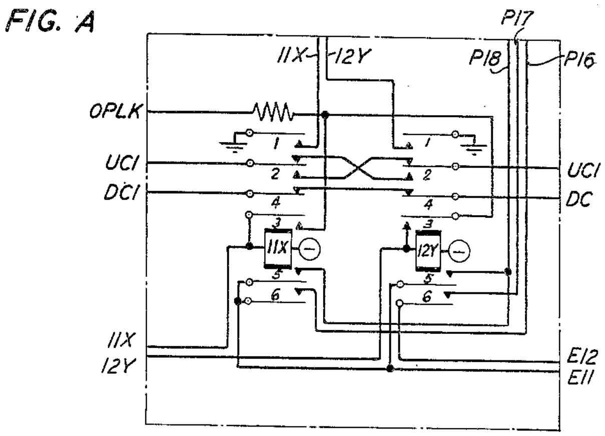
FIG. C
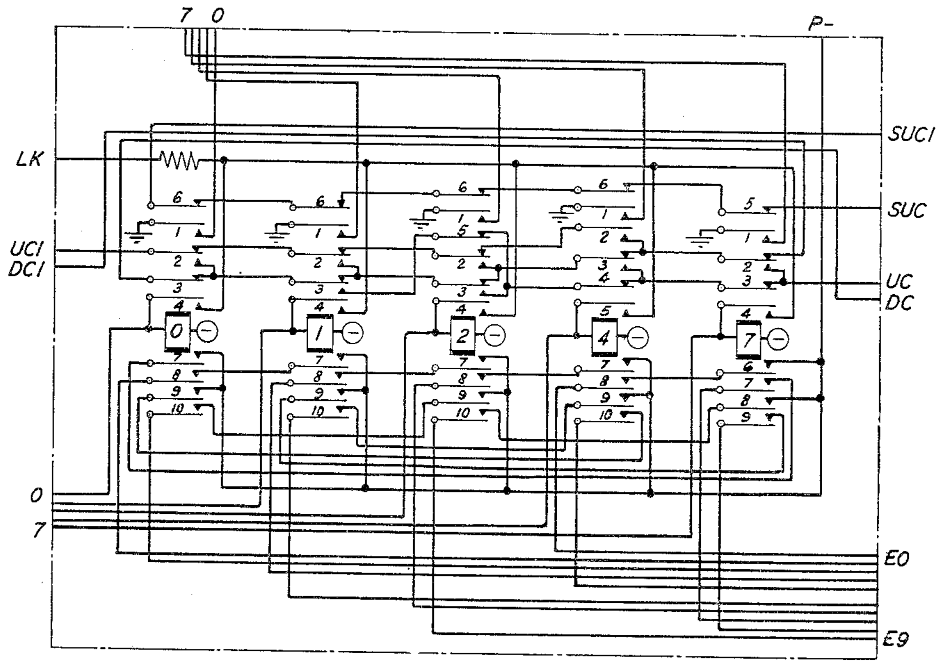
INVENTORS R. N. BREED
W. B. GROTH
G. C. IRWIN
L. A. KILLE
G. RIGGS
BY John E. Cassidy
ATTORNEY TAPE-TO-CARD CONVERTER CIRCUIT
Filed Jan. 29, 1952 94 Sheets-Sheet 85
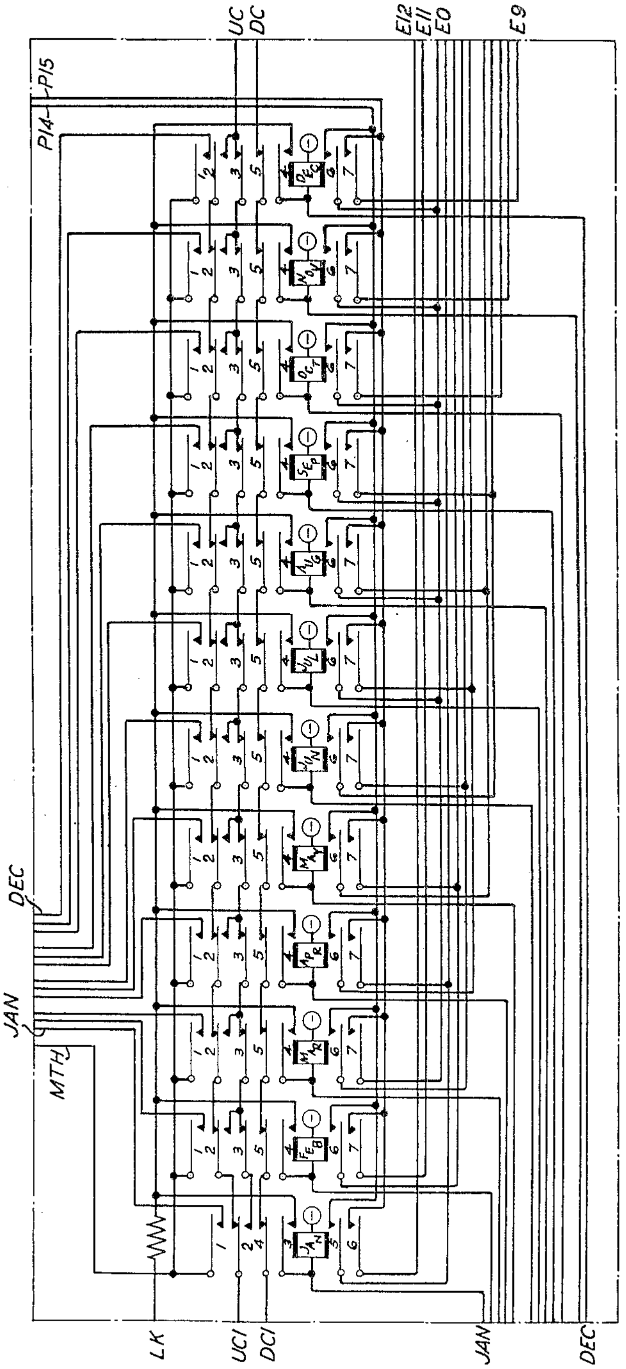
FIG. B
INVENTORS R. N. BREED
W. B. GROTH
G. C. IRWIN
L. A. KILLE
G. RIGGS
BY John E. Cassidy
ATTORNEY FIG. D
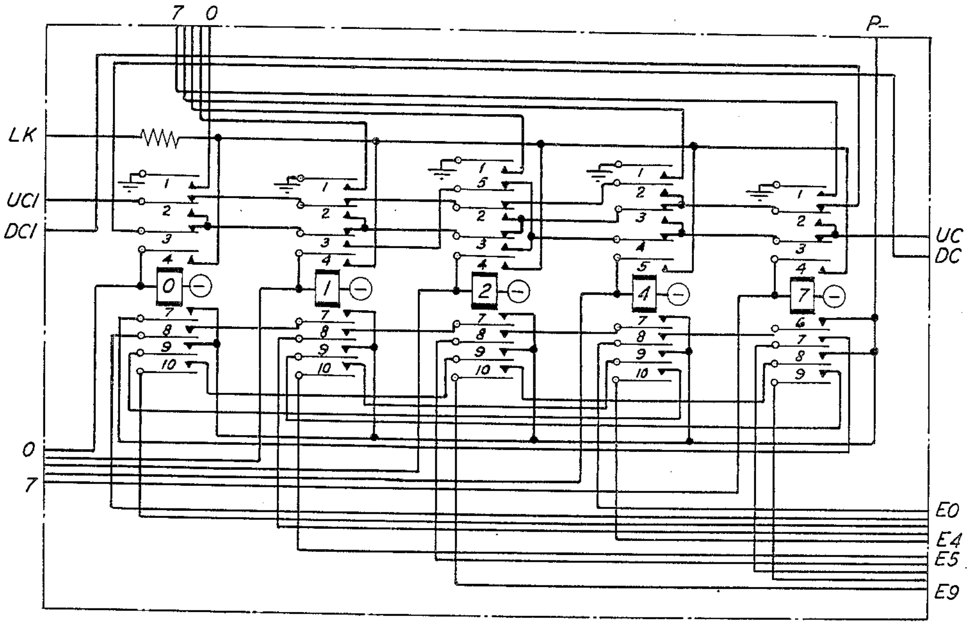
INVENTORS R. N. BREED
W. B. GROTH
G. C. IRWIN
L. A. KILLE
G. RIGGS
BY John E. Cassidy
ATTORNEY

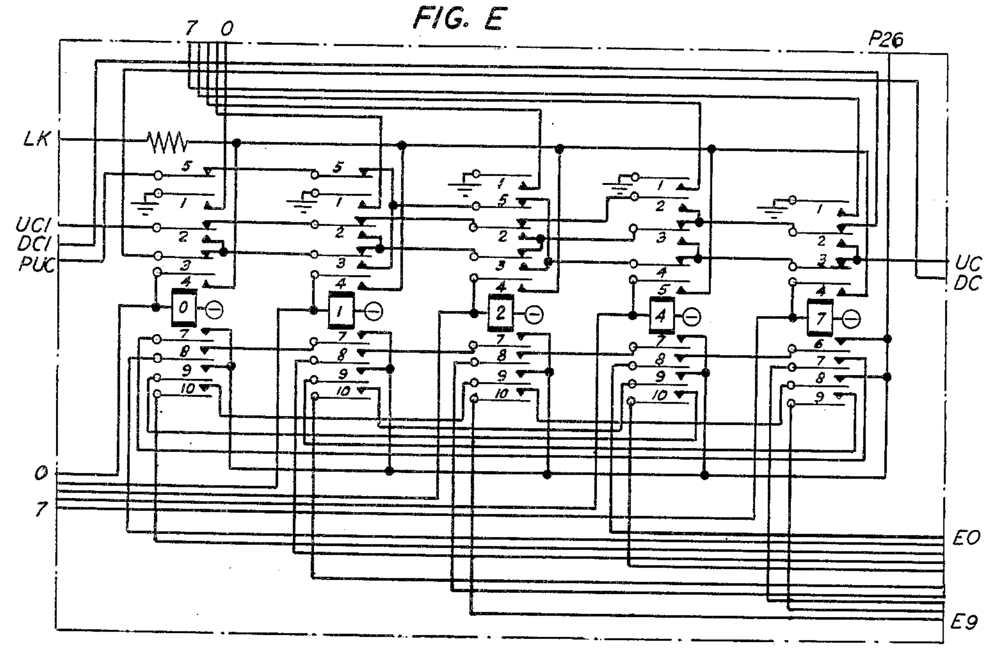
FIG. F
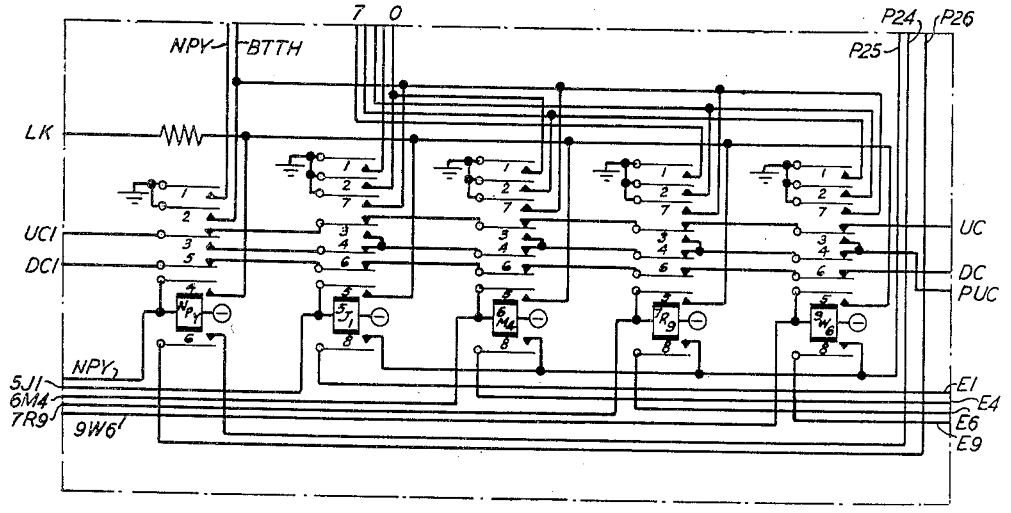
INVENTORS R. N. BREED
W. B. GROTH
G. C. IRWIN
L. A. KILLE
G. RIGGS
BY John E. Cassidy
ATTORNEY FIG. G
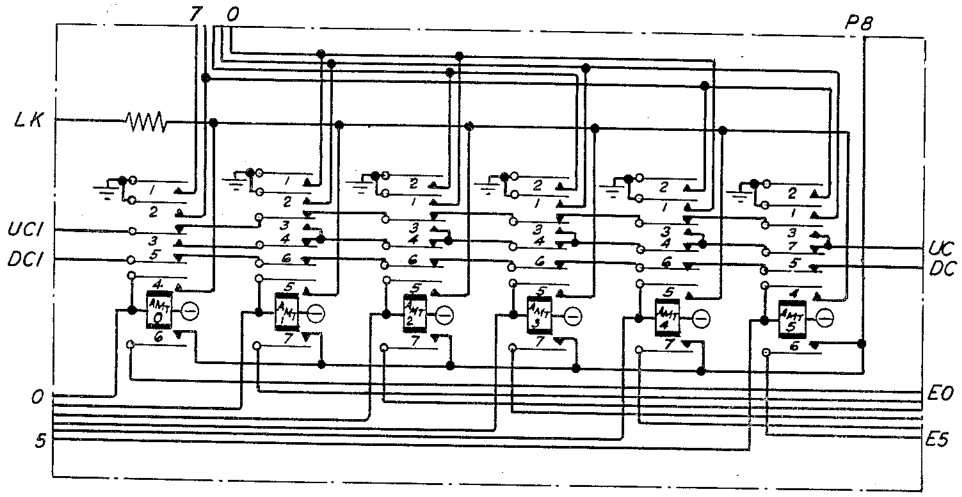
FIG. H
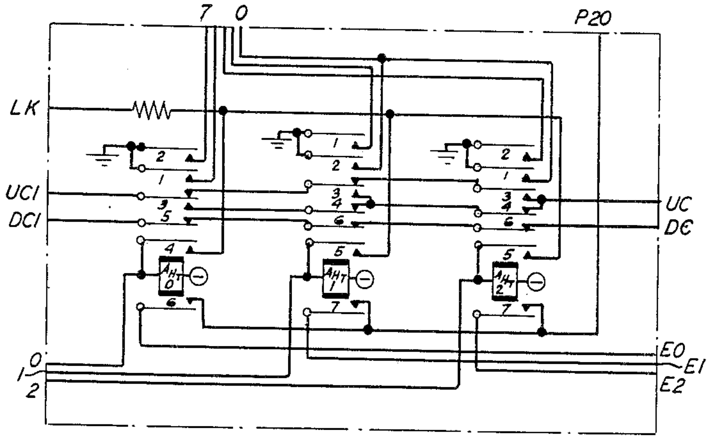
INVENTORS R. N. BREED
W. B. GROTH
G. C. IRWIN
L. A. KILLE
G. RIGGS
BY John E. Cassidy
ATTORNEY

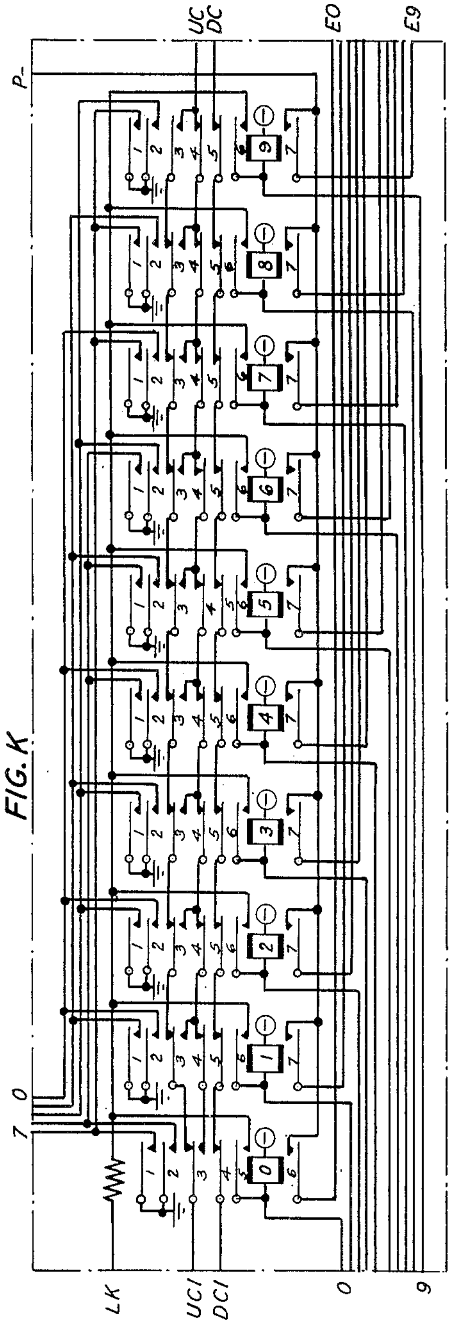
FIG. K
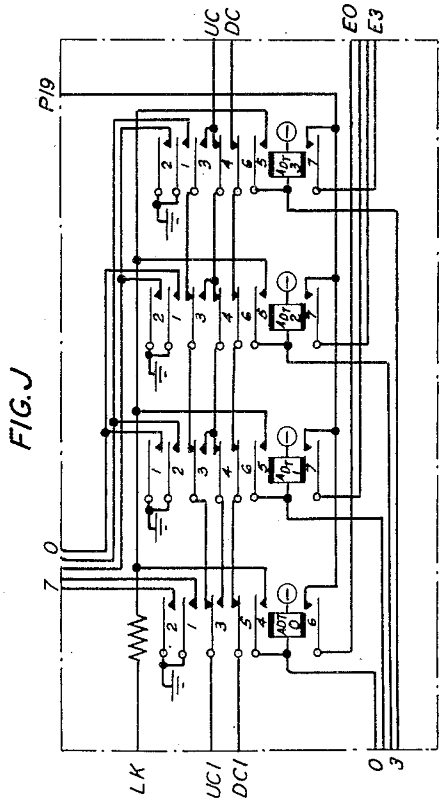
FIG. J
INVENTORS R. N. BREED
W. B. GROTH
G. C. IRWIN
L. A. KILLE
G. RIGGS
BY John E. Cassidy
ATTORNEY Feb. 5, 1957 R. N. BREED ET AL 2,780,410

TAPE-TO-CARD CONVERTER CIRCUIT

Filed Jan. 29, 1952 94 Sheets-Sheet 90

INVENTORS R. N. BREED
W. B. GROTH
G. C. IRWIN
L. A. KILLE
G. RIGGS

BY John E. Cassidy

ATTORNEY

TAPE-TO-CARD CONVERTER CIRCUIT

INVENTORS R. N. BREED
W. B. GROTH
G. C. IRWIN
L. A. KILLE
G. RIGGS

BY John E. Cassidy

ATTORNEY

INVENTORS R. N. BREED
W. B. GROTH
G. C. IRWIN
L. A. KILLE
G. RIGGS

BY John E. Cassidy
ATTORNEY

INVENTORS
R.N. BREED
W.B. GROTH
G.C. IRWIN
L.A. KILLE
G. RIGGS
BY John E. Cassidy
ATTORNEY Feb. 5, 1957 R. N. BREED ET AL 2,780,410

TAPE-TO-CARD CONVERTER CIRCUIT

Filed Jan. 29, 1952 94 Sheets-Sheet 94

INVENTORS
R. N. BREED
W. B. GROTH
G. C. IRWIN
L. A. KILLE
G. RIGGS

BY John E. Cassidy

ATTORNEY

United States Patent Office 2,780,410

Patented Feb. 5, 1957

2,780,410

TAPE-TO-CARD CONVERTER CIRCUIT

Rolland N. Breed, Clifton, N. J., Willard B. Groth, Bronx, N. Y., Gordon C. Irwin, Fair Haven, and Lindley A. Kille, Morristown, N. J., and George Riggs, Port Washington, N. Y., assignors to Bell Telephone Laboratories, Incorporated, New York, N. Y., a corporation of New York

Application January 29, 1952, Serial No. 268,742

4 Claims. (Cl. 235—61)

This invention pertains to recording systems and particularly to systems in which assembled items of recorded data are transferred in part directly and in part in translated form to another more readily utilizable recording medium. The present system may, for instance, receive coded information from a punched tape and convert it so that it may be punched in a card by a commercial business machine for accounting purposes.

An object of the invention is the improvement of recording and translating systems and methods.

An example of an improved recording system in which the invention is presently incorporated, is a system comprising, for instance, a tape having a number of sequential lines, each line having, for instance, a plurality of items of information, punched or embossed therein according to a preferred code. The record of a particular transaction comprises a plurality of such successive lines. The perforations or embossings may be sensed in any of a number of manners, electrically, mechanically or photoelectrically. In the present embodiment the sensing is performed electrically by a device known as a reader, which senses each line, and all of its several items of information, simultaneously and the several lines, corresponding to a complete entry of a transaction, sequentially. The several items of information appearing in each line of the tape are transferred, first to a set of reading relays. Each horizontal line of the tape may, for instance, have twenty-eight individual positions. The first group of three perforable positions of the twenty-eight is called group A. The remaining twenty-five are divided into five groups of five each, called group B, group C, group D, group E and group F. Similar nomenclature is employed in designating the reading relays and the groups of the several separate lines of the input register as well as various signals, alarms, etc. These groups of relays may be assigned, for instance, to record six items of information per line. Five of the items, for instance, may each be recorded in the five groups each of five adjacent horizontal positions of the tape. The sixth item of information may be recorded in the remaining three positions of the tape. Thus the full twenty-eight units in a horizontal row of the tape may be employed to record say six items of information. A complete transaction may comprise, for instance, five successive lines of tape. At times a complete record of a different transaction may comprise a different number of successive lines, such as two, lines of tape. The items of information perforated or embossed in the section of tape arranged in groups of five may be, for instance, in accordance with an additive two-out-of-five code, to represent any of the ten digits. This code will be explained in detail hereinafter. It will suffice at this point to mention that it comprises five positions numbered 0, 1, 2, 4 and 7. Two tape positions, reading pins, or relays in each group of five will be perforated, closed or operated, respectively, to indicate a number corresponding to the sum of the two. Thus 1 and 2 represent 3 and 0 and 1 represent 1. There is one exception which must be kept in mind. According to the code 4 and 7 arbitrarily represent 0. The sixth item of information employing only three adjacent horizontal positions may employ a code different from the additive two-out-of-five code such as a one-out-of-three or a three-out-of-three code to record a more restricted amount of information. It appears only in the first line of the entry for identification purposes and will be explained in detail hereinafter.

The code impressed in the tape, in accordance with the present arrangement is transferred through the reader, which is a well-known device for sensing the perforations, to a group of reading relays. There is a reading relay for each of the twenty-eight positions of the tape. Each of the twenty-eight reading relays is operated or released depending upon the perforation or non-perforation of its corresponding position of the tape. There is a separate group of reading relays for each item of information in a line of tape. Thus the six items of information recorded in a particular line are transferred individually to six groups of reading relays, five groups of five relays for each line and one group of three relays for the first line of an entry only.

The system of the invention, in addition to the reading relays, has an input register. The input register is divided into as many sections as the maximum number of lines of tape required for a transaction. For instance, if there are five lines of tape relating to the recorded transaction requiring the largest number of lines, the input register will have five sections. In general, each section of the input register has a relay corresponding to each reading relay and therefore to each of the positions in a horizontal row of tape. After each line of tape is read by the reader, and transferred to the reading relays, it is next transferred to its particular line or section of the input register, according to its line position of the tape in which it is perforated, each line in sequence, until all of the lines of tape relating to a particular transaction have been read and recorded in the input register.

The pattern of operation and release of each group of relays in each line section of the input register, upon completion of input registration, will correspond with the perforation or non-perforation of its corresponding section of the say five-line tape recording of the transaction. Thus if, for instance, in the third line of the tape recording a particular transaction, of the five horizontal perforable positions allotted to the last item of the line, positions 2 and 3 are perforated, relays in the corresponding positions of the last group of relays of line three of the input register will be operated. In accordance with the additive two-out-of-five code, in which values 0, 1, 2, 4 and 7 are assigned to the five positions, respectively, if positions 2 and 3 of the tape are perforated, the sum of the digits 1 and 2 assigned thereto is 3. Operation of the corresponding relays in the third section or line of the register, last group of relays will also indicate digit 3. If the first and second positions are perforated the sum of the corresponding digits 0 and 1 is 1, and in like manner for each two-tape positions of any group of five positions and for each two corresponding relay positions in the corresponding register group of a line, except for tape positions 4 and 7 and corresponding relay positions 4 and 7 of a group of five, the sum of which is arbitrarily designated as 0 as heretofore mentioned.

It has been stated that certain transactions may be recorded in fewer lines of tape and such transactions will employ only the same fewer lines of input register. It is pointed out however that particular tapes will have perforated therein a uniform number of lines for each transaction in the particular tape. Thus while tapes perforated, for instance, with five-line transactions are being run, each transaction therein will have five perforated lines per transaction. While tapes employing two lines, for instance, for each transaction are beign run, each entry in the tape will have two perforated lines per transaction and each transaction will be recorded in lines 1 and 2 of the register, while the other three lines of the input register, lines 3, 4 and 5, will not be employed.

Before the start of registering in the input register, the entire register is down-checked to insure that each relay in the entire register is released, or in the down position as this is called. This is performed by establishing a path from ground through a break contact, of each relay in the entire input register, that is to say a contact which is closed only when the relay is released, as distinguished from a make contact which is closed only when the relay is operated, and through the winding of a relay known as the input register down-check relay to battery to operate the relay which permits registering in the input register to start.

There is another check of the input register to insure proper registration called the input register up-check. When the two-out-of-five code is employed, two and only two relays of each group of five of the five groups B, C, D, E and F of a line should be operated. Each group of five relays which individually cooperate to register a particular item of information is arranged so that if two relays and two relays only of each group of five are operated, a path is establishable from ground through the make contacts of the two operated relays and the break contacts of the three other relays of the group of five and through a corresponding path through each group of five relays of a particular line of the register, according to the particular registration in each group and through the winding of a relay corresponding to the input register line to battery operating the relay. This, as is apparent, does not afford a positive check that the registration effected of the line is correct, but simply an indication that it is plausible. As each line of the input register is filled and before the reader is stepped to read the succeeding line of tape, the newly registered line in the input register is up-checked and its correspondingly numbered line up-check relay is operated.

If a tape having transactions requiring five lines is being processed, each of five up-check relays, one for each of lines 1 to 5 of the tape and of the register, is operated and, for the sake of simplicity, leaving out of consideration for the present certain refinements, it may be said that a path establishable from ground through a make contact of each of the five up-check relays 1 to 5 for a five-line entry indicates a plausible registration of the entries of each line of a five-line transaction and controls a relay which permits the circuit to proceed.

In the case of a transaction requiring only two lines of tape for a transaction, when the up-check relays for lines 1 and 2 of the register are operated, again neglecting certain refinements, the circuit is enabled to proceed with succeeding functions.

The present arrangement comprises thirty output registers. A considerable number of the output registers are arranged to receive certain items of information directly as recorded in a corresponding number of groups of relays of the input registers. That is to say, such output registers each comprises five relays designated 0, 1, 2, 4 and 7, respectively, and operate on an additive two-out-of-five code basis. If relays designated 1 and 2 in the input register are operated, to identify the digit corresponding to their sum, or 3, relays designated 1 and 2 in the output register will be operated to identify the same digit 3.

Other information recorded in various groups of the relays in the input registers is not transferred directly to the output registers. It is first subjected to a process known in the art as translation. That is to say the information as recorded in the input registers is acted upon through the medium of the setting of certain groups of switches and the operation of certain other groups of relays to change the form of the information as recorded in the input registers into a different form or to add an element of information thereto before it is impressed on the output registers. This will be described in detail hereinafter.

Before information is transferred to the output registers, the output registers are down-checked to insure that they are all released. After the information has been transferred to the output registers the registers are up-checked to insure that the registration is plausible before it is used to control the commercial business machine card punch in the ultimate recording.

In the present arrangement the information received from the different kinds of tape, that is to say, tapes having, for instance, five line entries and tapes having two line entires, require different sets of output registers, certain of which registers are common to both and others of which are individual thereto. The directing of the informaton into the proper registers is performed by relays under the control of switches which are operated to particular positions before the running of the tape begins. Each tape at its head end has certain identifying perforations which are automatically checked against the switch settings to insure that the type of tape being run conforms to the tape expected and the manual settings of the switches.

The operation of the output registers in turn controls the punches of a commercial business machine card punch. Card punching machines well known in the art suitable for use with the present arrangement are the International Business Machines or IBM, as it will hereinafter be identified, No. 514 and No. 523 Summary Punch. The present system thus converts recordings on tape to recordings on a punched business machine card which is adapted to be processed by other commercial accounting machines.

The punched tapes which are employed in the input of the present arrangement may be prepared in any desired manner to produce the recorded information in the form of a plurality of coded items per line and a plurality of successive lines per transaction. There are presently known in the art a number of arrangements which prepare a record in this form. For instance, in communication systems and particularly in modern telephone systems which are arranged for automatic message accounting there are a number of automatic message accounting of AMA, as it will hereinafter be called, arrangements, well known in the art, with which the present arrangement is designed to cooperate. That is to say it will accept punched tapes produced by these other well known AMA systems and convert them so that through the agency of a connected commercial accounting punch card machine, the IBM 514 or 523 summary punch, for instance, a punched record is produced suitable for further processing, such as the actual preparation of a telephone subscriber's bill or statement or for other purposes such as for service observing or service operation or maintenance purposes.

As will become apparent from the detailed disclosure, the principles of the present system are not limited in application in the communications industry nor to use with AMA prepared tapes in its input. Any tape having a plurality of groups of coded punchings arranged transversely and in which a plurality of successive transverse lines are grouped in succession longitudinally to form a record of a single transaction may be employed. Of course it is to be understood that the particular switching devices employed in the present converter to effect the translation to supply additional items of information or to change its form for the ultimate punched commercial record will depend upon the particular requirements of the input record. A knowledge of the detailed operation of the various AMA or other devices employed to prepare the input tape is not required for an understanding of the present invention. The tape, if desired, could be prepared by a hand operated perforator.

When a perforated tape is employed as the input record it is necessary to splice successive sections together. Such sections will be perforated in accordance with the codes of a plurality of preselected multiple digit numbers, 081010 for instance, arranged in sequence. The present circuit is arranged so that upon encountering a section of tape so punched, that is to say punched with the codes of the mutiple digit number assigned to identify a section of tape containing a splice, the present circuit recognizes the number and instead of directing it into the input register and through the circuit to control a punching operation, the present circuit responds to a succession of codes of such numbers perforated in the tape by operating the machine to as it were skip over the splice section.

There are other multiple digit numbers, the perforated codes of which appear in the tape for special purposes. They are employed not for controlling the punching of a card, but for checking and control purposes and are not transferred to the registers. Such codes at the leading end of a tape containing transactions as well as at the trailing end of a tape are characterized by a succession of nine lines each having the punched code of a different assigned six digit number, the first three digits of each of which six digits number are preassigned, such as 289, followed by three other identifying digits which though preassigned vary from line to line to afford a necessary check of various items to identify the tape as containing entries of a particular description, such as the number of lines to a transaction, or as coming from a particular source. During their reception they are checked against the settings of the preset manual switches to insure that the present circuit has been properly adjusted to receive the particular transactions appearing in the tape. The section of punched tape containing these identifying entries appearing at the leading end of a tape is called herein the leading tape identity. In a similar manner the nine lines following a succession of coded transactions, called hereinafter trailing tape identity, each have preassigned six digit numbers, the first three digits of which are the same three digits as assigned for leading tape identity, such as 289, followed by three other identifying digits.

Leading tape identity entries and trailing tape identity entries are not directed into the registers. As each line of the nine lines is received in each instance, if it is properly coded in the tape and if it corresponds with the settings of the switches, it operates one of nine line relays, line relays 1 to 9, in sequence, meanwhile stepping the reader after each line has been found to be correct. If the entire nine line punched code for leading or trailing tape identity is found to be correct and the nine line relays 1 to 9 are operated in proper sequence, the circuit is conditioned to perform a succeeding function such as to direct the codes of the first line of a transaction into the inpue register in the case of leading tape identity.

The present arrangement will punch either one card or two cards for a single entry of a transaction recorded in an input tape depending upon the perforations in the tape and the setting of the control switches. That is to say the present circuit may be set up so as to control the connected commercial accounting card punching machine so that, instead of producing the usual single punched card, an extra punched card is produced from the single input record of the transaction if an extra card is desired for any purpose.

These and other features of the invention may be learned from the following description when read with reference to the following drawings which taken together disclose a preferred embodiment in which the invention is presently incorporated.

Figs. 1 to 83 inclusive and Figs. A to H, J and K, all arranged as in Fig. 84, disclose the overall circuit of the invention.

Fig. 85 is a diagrammatic sketch showing by means of designated rectangles the relationship of the principal units of the overall circuit of this invention; Fig. 86 is a diagrammatic sketch showing by means of designated rectangles the relationship of the output circuit particularly the output registers and the IBM summary punch, portions of the latter being shown in perspective.

Fig. 87 is a diagram of a card which is employed in the IBM summary punch, which diagram is used in explaining a full punching cycle as an aid in understanding the operation of the present circuit; Figs. 88A, 88B, 88C and 88D are diagrams showing the successive stages in the movement of a card during a card free cycle of the IBM summary punch as an aid to understanding the operation of the present circuit.

Fig. 89 is a diagram of a plan view of an IBM summary punch card, with designations, used to explain the invention.

With respect to the overall circuit, Figs. 1 to 83, it is pointed out that it is, taken together, a single circuit unit, which although certain of its individual figures or groups of figures may be separately identifiable by function, the separation into individual figures has been dictated in general by the necessity for dividing the unitary circuit into units of patent drawing size. For this reason, at this point in the text, instead of describing each individual drawing figure, in numerical sequence, it is considered that it will be more helpful if the figures are described, with reference to the overall block diagram of Fig. 84, some individually but most in groups in relation to the most important separable functions.

Figure 13:
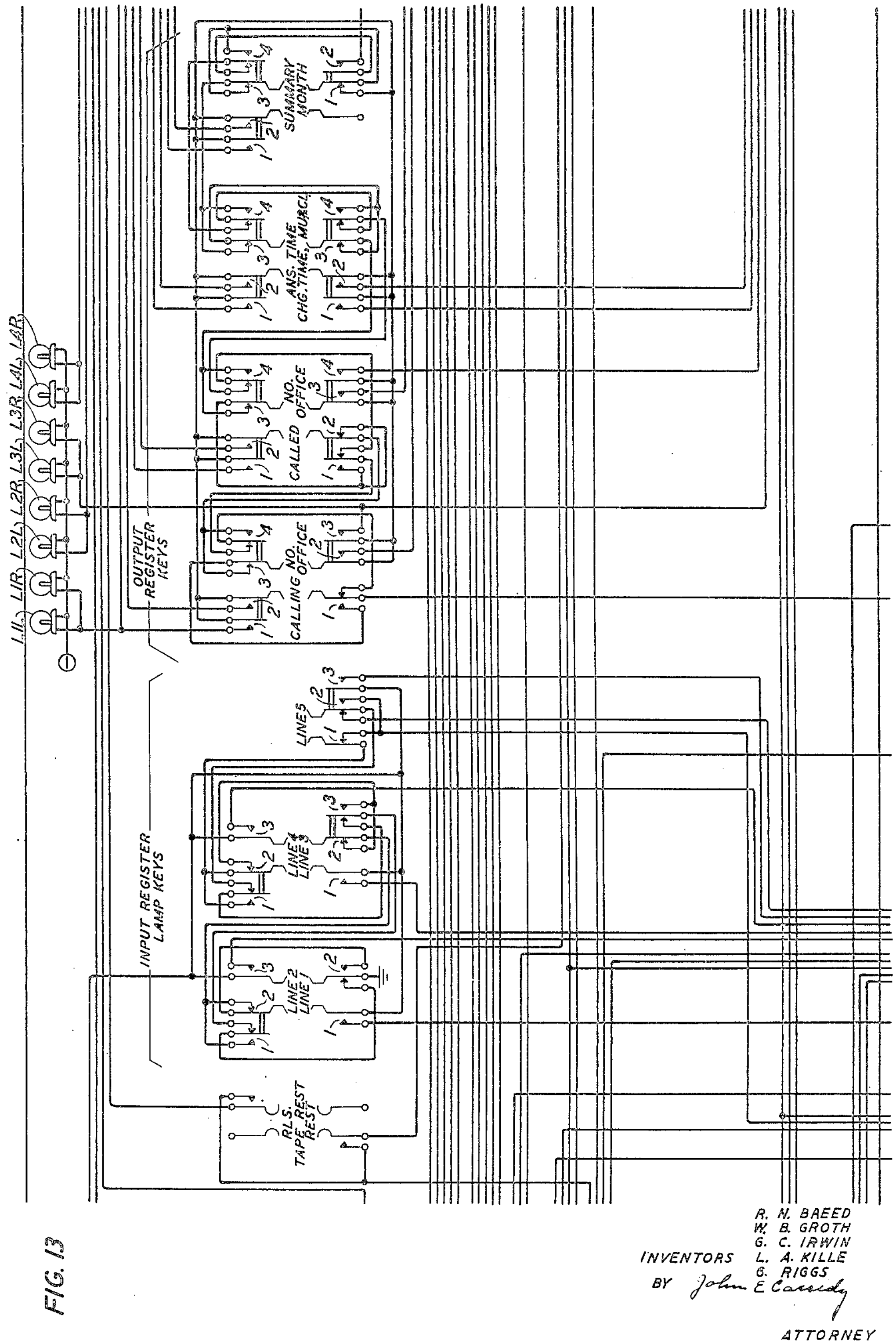
Figure 14:
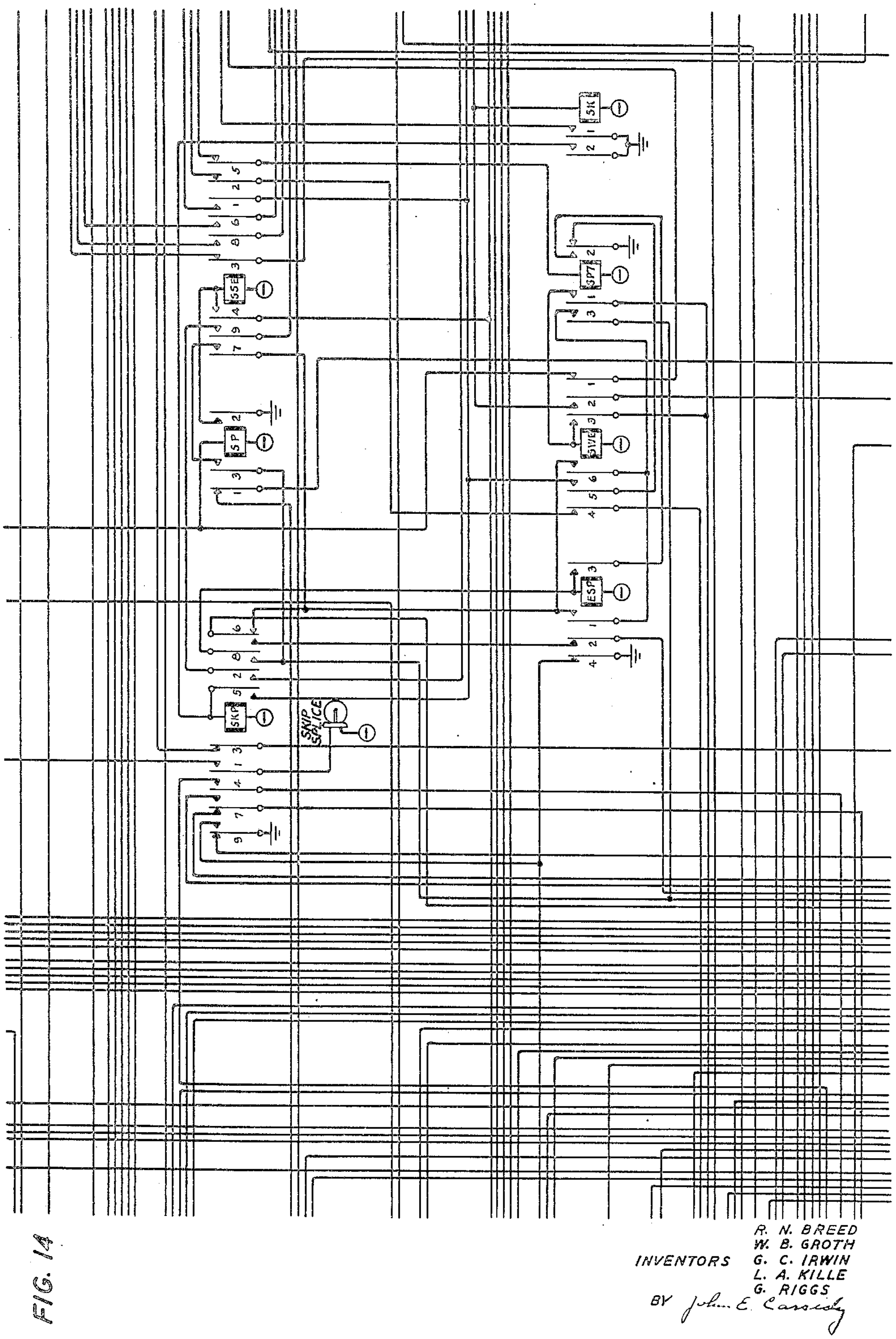
Figure 15:
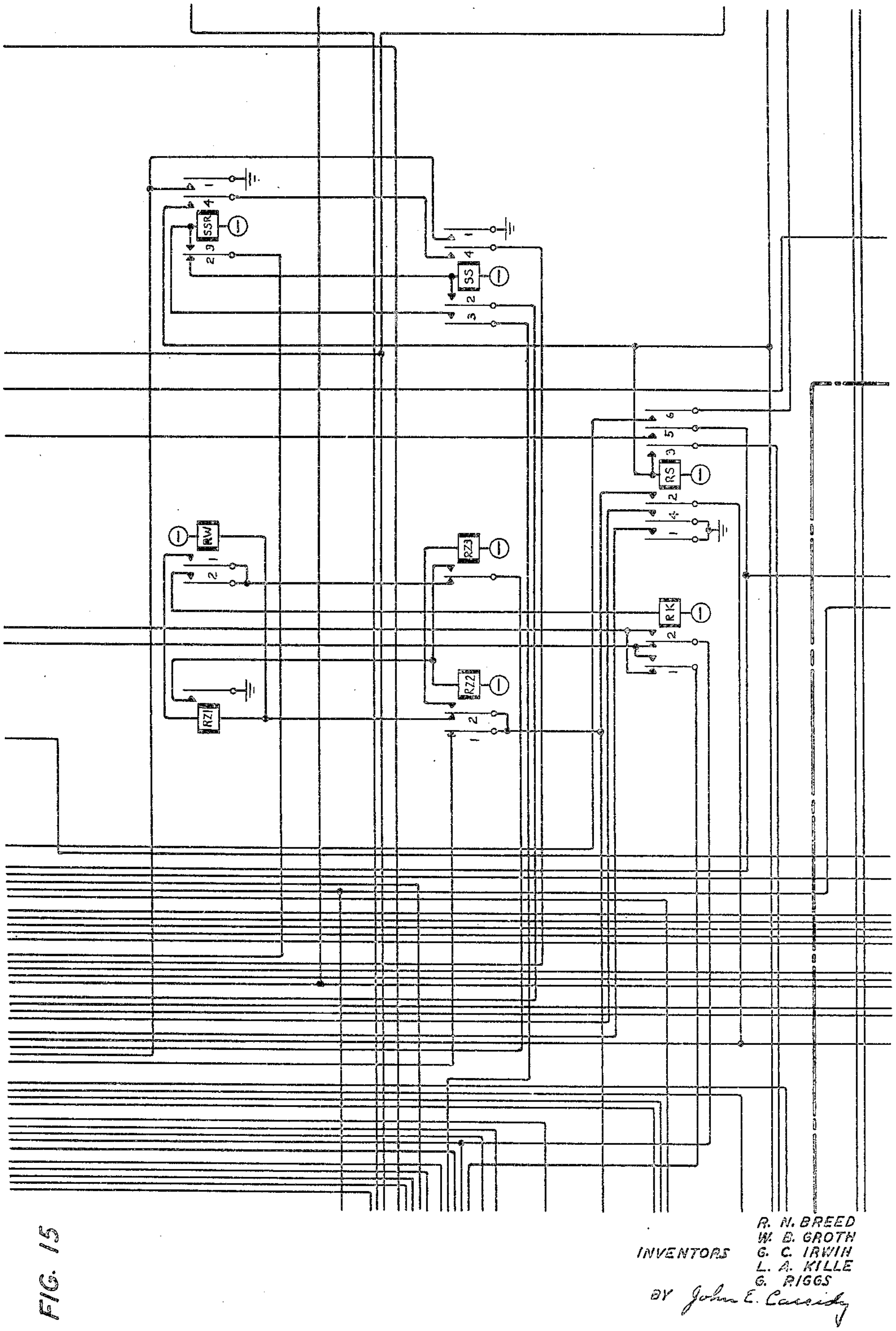
Figure 16:
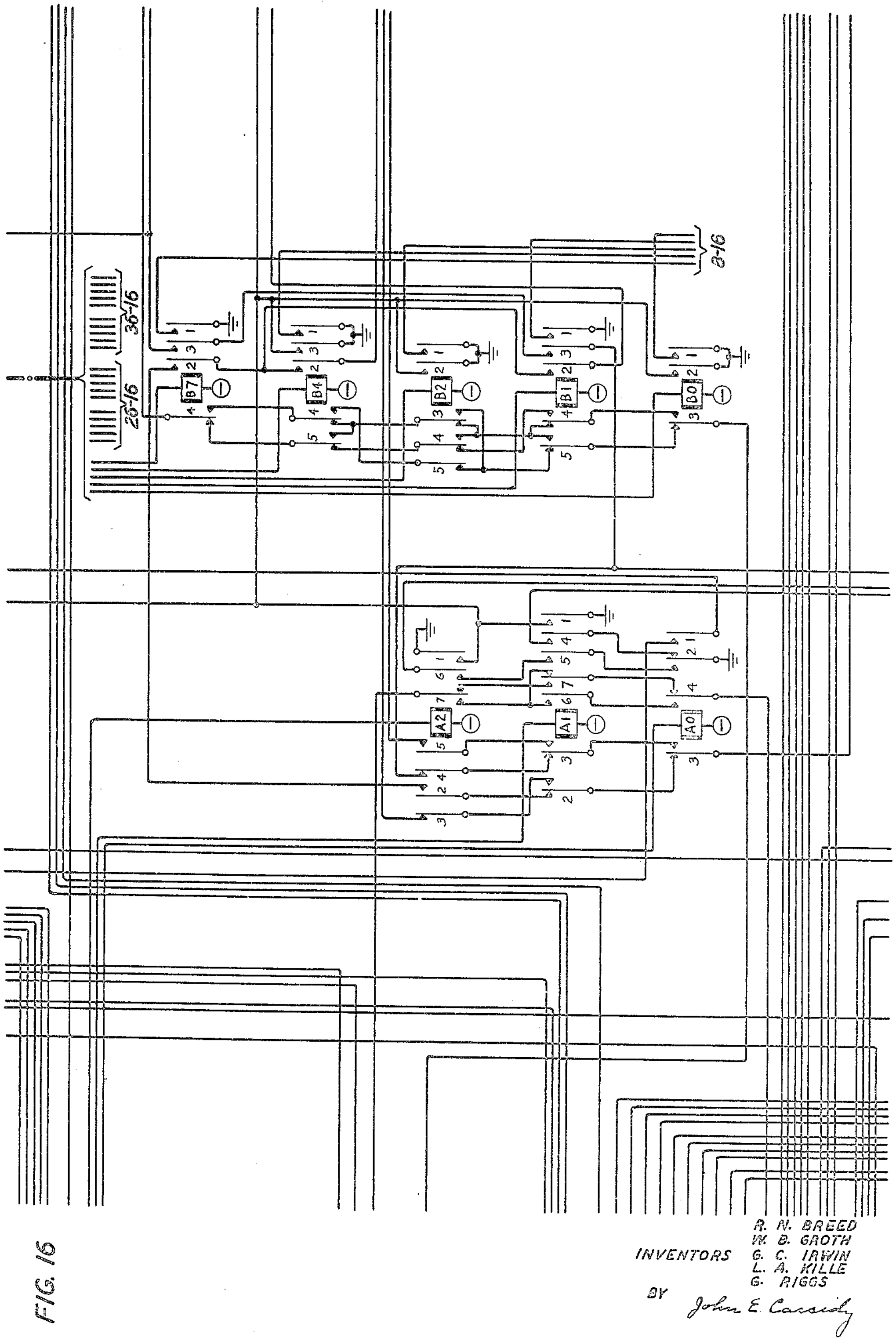
Figure 17:
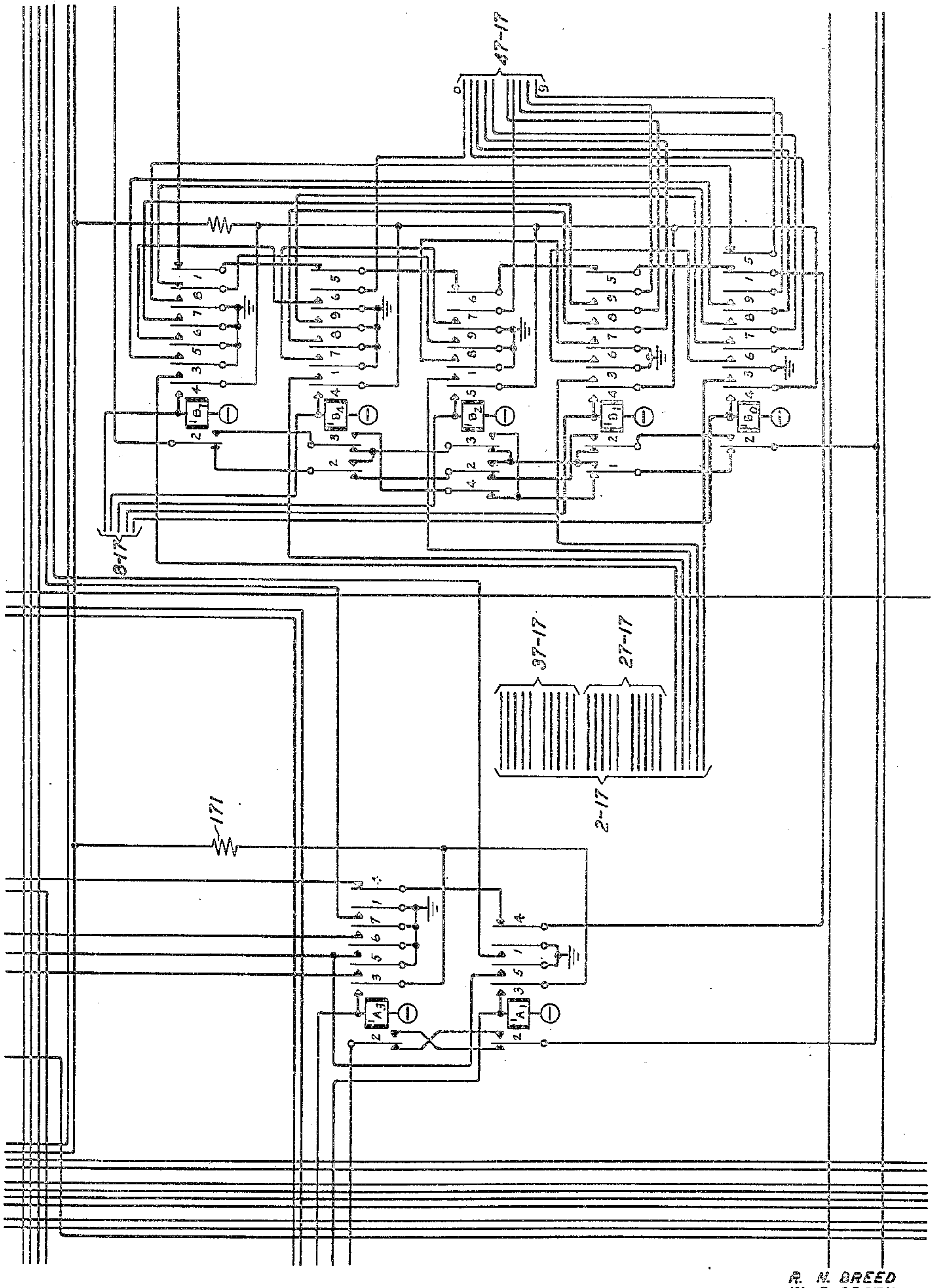
Figure 22:
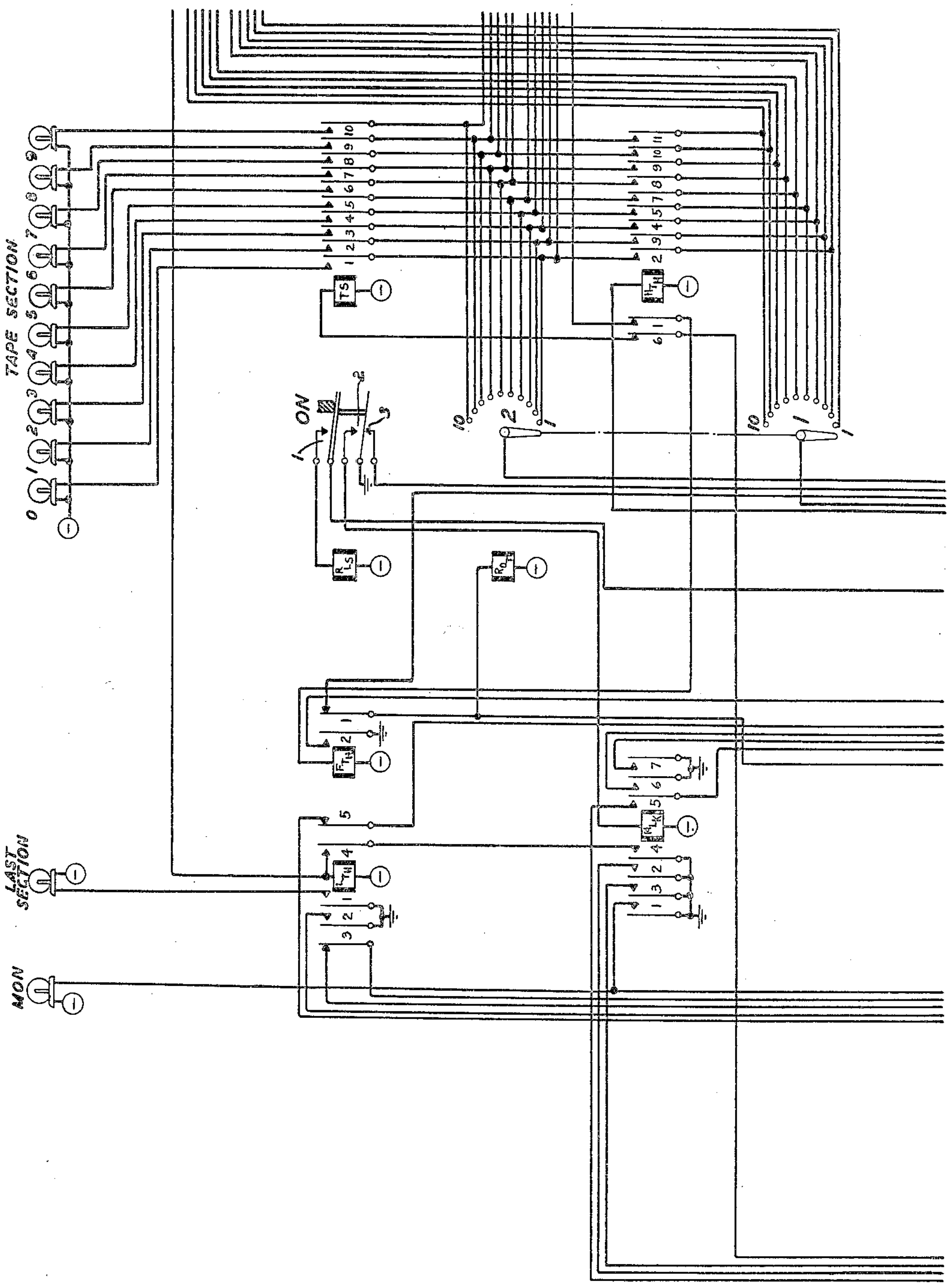
Figure 23:
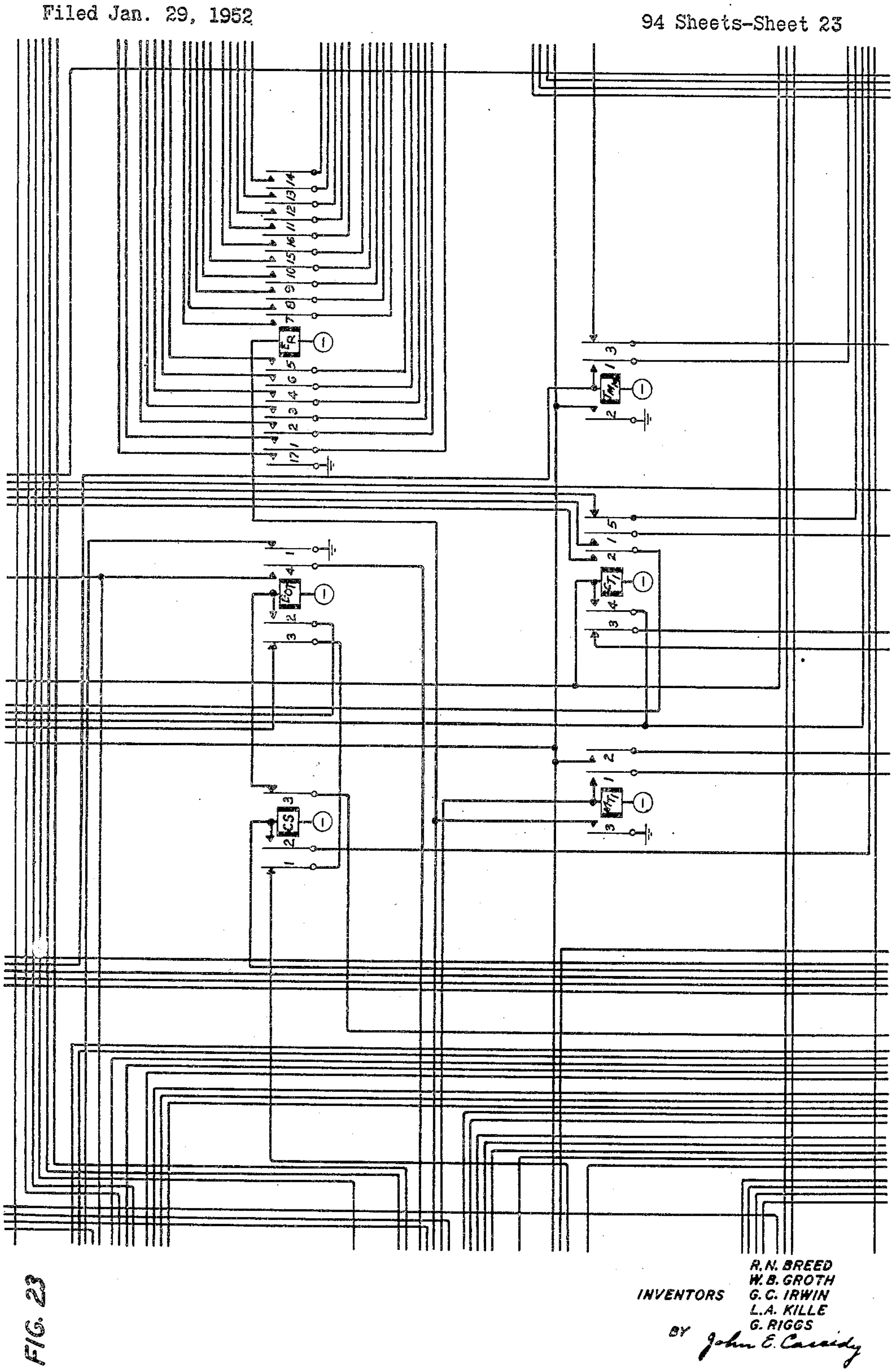
Figure 24:
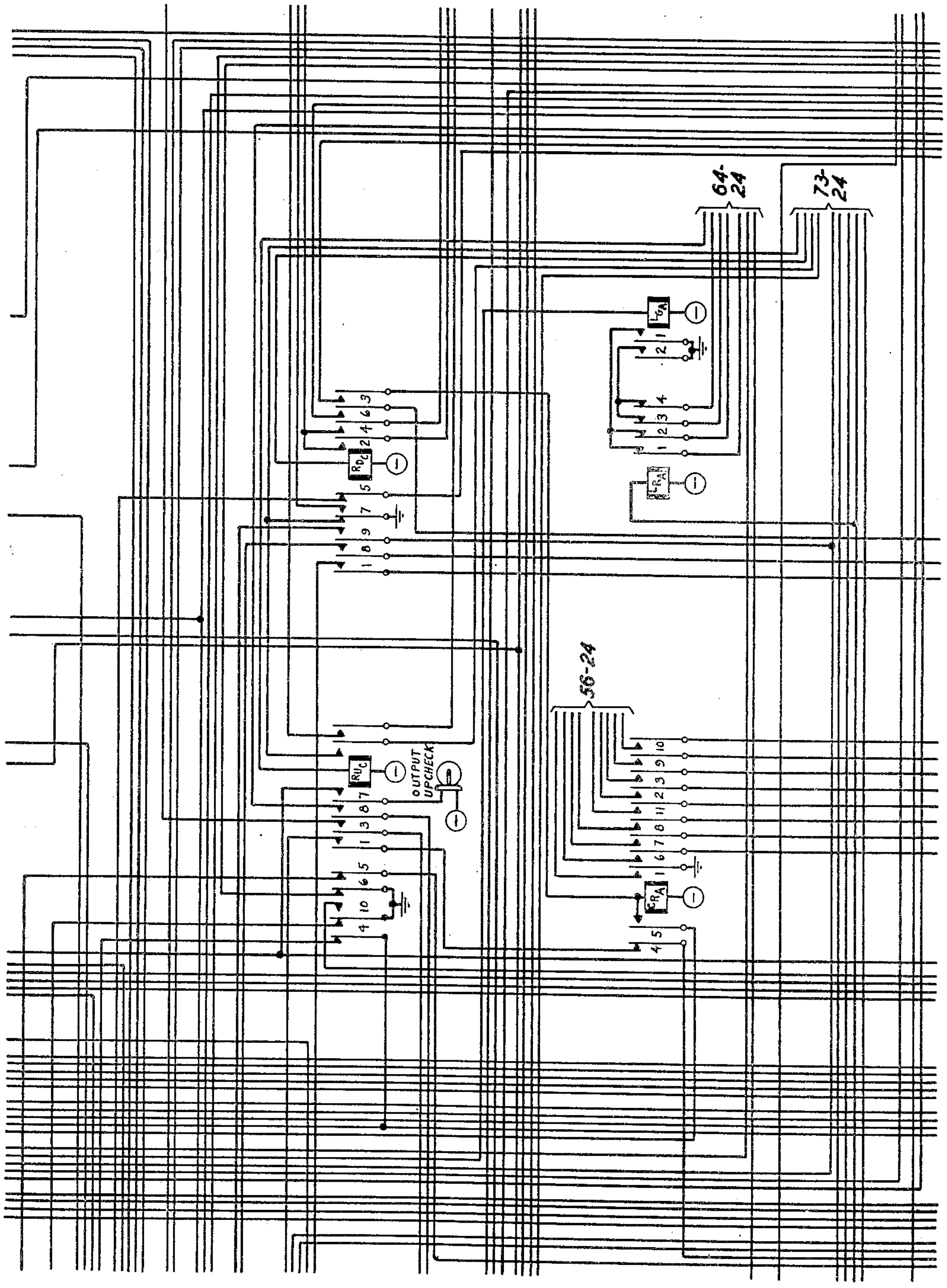
Figure 25:
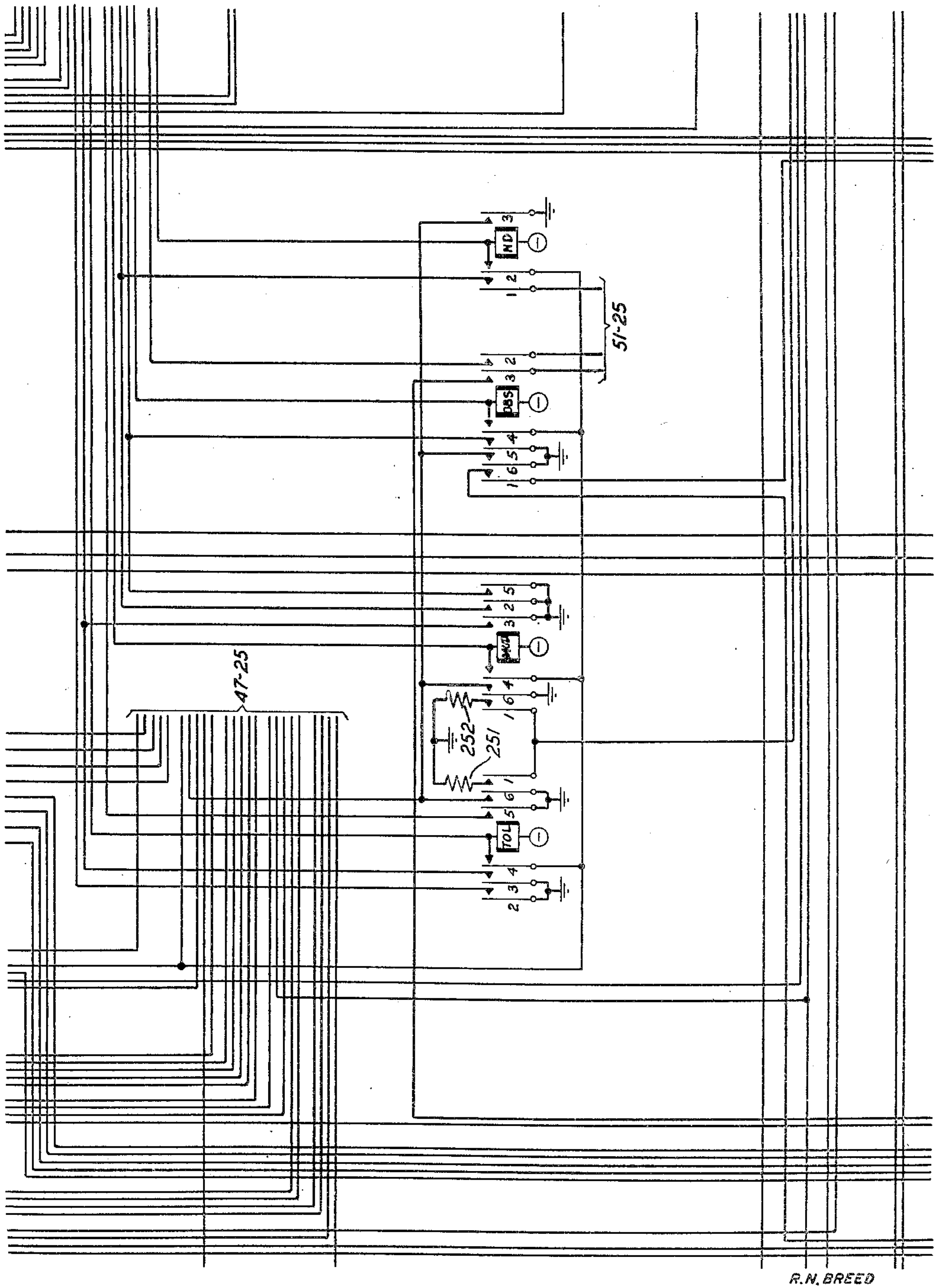
Figure 26:
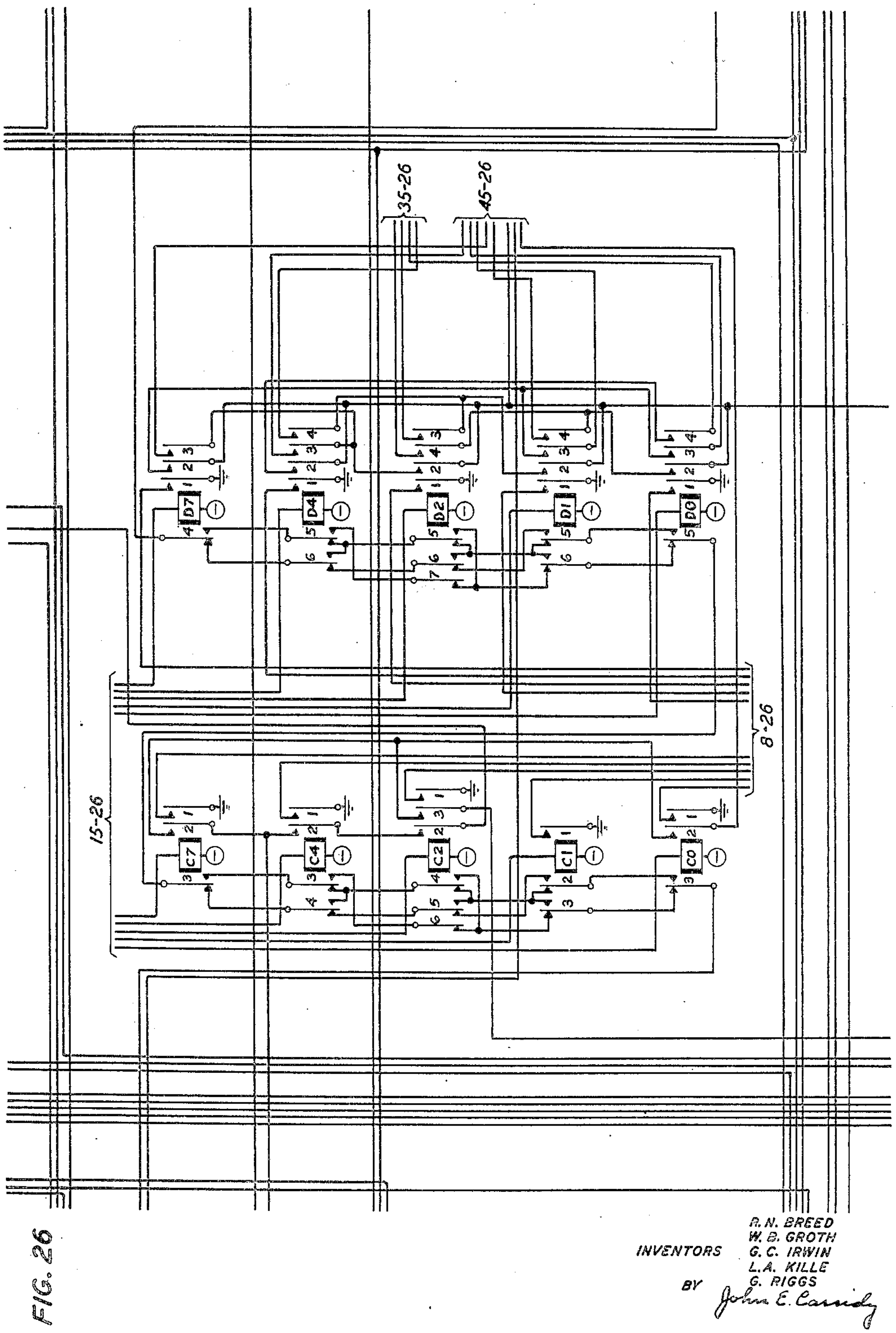
Figure 27:
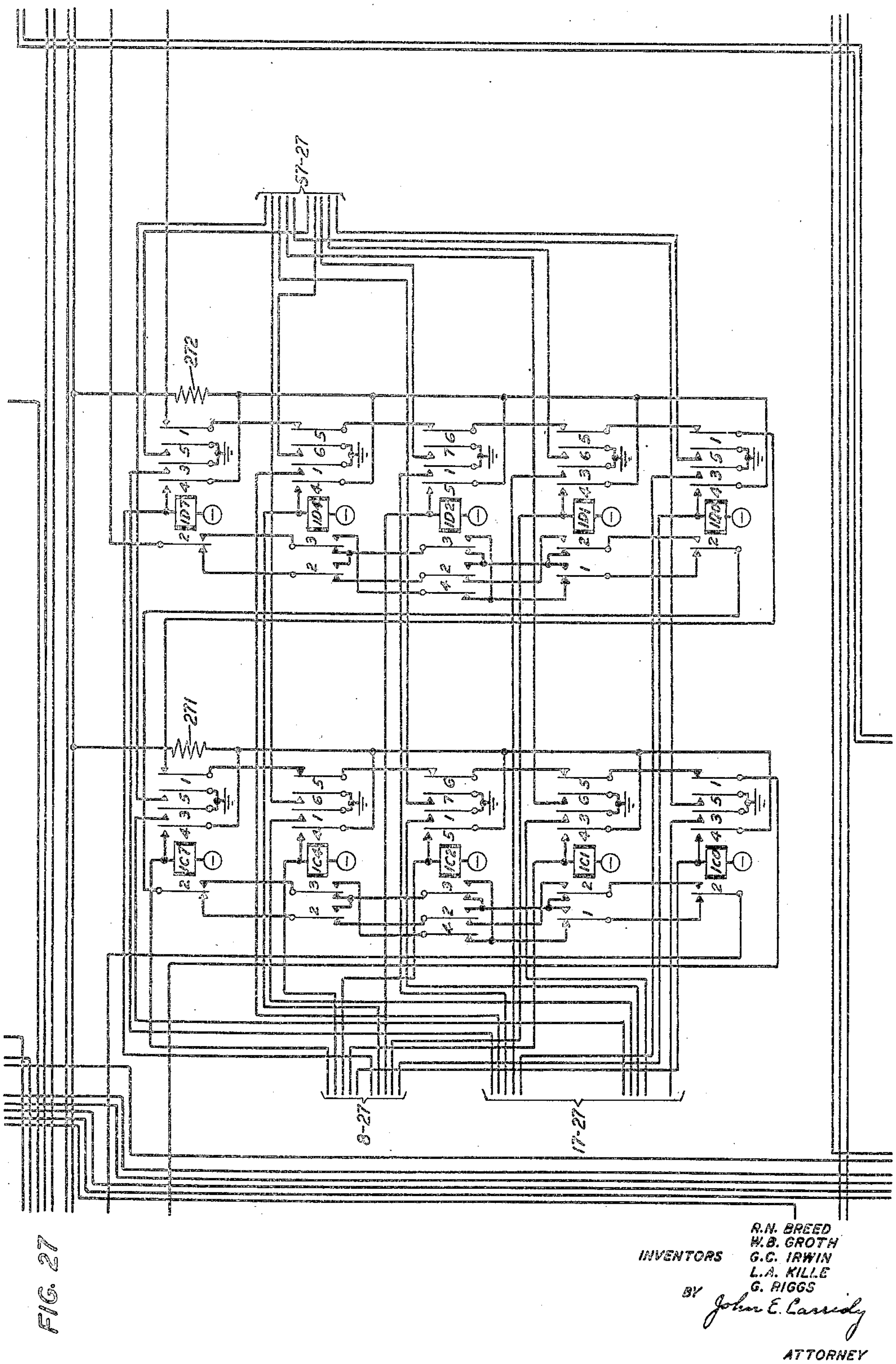
Figure 34:
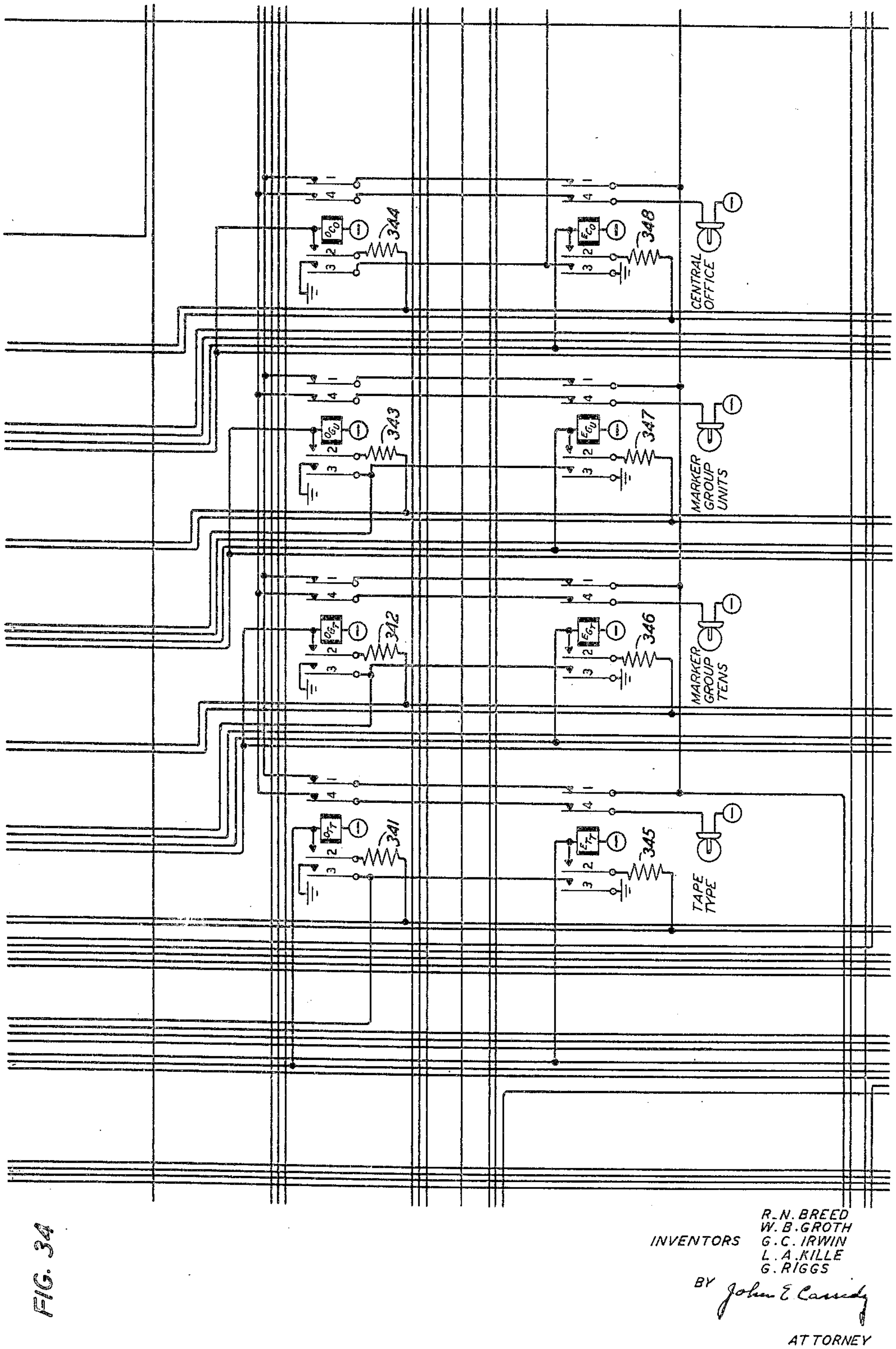
Figure 35:
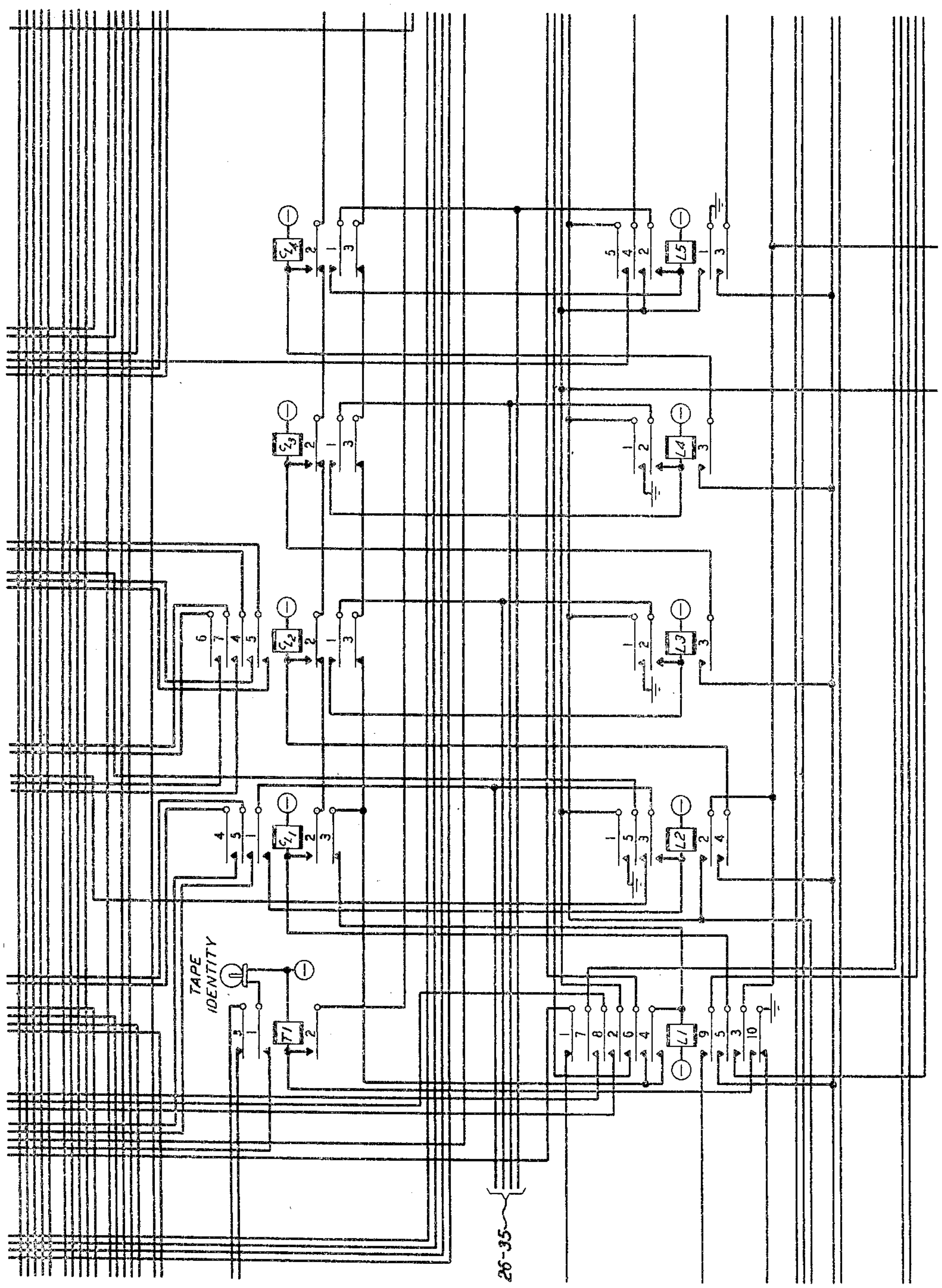
Figure 36:
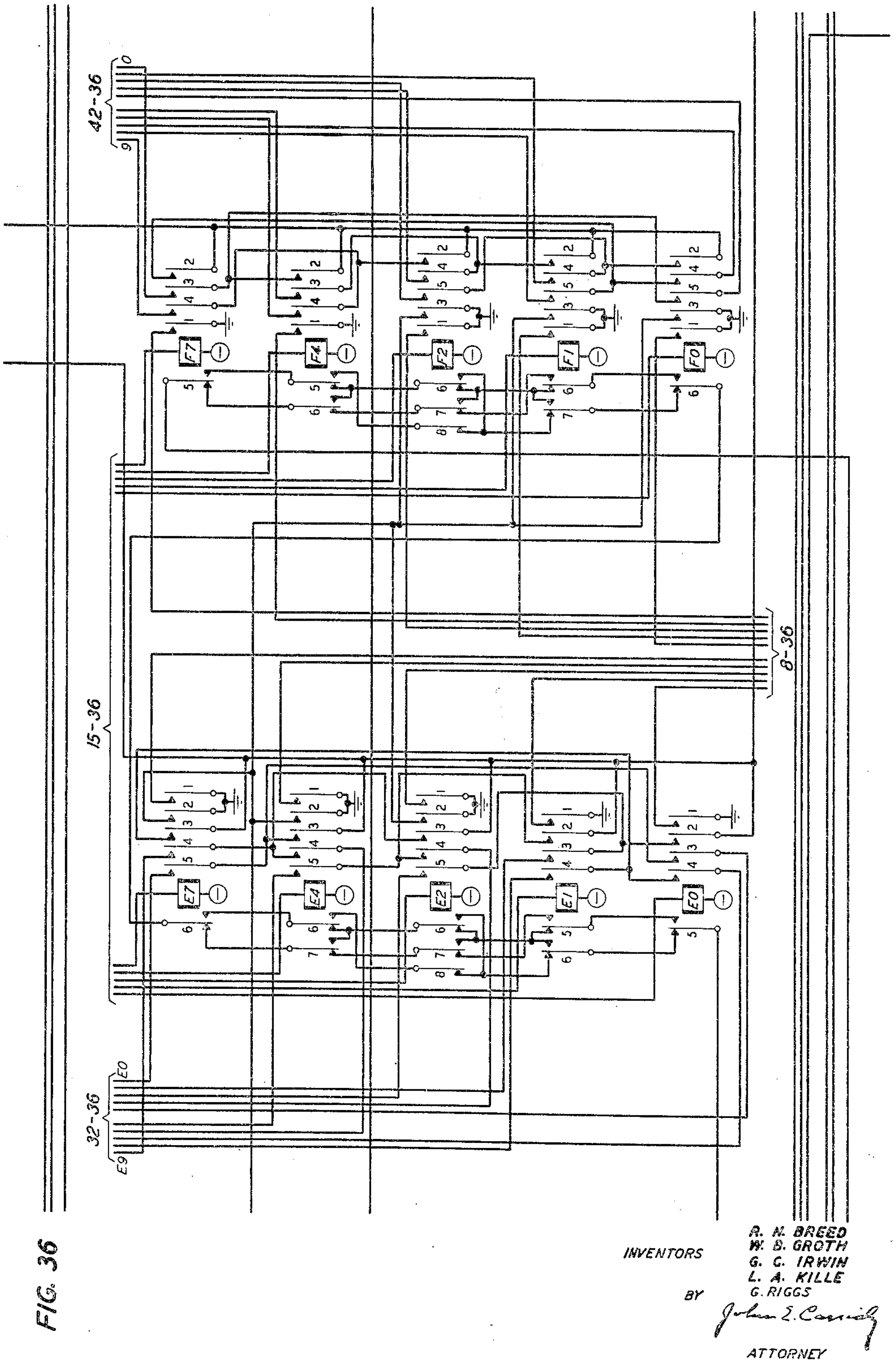
Figure 37:
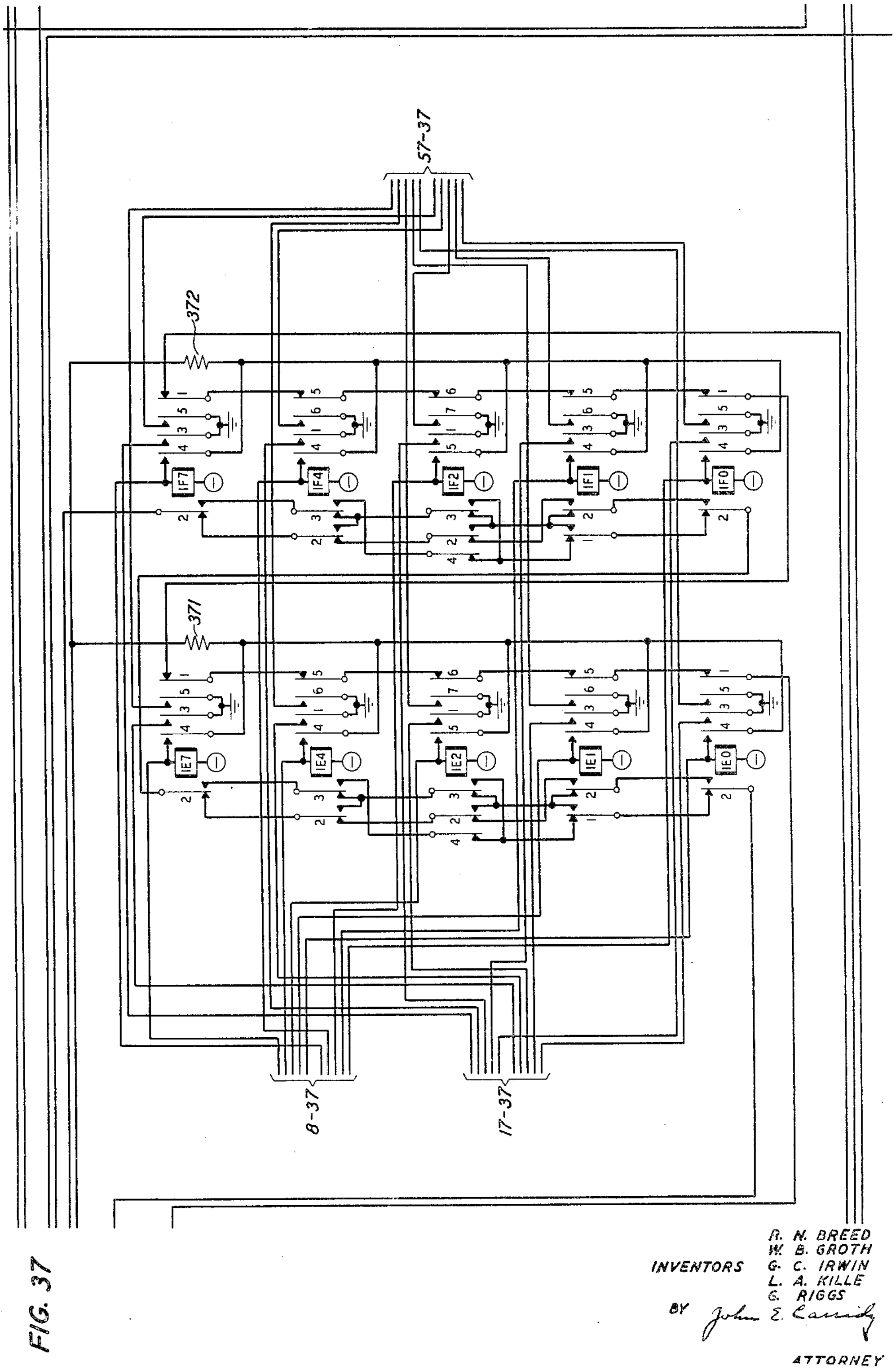
Figure 44:
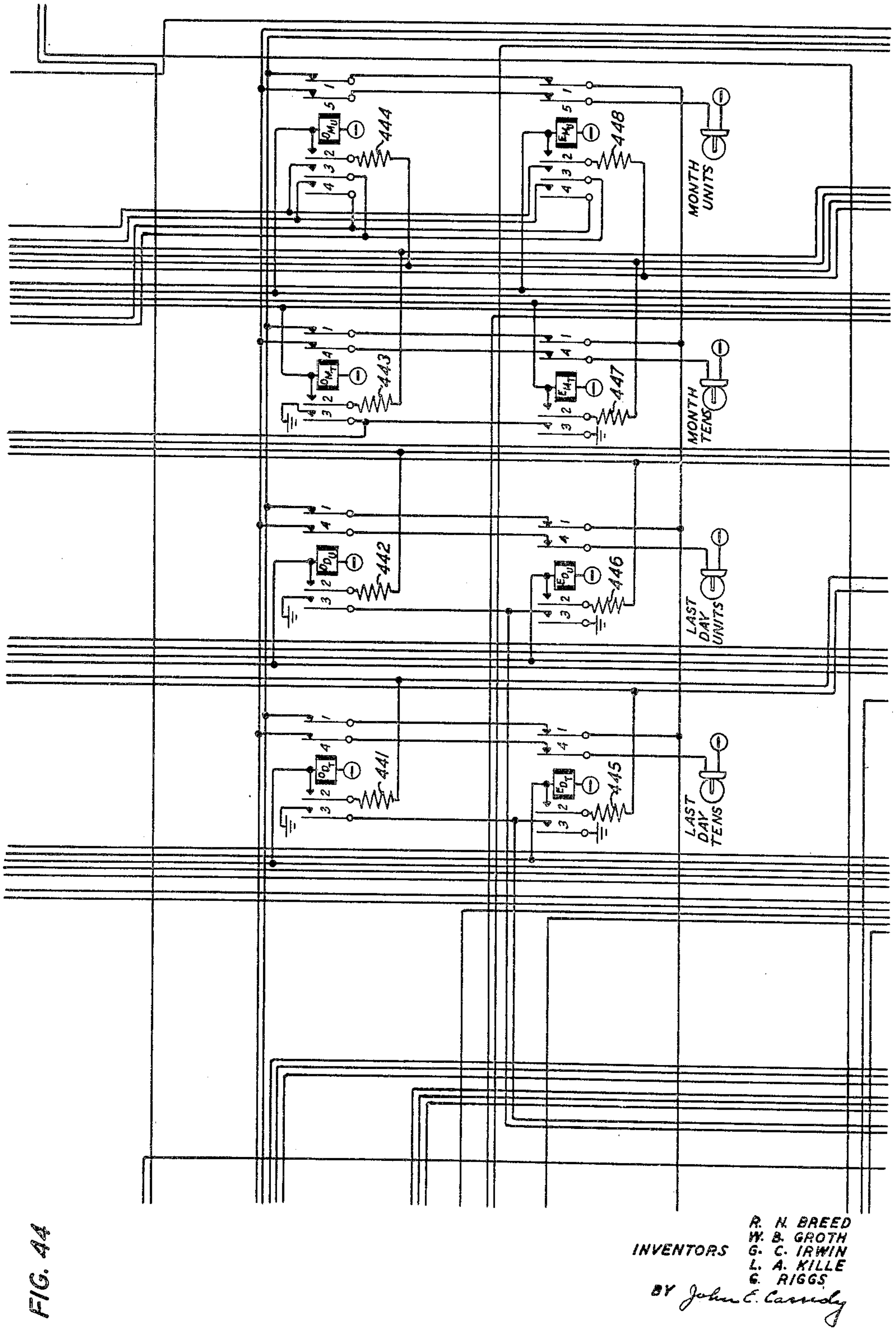
Figure 45:
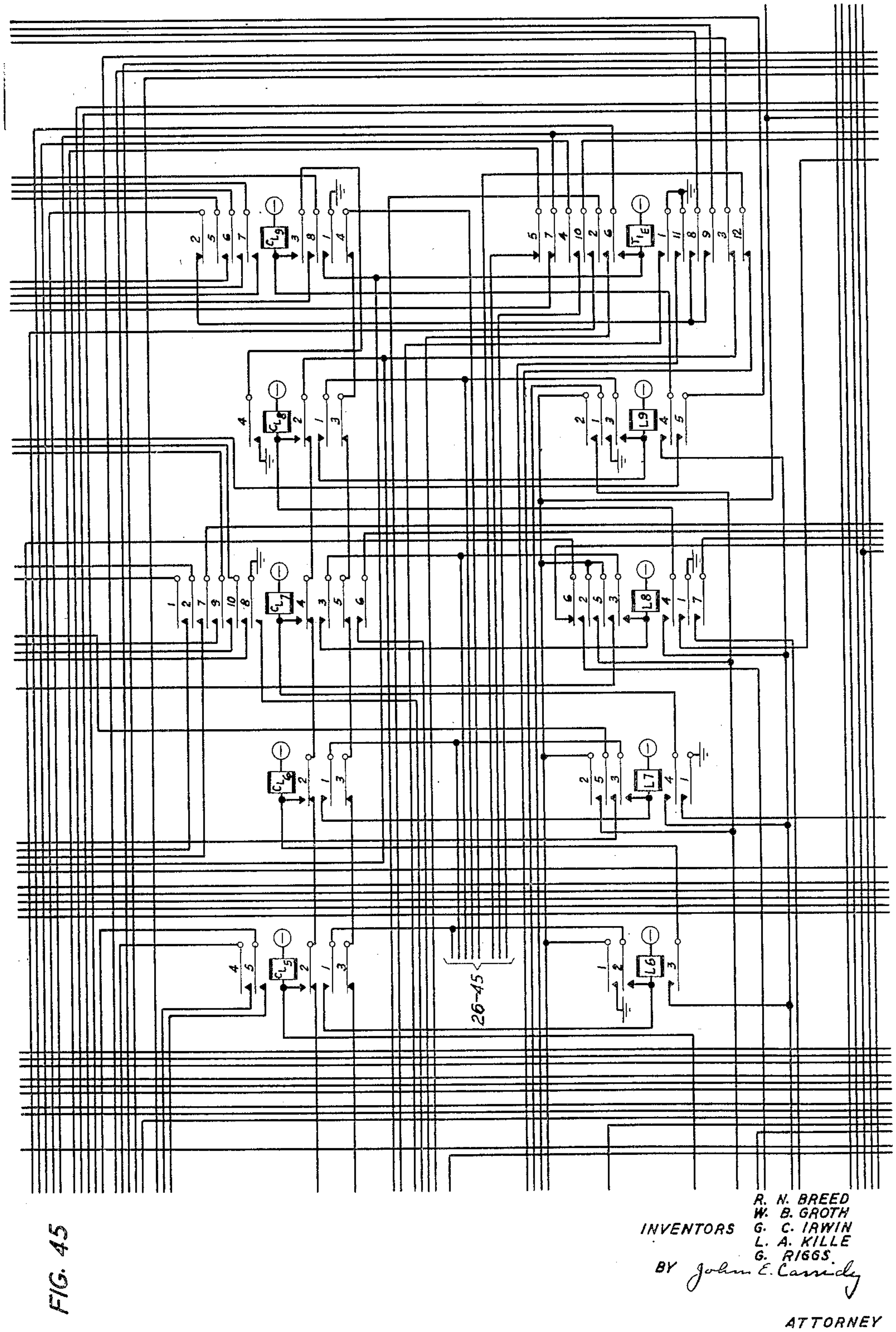
Figure 46:
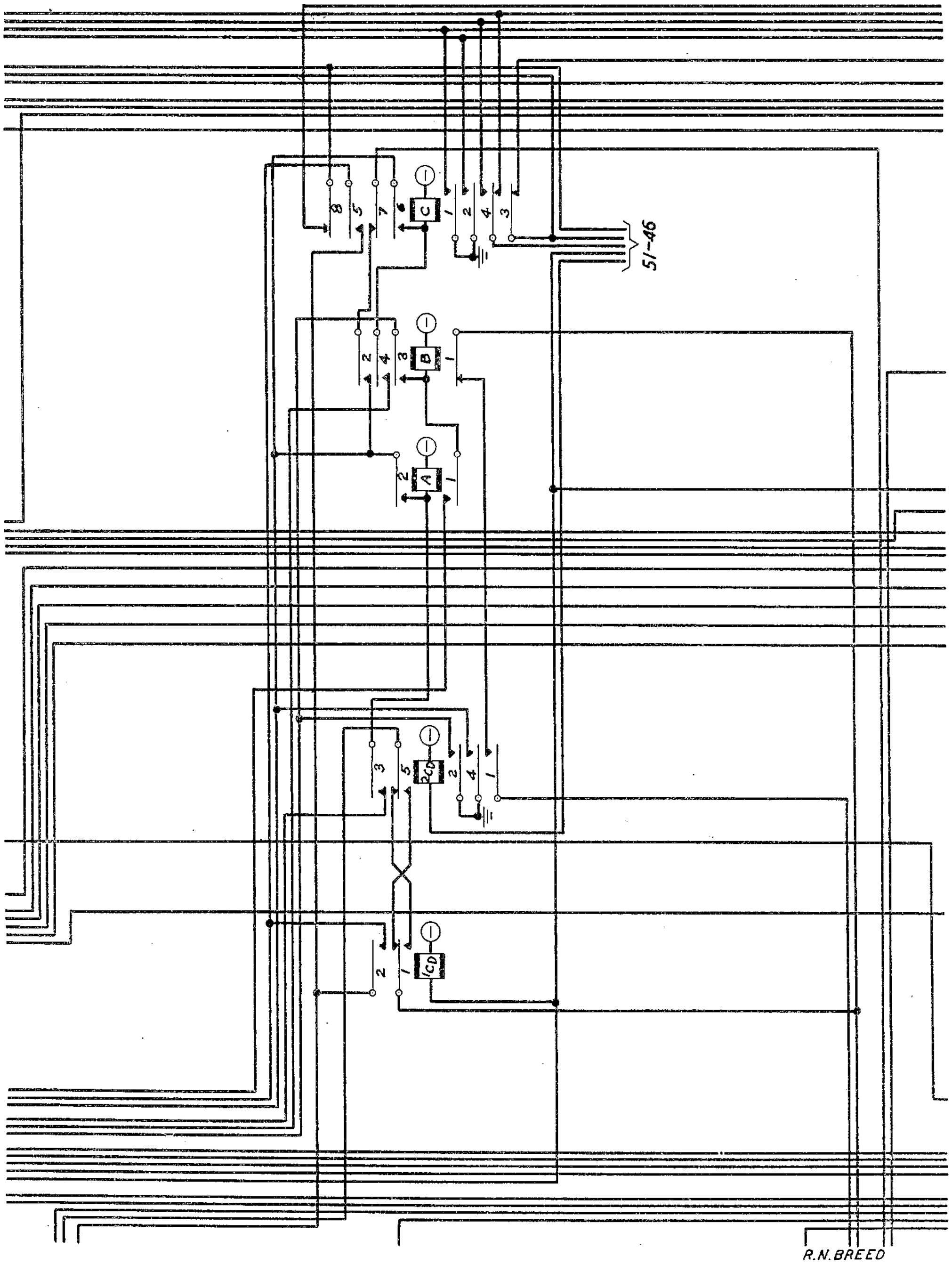
Figure 47:
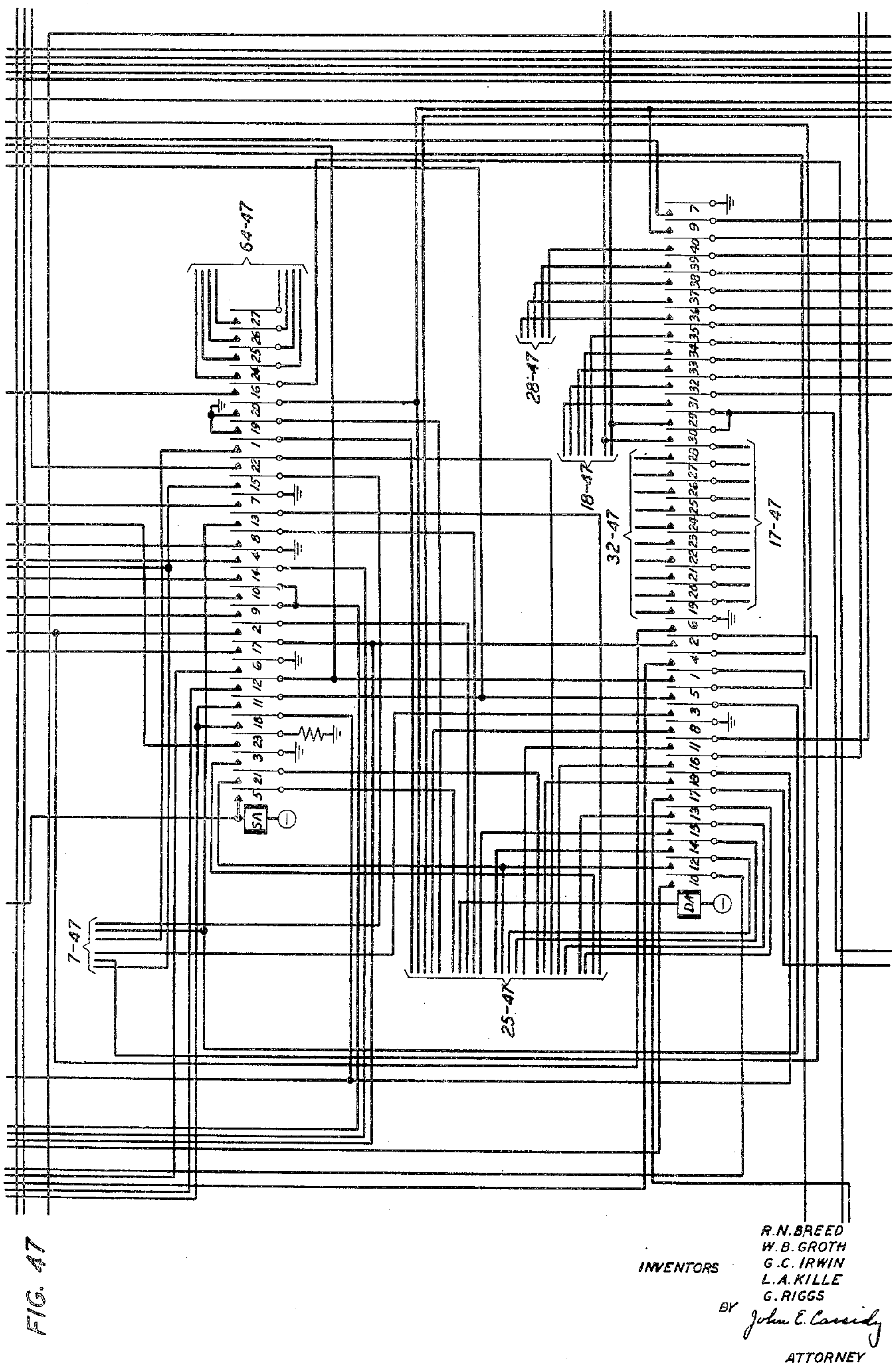
Figure 48:
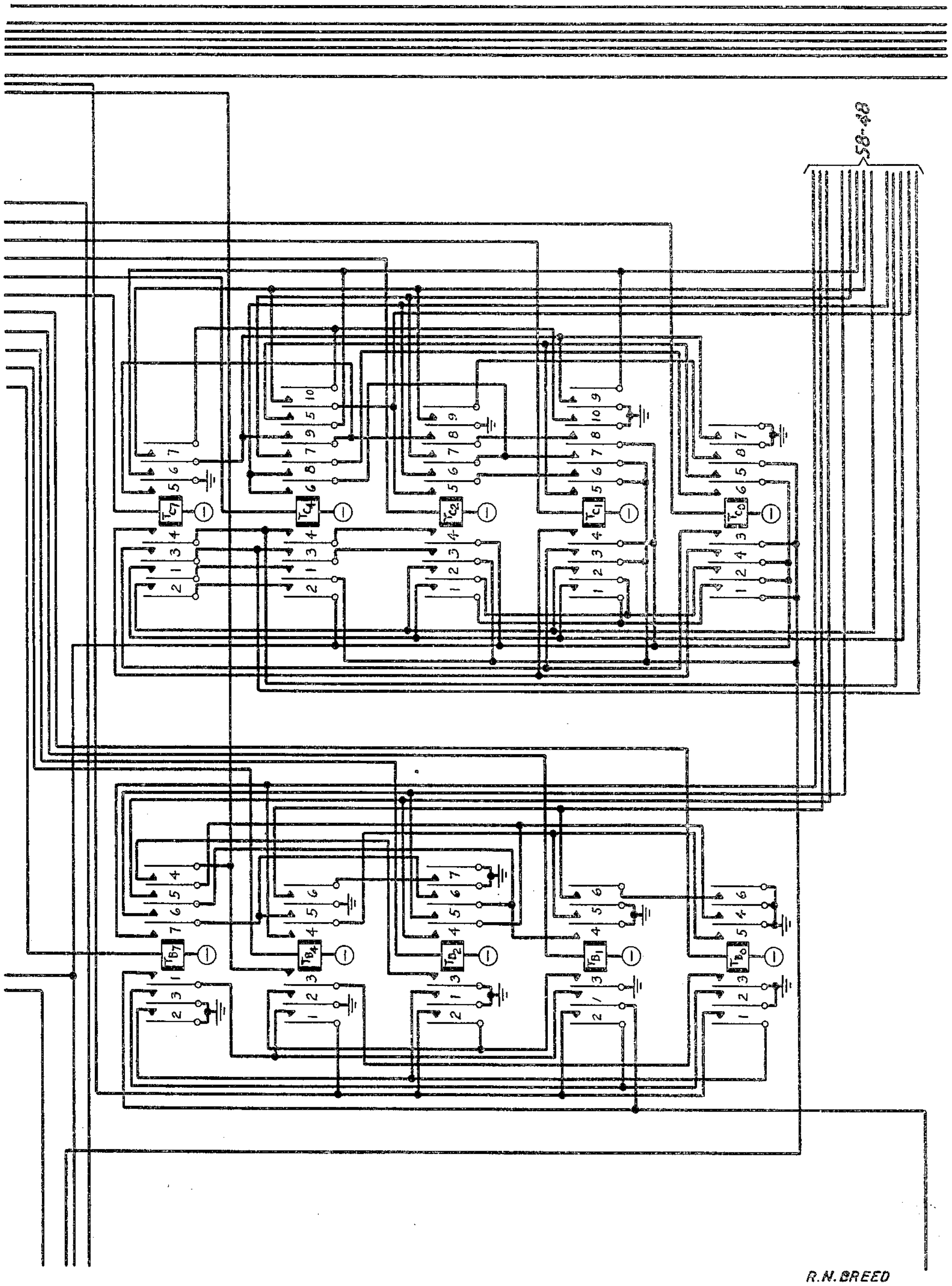
Figure 49:
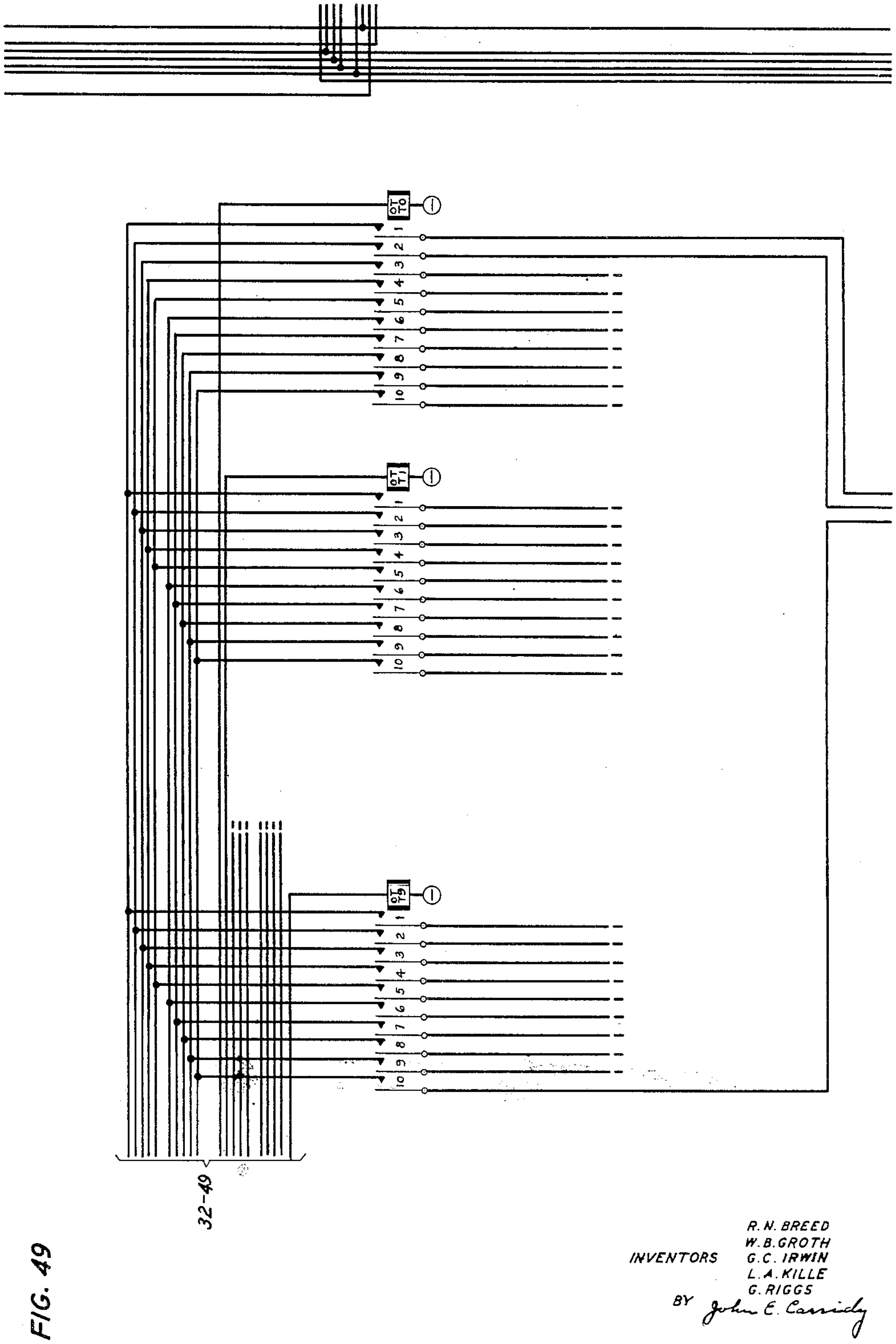
Figure 50:
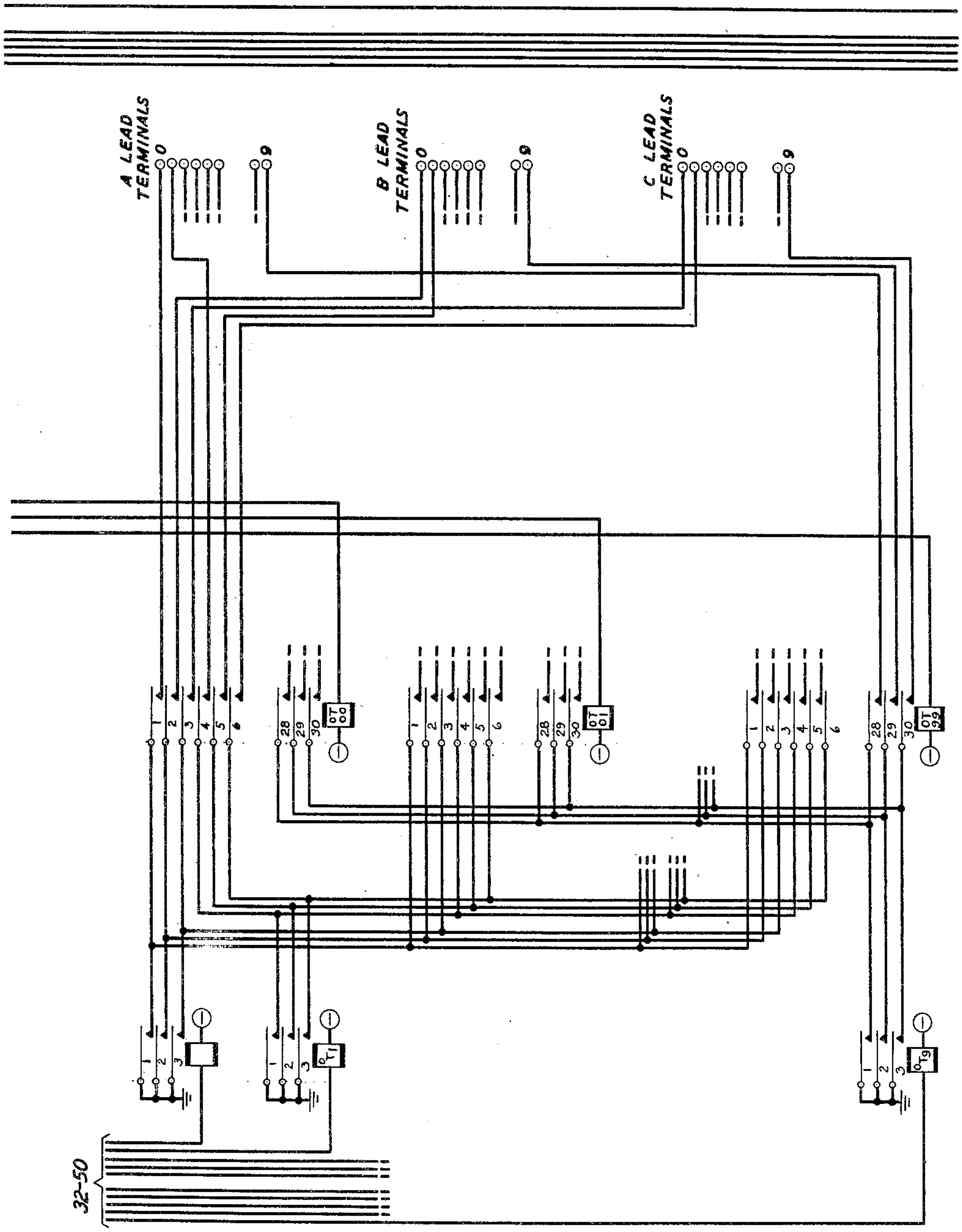
Figure 51:
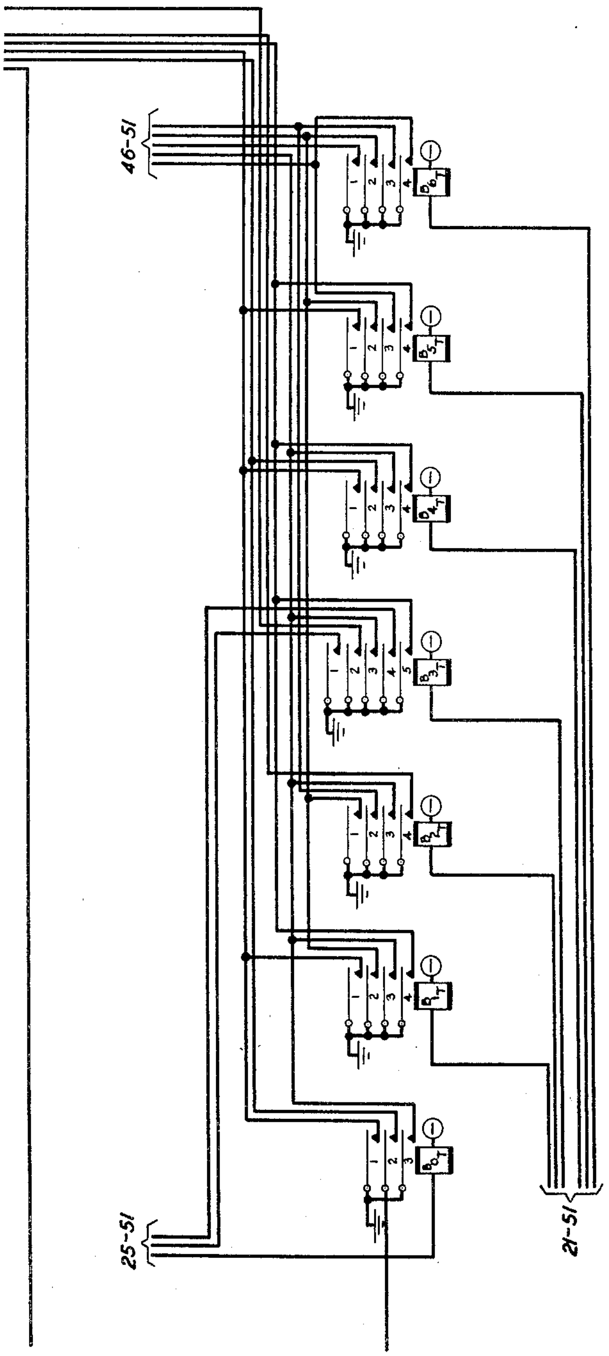
Figure 73:
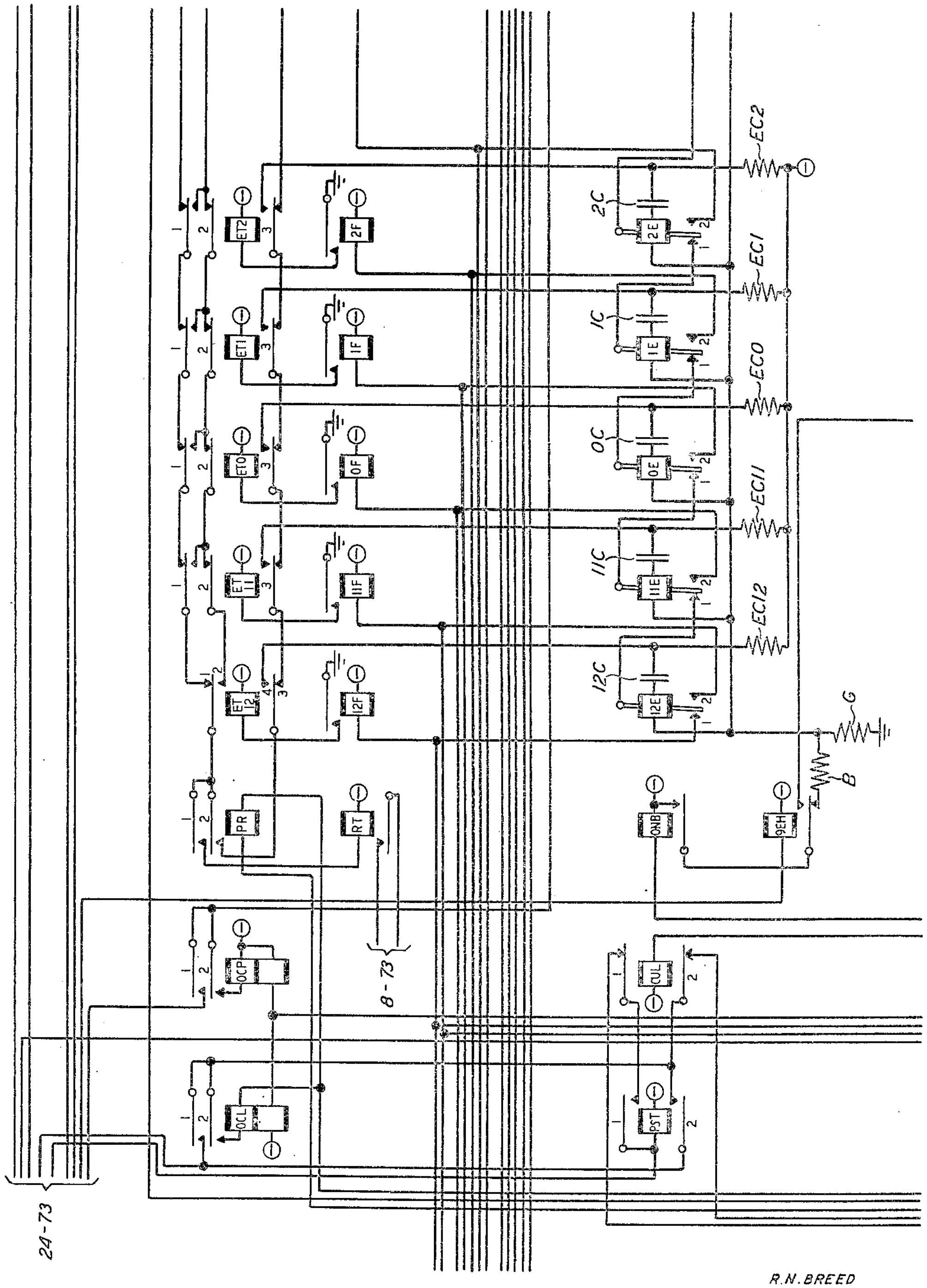
Figure 82:
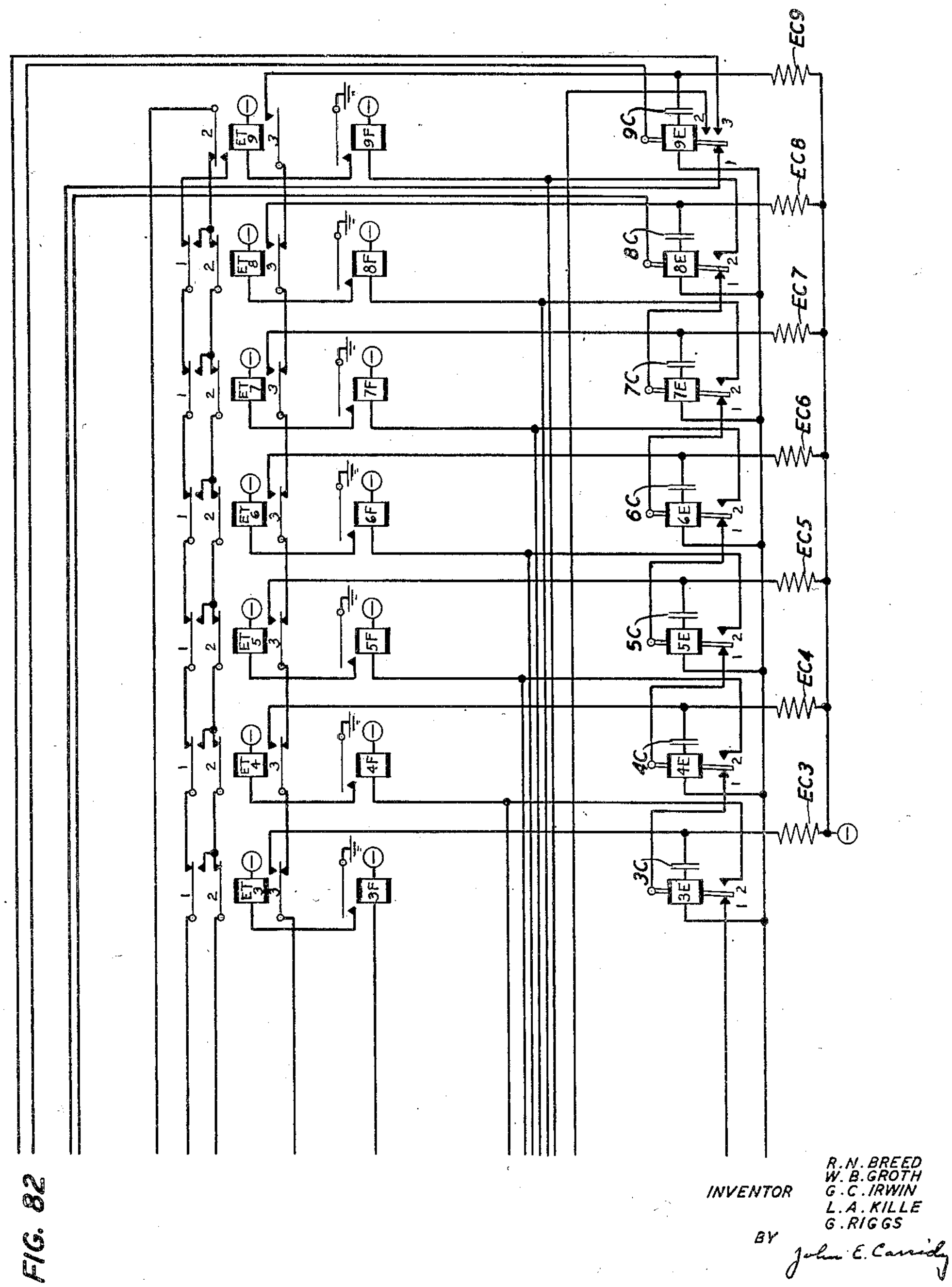

Figs. 8, 9, 10, 11 and 12 show the interconnecting relays between the reader relay circuit and lines 1, 2, 3, 4 and 5, respectively of the input register;

Fig. 13 shows the input register lamp keys and the output register lamp keys circuit;

Fig. 14 shows the skip splice control circuit;

Fig. 15 shows the reader line step check circuit;

Figs. 16, 26 and 36 show the twenty-eight reading relays comprising a first group A of three relays and five groups B, C, D, E and F each of five relays;

Figs. 17, 27, and 37; 18, 28 and 38; 19, 29 and 39; 20, 30 and 40; and 21, 31 and 41 show lines 1 to 5 of the input register respectively; the two relays at the left in Fig. 17 are called the entry type register;

Figs. 22 and 23 show the tape selection register;

Fig. 24 shows the output register control circuit including the output register up-check and down-check relays;

Figs. 25 and 47 show the tape index register;

Figs. 32, 33, 42 and 43 show the set-up switch circuit;

Figs. 34 and 44 show the set-up checking circuit;

Figs. 35 and 45 show the tape identity reading progress circuit;

Fig. 46 shows the circuit for controlling the punching of one card or two cards or the card count circuit;

Fig. 48 shows the start time translator;

Figs. 49 and 50 show the office index and office translator circuit;

Fig. 51 shows the class translator;

Figs. 52, 53, 54, 55, 56, 57, 58, 59, 60, 61 and 62 show the output register lamp connector circuit and the output register relay connector circuit;

Figs. 63, 64, 65, 66, 67, 68, 69, 70, 71 and 72 together with Figs. A, B, C, D, E, F, G, H, J and K show the output register circuit;

Figs. 73 and 82 show the punch sequence control circuit.

Figure 74:
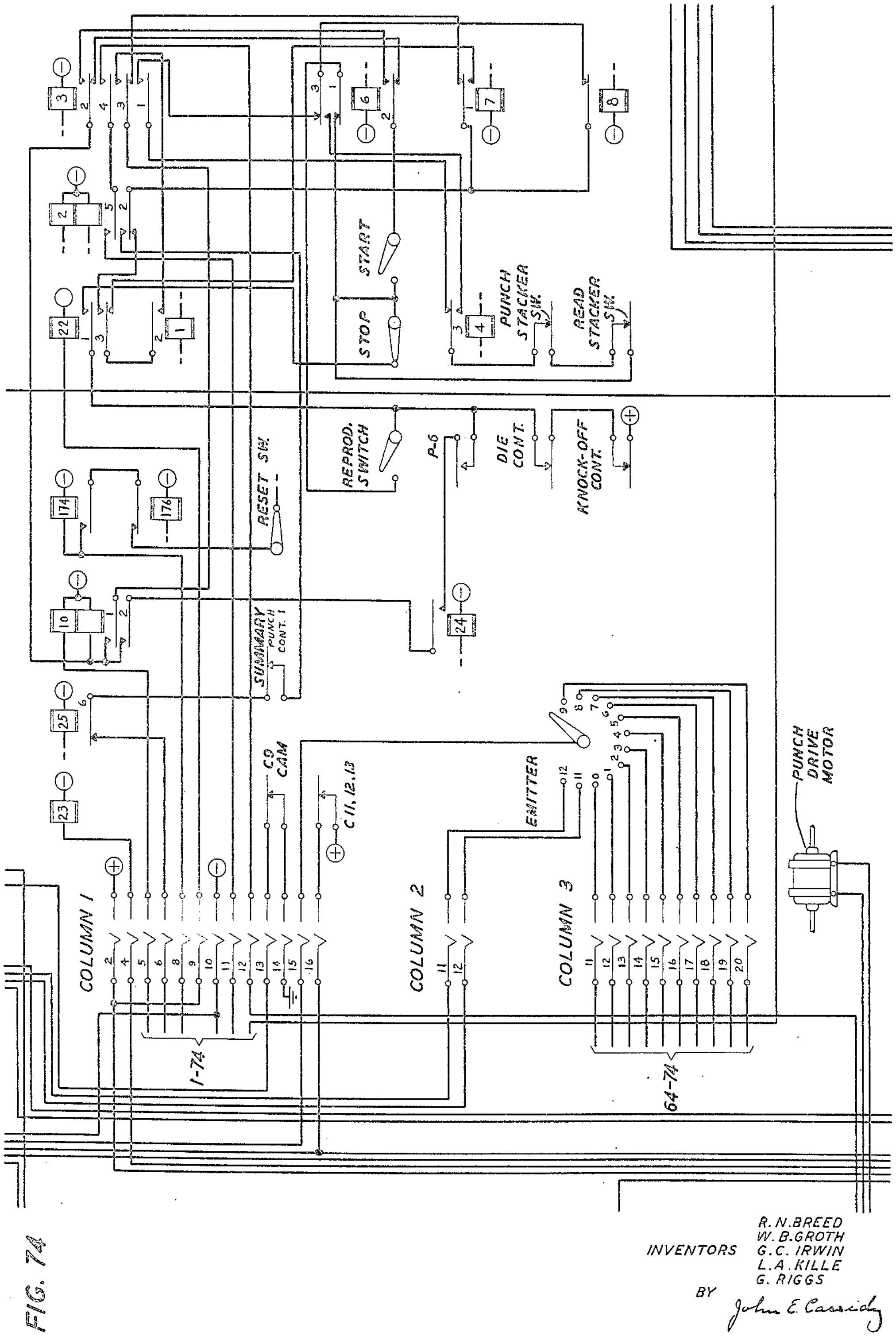
Figure 83:
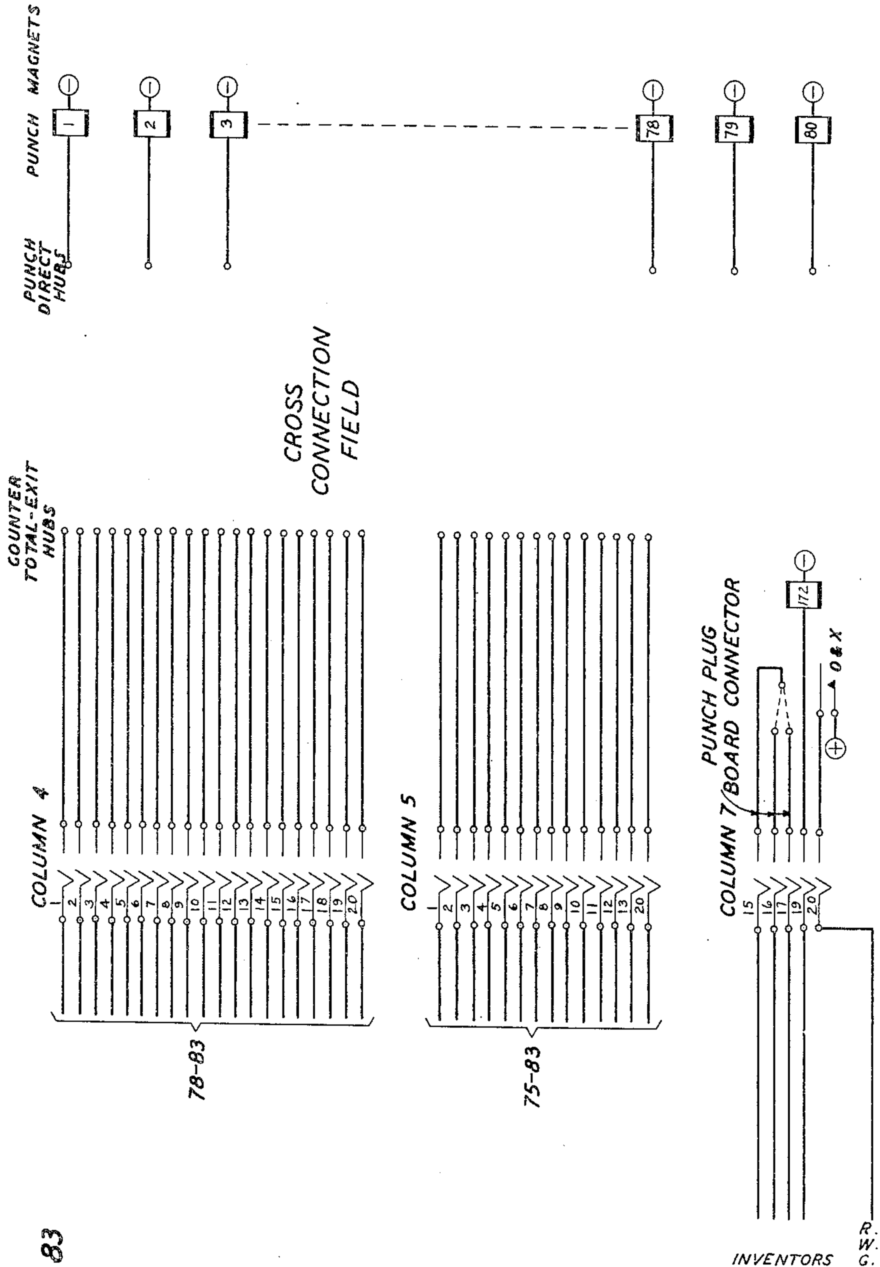
Figure 84:
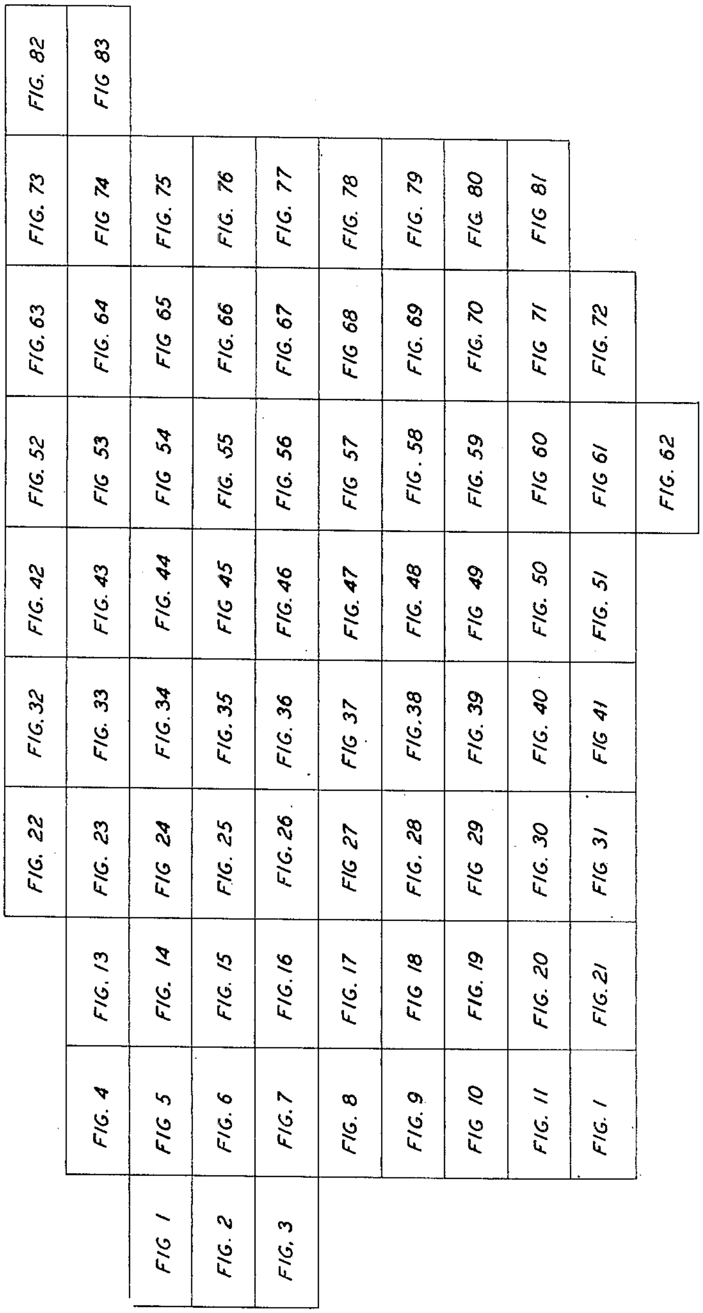

Figs. 74 and 83 show the interconnections of the present circuit and the IBM summary punch, the details of which latter are well known in the art. Only such details of the IBM punch as are required for interconnections thereto are necessary to an understanding of the present inventions;

Figs. 75, 76, 77, 78, 79, 80 and 81 show the punch control circuit.

The exemplified embodiment of the present invention as disclosed herein comprises apparatus mounted in practice in or upon a cabinet or cabinets, a control panel and a relay rack. The relays and other circuit elements and the mechanical details of mounting, cabling or other wiring interconnecting the elements are generally of a type well known in the art and would readily be devised by those skilled in the art in accordance with known information.

The operative apparatus includes a tape reader which may be such as is disclosed in Carpenter United States patent application Serial No. 662,280, filed May 1, 1946; obviously other devices of similar function may be employed.

Reference to Patent 2,263,291, T. L. Dowey, November 18, 1941, will disclose a punch generally corresponding to the card punch used herein.

The exemplary system disclosed herein is a further development of a system of machinery and equipment for automatic message accounting disclosed in a number of copending applications and granted patents. This exemplary embodiment is more particularly related to two of that group, first, United States patent to Giroud-Irwin-Kille-Retallack-Riggs-Strickler No. 2,572,132, granted October 23, 1951, which discloses means for producing a message unit summary tape capable of being processed by the presently described equipment; such tape is disclosed diagrammatically in Fig. 73 of said patent with the exceptions, as stated in column 6, line 44 of said patent, that no single line entries are normally present, and that certain index digits are different. Such a message unit summary tape will control the present equipment, however, regardless of the source from which it originated; citation of this specific tape is exemplary and not by way of limitation.

Toll tapes, message unit tapes, and service observing tapes, suitable for controlling the herein-described equipment may be and are produced as a part of the output product of another disclosure of the group, i. e., an equipment known as a computer and sometimes more specifically designated as a computer-sorter, because it may accomplish certain sorting functions, such as is described in the application of A. E. Joel, Jr., Serial No. 101,087, filed June 24, 1949; again this citation is exemplary as similar tapes produced by any means or derived from any source function in a similar manner and the principles of the invention extend to equivalent variants thereof.

Before proceeding with the description of the detailed operation of the circuit of the tape to card converter certain related matters will first be described.

Figure 89:
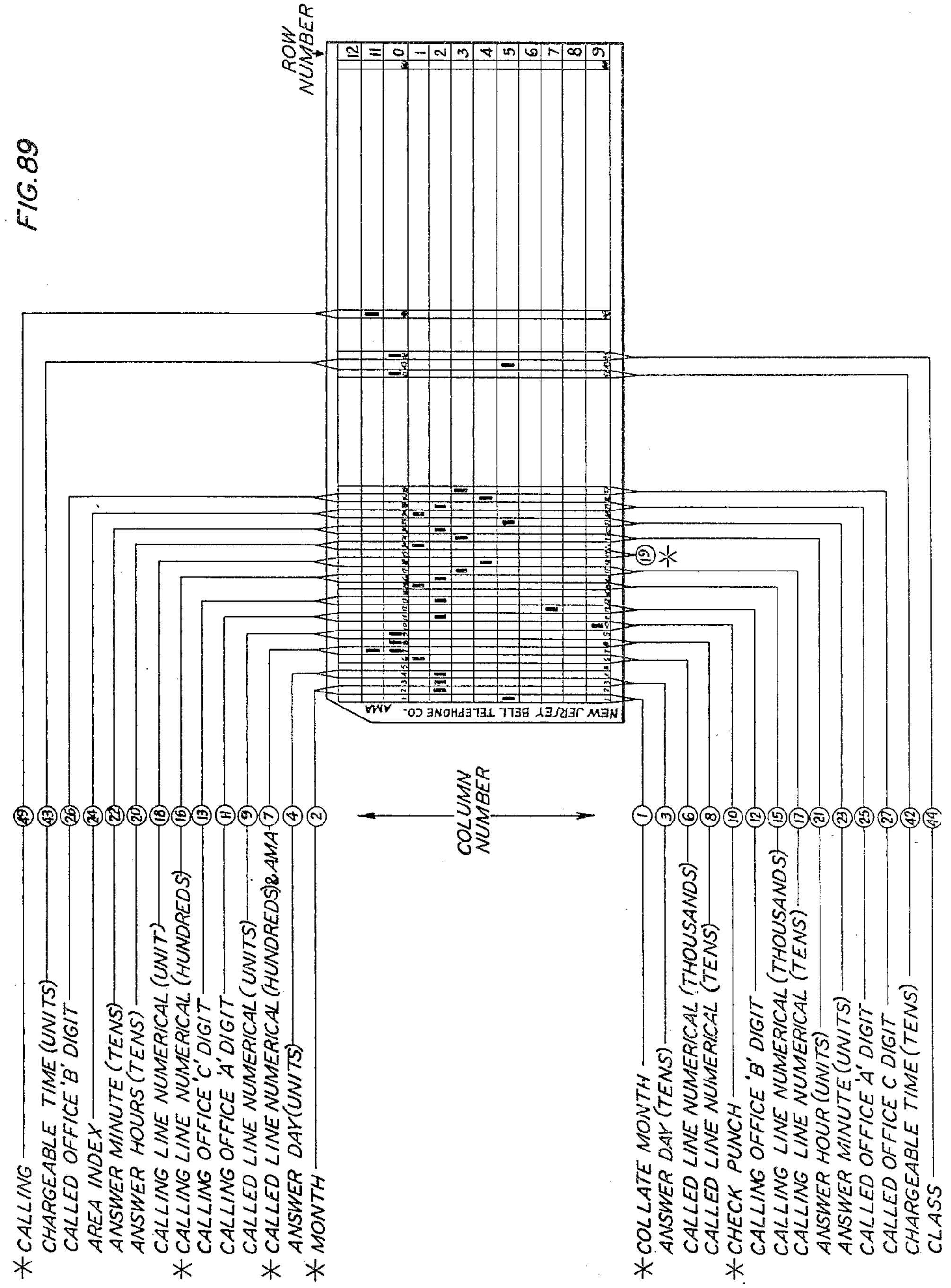

The card which is punched by the IBM summary punch under control of the tape to card converter is represented in Fig. 89. The card provides 80 vertical columns and 12 horizontal rows. In the present arrangement only 34 of the 80 vertical columns are employed. An individual punch magnet is assigned to each vertical column used. Each of the vertical columns may be employed to represent a particular kind of information such, for instance, as the month of the year, the tens or units digit of the day of the month, the thousands digit of the calling number, the hundreds digit of the calling number, the tens digit of the calling number, the units digit of the calling number, etc., a separate vertical column being assigned for each separate item of information. The quantity of the information, for instance, relating to any particular vertical column may be represented by the horizontal row of the punched area in the vertical column. For example, there are twelve months in a year and twelve horizontal rows on a card. Therefore, a punch in any particular horizontal row of the vertical month column will represent a particular month on a preassigned basis. In Fig. 89 the second vertical column is assigned to represent the month and a punch perforation in a particular one of the 12 horizontal rows represents a particular month according to a predetermined assignment. As another example consider called office code. Three vertical columns are assigned to convey this information which appears on the card as a three digit number, the hundreds, tens and units digits of which appear in columns 25, 26 and 27. Reference to these vertical columns and to the horizontal level or row number discloses that the number of the called office code as punched in the card is 243, the 2 appearing in vertical column 25, the 4 in vertical column 26, and the 3 in vertical column 27. The calling office code number is arbitrarily assigned to a particular telephone central exchange office. According to the arbitrary assignment each office is identified by a particular three digit number. The number 243 may be assigned for instance to one of the central switching offices of the Chelsea, New York office.

The values or information indicated by the position of the punch perforation in a particular vertical column has a certain flexibility. Any of the ten digits from 0 to 9 may be represented in a particular vertical column by a punching in a horizontal row opposite the correspondingly numbered row. In such cases horizontal rows 11 and 12 not be used. As mentioned above, each of the twelve horizontal rows may be assigned to a different month. According to another practice the quantity or the number represented in a particular vertical column may be in accordance with a code in which the specific quantity is indicated by a combination of punchings in two horizontal positions in a single vertical column, according to an assigned code. For instance, a combination of two punchings in the same vertical column consisting of a punching in either horizontal row 11 or 12, called an overpunch, combined with a punching in some one of the horizontal rows 0 to 9, called an underpunch, may be used to indicate a particular item of information such as a letter of the alphabet. This method has been employed in IBM practice. A variation of this is employed herein in that the overpunch is omitted and particular digits of the group 0 to 9 are assigned arbitrarily to represent station party letters on a party telephone line, such as the letter M, for instance, in a station identified as 2431M. A numeral may be assigned to the letter M and other numerals to other party letters. There might be, for instance, only four letters ordinarily assigned to party lines and each of these would be identified by a punching in a different one of four arbitrarily assigned horizontal rows in the vertical column assigned to party. In such case, the other horizontal rows would not be used since they would not be required. A fifth number corresponding to another horizontal row could, if desired, be assigned to identify a subscriber station which had no party letter, and in general the multi-vertical columned card arranged to be punched at any of a number of horizontal levels with one or more punches lends itself to the recording of data according to a number of codes and conventions to meet a wide variety of needs and conditions.

The present converter transforms and regroups the information received from the tape by the reader to the form required on the punched cards which cards are arranged to expedite further processing by conventional business machines and practices.

Figure 86:
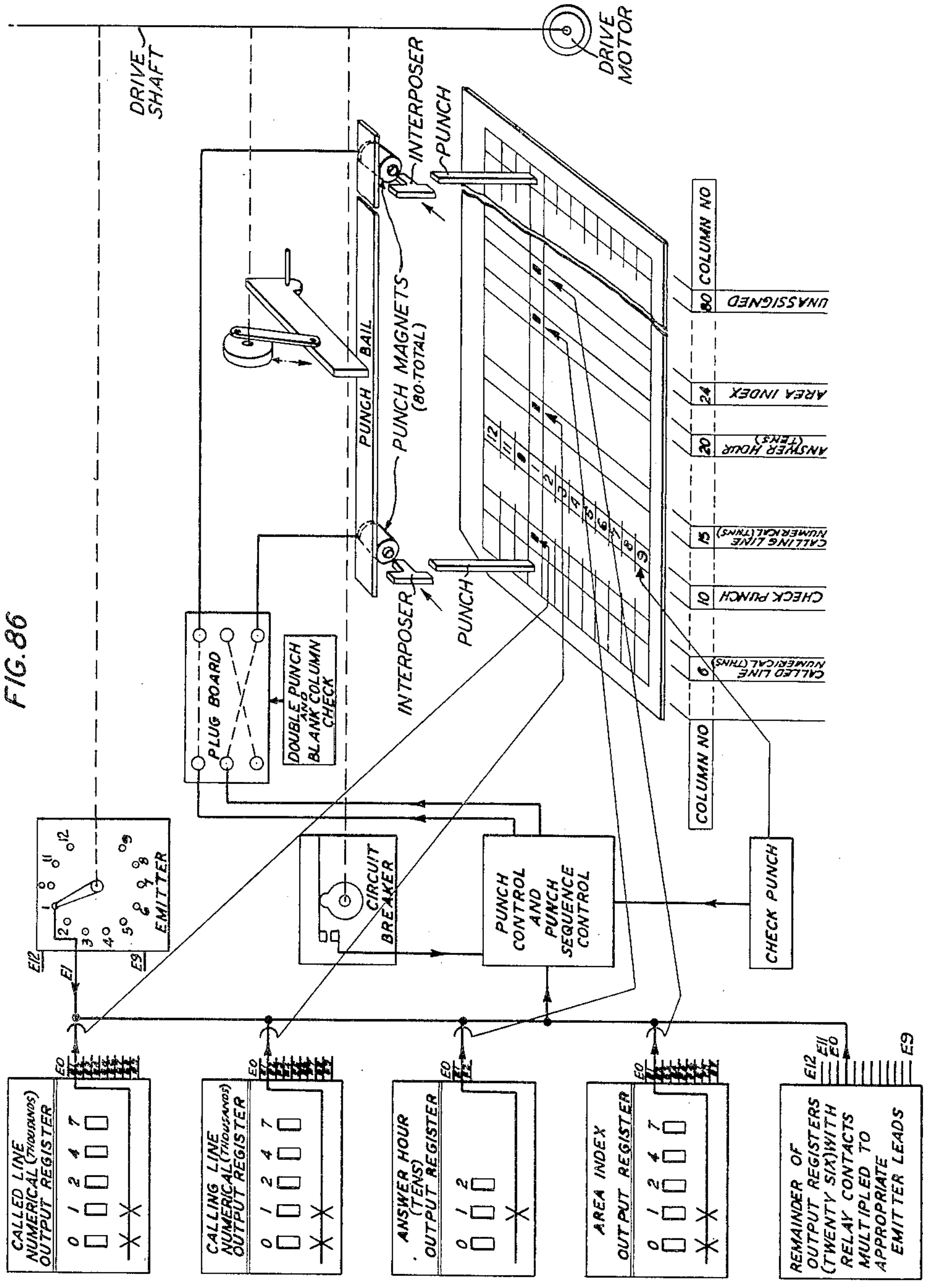

Reference to Fig. 86 shows diagrammatically the relationship of the output registers and certain of the important elements of the well known IBM Summary Punch Models 514 or 523 indicated also in Figs. 73 and 83.

The IBM summary punch has a punch for each vertical column. In the present arrangement all of the vertical columns are not required. There is a punch provided therefore only for each column that is required. The punch itself is controlled by a rotary interrupter called an emitter which controls the punching of the twelve rows in succession in discrete steps. The card is stepped into position so that each horizontal row is represented to the punches in turn. The punches are controlled by the emitter and the various output registers.

Let it be assumed that when a particular horizontal row, say row 5, is presented to the punch, the information in the output registers requires that three vertical columns are required to be punched and that therefore three of the punches are to be operated. It may be that the called party tens digit is 5. It may be that the month to be indicated is May to which the number 5 may be assigned and it may be that the numeral assigned to a subscriber telephone party letter such as J is 5. The output registers and punching relays under control of the emitter will therefore condition the individual punch in alignment with each of the vertical rows assigned to these three particular items of information so that the vertical column assigned to the called party tens digit, the vertical column assigned to the month and the vertical column assigned to the called party letter will be perforated in horizontal row 5. All of the perforations to be made in a particular horizontal row are made simultaneously. Therefore each of the punch magnets in the particular vertical columns which are to be perforated will be energized by its associated output register, under control of the emitter, when the emitter is in position corresponding to horizontal row 5 of the card, so that the punch activates an individual element called an interposer in alignment with a single common punch bail so that when the bail is operated through an eccentric cam it activates each of the three interposers, in the example under consideration, to perforate each of the three mentioned vertical columns in the horizontal row 5.

As the card progresses, one horizontal row at a time, through the punching mechanism, the different punches individual to each vertical column will be actuated at the proper time, under control of the output registers and punch relays which are connected to particular punches and under control also of the rotary interrupter or emitter which closes a path through a register to operate the punch in any horizontal row of the card as determined by the position in which the output register has been set by the information fed into it.

Reference to Fig. 86 indicates the output registers in a vertical column at the left. Thirty such registers, four indicated individually by rectangles and twenty-six by a single rectangle at the bottom of the column, are connected through the punch control and punch sequence control circuit, indicated by a rectangle, and through a plugboard or cross connection field, so that any register may be flexibly connected to any punch magnet. As a general proposition each register will be connected to a single punch though a certain few registers are connected to two or three punches, for instance. A drive motor drives the punch bail eccentric and the emitter, which is a rotary interrupter having 14 positions in a cycle, 12 for the 12 horizontal rows and two indicated as positions 13 and 14 which are passed through between punching positions on successive cards. No punching is performed while the emitter or card is in positions 13 and 14. In general, except in certain special registers, such as the month register, there are ten leads extending from each register called the emitter leads and designated E0, E1, E2, E3, E4, E5, E6, E7, E8 and E9. These connect to a sequence counting circuit the advance of which is controlled by the emitter. As the sequence counting circuit is advanced into each position, such as position 5, it will establish a circuit through the correspondingly numbered E lead to all registers in which it is possible to register a 5. Each of the output registers will previously have been set according to its particular code such as the additive two-out-of-five code. Certain of these registers may be set to record the number 5. One or more or none may be so set. Each one in which a five is registered will close a path through its particular register, and through an individual path through the punch control and sequence circuit too operate an individual relay therein for each closed path through a register recording the numeral 5. Each punch control and sequence circuit controls an individual path through the cross connection field to an individual punch magnet. If it is assumed that three such paths are closed when the emitter is in position 5, three punch magnets will be energized and three individual interposers will be drawn into alignment with their respective punches. The punch will be driven through the interposer by the punch bail under control of the single common eccentric and the punch drive motor. The card will then be stepped into the next position where the processes will be repeated. Thus each card will be stepped to present the twelve horizontal rows of each column to the punches in turn, to be perforated in particular positions as controlled by the output registers. It is to be understood, of course, that certain of the registers such as the month register require more than ten connections and thus show also an 11E and a 12E lead connections to the emitter. Certain others such as the subscriber station party register which records the numeral identifying the party letter will require only four leads from the emitter one assigned arbitrarily to each of four numbers to identify each of four party letters.

*Processing of tapes—general.*—The manner in which tapes are processed in the present tape-to-card converter, in automatic message accounting in a telephone system will now be described, in general, before proceeding with the detailed circuit description. The tape-to-card converter processes several kinds of tape produced in other automatic message accounting circuits. The tapes are the product of two other automatic message accounting circuits known as the computer and the summarizer. The kinds of tape are:

(*a*) From the computer:
- Toll tapes
- Message unit tapes
- Service observing tapes These are all 5-line call entries.

(*b*) From the summarizer:
- Message unit summary tapes

These are 2-line entries.

The operations for a typical call (5-line entry) from a toll tape are first described; then the operations for 2-line entries from summary tapes are covered.

The description is divided into four stages:

1. Reading and registering in the Input Registers.
2. Translation.
3. Transfer to the Output Registers.
4. Punching of the card.

Figure 85:
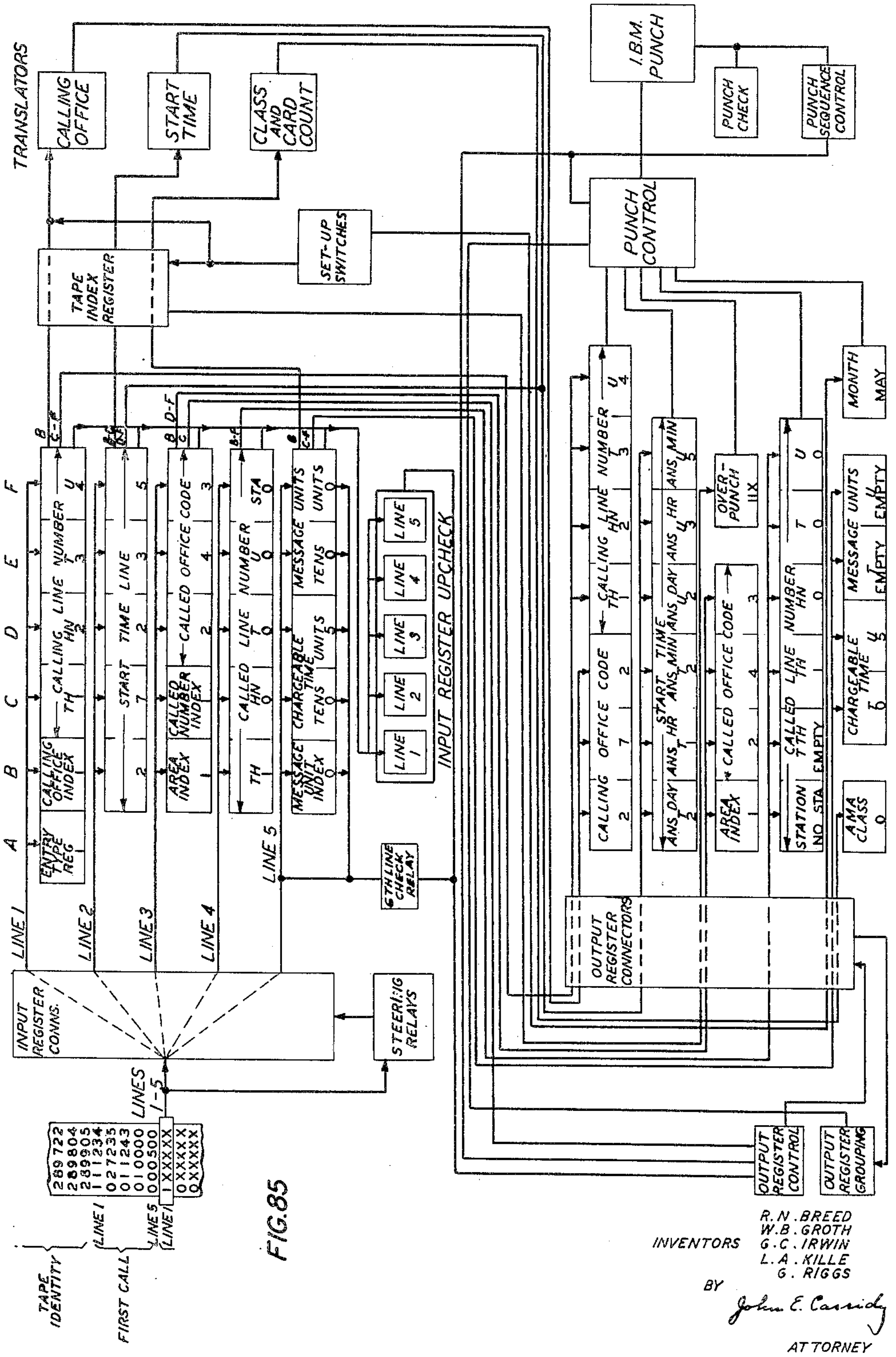

Stages 1, 2 and 3 are shown in block diagram form on Fig. 85. Stage 4 is shown on Fig. 86.

For discussion purposes the following call is assumed. On May 22nd, a subscriber whose directory number is CRanford 2–1234 in New Jeresy called CHelsea 3–1000 in New York, a different basic numbering plan area. The CRanford, calling, office index is 1. The call was answered at 1:25 P. M. and the duration of the call was five minutes. The CHelsea 3 area index is 1.

The entry for this call perforated in code on the toll tape is shown in the following table. All of the information in this table cannot be related, at present, by the reader directly to the details of the call assumed in the last preceding paragraph, since the information in the second and third lines involves translation which will be made clear hereinafter.

| | A | B | C | D | E | F |
|---|---|---|---|---|---|---|
| | | Calling Office Index | Calling Line Numericals | | | |
| First Line | 1 | 1. | 1 | 2 | 3 | 4 |
| | | | Start Time Line | | | |
| Second Line | 0 | 2 | 7 | 2 | 3 | 5 |
| | | Area Index | Called No. Index | Called Office Code | | |
| Third Line | 0 | 1. | 1. | 2 | 4 | 3 |
| | | | Called Line Numericals | | | |
| Fourth Line | 0 | 1 | 0 | 0 | 0 | 0 |
| | | Msg. Unit Index | Chargeable Time Msg. Units | | | |
| Fifth Line | 0 | 0. | 0 | 5 | 0 | 0 |

Had we chosen as an example an entry from a message unit detail tape, digits representing the number of message units would appear in the E and F columns of the fifth line of the entry, instead of 00 as shown above.

Had we chosen as an example an entry for a completed call from an observing tape, the arrangement and digits would be the same as shown above. However, had the entry been for an unanswered call, the differences would be as follows: the A digit of the first line would be a 3 instead of the 1 shown; and the fifth line would contain zeros in all digits since there is no chargeable time for an unanswered call.

In Fig. 85 the tape is shown stopped on the first line of the second call entry; therefore, the first call has been read and is being processed. The characters read are shown in their proper places in the input and output registers.

It is to be understood that the tape will be perforated in accordance with the code to represent the numerals shown and the register relays will be operated to correspond.

Before describing how this call is processed, the procedure for starting the machine is explained.

*Starting the tape-to-card converter and summary punch.*—Either the tape-to-card converter or the summary punch may be started independently of the other; however, it is preferable to start the punch first. A description of the starting procedure for each machine is given below.

(*a*) Start of summary punch

Make proper cross connections Fig. 83 for tape being processed.
Fill punch feed hopper with blank cards.
Empty punch stacker of cards from previous processing.
Operate power switch.
Operate start key.

The summary punch may remain in this condition until the tape-to-card converter is started.

(*b*) Start of tape-to-card converter

Set the set-up switches in accordance with the information on the accounting center assignment form for the tape.

The settings of the various switches assumed for the illustrative call are shown below. These switches are shown in detail in Figs. 32 and 42.

| Switch | Position |
|---|---|
| Tape type | Toll |
| Marker group | Tens 0 \| Units 0 |
| Central office | Off |
| Thousands | Off |
| Month | Tens 0 \| Units 5 |
| Last day tens | Off |
| Last day units | 4 |

Following the setting of the switches, the tape is fed into the reader. Operation of the motor start key gives ground to down-check paths of both the input and output registers. If this check is satisfied, operation of the machine start key is effective and tape processing begins.

The first tape entry read is that for splice pattern for which number 081010 is punched in code in the tape. This is transferred in code to the reading relays. The reading relays receive a two-out-of-five up-check. After this, the two-out-of-five up-check of the remaining splice entries is canceled; this prevents stoppage of the machine because of mutilation of the C and D digits by a window splice. This cancellation continues until an entry other than 08XX10 is read.

Tape identity follows the splice pattern. When the first line of tape identity is read, the two-out-of-five check is restored. The tape identity assumed in this description is shown on the tape of Fig. 85.

Line 1 of tape identity is read, checked by a two-out-of-five up-check, passed through the tape type switch of the converter, and then through the cross connection field of the summary punch. This tells the machine that the tape, the converter, and the punch are in agreement. The reader then advances the tape to the second line of tape identity which is checked on a two-out-of-five basis and compared with the marker group set-up switch. Lines 5, 8 and 9 are also checked on a two-out-of-five basis and compared with their set-up switches. Tape identity lines 3, 4, 6 and 7 are checked for a two-out-of-five check only.

*Processing of detail tapes.*—The processing of the first call entry of a tape differs in some respects from that of the succeeding call entries. For this reason, and also because of an overlap in processing, the first call entry is discussed separately from the succeeding call entries and the differences in processing are explained.

*First call entry.—Reading and registering.*—When the last line of the tape identity has been read and checked, the reader advances the tape to the first line of the first call entry. The machine has already found the input registers normal and therefore ready to receive the record of the first call.

To register the content of the first line of the first call entry in the line 1 input registers, the operated reading relays are connected to the line 1 input registers. This is done by the line 1 input register connectors, which operate under control of the first line steering relay, if the A digit of the first line is 1, 2 or 3.

When these connectors operate, the B to F digits of the reading relays are registered in the B to F digits of the line 1 input registers on a two-out-of-five basis. If the A digit is a 1 or 3, it is registered in the entry type register on a one-out-of-two basis. (Since for summary tapes there is only one type of record, A digit 2, the entry type register is not used.)

An A digit of 1 indicates a toll message, a completed service observing call, or a message unit detail message. A 3 indicates a non-answered observing call.

Satisfactory operation of the line 1 input register relays and the entry type register operates the line 1 input up-check relay. At the same time, the reader step circuit of line 1 operates to advance the tape to the second line of the entry; the line 1 steering relay then releases and the second line steering relay operates.

When the tape advances to the second line of the entry, the connectors to the line 2 input registers operate if the A digit of this line is 0. The B to F digits of the reading relays are registered in the same way as for line 1.

The A digits of all supplementary lines are not registered but are used only to control the operation of the connectors for each line. Advancing the tape, and steering and connecting the reading relays to the input registers of the remaining lines are done in the same way as for line 2.

After the fifth line of the entry has been registered and up-checked, the tape advances to the next line. The machine expects this line to be the first of a new entry. If the reader recognizes an A digit of 1, 2 or 3, depending on the type of call being processed, the sixth line check relay operates. Operation of this relay tells the machine that the first call has been registered and the first line of a new call has been read.

The sixth line check relay completes the up-check circuit of the input registers. The up-check circuit then notifies the transfer control that the input registers are ready to transfer their content to the output registers. The tape is not advanced until the input registers are ready to accept the record of the second call.

*Translation.—General.*—Since certain digits of the tape information are in index, or abbreviated, form and registered as such in the input registers, translation is provided to convert the index to a more useful form before recording it on the punched card. For example, a calling office index, B digit of first line, of 1 may mean CR 2, CRanford 2, on a tape from marker group 00, but on a tape from marker group C1 a calling office index of 1 may mean RO 4, Roselle 4. As such entries are read and registered, and before they are transferred to the output registers, these digits are passed to translating circuits. Listed below are the digits of 5-line call entries that require translating, together with the names of the circuits which perform this function.

| Digits | From Line | Digits Indicate | Translating Circuit |
|---|---|---|---|
| B | 1 | Calling office index | Calling office translator. |
| B and C | 2 | Tens of a start time | Start time translator. |
| B | 5 | Message unit index | Class translator. |

*Tape index register.*—The tape index register has various functions, some of which are described below; the rest are described at appropriate points in the text.

In the processing of detail tapes, that is toll, message unit detail, or MUD as abbreviated herein, or service observing tapes, part of the information in the input registers is translated before transfer to the output registers. However, translation is not used when processing summary tapes. The tape index register is provided to allow the input registers to either be connected to, or to by-pass, the translators. The tape index register is controlled by the set-up switches and gives the signal for the type of control needed.

Punched cards from toll tapes are used for subscriber billing; punched cards from message unit detail and service observing tapes are used for record and statistical purposes. To prevent a subscriber from being billed twice for the same call, each card is punched for either charge, for toll calls, or no charge, for message unit detail and service observing calls.

*Calling office translator.*—To allow the punched cards to be read directly, the calling office index, that is the B digit, line 1, is translated into the A, B and C digits of the calling office code. The calling office translator and marker group set-up switches control this translation.

The calling office index of the illustrative call is 1 and the marker group set-up switches are set at 0, 0. The B digit, in combination with this position of the set-up switches, results in an office code ABC of 272, representing CR 2, Cranford 2, which is the calling office.

*Start time translator.*—The start time line contains three parts, day, hour and minute, derived by the computer from the calendar day (from tape identity), the last recorded hour, and the answer time entry of the assembler output tape. Each of these items needs two digits, tens and units, making a total of six digits. Since the A digit of a supplementary line must be 0, the six digits of the start time line must be fitted to the five remaining spaces. A 2-digit code is used for the tens digit of the three parts. The 2-digit, B and C, code and the unit digits, D, E and F, of the day, hour and minute are the 5-digit entry of the start time line. These are shown in the second line of the input registers. The start time translator translates the 2-digit code into the tens digit of the day, hour and minute.

The start time line of the illustrative call is

| B | C | D | E | F |
|---|---|---|---|---|
| 2 | 7 | 2 | 3 | 5 |

The 2-digit code, BC, is 27. When translated, the three tens digits are 2, 1 and 2, which with the units digits, DEF, form the 22nd day, the 13th hour and the 25th minute.

*Class translator.*—Since many types of calls are processed by the tape-to-card converter, each card is marked by the class translator with an AMA class number. This number indicates the type of tape from which the cards were derived, and the class of treatment required in the card processing. A list of the AMA class numbers and the corresponding types of detail tapes is given below.

| AMA Class Number | Type of Detail Tape |
|---|---|
| 0 | Toll. |
| 1 | Observing, Answered (Toll or MUD). |
| 2 | Observing, Not Answered. |
| 3 | Observing, Cancel Charge (Toll or MUD). |
| 4 | Message Unit Detail. |

Since toll and MUD tapes each contain only one type of call, the class translator is controlled directly by the tape index register. However, when service observing tapes, which contain three types of calls, are processed, the class translator is controlled by the combination of the A digit of the first line of the entry, the B digit of the fifth line, and the tape index register.

*Transfer of information to output registers.*—When the reader finds a good registration in the first line of the next entry, the sixth line check circuit operates. This circuit tells the output register control circuit to go ahead and transfer the information in the input registers and translators to the output regisers. The transfer takes place as soon as the input registers and translators are filled and the output registers are cleared of the previous call. The two sets of registers, including the translators, keep the information registered in them until a check circuit tells the input side to release.

The 30 sets of output registers are shown in Figs. 63 to 72. Not all of these registers are used for all detail calls. Some of the registers are never used when summary calls are processed.

*Description of output registers.*—A brief description of the output registers and the information they receive for a 5-line entry follows.

*Calling office code registers.*—The calling office index goes through the tape index register to the calling office translator. The marker group from the marker group set-up switches joins the calling office index in the calling office translator. These two, after translation, form the three digits A, B and C of the calling office code, which is then registered in the calling office code output registers.

The calling office index for the example is 1. This number and the marker group information from the marker group set-up switches are translated into 272. These three digits are now registered in the calling office code output registers, and represent CR 2.

*Calling line numericals registers.*—The calling line numericals input registers give their information to the calling line numericals output registers, as shown in Fig. 85.

*Start time registers.*—The B and C digits of the start time registers are translated into three digits by the start time translator. These three then go to the answer day tens, answer hour tens, ,and answer minute tens of the start time output registers. The D, E and F digits of the start time input registers are passed unchanged to the answer day units, answer hour units and answer minute units of the start time output registers.

Fig. 85 shows the start time input registers containing, for the illustrative call, 27235. The B and C digits, 27, are translated and registered in the output registers as 212; meanwhile the D, E and F digits 235 are transferred without change to the output registers. Thus, the start time is registered as 212235. This represents an answer day of 22, an answer hour of 13 and an answer minute of 25.

*Area index and called office code registers.*—Both the area index and the called office code output registers receive their information from similarly named input registers.

As shown in Fig. 85, the area index for the example is assumed to be 1. The called office code is 243 for CH 3.

*Called line numericals and station registers.*—The called line numericals may be transferred as three digits, four digits with or without a station party letter, or as five digits. The called number index in the input register tells the output registers which it shall be, by controlling (in the output register control) the output register connectors. The table below shows the called number index and the corresponding operated output registers for the different kinds of called line numericals.

| Kind of Called Line Numericals | Called Number Index | Called Line Numericals | | | | | |
|---|---|---|---|---|---|---|---|
| | | STA | TTH | TH | HN | T | U |
| 3 Digits | 0 | 0 | 0 | 0 | X | X | X |
| 4 Digits, No Station | 1 | 0 | 0 | X | X | X | X |
| 4 Digits with Station | 1 | X | 0 | X | X | X | X |
| 5 Digits | 2 | 0 | X | X | X | X | X |

X indicates an operated register whose output will result in a punch in the card.

0 indicates either an unoperated register or one that will not cause a card punch.

The sample call, Fig. 85, has a called number index of 1 and called line numericals of 1000 without a party station letter in the input registers. This information is transferred to the called line numericals output registers as 1000 and the no station relay is operated in the station register.

*AMA class register.*—The AMA class register gets its information from either the tape index register, the class translator, or both. The table below shows the AMA class numbers and the corresponding types of detail tape.

| AMA Class Number | Type of Detail Tape |
|---|---|
| 0 | Toll. |
| 1 | Observing, Answered. |
| 2 | Observing, Not Answered. |
| 3 | Observing, Cancel Charge. |
| 4 | Message Unit Detail. |

The tape type switch, for the example shown in Fig.85, is set on toll. The tape index register now knows that a toll tape is being processed; therefore it tells the AMA class register to register an 0—the class number for a toll tape.

*Chargeable time registers.*—The chargeable time registers get the time from similarly named input registers. The time registered is punched for all detail calls, even when the time is 00.

The time of the sample call is five minutes. Therefore Fig. 85 shows 05 minutes in these registers.

*Message units registers.*—The message units registers get the number of message units from input registers of the same name. If the input registers have 00 message units, the output registers remain empty.

Fig. 85 shows that the message units output registers are empty because the input registers have 00 message units, so for this call the message units columns of the card will not be punched.

*Month register.*—The month is passed from the month set-up switches to the month register. The month in the register may be the same month as that shown on the switch settings, or the following month. The latter is registered for calls that are made after midnight of the last day of the period. Except for this interval, the same month as that shown on the set-up switches is registered in the month register.

The sample call was made on May 22. Therefore the set-up switches are set for a month tens of 0 and a month units of 5. When this information is passed the month May appears in the register.

*Overpunch register.*—The tape index register tells the overpunch register to register either 11X or 12Y. 11X indicates "charge" for a toll tape, while 12Y indicates "no charge" for message unit detail and observing tapes.

The sample call of Fig. 85 is a toll call; therefore 11X is registered in the overpunch register.

*Unused output registers.*—An up-check of all output registers is needed before processing can continue. Since the information transferred from input to output does not necessarily fill all output registers, grouping relays are used to take the place of those output registers not operated. The grouping relays provide an alternate path for the up-check circuit through the unused output registers.

Figure 62:
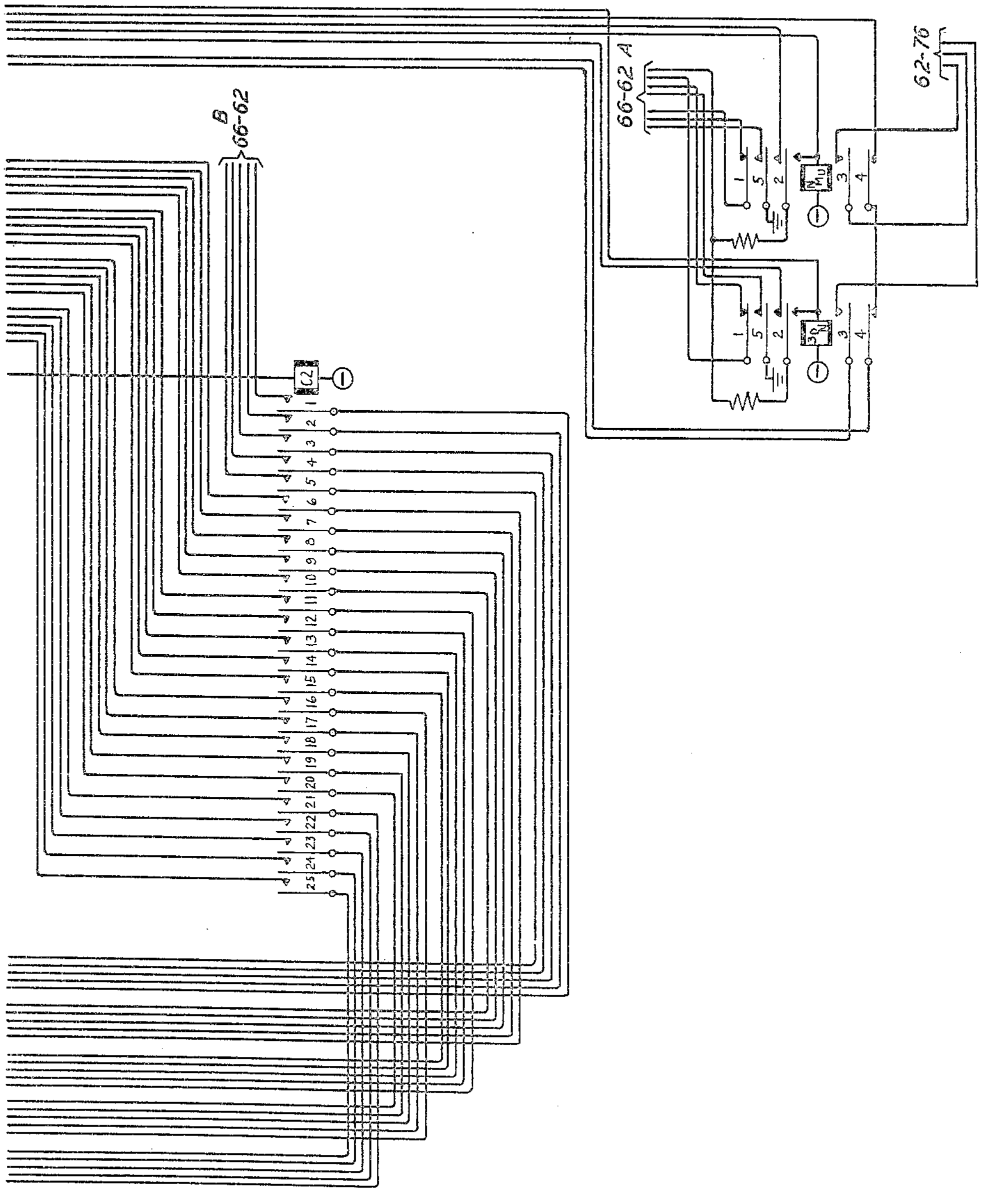

In Fig. 85, the sample call leaves the message units output registers empty. To complete the up-check path through these registers the no message units grouping relay, designated NMU in Fig. 62, is operated. This relay directs the up-check path over the normal down-check path of the message units registers, and then back to the regular up-check path to provide a continuous circuit to operate the output register up-check relay RUC, Fig. 24.

The case of the station and ten thousands registers is different. Here, one relay operated in the station register and none in the ten thousands register, or none in the station register and two-out-of-five in the ten thousands register, will provide a path for the up-check. The sample call shows the station register filled by the no station relay, which has no output to the IBM punches. The ten thousand register is empty. These conditions are needed to provide the up-check path.

*Operation of output registers.*—As previously described, the output registers are filled from the input registers and translators. This transfer of information takes place when the output register connectors operate. However, before the output register control can tell the connectors to operate, the input side must be filled and the output side empty.

After the transfer the output registers are up-checked. Then they tell the output register control to release the connections between the input and output sides. But the input register relays do not release immediately. They wait about 75 milliseconds to make sure that the output registers have locked up. If after this interval all the output registers are still locked up, the input registers are told that the transfer was successful and they release.

The input registers never get the signal to release if any output registers release during the timing cycle. Instead, the machine stops and an alarm sounds.

The output register up-check tells the punch sequence control to start punching a card when the output registers are filled. The card is punched—a row at a time—until all twelve rows are punched. When this is finished, the output registers are told to release and be ready for the next transfer.

*Card punching.—General.*—When processing toll, MUD, and observing tapes a separate card is punched for each "recorded message": when processing summary tapes a separate card is punched for each "summary entry." These cards are punched by the IBM summary punch from the information in the output registers of the tape-to-card converter. Fig. 89 shows one of these cards punched for the typical call previously described.

*Card column assignment.*—The assignment of the separate items to columns is controlled by cross connections on the cross connection field Fig. 83 of the IBM summary punch; a typical assignment for use in processing "recorded messages" follows:

| Card Column Number | Toll, MUD, and Observing Tapes |
|---|---|
| *1 | Collate Month. |
| *2 | Month. |
| 3 | Answer Day Tens. |
| 4 | Answer Day Units. |
| 5 | Called Line Numerical Ten Thousands. |
| 6 | Called Line Numerical Thousands. |
| *7 | Called Line Numerical Hundreds Plus AMA. |
| 8 | Called Line Numerical Tens. |
| 9 | Called Line Numerical Units. |
| *10 | Check Punch. |
| 11, 12, 13 | Calling Office Code. |
| 15 | Calling Line Numerical Thousands. |
| *16 | Calling Line Numerical Hundreds Plus Non-Billing. |
| 17 | Calling Line Numerical Tens. |
| 18 | Calling Line Numerical Units. |
| *19 | Called Station Letter. |
| 20 | Answer Hour Tens. |
| 21 | Answer Hour Units. |
| 22 | Answer Minute Tens. |
| 23 | Answer Minute Units. |
| 24 | Area Index. |
| 25, 26, 27 | Called Office Code. |
| 42 | Chargeable Time Tens. |
| 43 | Chargeable Time Units. |
| 44 | Class. |
| *49 | Billing. |
| 76 | Message Unit Tens. |
| 77 | Message Unit Units. |

In the above table the items "not" marked with an asterisk use the single punch decimal code. The items marked with an asterisk (*) are special and are described below.

**1*—*collate month.*—This column is used with the month column to permit month sorting to agree with IBM methods. January to June are punched 1 to 6 respectively. Punches for July through December are not required in the collate month column for sorting—a punch is made in the zero row for these months for checking.

**2—month.*—This column is punched on a modified decimal basis. It differs from other one-punch decimal columns in having two additional rows—12 for January and 11 for February. March to December are punched 0 to 9.

**7—called line numerical hundred plus AMA.*—This is a split column. A punch is made in row 11 for cards originating in an AMA accounting center to distinguish them from cards made from operator tickets, for example. The called line numerical hundreds is punched 0 to 9.

**10 check punch.*—Only row 9 of this column is used. This punch position is in the last horizontal row and is made when a satisfactory check has been made that all punch relays have operated. This checking operation and a sensing check will be explained later.

**16—calling line numerical hundreds plus non-billing.*—This is a split column. A punch in row 12 is made on the cards not to be used for billing—as in service observing records, for example. Each card has either this punch to indicate non-billing or a punch to indicate billing in row 11 of column 49, as mentioned below. The calling line numerical hundreds is punched 0 to 9.

**19—called station letter.*—Positions 1, 4, 9 and 6 represent station letters J, N, R and W respectively. Note that these assignments do not correspond to the dial letter plate. They are chosen to correspond to the IBM code for printing letters.

**49—billing.*—Only row 11 of this column is used and, as indicated under column 16 above, each card has either a 12 punch in column 16 or an 11 punch in column 49. All "billing" cards are punched 11 in column 49.

Each punch relay P, Figs. 75 to 81, has a check punch relay CP in series with it. The contacts of the check punch relays are grouped through cross connections in the cross connection field to cause a check punch in column 10 of the last position, that is row 9. An unoperated check punch relay which should be operated thus prevents the check punch being made. Check punch relays which are unoperated because the corresponding output registers are not used are shunted by other relays.

The check punch is an indication of a satisfactorily punched card. Without it, the card cycle is not completed and the output registers cannot release. This punch in row 9 is a check that all the proper punch relays are operated. It is "not" a check that the proper punches are made in the card.

*Succeeding call entries.*—Whereas the converter checks to be sure that both input and output registers are empty before the processing of the first entry of a tape can begin, the processing of the succeeding entries is done differently. It is performed as an overlapping action. The reason for overlapping is that the reader can read 5-line entries faster or at 180 per minute than the punch can punch cards or at 100 per minute. Therefore the output register control must delay the transfer of a new entry just registered in the input until the output registers have cleared the previous entry.

For all but the first entry, the processing is as follows. As soon as the transfer of information to the output registers is successful, the input registers release. The output registers go ahead and send the information from this entry to the summary punch to be punched on a card. Before the card is completely punched, the input registers take the next entry from the reader and wait with it until the output registers release after finishing with the old entry. Then the next transfer takes place and when it is complete, the input registers are told to release and get ready for another new entry. Meanwhile the output registers go ahead with the processing as before. The processing of two different entries at the same time in the input and output registers on an overlap basis continues until the trailing end of tape pattern is reached.

*Window pattern.*—When a window entry, that is 287020, is read, a two-out-of-five check is made on the B to F digits and a one-out-of-three check on the A digit. After the checks are made, the tape advances to the next line which is splice pattern. Splice pattern is read, checked, and causes skipping of the splice entries that follow. Another window entry, 287020 follows the last splice entry of the window pattern. This stops the skipping action and advances the tape to the next line.

*Trailing end of tape pattern.*—*Tape identity.*—The trailing end tape identity is checked in substantially the same way as the leading end tape identity.

*Skip splice and splice pattern.*—Skip splice, 2860XX, follows the last line of trailing end tape identity. The B to F digits of this line are checked on a two-out-of-five basis and the A digit on a one-out-of-three basis. The tape then advances to the next line which is splice pattern, and again skips through the reader.

When the reader comes to the end of a tape it finds mutilations of the digits caused by tape cutting. These mutilations bring in the short alarm and stop the reader meter. Operation of the alarm cut-off key stops the alarm. The motor start key is then operated and the tape is stepped out of the reader by either the tape feed or the reader step key. Operation of the end of tape key releases the converter circuit.

When the last call entry is punched on a card, the summary punch stops. The last card and the card preceding it remain in the punch unit mechanism. These cards are discharged into the punch stacker by operating the summary punch start key for two card cycles. Following this, the power switch of the summary punch is moved to the off position, causing release of the circuit.

*Reading and registering.*—When summary tapes are processed, only the first and second line input registers are used. The position of the tape type switch prevents the third, fourth and fifth line input register connectors from operating.

As previously mentioned, the A digit of the first line of a summary entry is not registered. The B to F digits of this line, however, are registered in the same way as for detail type entries.

The up-check of the first line of the summary entry is through the B to F digits recorded in the input registers and a summary tape relay. From this point on, steering, recording and up-check of the second line are done in the same way as for the second line of a detail type entry.

Operation of the up-check relays of lines 1 and 2 signals the transfer control that the input registers are ready to transfer their content to the output registers. The tape advances to the first line of the next entry and remains there until the input registers are again released.

*Translation.—Tape index register.*—The same as described for detail calls.

*Calling office translator.*—The calling office code is determined by the positions of the marker group and central office set-up switches. Since the records of a summary tape represent one central office, the code does not change during processing.

*Transfer of information to output registers.*—The transfer of a summary entry from input to output registers is similar to that of a 5-line entry but simpler. When the two lines of the entry are registered in the input registers, and the output registers are cleared of the previous call, the output register control circuit goes ahead and transfers the information to the output registers.

Some of the registers record different information when processing summary tapes than they do when processing 5-line entries. In addition, some of the output registers are not used at all.

*Description of output registers.*—A description of the output registers which are used and the information they receive for a summary entry follows.

*Calling office code registers.*—The entire tape originates in the same central office, so the central office set-up switch is set to correspond to the calling office index. This controls the calling office translator to form the calling office code as described for detail calls.

*Calling line numericals registers.*—The same as described for detail calls.

*Summary registers.*—The answer minute tens, answer day units, answer hour units and answer minute units of the start time registers are used to register the summary message units. The registers when thus used are called summary thousands, summary hundreds, summary tens and summary units. These registers get their information directly from the C, D, E and F digits of the second line of the input registers.

*Last day registers.*—The last day tens and the last day units registers are employed. These registers are used as chargeable time tens and chargeable time units when 5-line entries are being processed.

The registers are filled from the setting of the last day tens and last day units switches.

*Month register.*—The month is passed from the month set-up switches. For summary tapes the month registered is always the same as that on the month set-up switches.

*Overpunch register.*—The message unit index, B digit of the second line of a summary entry, tells the overpunch register whether to register 11X or 12Y. 11X is registered for exactly 1000 message units, while 12Y is registered for less than 1000 message units.

*Unused output registers.*—As in the processing of 5-line entries, a summary entry cannot be completely processed until all output registers are upchecked. In this case the tape index register relay which is in the operate condition by-passes the output registers that are never used for summary entries.

*Card column assignment.*—A separate cross connection arrangement is used for summary entries. A typical assignment of the items to columns for summary entries follows:

| Card Column Number | Summary Tapes |
|---|---|
| *1 | Collate Month. |
| *2 | Month. |
| 4 | Summary Hundreds. |
| *7 | AMA. |
| *10 | Check Punch. |
| 11, 12, 13 | Calling Office Code. |
| 15 | Calling Line Numerical Thousands. |
| *16 | Calling Line Numerical Hundreds Plus Under 1000 Message Units. |
| 17 | Calling Line Numerical Tens. |
| 18 | Calling Line Numerical Units. |
| 21 | Summary Tens. |
| 22 | Summary Thousands. |
| 23 | Summary Units. |
| 42 | Last Day Tens. |
| 43 | Last Day Units. |
| *49 | 1,000 Message Units. |

In the above table the items not marked with an asterisk use the single punch decimal code. The items marked with an asterisk are described below.

*1—*collate month and* *2—*month.*—The use of these columns is the same as for recorded messages.

*7—*AMA.*—The punch in position 11, for cards originating in an AMA accounting center to distinguish them from cards made from operator tickets, is the only punch in this column. The underpunch portion is unassigned.

*10—*check punch.*—The use of this column is the same as for recorded messages.

*16—*calling line numerical hundreds plus under* 1000 *message units.*—This is a split column. The calling line numerical hundreds is punched 0 to 9 in the underpunch position. The overpunch position 12 indicates that the summary is under 1000 message units. Each summary card has either a 12 position punch in column 16 or an 11 position punch in column 49.

*49—1000 *message units.*—A punch in position 11 of this column is used to indicate exactly 1000 message units. The underpunch positions are not used.

*Keys and functions.*—The functions of certain of the important keys shown in the converter circuit, which will be described in detail hereinafter, are presented here for ready reference.

| Key | Function |
|---|---|
| Alarm Cut Off | Retires external alarm. |
| Motor Start | Starts reader motor. |
| End of Tape | Restores circuit to normal after tape runs out of reader following skipping of last splice pattern. |
| Machine Release | Temporarily shuts down machine but allows calls being processed to be completed. |
| Machine Start | Starts machine processing. |
| Reader Step | Advances tape to the next line. It is effective only when start circuit is released and reader lamps key is operated. |
| Input REGRLS | Removes lock from input registers. |
| Output REGRLS | Removes lock from output registers. |
| Tape Feed | Feeds tape into reader. |
| Tape Section Release | Releases tape section register by restoring tape section selector to normal. This key is operative only when circuit is stopped or in an alarm condition. |
| Tape Section Reset | Advances tape section selector one step for each key operation. |
| Master Release | Restores entire circuit to normal when operated in conjunction with Machine Release key. |
| Emerg. Motor Stop | In an emergency, stops reader motor and removes battery supply from reader step magnet. |

| Key | Function |
|---|---|
| Emerg. Reset | Allows processing to continue upon restoration of power after failure. |
| Tape Indent | Permits machine to continue processing after a tape identity check failure. |
| Summary | Lights the Thousands, Hundreds, Tens and Units indicating lamps for summary entries. In addition, the Under 1000 MU Y lamp will light if there are under 1000 message units in the summary or the 1000 MU X lamp will light if there are 1000 message units in the summary. |
| Chargeable Time MU and Class Key. | On detail calls, lights the indicating lamps for AMA Class, minute tens and units of chargeable time and tens and units of message units. In addition, the Charge X lamp will light for calls on which charges apply or the No Charge Y lamp will light for no charge calls. |

Figure 87:
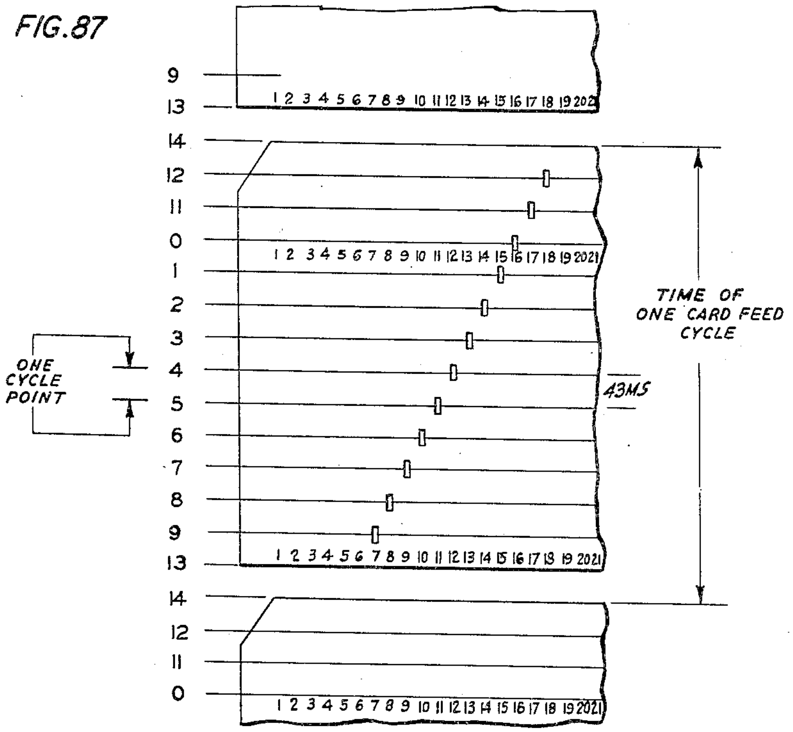

Fig. 87 shows portions of three cards arranged to indicate a punching cycle. The cycle is separated into 14 discrete time units, the first numbered 14, which is a unit interval between successive cards, then 12, which is the interval alloted to punching the top row on a card, followed by 11, then 0 to 9 and then 13. Interval 13 is the last interval. During the interval numbered 13 the card moves out of the machine. Interval 13, like interval 14, is not a punching interval.

The cycle time for a single horizontal row may be, for instance, 43 milliseconds. The cards are stationary during the punching operation and move one-quarter inch between punch positions. Positions 13 and 14 are for providing clearance between cards. It may require, for instance, 600 milliseconds for moving the card through the 14 positions.

Figure 88A:
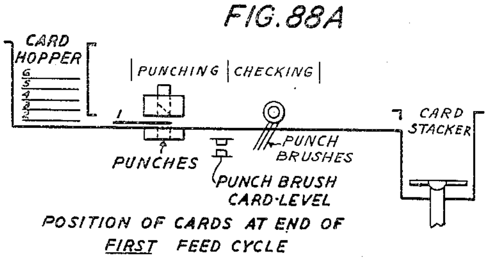
Figure 88B:
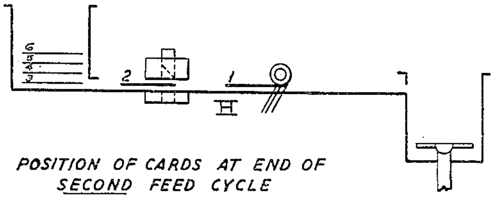
Figure 88C:
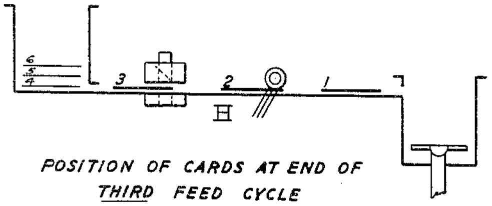
Figure 88D:
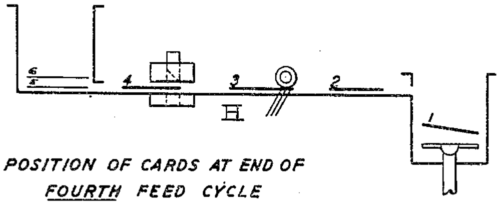

Refer now to Figs. 88A, 88B, 88C and 88D. Four feed cycles are required for one card to progress from the card hopper through the punch positions into the stacker of the IBM machine. The positions of the cards at the end of each one of the cycles one to four are indicated in Figs. 88A, 88B, 88C and 88D, respectively. In Fig. 88B card 1 closes a pair of contacts, not shown, which control the continuous operation of the machine. The first two cards, card 1 and card 2, must be manually controlled by a double operation of the start key until the cards are in the positions shown in Fig. 88B. When the first card leaves its position an electrical check is made that there is at least one hole in each employed vertical column and that none other than those specified is double punched. This check does not detect a punching in a wrong position of a column. The summary punch is equipped to check thirty columns for double punch or blank columns. In the tape-to-card converter columns 76 and 77 assigned to message unit tens and message unit units are not checked for double punch and blank columns. These columns are used only in service observing and do not affect billing. Columns 5, 6 and 19 assigned to called line numerical ten thousands, called line numerical thousands and called station letter are not checked for blank columns as certain tape entries do not contain these particulars and thus certain cards would not be punched in these columns.

The normal speed of the converter is .3 second per card and the maximum speed of the punch is .6 second per card. Therefore the converter circuit must normally wait for the completion of the card feed cycle. The punch signals when the card feed cycle is completed.

The tape to card converter circuit is designed to accept the following tapes.

1. A toll tape from a computer.
2. A message unit detail tape from a computer.
3. An observing tape from a computer.
4. A detail tape from an assembler-computer.
5. A summary tape from a summarizer.

The circuit is designed to punch a card for each call in tapes 1, 2, 3 and 4 and in addition on tape 4 to punch an additional card, on toll and message unit detail messages which are marked for observing. When processing summary tapes, listed as number 5 above, a card is punched for each summary entry.

*Functions.*—To read each line of the input tape.

To check each line for one or three perforations in the A digit, and two in each of the B, C, D, E and F digits.

To check the advance of the reader drum.

To recognize and skip splice pattern.

To recognize and check the tape identity on the leading end of each section of the tape.

To recognize and check the tape identity on the trailing end of each section of the tape.

To check for consecutiveness and count the sections of the summary tape.

To accept detail tapes from the computer or assembler computer, observing or message unit detail tapes from computer or summary tapes from the summarizer.

To accept summary tapes on a flexible processing period basis.

To check that the set-up switches are not changed after processing of tape has started.

To steer each line of either the five line entries or two line entries to the corresponding input register.

To connect and register on a two-out-of-five basis all lines of any one good call entry in the input registers.

To check that all input registers are released before steering to them.

To check that one or three of the A digit register relays are operated and that two-out-of-five relays of the B, C, D, E and F digit registers of all lines are operated before allowing the circuit to proceed.

To translate calling office information from office index and marker group to an arbitrary flexible three-digit code.

To translate information from two tape digits to three digits of start time.

To derive, from tape and set-up switches, a distinguishing number for each type of detail call to punch on cards.

To punch two similar cards from the same call information in certain cases.

To punch the next month on the card for a call made after midnight on the last day of the month.

To translate from the tape information the called station or party.

To transfer information from input registers and translators to output registers between IBM punch cycles.

To check that output registers remain operated before releasing input registers, and to prevent passing the same input information to output registers a second time unless two cards are required.

To check that the correct output registers are operated and that the correct number of relays in each register are operated.

To check that all output registers are released before filling them.

To store complete information in output registers before attempting to punch a card and to provide registers for the following information:

1. Calling number.
2. Answer time, day, hour and minute or summary.
3. Called area.
4. AMA class.
5. Called office and number.
6. Charge time or round or last day.
7. Message units.
8. Month.
9. X and Y punches.

To check that the circuit advances within a required time limit.

To control an IBM machine so as to perforate a series of IBM cards in accordance with information set up for each card in an output relay register, at a speed of approximately one hundred cards per minute.

During the punching of each IBM card, to check that the right circuit paths for the functioning of the punch magnets of the IBM machine have been closed at the proper time to insure complete perforation on the IBM card of all information set up for that card on the output register relays.

To provide for directing twelve equally spaced circuit breaker pulses from the IBM machine so as to cause the punching, one row at a time, of the correct punched hole information for a multiplicity of columns of the IBM card.

For the punching of each row of holes, to complete the connection of the circuit breaker lead to the correct punch magnet windings before the circuit breaker of the IBM machine closes to operate the punch magnets.

To check that the circuit breaker pulses of the IBM machine are in synchronism with the circuit breaker pulse directing circuits of the converter.

To prevent checking the first line of tape identity, and in so doing stop the machine and operate the alarm if an attempt is made to process a summary tape using the IBM cross connection field or plug board as it is called wired for detail calls and vice versa.

To stop the machine after punching of the card in progress and to operate the alarm when any of the following trouble conditions occur.

The non-completion of any of the operations and checks mentioned in the above functions.

The stacker becomes filled.

Any one of the fuses of the IBM machine is operated.

The Stop key of the IBM machine is operated.

To stop without an alarm but with an indicating lamp when the punch blank card feed hopper is empty.

To stop without an alarm but with an indicating lamp when double punch, or blank column, or comparison stoppages of the punch occur.

*Description of operation.—General description.*—The following is a general description of the circuit operation when processing a detail tape, assuming that toll entries are being processed.

The set-up switches are set for processing a detail tape, with the marker group, month and last day switches set to agree with the identity of the tape to be processed.

The reader is started by the operation of the Motor Start key. The tape is fed into the reader and cards into the punch. The Machine Start key is operated. The tape identity is checked with the setting of the set-up switches.

The five lines of each call entry are read successively and the B, C, D, E and F digits of each line are recorded in an input register exactly as read.

The information recorded on the set-up switches and on the input registers is used to control the operation of the output registers. Some of these output registers are operated directly under control of the input registers, these include the registers for recording the calling number, the called area, the called office, the called number, the elapsed time and the units digits of the day, hour and minute. Other output registers are operated under control of translators which in turn are controlled by the set-up switches and input registers, these include the month, the calling office, the called station (party letter), and the tens digit of the day, hour and minute.

As soon as the output registers are operated they lock up and are ready to control the punching of a card. The input registers are then released and are ready to receive the next entry on the AMA tape. The output registers control the punching of a card and while this is in progress, the AMA tape is advanced and the five lines of the next call entry are read and recorded in the input registers. As soon as a card is punched, the output registers are released and are ready for operation on the next entry. This overlapping process continues to the end of the AMA tape with the punch operating at its maximum speed of one hundred cards per minute and the AMA tape advancing in spurts of five lines at a time.

The circuit operation when processing a summary tape is somewhat simpler than that described for processing a detail tape in that each AMA tape entry consists of only two lines and much less information is punched on the card.

In case an entry for a toll or message unit detail message on a detail tape is marked for observing, two cards instead of one are punched, the second card being for the service observing record. This requires a second punching cycle for the second card with a consequent delay in releasing the input registers and recording the next entry.

Checks are made for the proper number of relays operated for each digit of the reading relays and input and output registers, for the proper number of lines in an entry and for the locking up of the output registers. When the input or output registers are released, checks are made that all relays are normal. While a card is being punched, a check is made that the circuit is closed to the punch control relay of each column that is supposed to be punched. A check punch is made on a card only if all of the above checks are satisfied. If any checks are not satisfied the circuit blocks and brings in an alarm.

*The reader.—General.*—The function of the reader is to read the perforated information on the AMA tape, to control the advance of the tape, and to provide various closures for controlling the circuit.

The reader assembly is positioned on the guide tracks of the reader mounting and pushed into place so that the multi-contact plug on the reader assembly makes contact with the multi-contact jack on the reader mounting. This grounds the common side of all of the contacts and extends the individual contacts into other parts of the circuit. The winding of the Step magnet of the reader is also connected into the circuit. The alternating-current supply is connected to the reader motor by means of a cord.

The AMA tape is about three inches wide. The information on the tape is represented by embossed perforations. There are twenty-eight positions across the tape in which perforations may occur. These positions are spaced approximately 0.1 inch center to center both transversely and longitudinally. The twenty-eight positions are divided into six groups constituting the A, B, C, D, E and F digits. Looking at the smooth side of the tape, with the leading end down, the A digit is at the left. The A digit group contains three positions, and the B, C, D, E and F digit groups each contain five positions. The positions in the A group are designated 0, 1 and 2, from left to right. The positions in the B, C, D, E and F groups are designated 0, 1, 2, 4 and 7 from left to right. For mechanical reasons, each line of perforations, as perforated and as read, instead of occupying a straight horizontal line, occupy a zigzag line. The grouping and designations of this zigzag line arrangement are as follows:

| A | B | C | D | E | F |
|---|---|---|---|---|---|
| 0 1 2<br>0<br>0 0 | 0 1 2 4 7<br>0 0 0<br>0 0 | 0 1 2 4 7<br>0 0<br>0 0 0 | 0 1 2 4 7<br>0 0 0<br>0 0 | 0 1 2 4 7<br>0 0<br>0 0 0 | 0 1 2 4 7<br>0 0 0<br>0 0 |

On the tapes read, each line of perforations contains one or three perforations in the A digit group, three perforations representing the number 3, and two perforations in each of the B, C, D, E and F digit groups. The information contained in each of the B, C, D, E and F digits is in accordance with the additive two-out-of-five code, in which the sum of the two perforation position designations 0, 1, 2, 4 and 7 (with the exception of the combination of 4 and 7) equals the numeral represented, according to the following table:

| Perforated Positions | Numeral |
|---|---|
| 0+1 | 1 |
| 0+2 | 2 |
| 1+2 | 3 |
| 0+4 | 4 |
| 1+4 | 5 |
| 2+4 | 6 |
| 0+7 | 7 |
| 1+7 | 8 |
| 2+7 | 9 |
| 4+7 | 0 |

The reader is equipped with twenty-eight reading pins arranged to line up with the holes in the drum and with the perforation positions on the tape. These pins are operated with a reciprocating motion from a motor-driven cam and are arranged to make contacts when registering with perforations in the tape. The reciprocating motion of the reading pins is dependent only upon the running of the reader drive motor, and is entirely independent of the rotation of the reader drum and the advance of the tape. Thus if the advance of the drum is stopped, the same line on the tape is read repeatedly. The reader drum advance takes place while the reading pins are withdrawn from the drum.

The reader runs at the nominal rate of sixteen reading operations per second, and if the rotation of the drum is not stopped it will be advanced at the rate of sixteen steps per second, resulting in reading sixteen lines per second.

Figure 6:
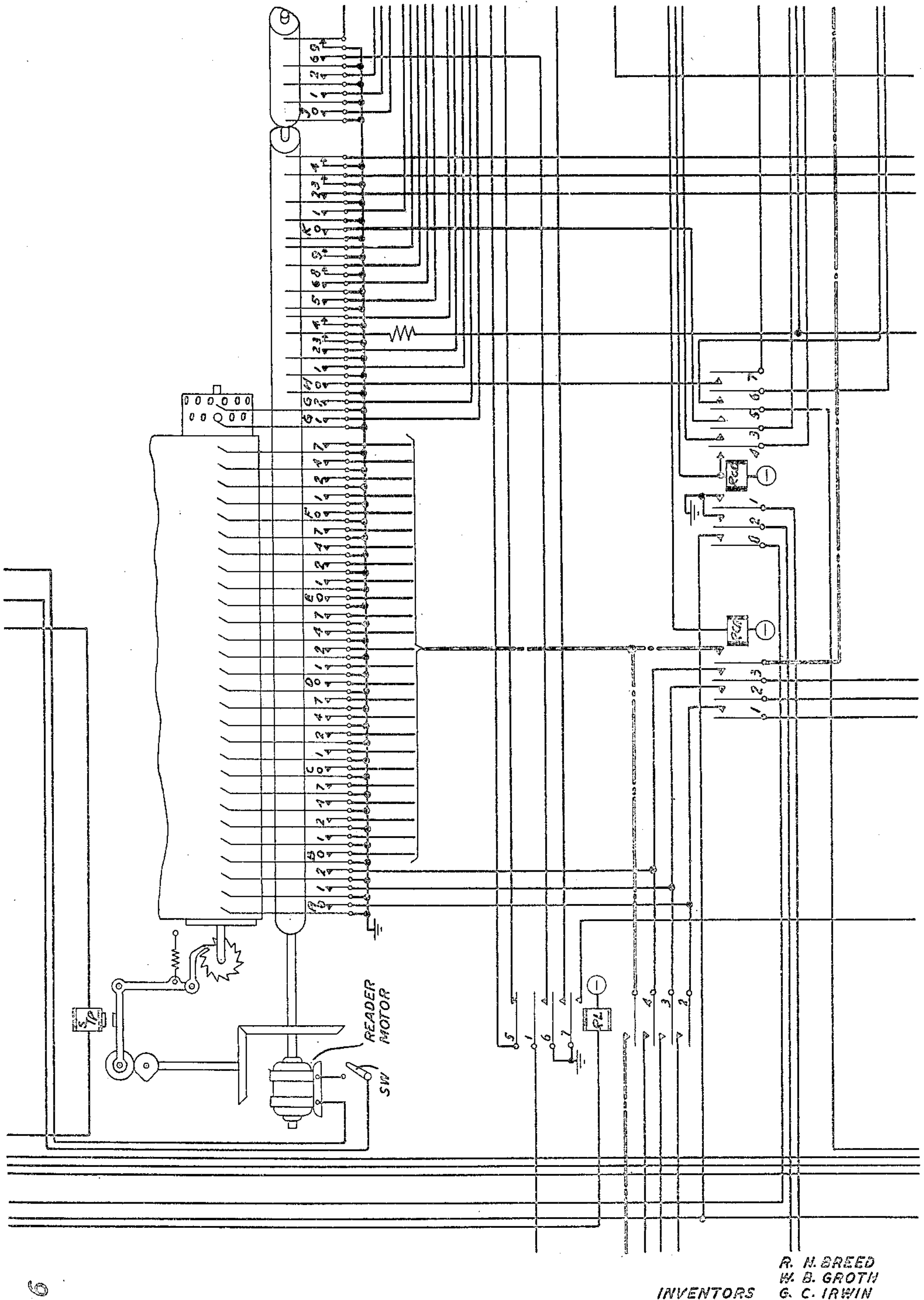
Fig. 6 shows the reader.

*Reader (Fig. 6).*—The reader Fig. 6 may be powered, for instance, by directly geared 1/20 horse-power split phase induction motor.

The AMA tape is inserted in a tape guide, not shown, on the upper front of the unit with the embossed side of the perforations facing down and the A digit to the right. The embossed portion of the perforations are meshed with an exposed portion of the drum and insures proper tracking before the tape is advanced to the reading position. The tape is fed around the drum continuing out the bottom of the reader. The fitting of the embossed portion of the perforations in the tape into the holes in the drum holds the tape in alignment and provides traction so that when the drum is rotated the tape is advanced through the reader.

A mechanical stepping mechanism is used to advance the tape in the reader. Drum advance takes place through the square motion action of a step rack in association with the step gear attached to the drum. The drum advance is controlled by a step magnet which permits advance when operated and prevents advance when released. In order to prevent the reader shaft from being turned back, a ratchet has been incorporated in the flywheel assembly. This ratchet is of the centrifugal throw-out type so that it is operative only at low shaft speeds. It limits the amount of back rotation to something less than two degrees.

There are thirty-six lines of holes on the drum so that each step of advance is ten degrees. At one end of the drum, clear of the tape, two additional holes are provided on alternate lines of holes. Two sensing pins, designated G1 and G2 are arranged to register with these holes and have the same in and out motion as the reading pins. These pins are arranged in a staggered setting so that in one position of the drum the G1 pin will enter a hole and close its contact while the G2 pin will not enter, and on the next position of the drum the G2 pin will enter a hole and close its contact while the G1 pin will not enter. The G1 and G2 contacts are used in the reader step check circuit and described in a following paragraph.

The control contacts are actuated by motor-driven cams and close and open independently of the tape pattern. All of the reading contacts and the G, P, H and K contacts, except H3, H4, H8, H9, K3 and K4 contacts make and break in synchronism, the make period being approximately twice the break period. These contacts are called make contacts. The H3, H4, H8, H9, K3 and K4 contacts are closed when the reading contacts are open and open when the reading contacts are closed. They are called break contacts. The J contacts, except J9, make and break about nine milliseconds after the reading contacts. They are called late make contacts. The J9 contact is closed when the J0 contact is open and open when the J0 contact is closed. It is called a late break contact.

Figure 4:
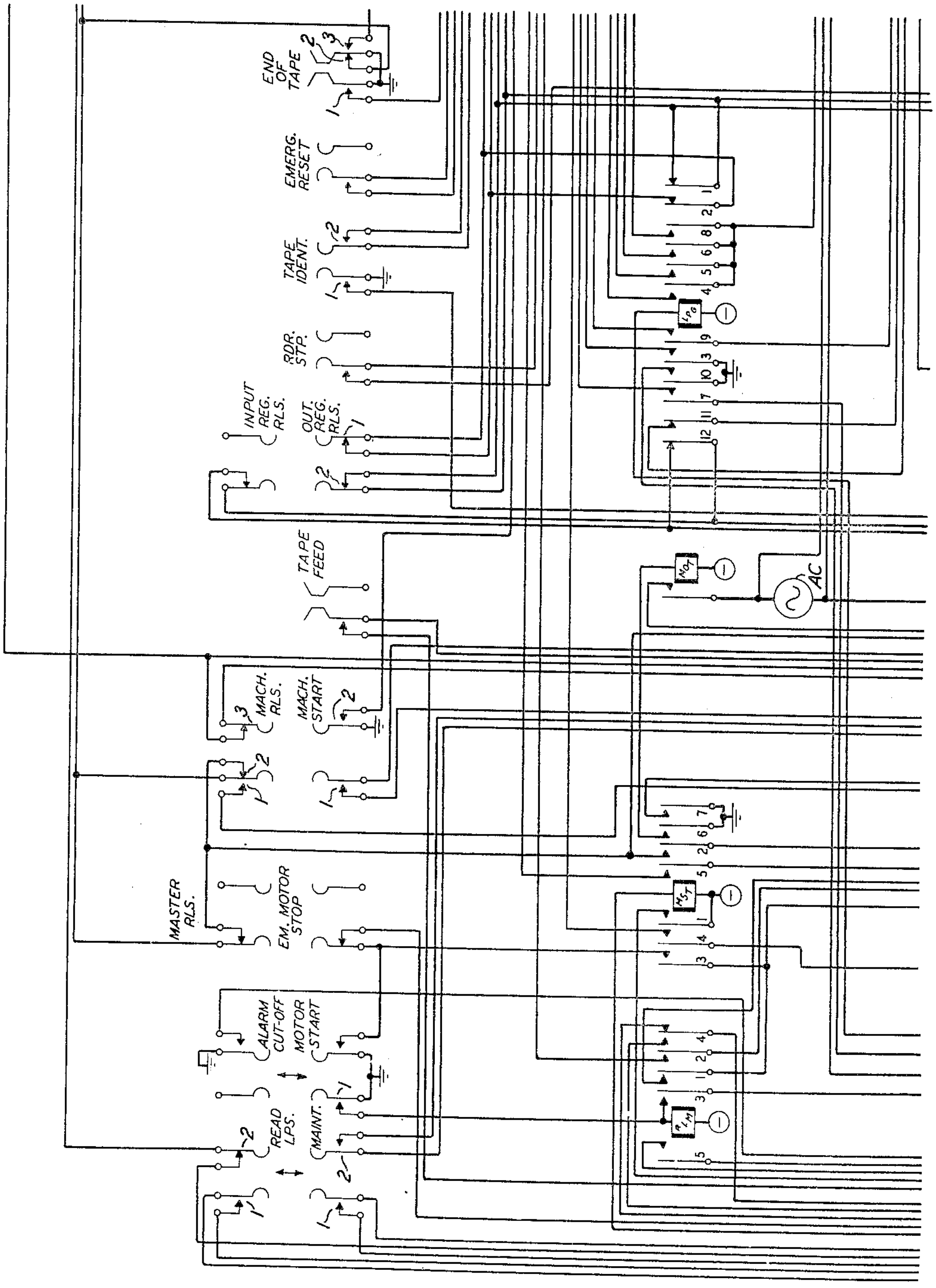
Figs. 4 and 5 show the starting and stopping and other control keys and relays.

A non-locking key, Tape Feed, is shown in Fig. 4. With the motor running the operation of the Tape Feed key operates the step magnet thus permitting the reader drum to rotate. This key is used when feeding a tape into the reader.

*Set-up switches and key operations.—Setting of set-up switches.*—Before processing is started the set-up switches shown in Figs. 4 and 13 are set manually in accordance with the information accompanying the tape being processed.

The following information is set up on these switches:

1. Tape type.
2. Marker group.
3. Central office.
4. First and last thousands.
5. Month.
6. Round or last day.

*Motor start key operation (Fig. 4).*—When tape processing is begun, the Reader Motor Fig. 6 is started by the operation of the Motor Start key. The Motor Start key operated closes ground through its contact 1 and the winding of relay RLM to battery, to operate relay RLM and at the same time closes ground through the emergency motor stop, EM Motor Stop, key normal, contact 1 of relay AL released in Fig. 1, and the winding of relay MST to battery to operate relay MST in Fig. 4. The operation of relay MST closes battery through its contact 1 to the step magnet STP in Fig. 6 and closes ground through its contact 6 and the winding of relay MOT to battery to operate relay MOT. Operation of relay MOT supplies alternating current from source AC in Fig. 4 through switch SW in Fig. 6 to the Reader Motor. Operation of relay MST also closes ground through its contact 2 from contact 2 of key End of Tape normal in Fig. 4 or contact 1 of relay EOT released in Fig. 23 and Master Release key normal or Machine Release key contact 2, both keys in Fig. 4, to operate relay MON, in Fig. 5, which locks through its contact 7 to operating ground around contact 2 of relay MST. Relay MON contact 1 provides locking ground for relay RLM through contact 3 of relay RLM, contact 1 of relay TCM, Fig. 5, and Machine Release key contact 3. Relay MON also provides a locking path for relay MST. The path may be traced from battery through the winding of relay MST, contact 1 of relay AL, contact of EM Motor Stop key, contact 3 of relay MST, contact 1 of relay RLM and contact 2 of relay MON to ground.

Figure 32:
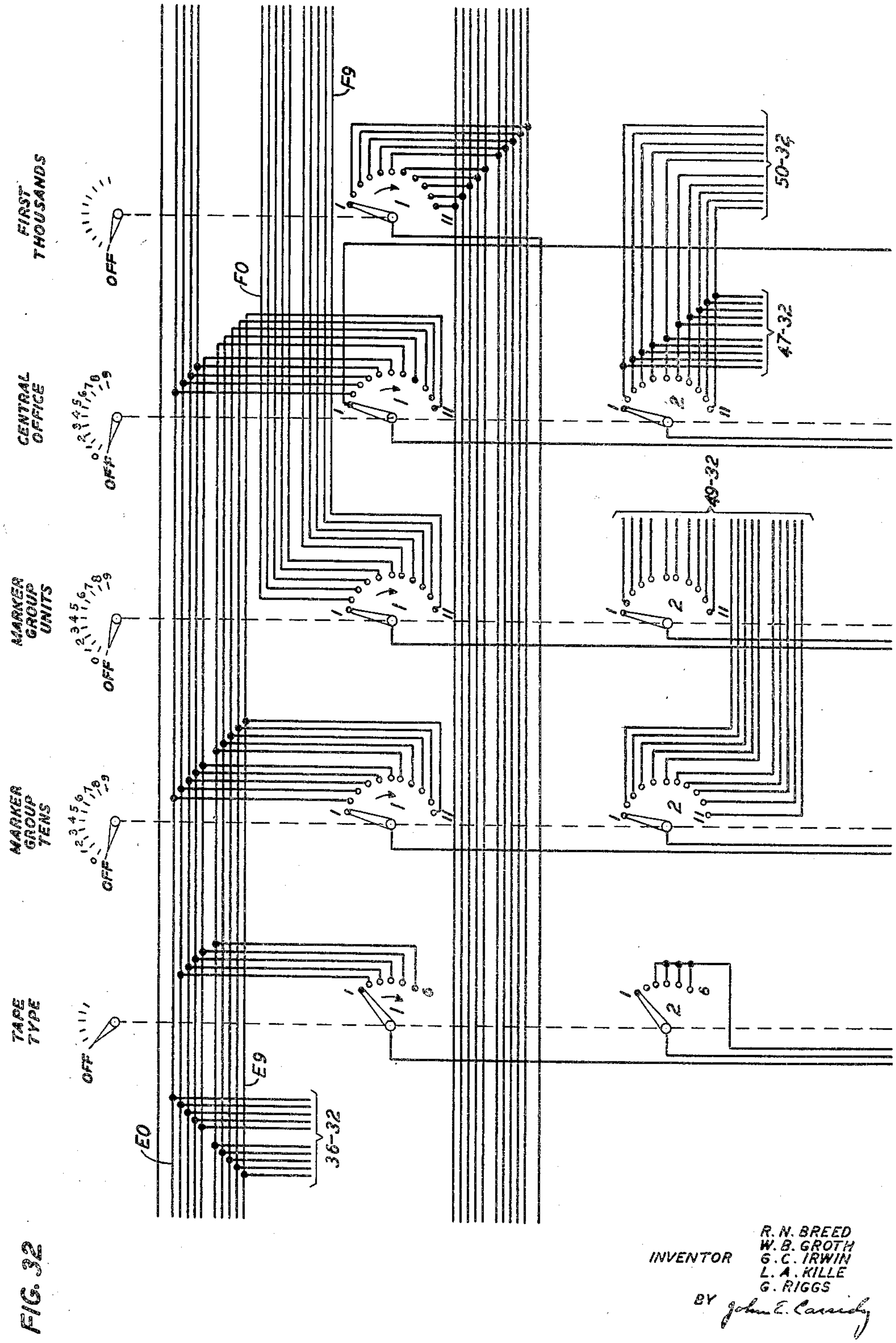
Figure 33:
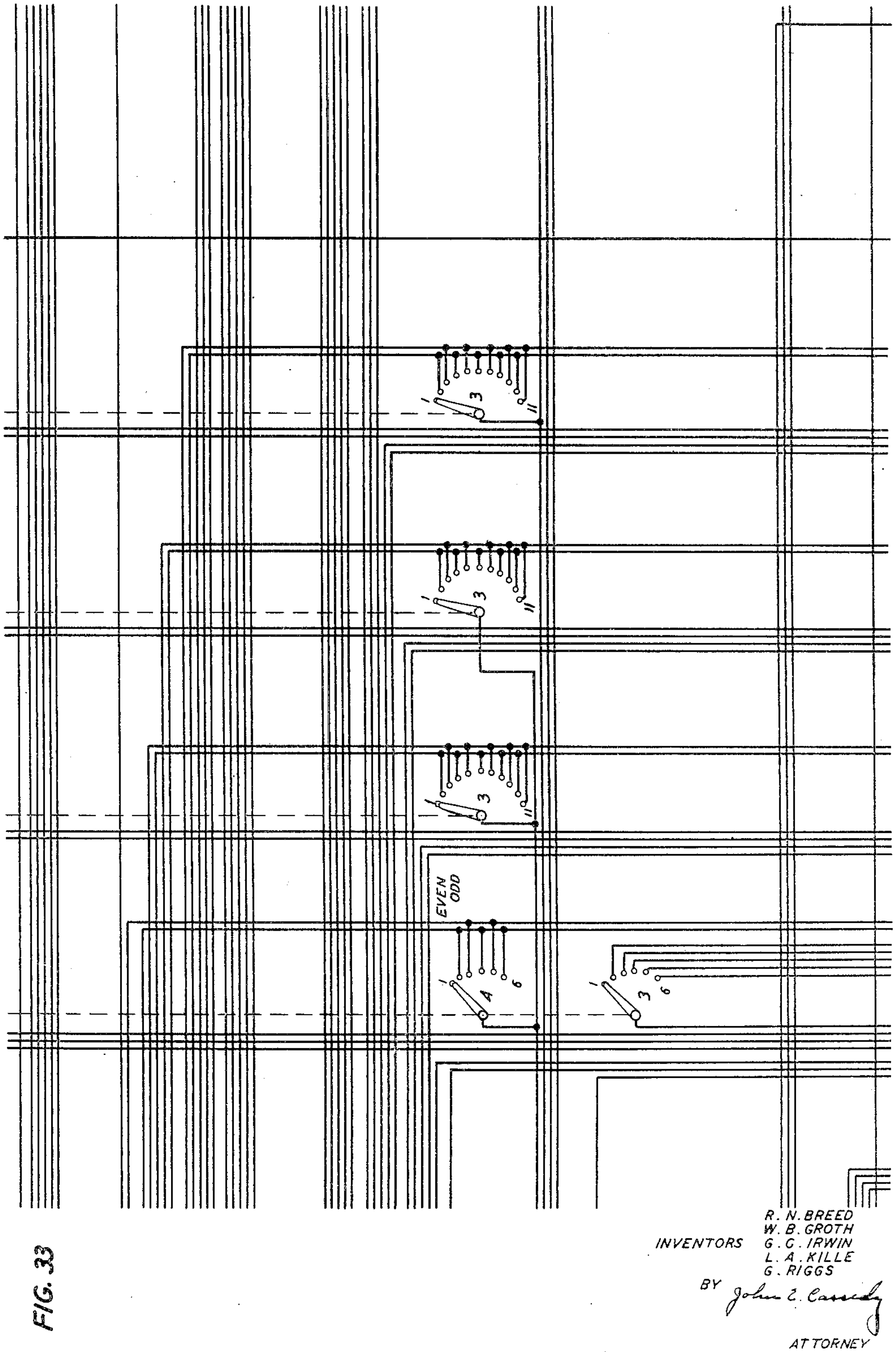
Figure 42:
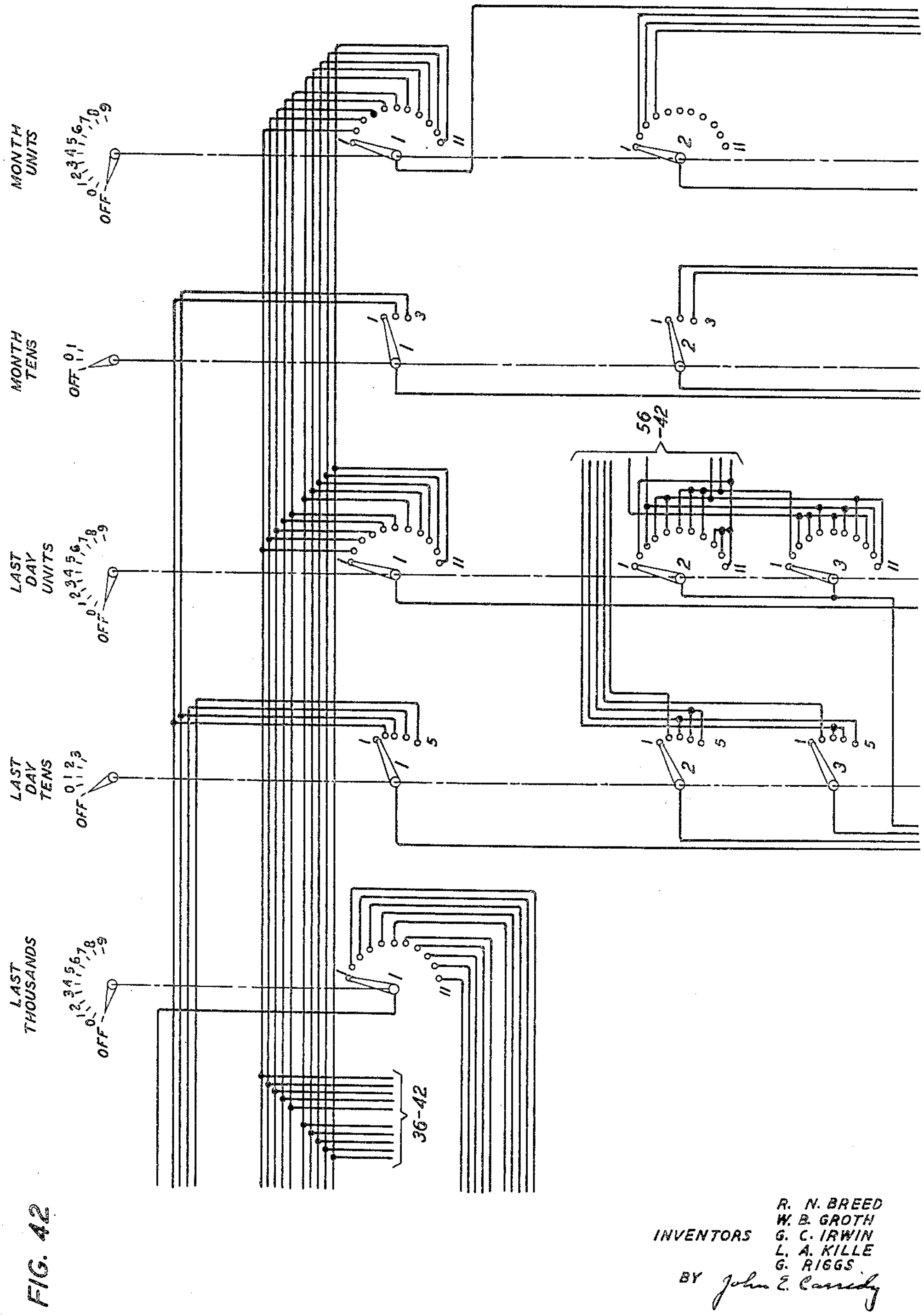
Figure 43:
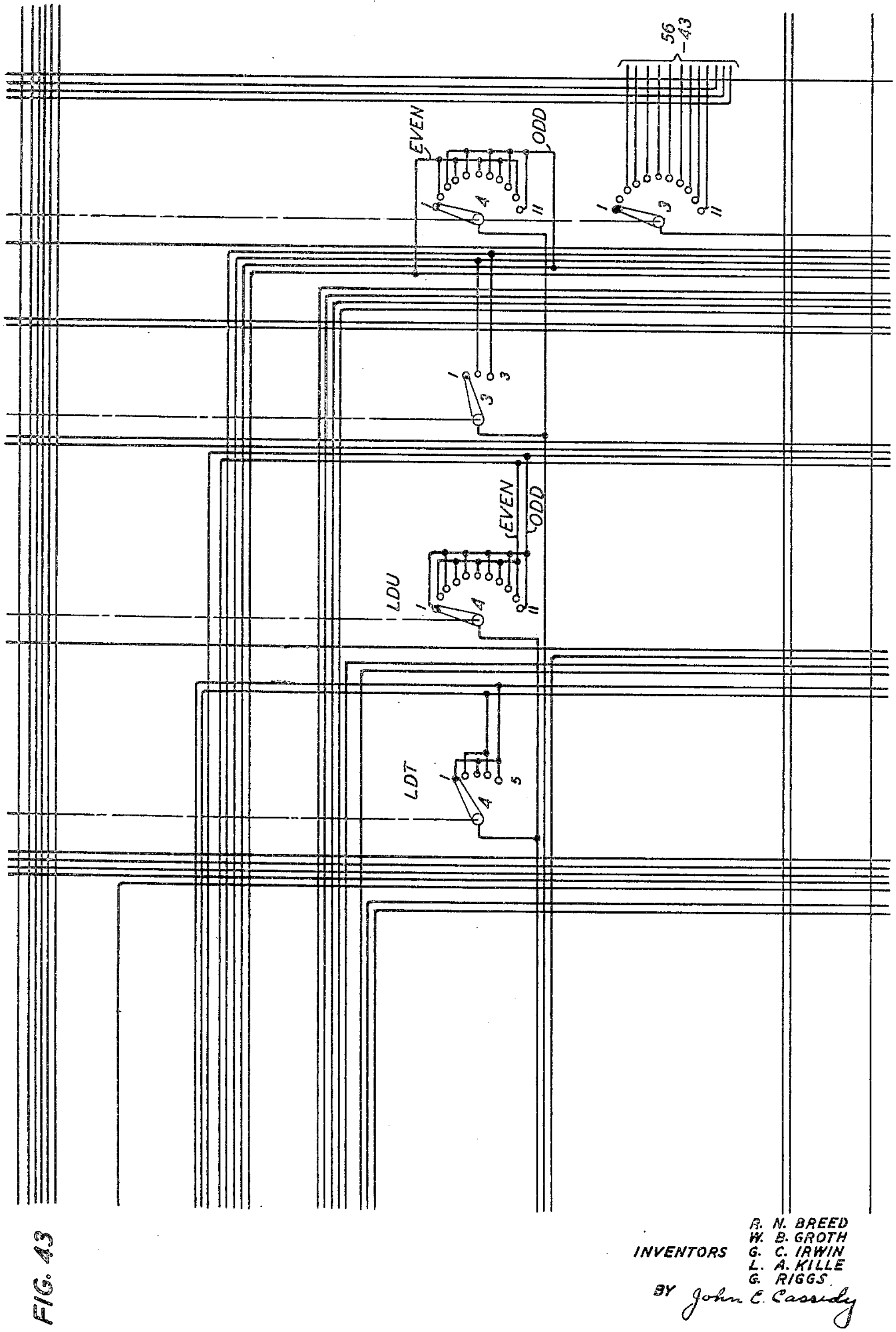

*Machine start key operation (Fig. 4).*—After the input tape is inserted into the reader, and the set-up switches Figs. 32 and 42 set, the tape is ready for processing. The Machine Start key Fig. 4 is then operated. Input register down-check relay NDC and output register down-check relay RDC are both operated at this time over paths to be traced hereinafter. When the H break contact 4 in Fig. 6 closes, a ground is closed through contact 4 of relay MST operated in Fig. 4, contact 1 of relay NDC operated in Fig. 7, contact 1 of relay RDC operated in Fig. 24, contact 1 of Machine Start key operated in Fig. 4, break contact 1 of relay ST2 released in Fig. 5, contact 2 of relay RLS released in Fig. 5 and contact 5 of relay RLM operated in Fig. 4 through the winding of relay ST1 in Fig. 5 to battery to operate relay ST1. The requirement that relays NDC and RDC be operated prevents ever operating the start circuit if any relay is operated in the input or output register. The registers must be normal to be able to start with one exception as described in a following paragraph. Operation of relay ST1 operates relays RCA and RCD in Fig. 6. The path for relay RCA extends from ground through contact 1 of relay ST1 and the winding of relay RCA to battery. The path for relay RCD extends from ground on contact 1 of relay ST1 through contact 5 of relay MST and the winding of relay RCD to battery. When H break contact 4 opens, relay ST2 operates in series with relay ST1 from ground through contact 4 of relay ST1 operated through relay ST2 winding, contact 2 of relay RLS released, contact 5 of relay RLM operated and relay ST1 winding to battery. When H break contact 4 recloses, a ground is closed through contact 4 of relay MST operated, contact 1 of relay NDC operated in Fig. 7, contact 1 of relay RDC operated in Fig. 24, contact 3 of relay ST1 operated, make contact 1 of relay ST2 operated and the winding of relay ST3 to battery to operate relay ST3 which locks through its contact 5 and contact 3 of relay RLS to ground through contact 3 of relay MON. The release of the start circuit releases relay ST1 and the operation of the Reader Lamps key operates relay RL and LPG in a manner to be described hereinafter.

*Reader step key operation* (*Fig. 4*).—Operation of the Reader Step key, Fig. 4, steps the tape to the next line and is effective only when the start circuit is released and the Reader Lamps key is operated.

When the Reader Step key, Fig. 4, is operated and H break contact 8 closes, a ground is closed from H break contact 8, through contact 6 of relay ST1 released, Reader Step key operated, contact 2 of relay SSR released and the winding of relay SS to operate relay SS. On the following make period of the reader relay SS locks through contact 4 of relay MON operated to H make contact 5. At the same time, a ground is closed from H make contact 2 closed through contact 3 of relay SS operated and the winding of relay SSR to battery to operate relay SSR which locks through its contact 7 to Reader Step key operated and contact 1 of relay SSR operated to ground. The operation of relay SSR closes ground from contact 6 of relay RL operated through contact 8 of relay LPG, contact 4 of relay SS, contact 4 of relay SSR operated and the winding of relay RS to operate relay RS which locks to H break contact 3. Relay RS operates the step magnet STP of the reader over a circuit from ground through contact 1 of relay RS, contact 1 of relay RSF, winding of magnet STP and contact 1 of relay MST to battery, which steps the tape to the next line. When H make contact 5 opens, relay SS releases. Relay SSR remains operated until the Reader Step key is released. In this way the tape is stepped one step each time the Reader Step key is operated.

*Tape identity key operation* (*Fig. 4*).—If a line of tape identity is mutilated, the progress of the circuit stops and a timed alarm is brought in. The Reader Lamp key should be operated and Reader lamps read and logged. The reader should then be stepped line by line past all of the tape identity entries by means of the Reader Step key. This is accomplished by operating the Machine Release key and then the Motor Start key to start the motor; the Reader Step key is then operated once for each step and the Reader lamps should be read and logged on each line. This stepping should continue until the tape identity entries are all passed over and the line being read is the first line following the tape identity entries.

In case the TH selector, Fig. 22, is normal and in the case of summary tapes, the tape section reset key Tape Sect. Reset, Fig. 13, should be stepped until the Tape Section lamp agrees with the setting of the First thousand switch. For all other type tapes, if the TH selector is normal, the Tape Section Reset key should be operated once to step the TH selector off-normal.

Operation of the Tape Ident. key closes a ground from contact 3 of relay MLK operated through the contacts of key Tape Ident. and the winding of relay MT1 to operate relay MT1. Relay MLK had previously operated when the TH selector was stepped off-normal from ground through the off-normal contacts ON in Fig. 22. Operation of relay MT1 closes a ground through its contact 3 and the winding of relay ER to operate relay ER, which in turn closes leads which will operate either relay ETT or relay OTT, relay EGT or relay OGT, relay EGU or relay OGU, relay ECO or relay OCO, all in Fig. 34, relay EDT or relay ODT, relay EDU or relay ODU, relay EMT or relay OMT and relay EMU or relay OMU, all in Fig. 44, depending upon the setting of the Set-up Switches. Operation of relay ER also closes ground through its contact 17 and the winding of relay TIE to operate relay TIE, Fig. 45, which locks from ground through its contact 6, contact 21 of relay MON, contact 3 of relay SP6 normal to ground on contact 10 of relay L1 normal. In the case of summary tapes where the TH selector has not been stepped due to reading the next higher tape identity, operation of relay MT1 closes a ground from contact 3 of relay SA, Fig. 47 operated, contact 8 of relay SSE operated, Fig. 14, contact 2 of relay MT1 operated to energize the ROT magnet of the TH selector. This steps the TH selector to the next higher position. The release of Tape Ident. key releases relay MT1 and relay SSE if operated. The release of relay SSE de-energizes the ROT magnet.

*End of tape key operation* (*Fig. 12*).—When the tape runs out of the reader following skipping of the last splice pattern, a timed alarm is brought in. While skipping the last splice pattern ground is closed from contact 6 of relay DA operated or from contact 2 of relay LTH, Fig. 22, contact 2 of relay SA operated, Fig. 47, through contact 2 of relay SKP operated, Fig. 14, contact 9 of relay SSE operated, Fig. 14, contact 3 of relay CS normal Fig. 23, and the winding of relay EOT to battery to operate relay EOT, Fig. 23, which locks through its contact 2 and contact 6 of relay MLK to ground. The End of Tape key is operated which closes a ground through its contact 1, contact 4 of relay EOT operated and through off-normal contacts 1 of the selector TH to energize magnet RLS of the TH selector. The RLS magnet causes the TH selector to return to normal. When the TH selector is normal relay MLK releases which in turn releases relay CT1 and EOT. In the meantime the operation of the End of Tape key removed locking ground from the winding of relay MON causing it to release. Relay MON releases relay ON1 and removes off-normal grounds from the entire circuit causing the release of all relays operated or locked to these off-normal grounds. The circuit should be completely normal.

*Release of circuit.—Temporary release of circuit.*—When it is desired to temporarily shut down the machine the Machine Release key is operated but processing continues until the calls being processed are completed. The operation of Machine Release key by opening contact 3 unlocks relay RLM which in turn releases relays ST1 and ST2. Nothing occurs until both the input and output registers become normal at the same time.

After punching the call information registered in the output registers the output registers are released. The call information registered in the input registers is then transferred to the output registers. Following this the input registers are released. Normally, relay SR1 is reoperated at this time. However, this is prevented by the release of relay RLM and the opening of its contact 4. When the call information in the output register is punched, the output register is released. The release of the output register operates relay RDC in a manner to be explained hereinafter. A ground is closed from K4 break contact of the reader through contact 3 of relay TC normal, contact 4 of relay NDC operated, break contact 4 of relay RLM normal, contact 3 of relay SR1 normal, contact 6 of relay RDC operated, contact 3 of relay T1 normal, contact 2 of relay SSE normal, contact 4 of relay SWE normal, contact 14 of relay ST3 operated and the winding of relay RLS to operate relay RLS. The operation of relay RLS by opening the contact 3 releases relay ST3 which in turn releases relay MST. The release of relay ST4 also releases relay RLS. The release of relay MST stops the reader motor.

*Release of alarm and start relays.*—Following an alarm the operation of the machine release key Mach. RLS closes a ground from contact 1 of relay EOT or End of Tape key normal, contact 1 of Mach. RLS key operated, contact 4 of relay AL operated and the winding of relay RLS to battery to operate relay RLS which locks through contact 4 of relay AL operated and contact 1 of relay RLS to ground. The operation of relay RLS releases relays ST1, ST2 and ST3. Relay ST3 released, by opening its contact 7, in turn releases relay RSH if the alarm is a reader step hold alarm or releases relay SAL if the alarm is a short alarm or releases relay RSF if the alarm is a reader step failure alarm. The release of relay RSH, relay SAL or relay RSF releases relay AL. The release of AL releases RLS.

If the alarm was due to a fuse alarm relay AL will release when the blown fuse is removed.

*Emergency stop.*—If it is necessary to stop the reader motor in an emergency, the emergency motor stop key EM Motor Stop is operated; this operation releases relay MST which in turn by opening its contact 6 opens the circuit to the motor relay MOT and removes battery supply of the Step magnet.

*Emerg. Reset key operation.*—If the power supply is removed while a tape is being processed, all relays would release. When the power supply is restored relay MLK will reoperate if the TH selector is off-normal. However, certain relays which were locked to relays MLK or MON will not reoperate automatically. Therefore, in order to reoperate these relays the Motor Start and Emerg. Reset keys are operated. The Emerg. Reset key closes ground from contact 2 of relay MLK operated through the winding of relay ER to battery to operate relay ER. A ground is closed from contact 17 of relay ER operated through the winding of relay TIE to battery to operate relay TIE, Fig. 45, which locks through contact 21 of relay MON operated, contact 1 of relay SP6 and contact 10 of relay L1 normal to ground. The operation of relay TIE closes ground from contact 7 of relay MLK through contact 2 of relay TIE to operate relay CT1, Fig. 23, which locks to contact 7 of relay MLK operated. Operation of relay ER closes paths to operate either relay ETT or OTT, relay EGT or OGT, relay EGU or OGU, relay ECO or OCO, relay EDT or ODT, relay EDU or ODU, relay EMT or OMT and relay EMU or OMU depending on the setting of the set-up switches. If relay MLK was not operated at the time the Emerg. Reset key was operated nothing would happen.

*Release of entire circuit by operation of the machine release key Mach. RLS and master release key Master RLS*

The operation of the machine release key Mach. RLS and master release key Master RLS removes locking ground from relay MON which causes relay MON to release. At the same time operation of Mach. RLS key by opening its contact 3 releases relay RLM which in turn releases relays ST1 and ST2. The release of relay MON releases relays MST, ST3 and MON. The release of relay MST releases relay MOT which stops the reader motor. The release of relay ST3 releases relays RCA and RCD. Any relay operated or locked to MON, or ST3 operated are released. However relay MLK is held operated by selector TH off-normal springs. Relay MLK locks relay CT1 operated.

To restore selector TH, the tape section release key Tape Sect. RLS should be operated, with the reader lamp key Read LPS operated. Ground is closed from contact 6 of relay RL operated through contact 4 of relay LPG operated, Tape Sect. RLS key operated and off-normal contact 1 of selector TH and through the winding of magnet RLS to battery, to operate magnet RLS which restores selector TH to normal. This circuit is effective only when the circuit is stopped or during an alarm condition.

*Alarm cut-off.*—When an alarm occurs relay AL is operated. By the operation of the Alarm Cut-Off key ground is supplied through the winding of relay EAC to battery and relay EAC operates, Fig. 1, and locks to relay AL operated contact 9. The operation of relay EAC by opening break contact 1 removes ground from lead R, Fig. 1, to the external alarm circuit and by opening contact 2 extinguishes the Machine Pilot lamp.

*Supplementary circuit operations.—Reading and Skipping splice pattern.*—When an 081010 line is read, a ground is closed from reader G1 contact closed and break contact 1 of relay RK or reader G2 contact closed and make contact 2 of relay RK operated, through contact 9 of relay ST3 operated, contact 8 of relay RCD operated, through two-out-of-five check of the B, C, D, E and F digit reading relays, contact 3 of relay A0 operated, contact 3 break of relay A1 and contact 4 break of relay A2, contact 3 of relay B1, contact 3 of relay B7, contact 5 of relay TIE released in Fig. 45 and the winding of relay SK to battery to operate relay SK in Fig. 14. Relay SK supplies ground through its contact 2 and the winding of relay SKP to operate relay SKP which locks through contact 3 of relay CT1 released in Fig. 23, contact 1 of relay L1 released in Fig. 35 and contact 6 of relay ST3 operated to ground. The operation of relay SKP closes a ground from reader H6 make contact through contact 2 of relay ESP released, contact 6 of relay SKP operated, contact 3 of relay RCD operated and the winding of relay RS to battery to operate relay RS in Fig. 15. Relay RS locks to reader H3 break contact and by closing its contact 1 operates the step magnet STP of the reader which allows the tape to be stepped to the next line.

When J9 late break contact closes, ground is closed through contact 8 of relay SKP operated and the winding of relay ESP to battery to operate relay ESP. When reader J9 late break contact opens, relay ESP releases closing ground from reader H6 make contact through contact 2 of relay ESP released, contact 6 make of relay SKP operated, contact 3 of relay RCD operated and the winding of relay RS to operate relay RS which locks to reader H3 break contact. Relay RS by closing its contact 1 operates the step magnet STP of the reader which steps the tape to the next line.

The same operation as described in the previous paragraph occurs for each line of splice pattern. The first line to be read following the last line of splice pattern is 2891XX, which is the first line of tape identity. XX represents tape index. Operation of relay A2 over a path from ground through reader contact AL, contact 3 of relay RC and the winding of relay A2 to battery, Fig. 16, or the operation of relay F1 or F2, Fig. 36, over corresponding paths closes ground through make contact 8 of relay SKP operated to hold relay ESP operated after opening of reader J9 late break contact. At the same time relay L1 operates in Fig. 35 which by opening its contact 1 releases relay SKP, Fig. 14, in turn, by opening its contact 8, releasing relay ESP. The holding of relay ESP operated prevents stepping should relay L1 fail to operate, thus failing to unlock relay SKP.

*Skip splice entry and splice pattern.*—After stepping from the last line of trailing tape identity, the next line read is the skip splice entry, 2860XX. The XX represents the machine number of the machine that perforated the tape. A ground is closed from the G1 contact closed of the reader and contact 1 of relay RK released, Fig. 15, or G2 reader contact closed and make contact 2 of relay RK operated, through contact 9 of relay ST3 operated, contact 8 of relay RCD operated, through two-out-of-five check of the B, C, D, E and F digit reading relays, break contact 3 of relay A0 and break contact 2 of relay A1 released, contact 2 of relay A2, contact 2 of relay B7, contact 2 of relay B1, contact 2 of relay C4, contact 2 of relay C2, contact 8 of relay RDC operated, contact 1 of relay SWE released and the winding of relay SP6 to battery to operate relay SP6. The operation of relay SP6 by opening its contact 1 releases relay TIE and by closing its contact 2 operates relay SSE which locks through contact 7 of relay TIE released and either contact 7 of relay DA operated to ground or contact 3 of relay TMM released and contact 6 of relay SA operated to ground. The operation of relay SSE closes ground from contact 1 of relay A2, contact 2 of relay E2, contact 2 of relay E4, contact 2 of relay E7, contact 3 of relay F0, contact 3 of relay F1 or contact 3 of relay F2 operated, contact 3 of relay SP6 operated, contact 7 of relay SSE operated, contact 6 of relay SKP released, contact 3 of relay RCD operated and through the winding of relay RS to operate relay RS in Fig. 15. Relay RS locks to reader H3 break contact and operates the step magnet of the reader which steps the tape to the next line.

The line following the skip splice entry is an 081010 line. The reading of 081010 causes skipping of splice pattern as described under Reading and Skipping Splice Pattern hereinafter except that relay SKP locks through contact 1 of relay SSE operated, contact 1 of relay L1 released and contact 6 of relay ST3 operated to ground.

When the splice pattern is the last splice pattern of the tape, the line following the last 081010 will not be 2891XX in which case relay L1 does not operate and relay SKP does not release. However, the operation of contact 1 of relay A1, contact 1 of relay A2, contact 2 of relay B0, contact 2 of relay B2, contact 3 of relay B4, contact 2 of relay E2, contact 2 of relay E4, contact 2 of relay E7, contact 3 of relay F0, contact 3 of relay F1 or contact 3 of relay F2 closes ground through contact 8 of relay SKP operated and the winding of relay ESP to battery to hold relay ESP operated and prevents further stepping of the tape. The short alarm then operates and causes the reader motor to stop.

*Window splice.*—A window splice consists of a window entry, 287020, followed by forty or more lines of splice pattern, followed by another window entry. When the first 287020 line is read, a ground is closed from reader G1 contact closed and break contact of relay RK released or reader G2 contact closed and make contact 2 of relay RK operated, through contact 9 of relay ST3 operated, contact 8 of relay RCD operated, two-out-of-five check of B, C, D, E and F digit reading relays, through contact 3 of relay A0 and contact 2 of relay A1 both released, contact 2 of relay A2 operated, contact 2 of relay B7, contact 2 of relay B1, contact 2 of relay C7, contact 2 of relay C0 and contact 4 of relay TIE operated, contact 5 of relay SSE released and the winding of relay SP7 to battery to operate relay SP7. The operation of relay SP7 closes ground from contact 4 of relay ESP released, contact 13 of relay ST3 operated, contact 1 of relay SP7 operated and the winding of relay SWE to battery to operate relay SWE which locks through contact 13 of relay ST3 operated and contact 4 of relay ESP released to ground. Ground is closed from contact 1 of relay A2 or contact 2 of relay E2 operated, contact 3 of relay SP7 operated, contact 6 of relay SWE operated, break contact 6 of relay SKP released and contact 3 of relay RCD operated and the winding of relay RS to battery to operate relay RS which locks to H3 break contact. Relay RS operates the step magnet of the reader which steps the tape to the next line.

The line following the window entry is an 081010 line. The reading of 081010 causes skipping of splice pattern as described in paragraph on Reading and Skipping Splice Pattern in the foregoing except that the operating path of relay SK, Fig. 14, is carried through contact 2 of relay SWE operated instead of relay TIE released and relay SKP locks through contact 5 of relay SWE operated and contact 2 of relay SP7 released. Relay SWE also locks through contact 13 of relay ST3 operated and contact 9 of relay SKP operated to ground.

The line following the last 081010 line is another 287020 window entry. When 287020 line is read, relay SP7 operates as described above. The operation of SP7 at its make contact 2 locks relay ESP and, at its break contact 2 opens the path through relay SKP winding which in turn by opening its contact 9 releases relay SWE. A ground is closed from contact 1 of relay A2 or contact 2 of relay E2 operated, contact 3 of relay SP7 operated, contact 1 of relay ESP operated, break contact 6 of relay SKP released, contact 3 of relay RCD operated and the winding of relay RS to battery to operate relay RS which locks to reader H3 break contact. When contact G1 or G2 opens, relay SP7 releases in turn releasing relay ESP. The operation of relay RS operates the step magnet STP of the reader which steps the tape to the next line.

*Set-up check.*—As each line of leading tape identity is read and checked the proper set-up check relay is operated. Operation of relay CL1, Fig. 35, operates either relay OTT or relay ETT, both in Fig. 34. Operation of relay CL2 operates either relay OGT and relay EGT and either relay OGU or relay EGU. Operation of relay CL5 operates either relay OCO or relay ECO. Operation of relay CL7 operates either relay EDT or relay ODT and either relay EDU or relay ODU. Operation of relay CL9 operates either relay OMT or relay FMT and either relay OMU or relay EMU. The operation of the proper relays is dependent on the setting of the set-up switches in an even or an odd position. As an example, if the tape being processed is for Office 4, the office switch is set in an even position and upon operation of relay CL5, relay ECO operates over a path from battery through the winding of relay ECO, contact 4 of relay CL5, even position of central office switch 3 and contact 18 of relay MON to ground. The set-up check relays lock through their respective switches to relay MON operated.

If the set-up switches are changed from the original setting, the operated set-up check relay associated with the changed set-up switch releases and a ground is supplied from contact 10 of relay RUC normal, contact 2 of relay CL9 normal through contact 8 of relay TIE operated, and contacts of some pair of the E-- and O-- relay in series such as the 1 contact of relay ETT and the 1 contact of relay OTT, both normal, contact 18 of relay ST3 operated and the winding of relay AL to battery to operate relay AL. Operation of relay AL releases relay MST which in turn stops the reader motor. At the same time, set-up check lamps Tape Type, Marker Group Tens, Marker Group Units, Central Office, Last Day Tens, Last Day Units, Month Tens and Month units, Figs. 34 and 35, are lighted to indicate the switches that were changed. A typical circuit may be traced from battery through the filament of lamp Tape Type, contact 4 of relay ETT, contact 4 of relay OTT, contact 9 of relay TIE, contact 2 of relay CL9, and contact 6 of relay RUC to ground, lighting lamp Tape Type. A corresponding circuit may be traced for each of the other lamps.

*Reader step check.*—When the step magnet STP of the reader is operated, the reader drum advances the tape to the next entry. In order to check that the reader drum has advanced, two reader contacts, G1 and G2, are used to indicate the change of position of the drum.

Reader pins associated with reader contacts G1 and G2 are staggered so that they read on alternate drum positions. That is, if the G1 contact is closed for a particular line, contact G2 will close when the drum advances to the next line. In this manner it is possible to check the advance of the reader drum. The leads from the G1 and G2 reader contacts are carried through contacts of relay RK and indicate a check or an alarm, respectively, if the drum has or has not advanced.

At the start of processing it is necessary to synchronize these reader pins with the operation of relay RK. This relay when released checks that the drum has advanced when the G1 contact is closed; and when operated checks that the drum has advance when the G2 contact is closed. If the reverse occurs an alarm relay RSF is operated over a path from battery through the winding of relay RSF, contact 10 of relay ST3, make contact 1 of relay RK or break contact 2 of relay RK to ground through contact G1 or contact G2 respectively, to indicate that the reader drum failed to advance.

If G2 contact is closed when the Machine Start key is operated, it is necessary to operate relay RK so as to synchronize the reader step check circuit with the G1 and G2 reader contacts. Upon operation of the Machine Start key, relay ST1 operates during the break period of the reader cycle. During the following period contact G2 closes ground through contact 5 of relay ST1 operated, contact 8 of relay ST3 released, contacts 1 and 2 of relay RZ2 released and the winding of relay RW to battery to operate relay RW which closes ground from contact 2 of relay ST1 operated, break contact of relay RZ3 released, contact 2 of relay RW operated and the winding of relay RK to operate relay RK. At the end of the make period of the reader cycle, contact G2 opens, allowing relay RZ1 to operate in series with RW from ground through contact 2 of relay ST1 operated, break contact of relay RZ3 released, contact 2 of relay RW operated, winding of relay RZ1, and the winding of relay RW to battery. Relay RZ1 operates relay RZ2 over an obvious path. During the following break period, relay ST3 operates. During the following make period contact G2 recloses, closing ground through make contact 2 of relay RK operated and contact 9 of relay ST3 operated to the lead through the two-out-of-five checking circuit which indicates that the reader step check circuit is synchronized with the G1 and G2 reader contacts.

When either relay RS, Fig. 15, RS1, RS2, RS3, RS4 or RS5 operates, Figs. 8 to 12, respectively, a ground is closed from reader H9 break contact during the following break period of the reader, through contact 20 of relay ST3 operated, contact 3 of the particular RS1 to RS5 relay which is operated, make contact 2 of relay RZ2 operated and the winding of relay RZ3 to operate relay RZ3. Relay RZ3 holds relay RZ2 operated from ground through contact 4 of relay ST3 and the make contact of relay RZ3 and releases, by opening its break contact, relays RK, RW and RZ1. At the end of the break period RZ3 releases in turn releasing relay RZ2. During the break period the reader drum should advance and on the following make period contact G1 closes ground through break contact 1 of relay RK released and contact 9 of relay ST3 operated and contact 8 of relay RCD operated to the check lead which indicates that the reader drum did advance. If during the break period the reader drum did not advance, on the following make period, contact G2 closes ground through contact 2 break of relay RK released and contact 10 of relay ST3 operated and the winding of relay RSF, Fig. 1, to operate relay RSF, which indicates the reader drum did not advance. Operation of relay RSF closes ground from contact 10 of relay RUC released through the winding of relay AL to operate relay AL which by opening its contact 1 releases relay MST. The release of relay MST by opening its contact 6 releases relay MOT which causes the reader motor to stop and processing to stop.

If at the start of processing contact G1 is closed, the reader step check circuit is synchronized with reader contacts G1 and G2. Upon operation of relay ST3 the following closure of contact G1 closes ground through break contact 1 of relay RK released and contact 9 of relay ST3 operated to the check lead which indicates the reader step check circuit is synchronized with the G1 and G2 reader contacts.

*Mutilated skip splice entry.*—When a skip splice entry is mutilated, the progress of the circuit stops and a timed alarm is brought in. After determining by operation of Reader Lamp key and reading of the Reader lamps that the alarms were caused by a mutilated skip splice entry (2860XX), the Machine Release key is operated to release the alarm condition and prepare the circuit for restart. The Motor Start key is operated to start the reader motor. The tape is then stepped to the next line (081010) by operation of the Reader Step key. Following this the End of Tape key is operated. Ground is closed from contact 3 of End of Tape key operated through contact 5 of relay MLK operated, contact 3 of relay EOT normal, contact 1 of relay CS normal, contact 9 of relay LPG and the winding of relay SP6 to operate relay SP6. Operation of relay SP6, Fig. 14, by opening its contact 1 releases relay TIE and by closing its contact 2 operates relay SSE which locks through contact 7 of relay TIE normal and either contact 7 of relay DA operated to ground or contact 3 of relay TMM normal and contact 6 of relay SA operated to ground.

Figure 31:
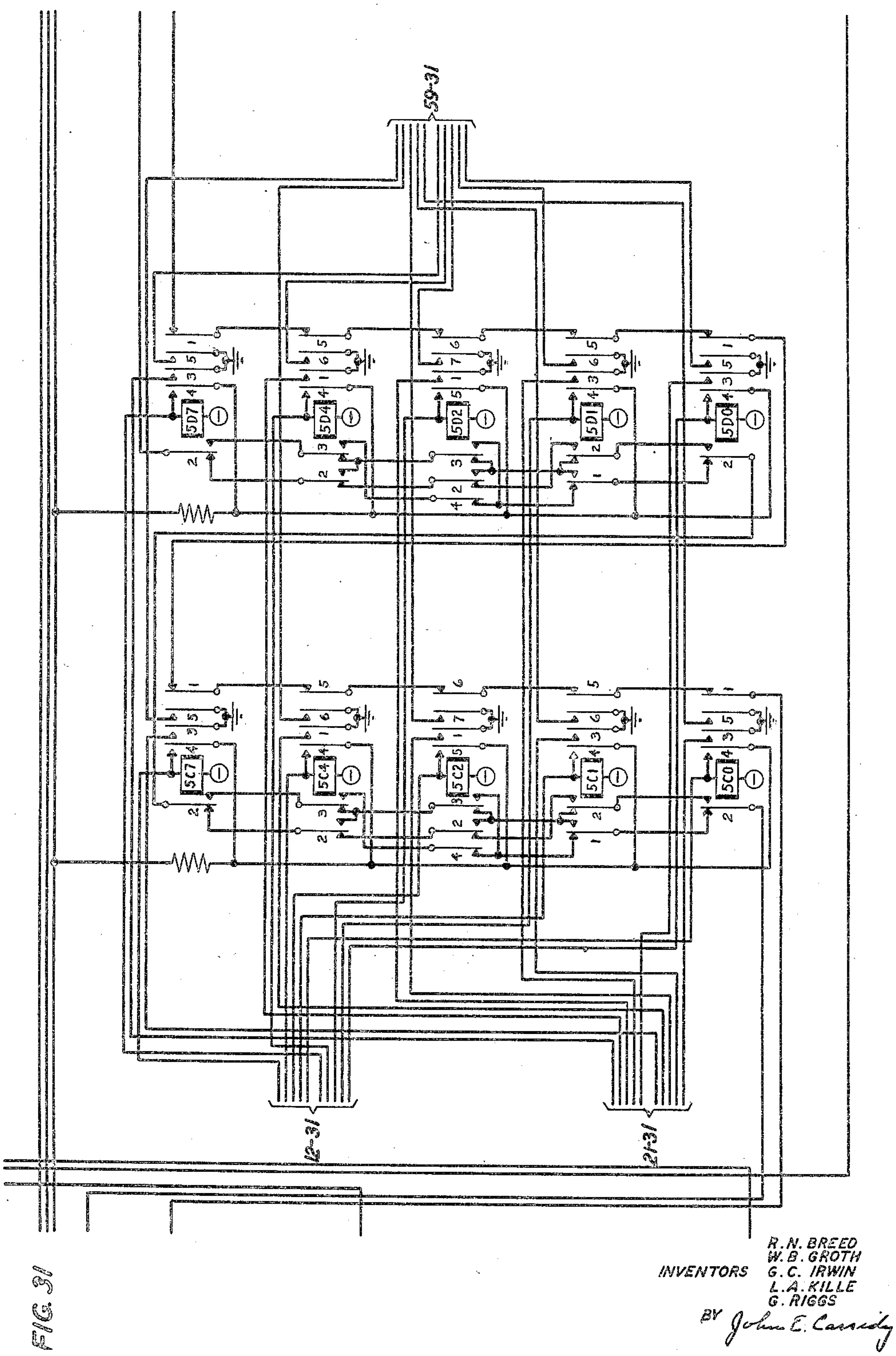

*Alarms (Fig. 31).—General arrangement of alarms.*—An alarm occurs under the following conditions:

1. The reader fails to step or the gang summary punch fails to punch within approximately one second. Short alarm functions.
2. Reader fails to step when signaled to do so.
3. Reader step relay fails to release.
4. Set-up switches are changed after processing has begun.
5. Punch stops.

*Short alarm.*—The short alarm functions if the reader fails to step or the gang summary punch fails to punch within a measured interval of one second.

When the Machine Start key is operated, relay RCD is operated by the operation of relay ST1 as described under the heading Machine Start Key Operation in the foregoing. Relay RCD operates relay SAS from battery through the winding of relay SAS and contact 1 of relay RCD to ground. Relay SAS, by opening its contact 1, removes the shunt across condenser A and connects ground through winding of relay SAE to condenser A. condenser A charges over a path from battery BAT through a fuse, RES1 and RES2. After approximately one second the condenser voltage equals the breakdown voltage of tube SA which fires and operates relay SAE. While skipping splice tube SA fires in approximately .35 second, for resistor RES2, which is approximately twice the magnitude of resistor RES1, in the path through which condenser A charges, has been shunted by contact 7 of relay SKP operated. Operation of relay SAE closes ground through contact 7 of relay TCM released and the winding of relay SAL to operate relay SAL which locks through make contact 7 of relay ST3 operated to ground. Relay SAL operates relay AL which releases relay MST. The release of relay MST releases the motor control relay MOT which disconnects the power supply from the Reader Motor which stops the reader motor. The release of relay MST by opening its contact 5 also releases relay RCD which in turn, by opening its contact 1, releases relay SAS. The release of relay SAS deionizes tube SA and releases relay SAE.

If during the short alarm timing period any one of relays RS1, RS2, RS3, RS4, RS5, RS or RT operates, condenser A is discharged and tube SA does not fire. Any one of relays RS1, RS2, RS3, RS4 or RS5 applies ground through its respective contact 2, contact 2 of relay SAS and resistance RES3 to condenser A. The operation of relay RS shorts condenser A through its contact 5 and contact 8 of relay SKP. The operation of relay RT also shorts condenser A through the contact of relay RT, Fig.

73. Relay RT operated indicates the summary gang punch is punching a card, while the operation of relay RS1, RS2, RS3, RS4, RS5 or RS indicates the reader is stepping.

*Reader step failure.*—When the reader drum fails to advance, as described under Reader Step Check in the foregoing, ground from contact G1 or G2 is extended through contact 1 make or contact 2 break of relay RK. This ground is carried through contact 10 of relay ST3 operated and the winding of relay RSF to operate relay RSF which locks to contact 7 make of relay ST3 operated. Ground is supplied through contact 4 of relay RSF to light RDR Step Fail lamp. Contact 1 of relay RSF opens the path of the step magnet STP and contact 3 relay RCF operated closes ground from contact 10 of relay RUC released to operate relay AL which in turn by opening its contact 5 releases relay MST. The release of relay MST releases the motor control relay which stops the reader motor.

Figure 1:
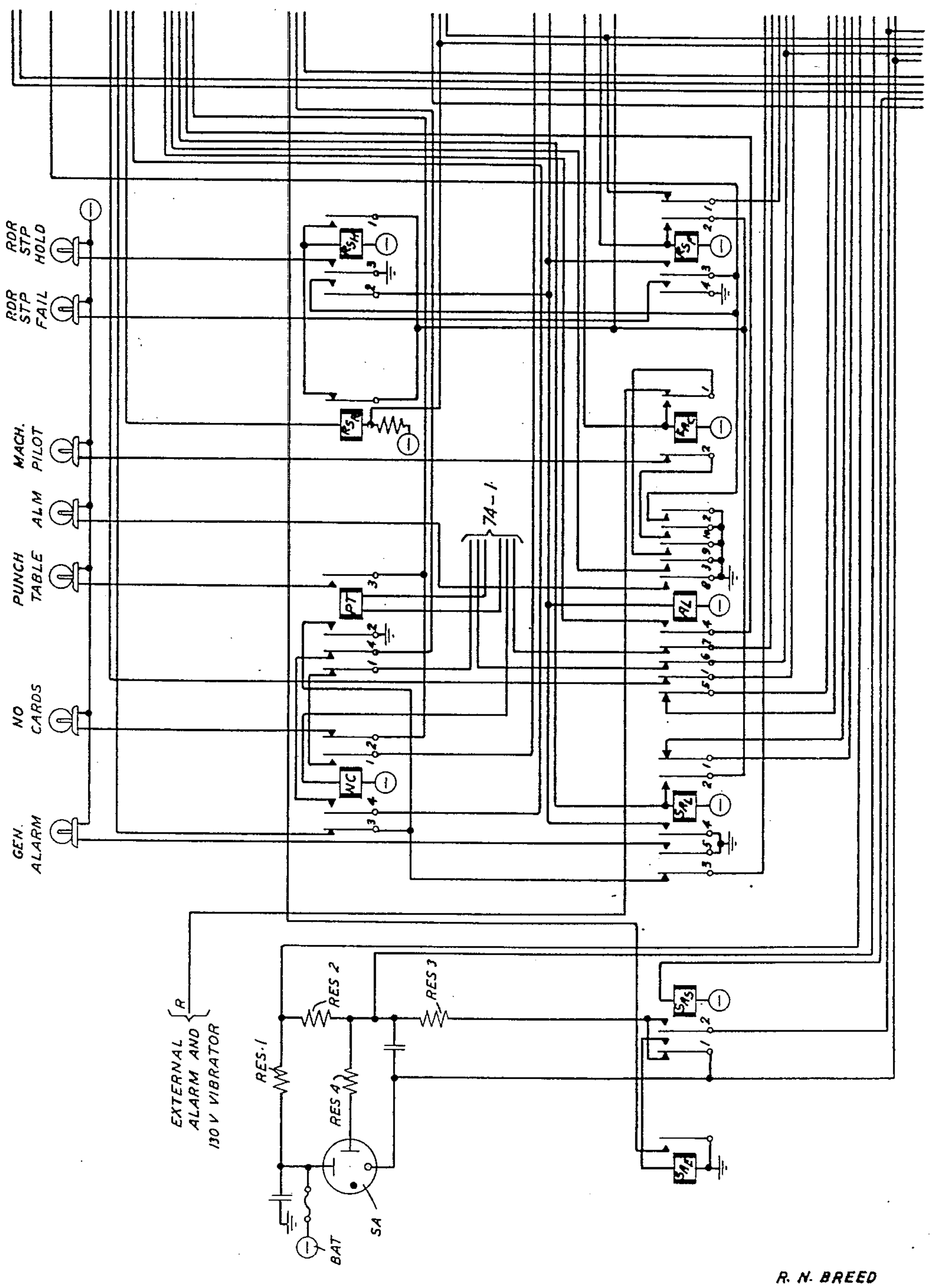
Fig. 1 shows the timing and alarm circuits.

*Reader step relay release failure.*—When any one of relays RS, RS1, RS2, RS3, RS4 or RS5 operates a ground from contact 6 of the particular relay is closed to shunt down relay RSR, Fig. 1, which has been operated from ground on contact 6 of relay MON when relay MON operated. Relay RSR is a slow release relay and takes approximately .25 second to release when thus shunted. If the shunt lead remains grounded over .25 second, relay RSR releases in turn operating relay RSH from ground on contact 7 make of relay ST3 operated and the contact of relay RSR released. Relay RSH locks to ground on contact 7 make of relay ST3 operated. Ground from contact 3 of relay RSH lights RDR Step Hold lamp and ground from break contact 10 of relay RUC released operates relay AL which in turn by opening its contact 11 releases relay MST, through contact 2 of relay RSH operated and the winding of relay AL to battery. The release of relay MST releases the motor control relay which stops the reader motor.

If the shunt lead remains grounded less than .25 second, relay RSR does not release and the alarm is not brought in.

*Punch stoppages.*—There are two general types of punch stoppages. One type is due to the card hoppers becoming empty and the other type is due to double punch, blank column or non-comparison detection.

*No cards.*—When the Motor Start key is operated a ground is closed from contact 7 of relay MST or contact 8 of relay MON operated through contact 10 of the punch Fig. 74 contacts of relays within the punch, to contact 12 of the punch and through the winding of relay NC, Fig. 1, to battery and the winding of relay NC to battery to operate relay NC. Relay NC remains operated until the card hopper becomes empty. The release of relay NC by opening its contact 1 opens up the operating path to the clutch control relay of the punch. By closing its contact 3, relay NC closes ground from contact 13 of relay MON operated through contact 3 of relay SAL normal, contact 6 of relay ST3 operated and the winding of relay TCM to operate relay TCM. The operation of relay TCM releases relay RLM which in turn releases relays ST1 and ST2. Relay TCM also closes ground through its contact 6 and contact 2 of relay NC released to light the No Cards lamp. Tape processing continues until the output and input registers are filled at which time the short alarm timing starts. When relay SAE operates, ground is closed through make contact 7 of relay TCM operated and the winding of relay RLS to operate relay RLS. The operation of relay RLS releases relay ST3 which in turn releases relays RCC, RCD and MST. Relay ST3 released also locks relay TCM operated from ground on break contact 2 of relay ST3 through operated make contact 16 of relay MON operated. The release of relay RCD by opening its contact 1 releases relay SAS which deionizes tube SA and releases relay SAE. The release of relay SAE releases relay RLS. The release of relay MST stops the Reader Motor.

The circuit remains in this condition until cards are placed in the hopper at which time relay NC operates. The operation of relay NC extinguishes the No Cards lamp. While relay TCM is operated the input and output register lamps are prevented from lighting and the input and output register release keys are made ineffective in a manner which will be made clear hereinafter. Following the operation of the Motor Start key, the Mach. Start key is operated. When the reader H4 break contact closes, a ground is closed through contact 4 of relay MST operated, contact 5 of relay TCM operated, contact 1 of Mach. Start key operated, contact 1 of relay ST2 released, contact 2 of relay RLS released, contact 5 of relay RLM operated and the winding of relay ST1 to battery to operate relay ST1. When H4 break contact opens, relay ST2 operates in series with relay ST1 from ground through contact 4 of relay ST1 operated through the winding of relay ST2, contact 2 of relay RLS released, contact 5 of relay RLM operated and the winding of relay ST1 to battery. When H4 break contact recloses, a ground is closed through contact 4 of relay MST operated, contact 5 of relay TCM operated, contact 3 of relay ST1 operated, make contact 1 of relay ST2 operated and the winding of relay ST3 to operate relay ST3 which locks through contact 3 of relay RLS released and contact 3 of relay MON to ground. Operation of relay ST3 by opening its contact 6 releases relay TCM.

*Punch trouble.*—When a double punch or blank column condition occurs, negative potential is impressed from terminals 8 and 10 of the punch, Fig. 74, to operate relay PT. The operation of relay PT by opening its contact 1 opens up the operating path extending through terminal 5, Fig. 74, to the clutch control relay of the punch, closes ground through contact 3 of relay SAL normal, contact 6 of relay ST4 operated and the winding of relay TCM to operate relay TCM. The operation of relay TCM closes ground from its contact 6 through contact 3 of relay PT operated to light Punch Trouble lamp. The same operation of the circuit occurs as above described with the exception that instead of placing cards in hopper the reset switch Reset SW of the punch, Fig. 74, is operated. The operation of the reset switch releases relay PT which in turn extinguishes the Punch Trouble lamp.

Figure 2:
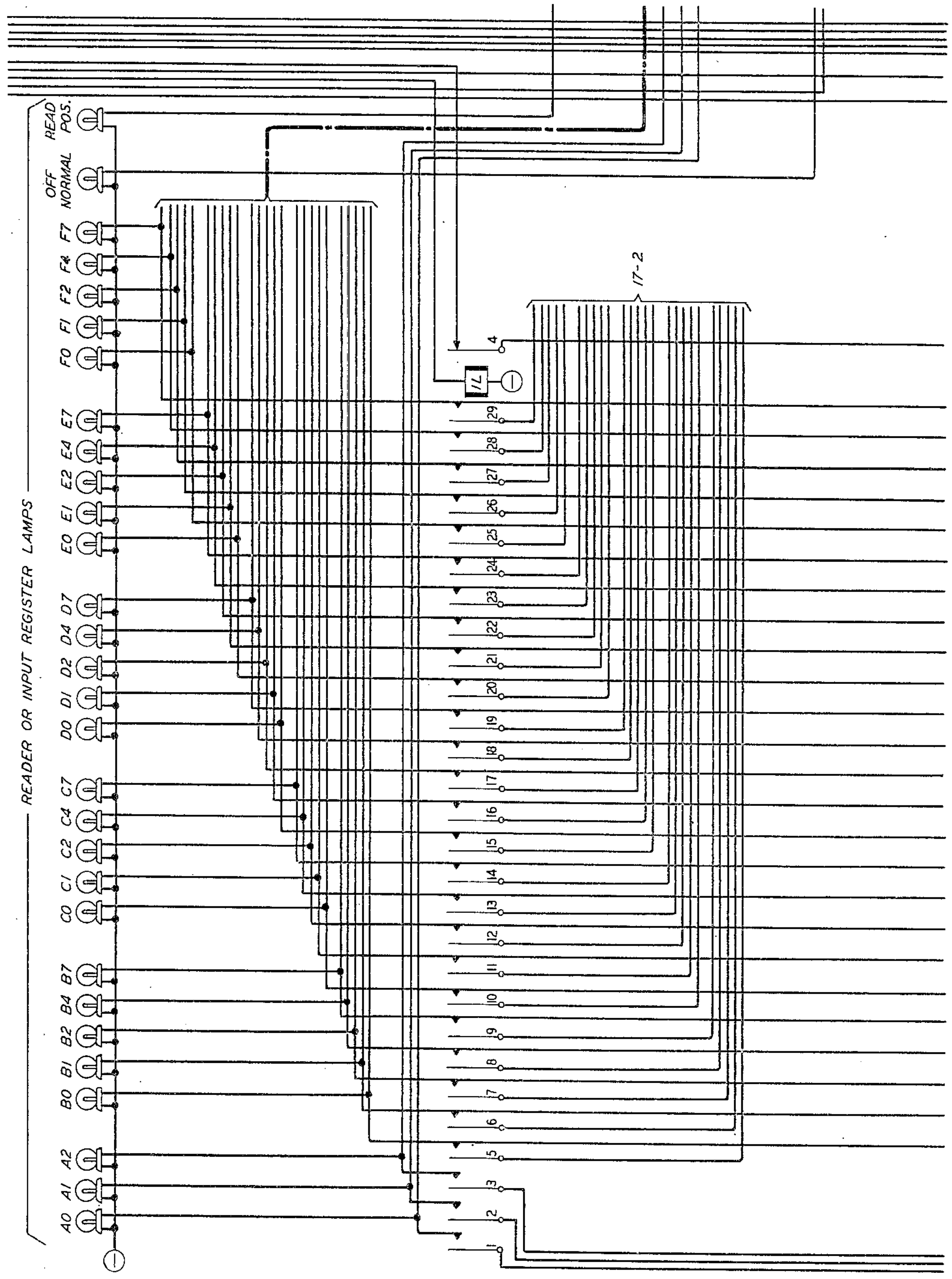
Figs. 2 and 3 show the input register lamp and the lamp to register connecting relays.
Figure 3:
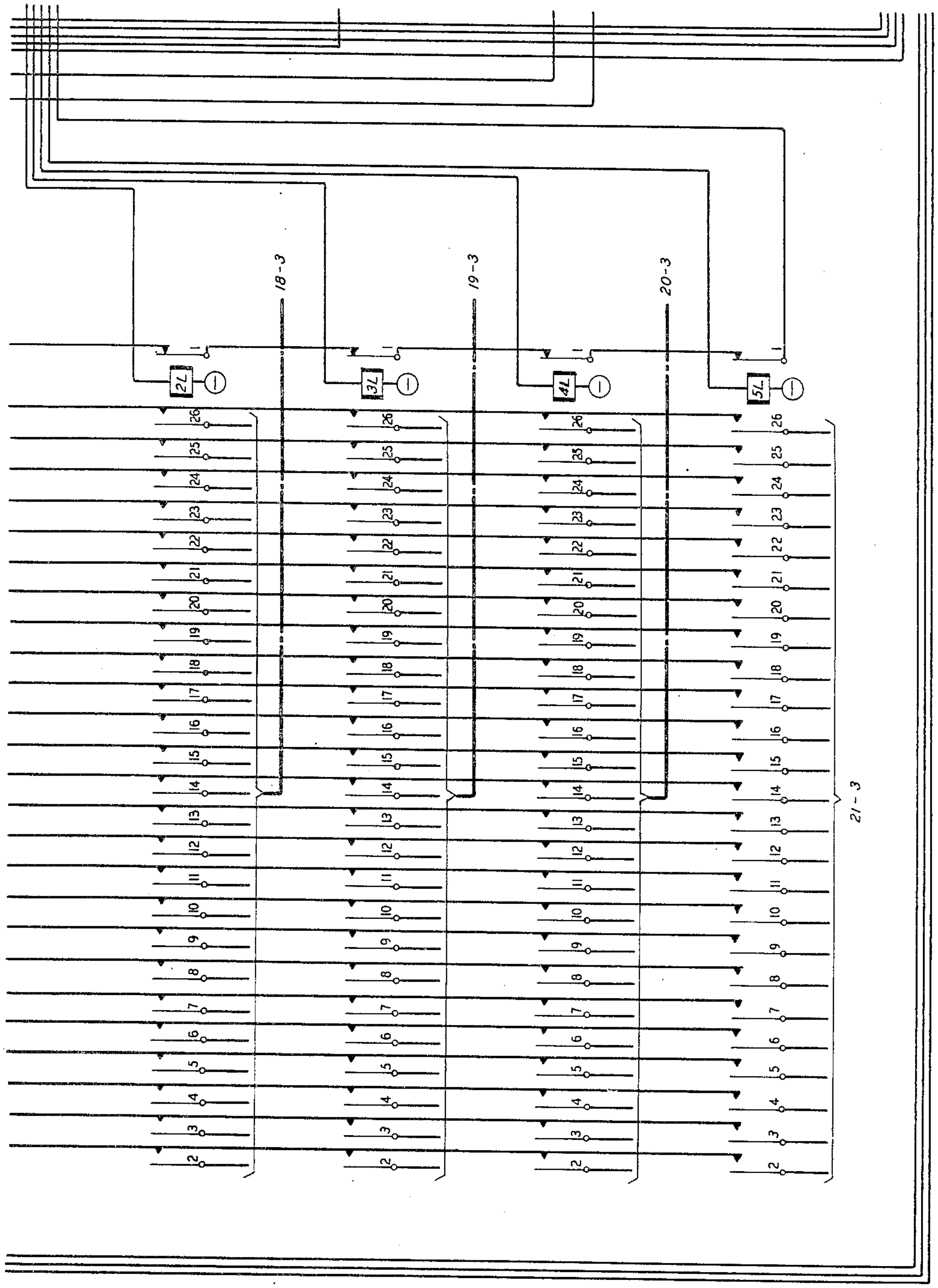

*Lamps.—Reading and input register lamps (Fig. 33).*—In Fig. 2 there are twenty-nine lamps representing the twenty-eight reading pins of the Reader, plus one reading position Read Pos. indicator lamp. These lamps are labeled Reader or Input Register Lamps. The reader lamp key Read LPS, shown in Fig. 4, operates the reader lamp connector relay RL to light the lamps in accordance with a number of reader pins that are closed. The circuit may be traced from battery through the winding of relay RL, contact 1 of key Read LPS, contact 4 of relay 1L, contacts 1 of relays 2L, 3L, 4L and 5L, contact 2 of key Line 5, contact 1 of key Line 4, contact 3 of key Line 3, contact 1 of key Line 2 and contact 1 of key Line 1 to ground, all of the keys being normal as shown. Relay RL, through its contact 1, connects the reader contact J6 to the reading position lamp Read Pos. It also connects the three A digit reader pins, A0, A1 and A2, with the correspondingly numbered A digit lamps, five B digit reading pins B0, B1, B2, B4 and B7 to the B digit lamps, five C digit reading pins to the C digit lamps C0, C1, C2, C4 and C7, five D digit pins to five D digit lamps D0, D1, D2, D4 and D7, five E digit pins to five E digit lamps, E0, E1, E2, E4 and E7 and five F digit pins to five F digit lamps F0, F1, F2, F4 and F7. The path over which relay RL operated was traced through a back contact of each of the input register relays 1L to 5L, inclusive. This down-check of the input register lamp connectors is to prevent relay RL from operating whenever any of the input register relay connectors is operated.

This prevents a possible back-up from an already operated input register relay through the reader lamp connector to incorrectly operate some reading relay.

*Input register lamp connectors.*—In addition to the reader or input register lamps and the reader lamp key Read LPS there are also provided input register lamp keys, labeled Input Reg. Lamps. These keys operate the input register lamp connectors so that the lamps indicate the registration in the register corresponding to the number of the key that is operated. For example, if the key for the first line key Line 1 is operated, input register lamp connector relay 1L is operated from battery through the winding of relay RL, contact 1 of key Line 1, contact 2 of key Read LPS, contact 2 of relay TCM, contact 7 of relay LPG, contact 5 of relay RL, contact 1 of key Line 5, contact 2 of key Line 4, contact 2 of key Line 3, contact 2 of key Line 2 and contact 2 of key Line 1 to ground. It will be observed that this path extends through break contacts on each of the line lamp keys other than the Line 1 key so that the path is open if any other of these keys is operated at the time. Relay 1L closes a circuit so that a make contact ground on any of the relays of the A or B digit of the entry type register, Fig. 17, of the C or D digit, Fig. 27, or the E or F digit, Fig. 37, lights the input register lamps corresponding to the operated relays.

The circuit for operating the reader lamp relays extends through a contact of relay LPG to insure that the lamps will light only when the start circuit is normal or an alarm is in. The same circuit extends through a contact of relay TCM to prevent the lighting of an input register lamp when a punch trouble condition exists.

Figure 18:
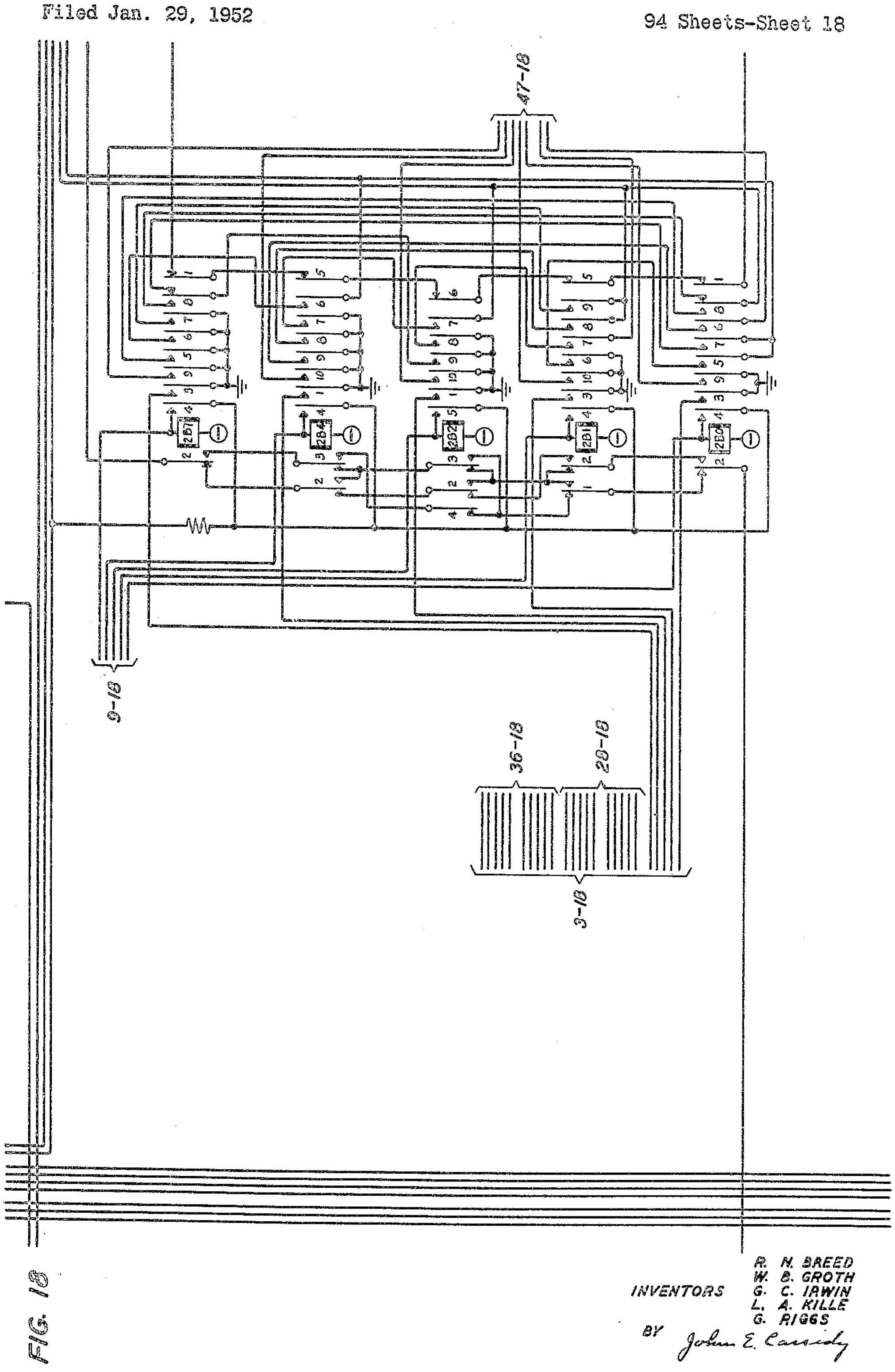
Figure 19:
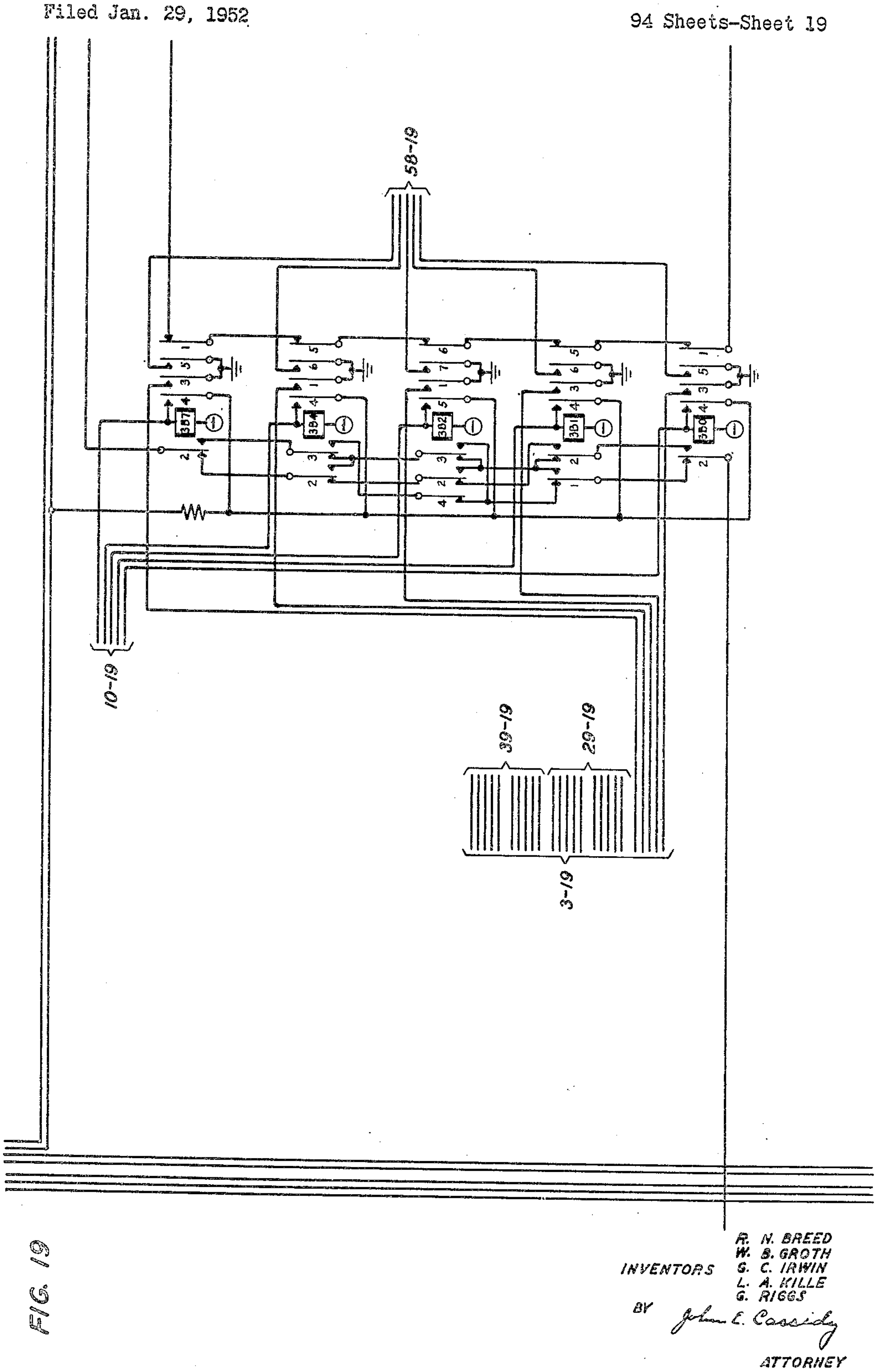
Figure 20:
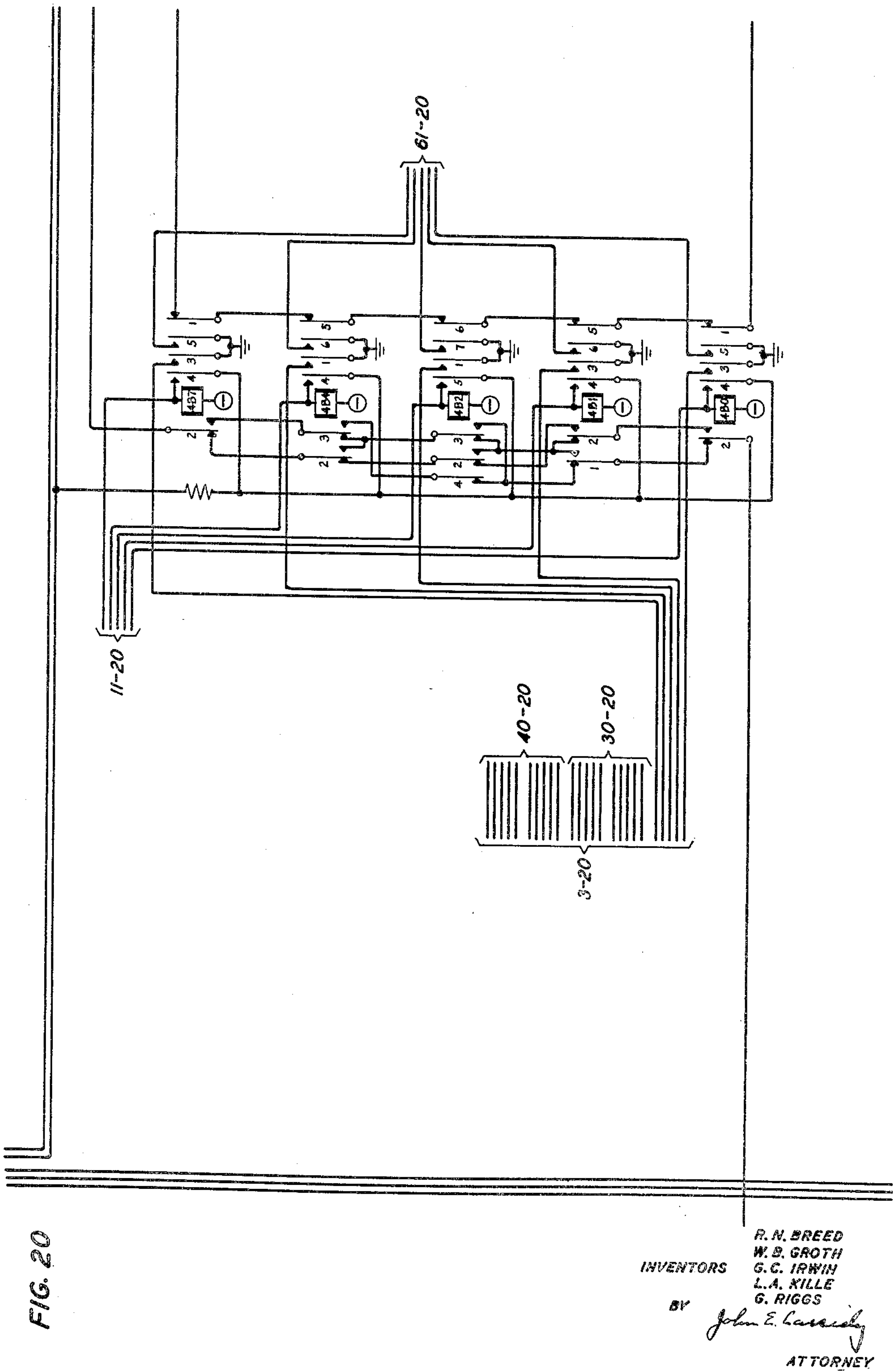
Figure 21:
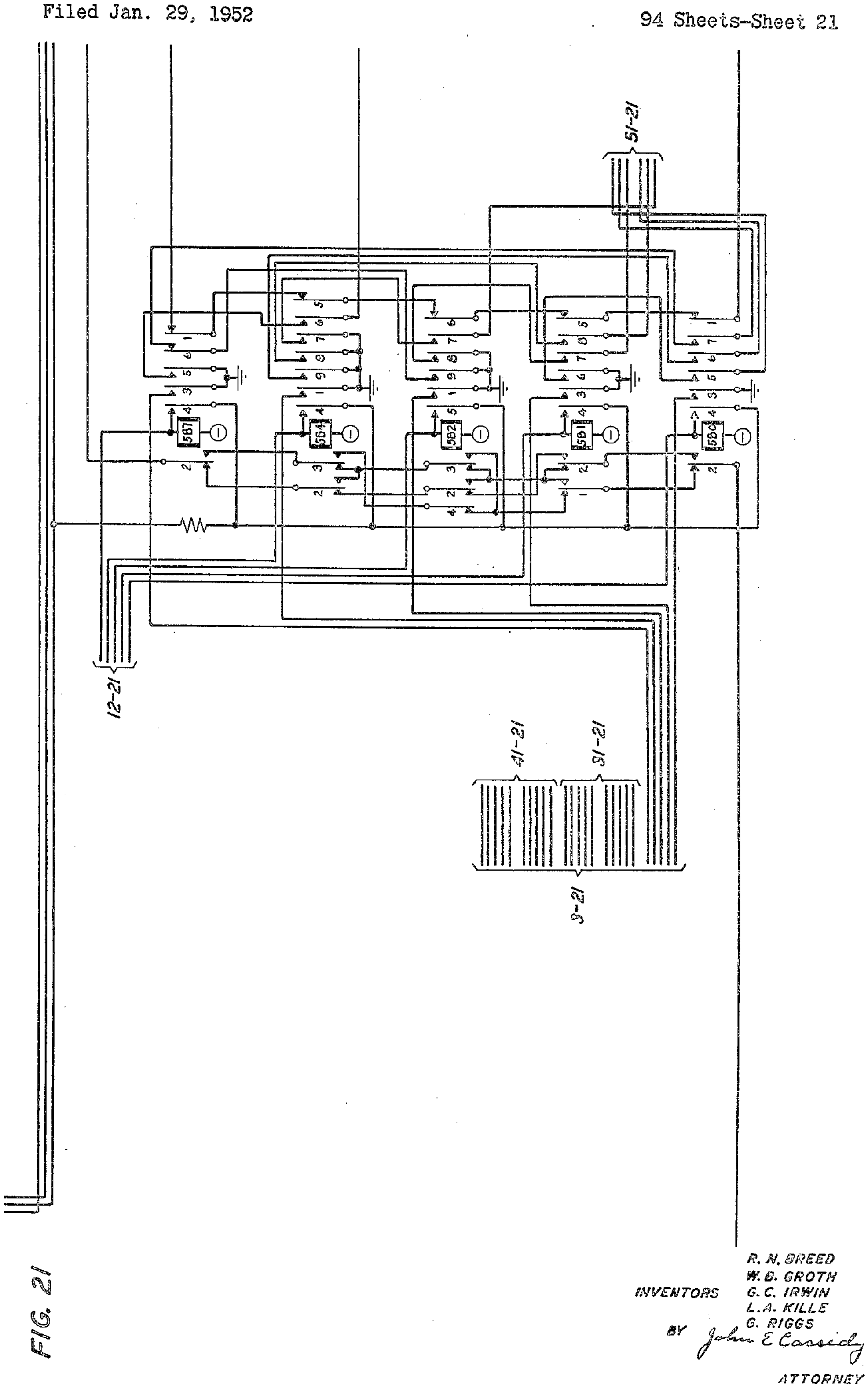
Figure 28:
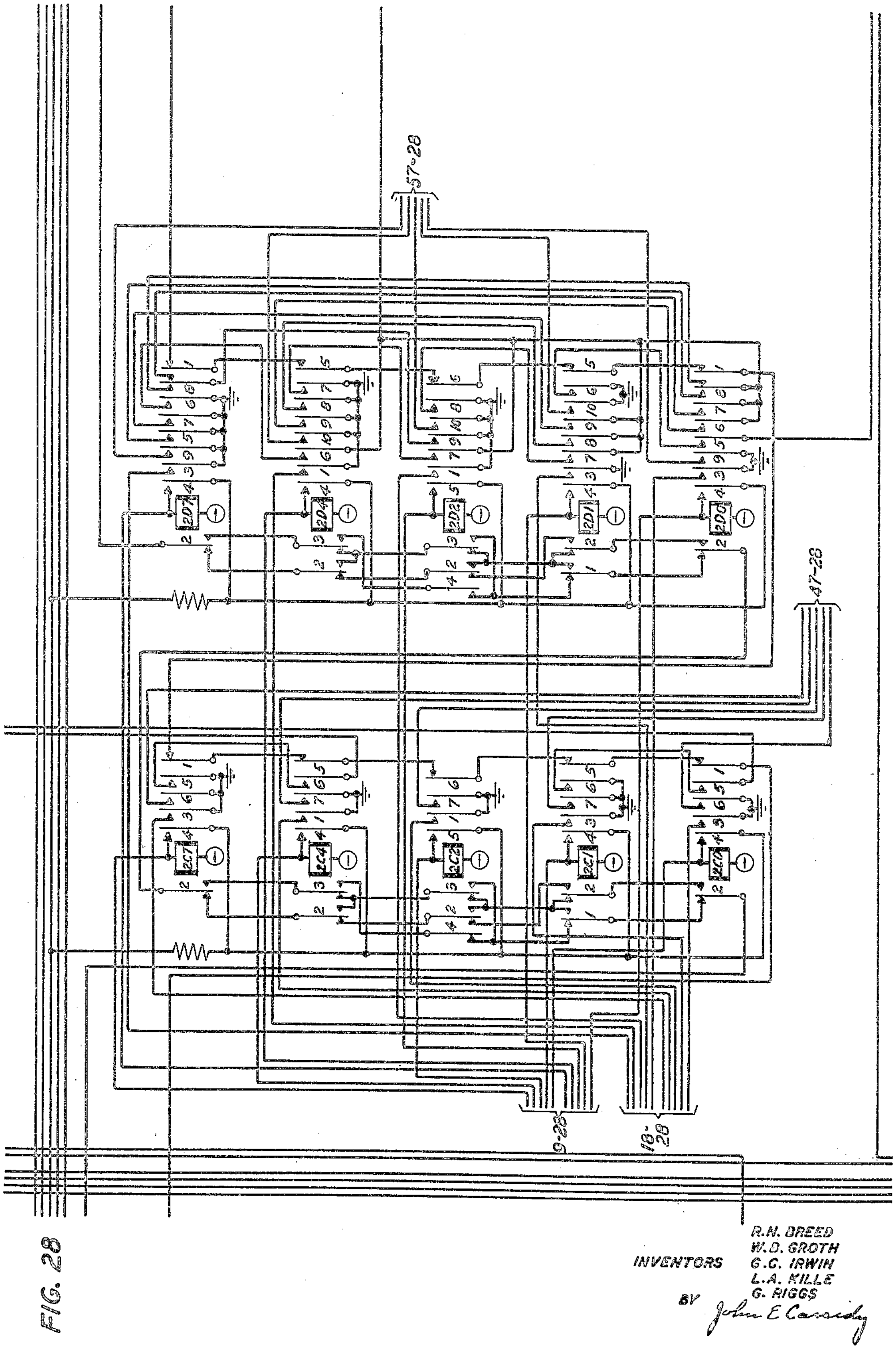
Figure 29:
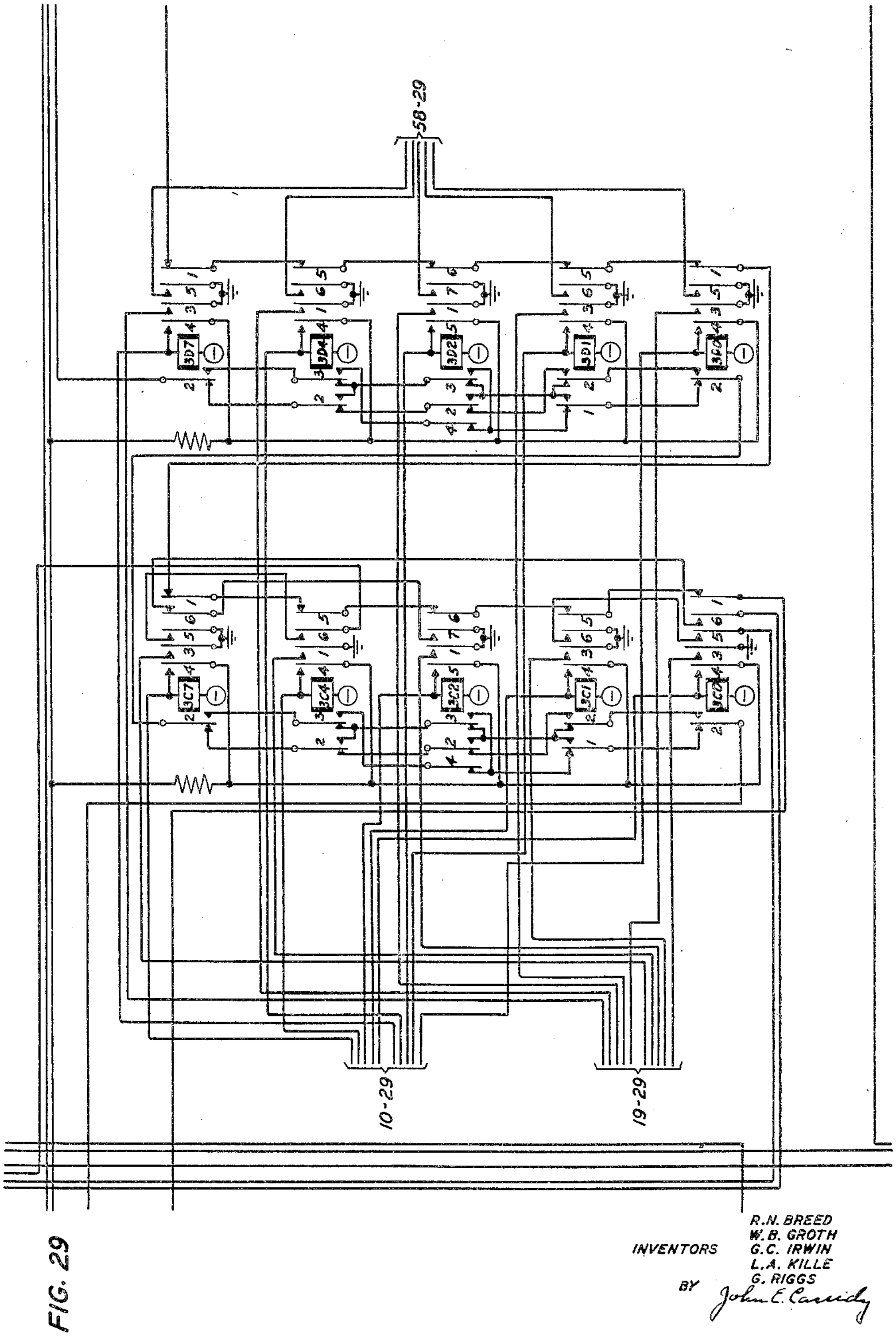
Figure 30:
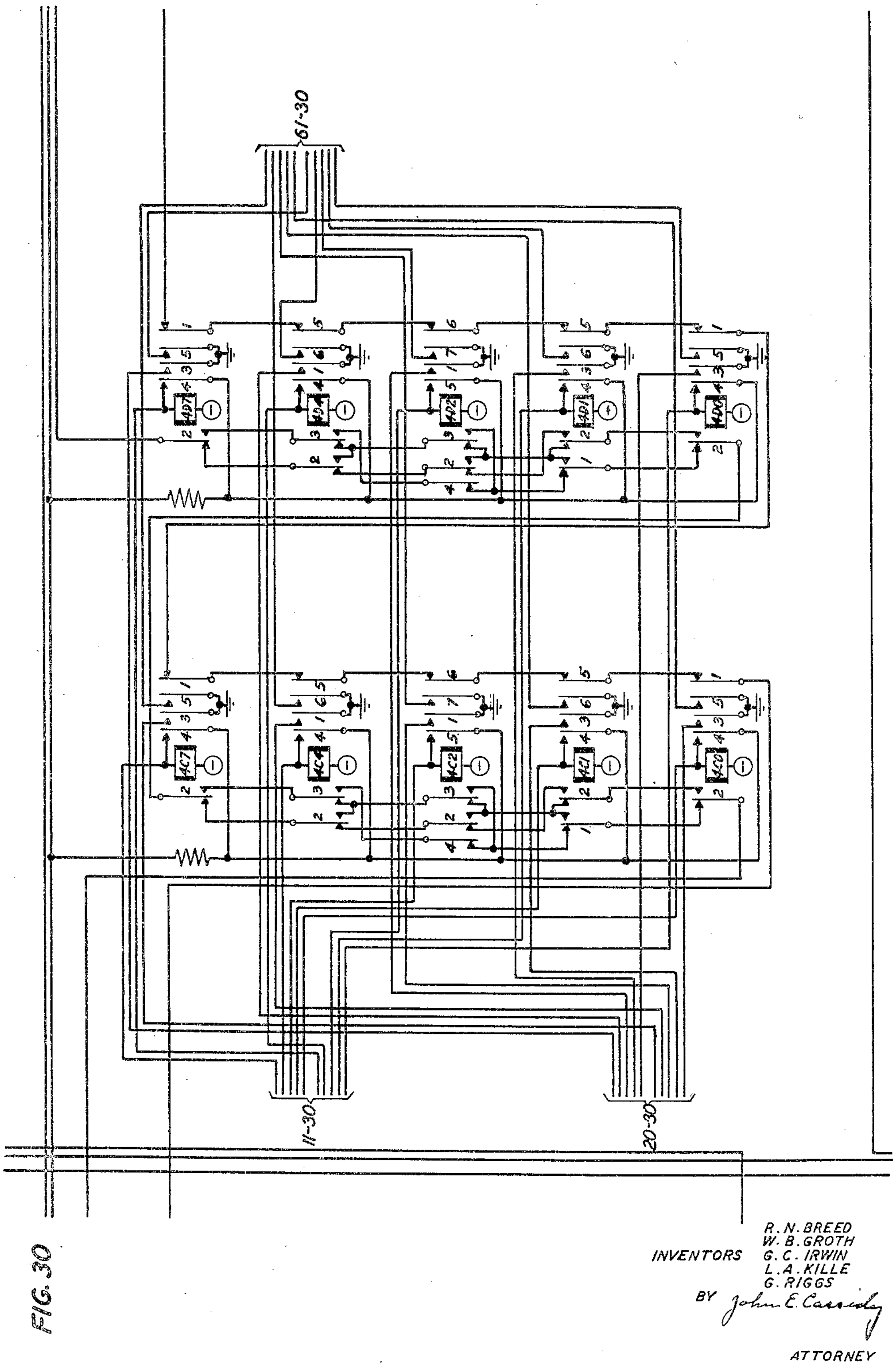
Figure 38:
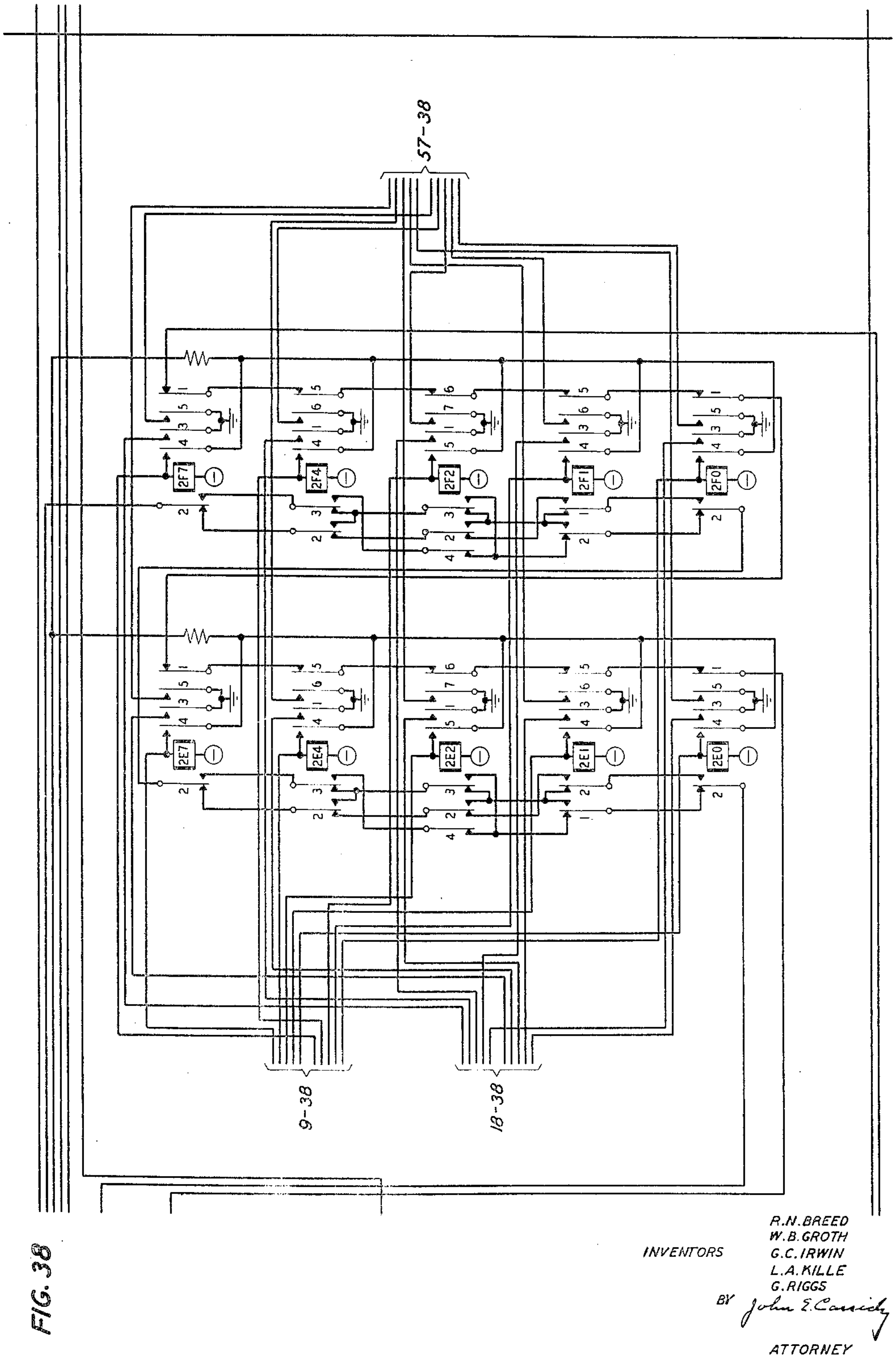
Figure 39:
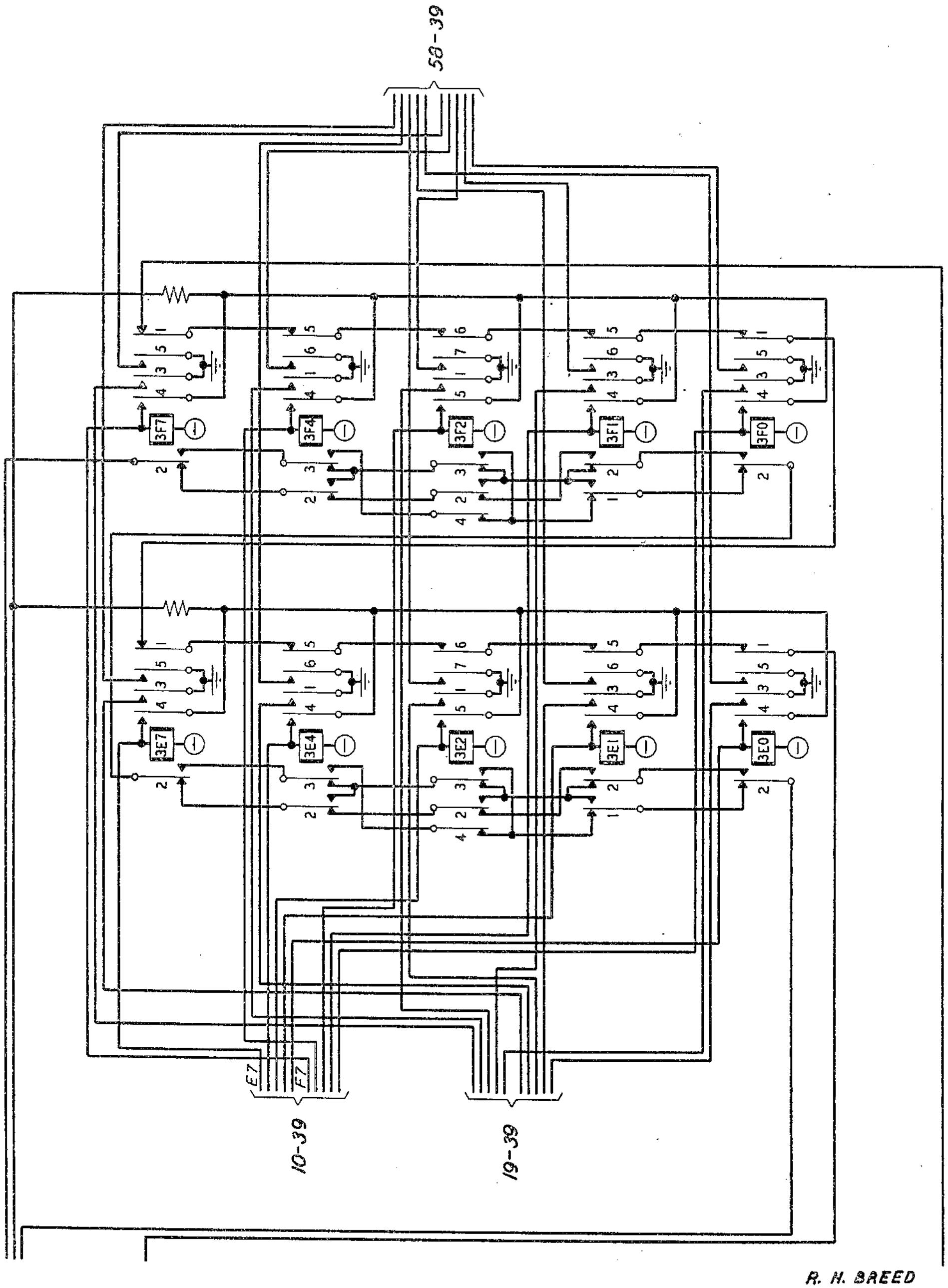
Figure 40:
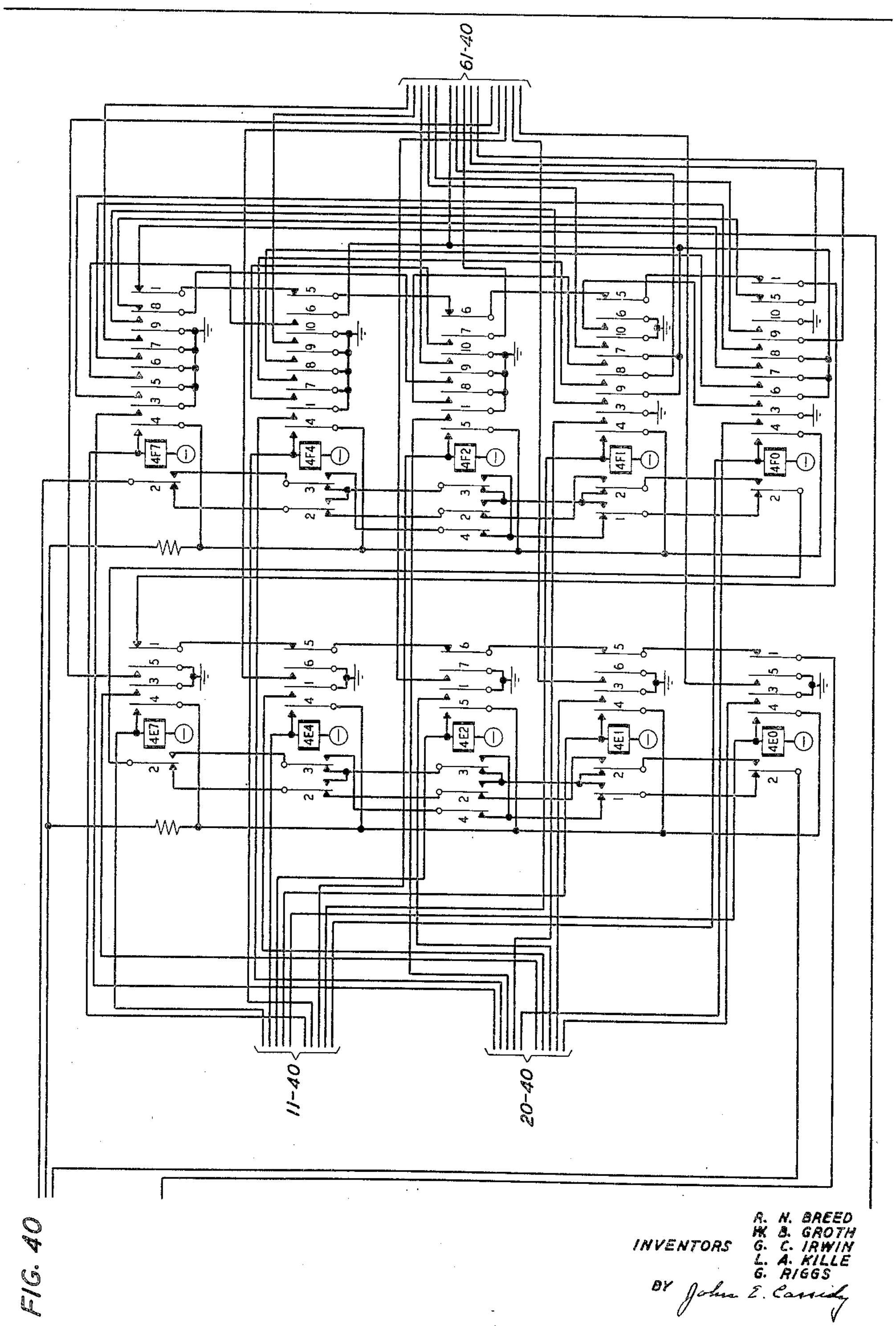

Relay 2L connects the relays corresponding to the B digit, Fig. 18, the C and D digits, Fig. 28, and the E and F digits, Fig. 38, corresponding to the second line of the tape to the Input Register Lamps. Relays 3L, 4L and 5L similarly connect the relays corresponding to the B, C, D, E and F digits in Figs. 19, 20 and 21 and 29, 30 and 31, and 39, 40 and 41, respectively for the third, fourth and fifth line of the tape.

*Line of entry lamps.*—There are five line of entry lamps, one each in Figs. 8 to 12, inclusive. They indicate which of the relays SR1 to SR5 is operated, or in other words which of the five input registers is in the process of being filled or which will try to fill next. The lamp operate paths extend from ground through contact 17 of relay RL, contact 5 of relay SR1 or contact 3 of relays SR2 to SR5, depending upon which SR– relay is operated, and the filament of the corresponding Line– lamp to battery lighting the particular lamp. Relay RL contact 17 is closed, making it possible to light the lamps, whenever the reader lamp key Read LPS is operated.

*Alarm lamps.—General alarm.*—Whenever the circuit fails to progress after a short time limit, the SAL relay operates as described in the foregoing which in turn connects ground through its contact 5 to light Gen. Alarm lamp.

*RDR step fail.*—Whenever the reader drum fails to step when signaled to do so, the RSF relay operates, as described in the foregoing, which in turn connects ground through its contact 4 to light RDR Step Fail lamp.

*RDR step hold.*—Whenever a reader step relay fails to release, the RSH relay operates as described in the foregoing which in turn connects ground through its contact 3 to light RDR Step Hold lamp.

*Alarm.*—The ALM lamp lights from ground through contact 8 of the alarm relay AL whenever an alarm condition occurs.

*Machine pilot.*—The Machine Pilot lamp lights whenever an alarm condition occurs. Ground from contact 2 of relay AL operated through contact 2 of relay EAC normal lights the Machine Pilot lamp. It is extinguished when relay EAC relay operates due to operation of the Alarm Cut-Off key.

*Tape section lamps.—Tape section 0–9.*—One of the ten Tape Section 0–9, Fig. 22, lamps lights to indicate the tape section being processed when processing summary tape. Ground is closed from contact 4 of relay SA operated through contact 6 of relay L8 normal, the rotatable switch arm and some particular contact of the TH selector wafer 2 and a corresponding contact of relay TS operated to light one of the ten Tape Section 0–9 lamps.

*Last section.*—When processing the last section of a summary tape, relay LTH, Fig. 22, operates in a manner to be described, which in turn closes ground from its contact 1 to light the Last Section lamp.

Figure 5:
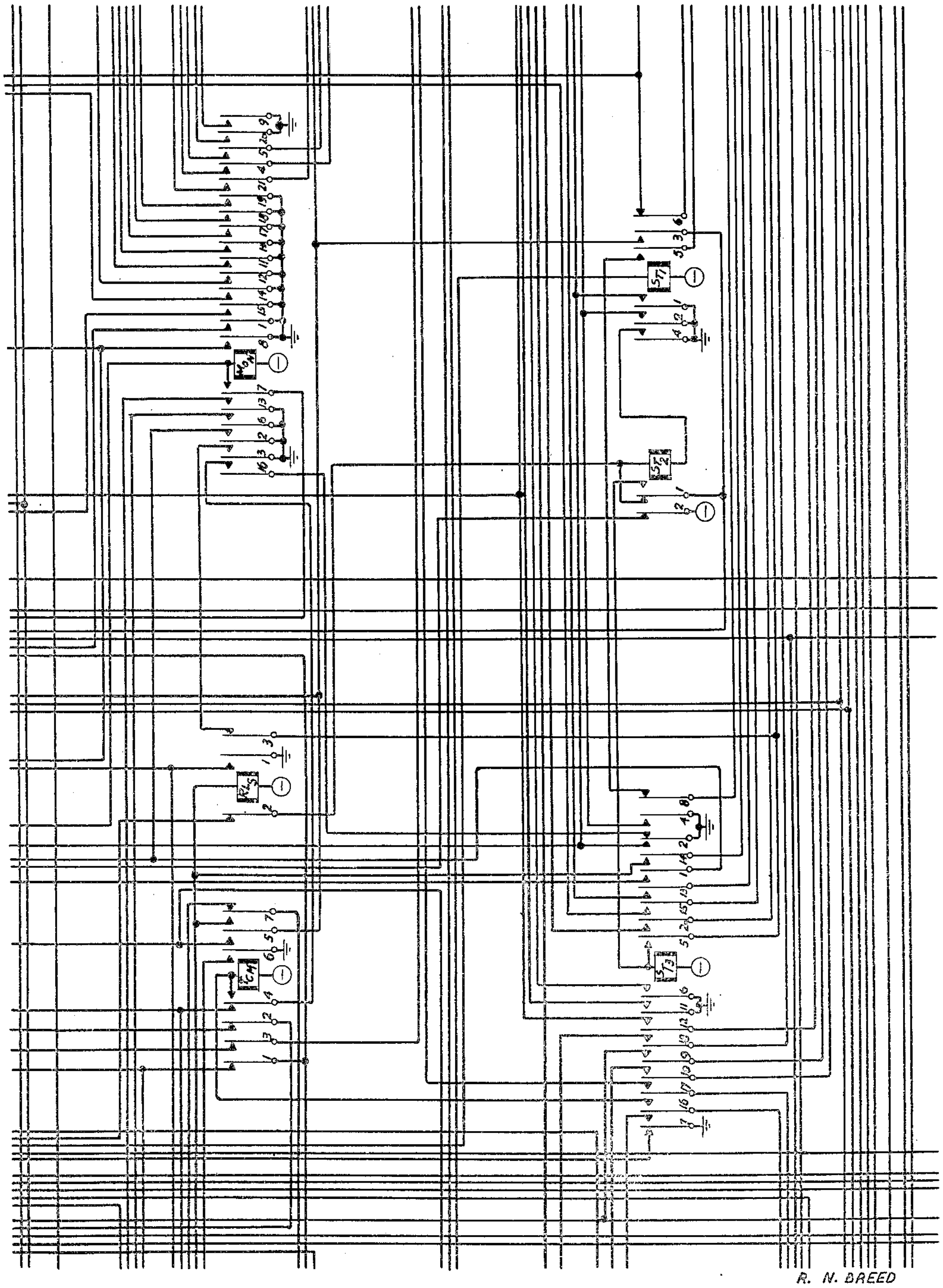

*Miscellaneous lamps.—Master off-normal.*—Whenever the circuit is off-normal relay MON, Fig. 5, or relay MLK, Fig. 22, operate as heretofore described which in turn connects ground from contact 10 of relay MON or contact 1 of relay MLK to light Master Off-Normal lamp, Fig. 22.

*Off-normal.*—Whenever the circuit is processing tape relay RCD is operated which in turn connects ground from its contact 2 to light the Off-Normal lamp, Fig. 2.

*Tape identity.*—Whenever the circuit is reading tape identity relay TI operates in a manner to be described which in turn closes ground from contact 5 of relay LPG through contact 6 of relay RL, contact 1 of relay TI and the filament of tape identity lamp Tape Ident., Fig. 35, to battery to light the lamp.

*Skip splice.*—Whenever the circuit is reading splice pattern relay SKP operates, as described in the foregoing, which in turn closes ground, when relays RL and LPG are operated, from contact 6 of relay RL through contact 6 of relay LPG, contact 1 of relay SKP and through the lamp filament to light the Skip Splice lamp, Fig. 14.

*Punch trouble.*—When a stoppage of the punch occurs due to a double punch, blank column or a non-comparison indication for a card relay PT operates which in turn closes ground through its contact 3 and the lamp filament to light Punch Trouble lamp, Fig. 1.

*No cards.*—When the card hopper of the punch becomes empty relay NC releases which in turn closes ground from contact 6 of relay TCM operated and contact 2 of relay NC through the lamp filament to battery to light the No Cards lamp, Fig. 1.

Figure 7:
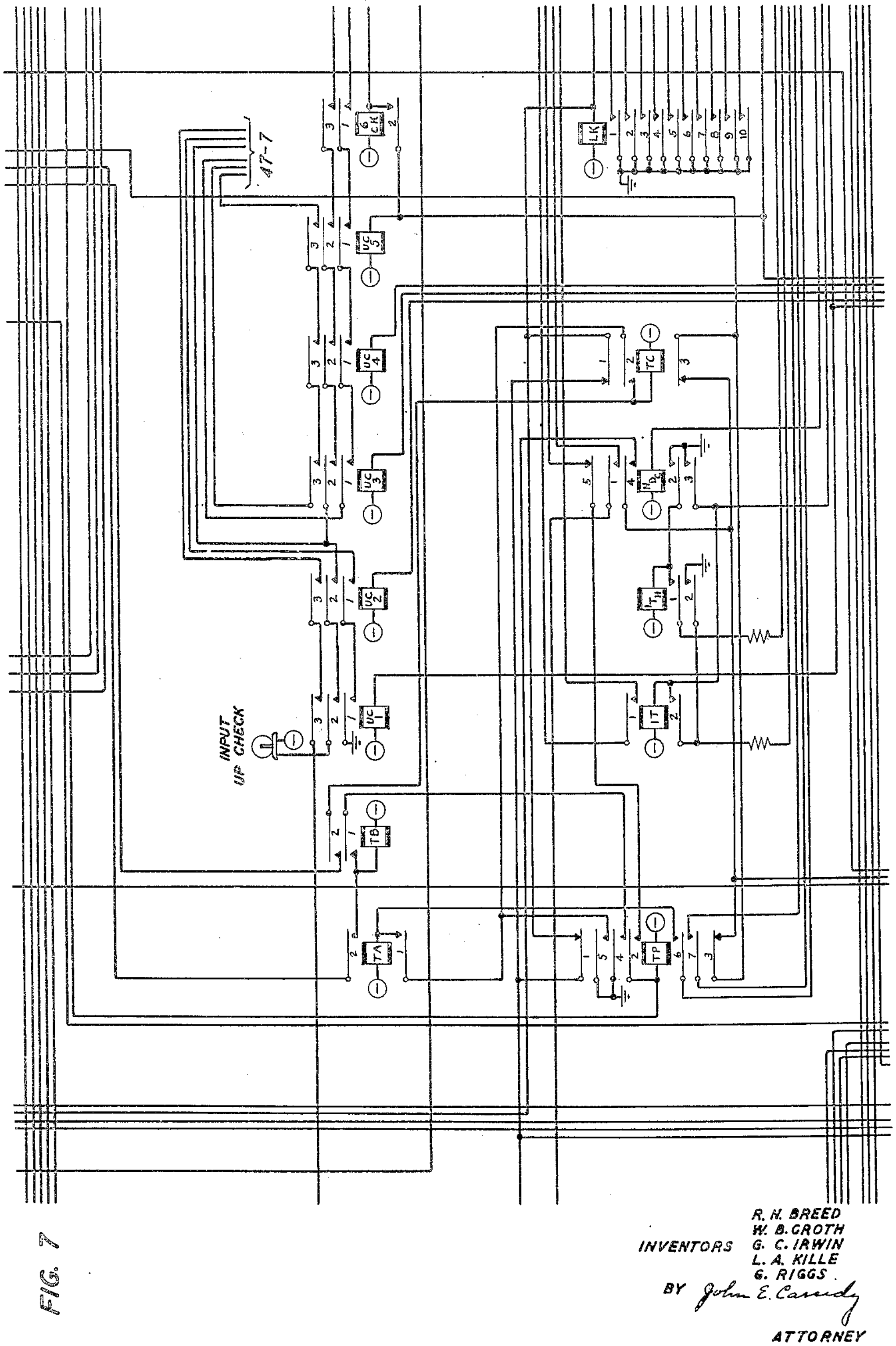
Fig. 7 shows the five up-check relays, the 6th line first group check relay and the single down-check relay for the input register, the input register ground supply relay and other control relays.
Figure 8:
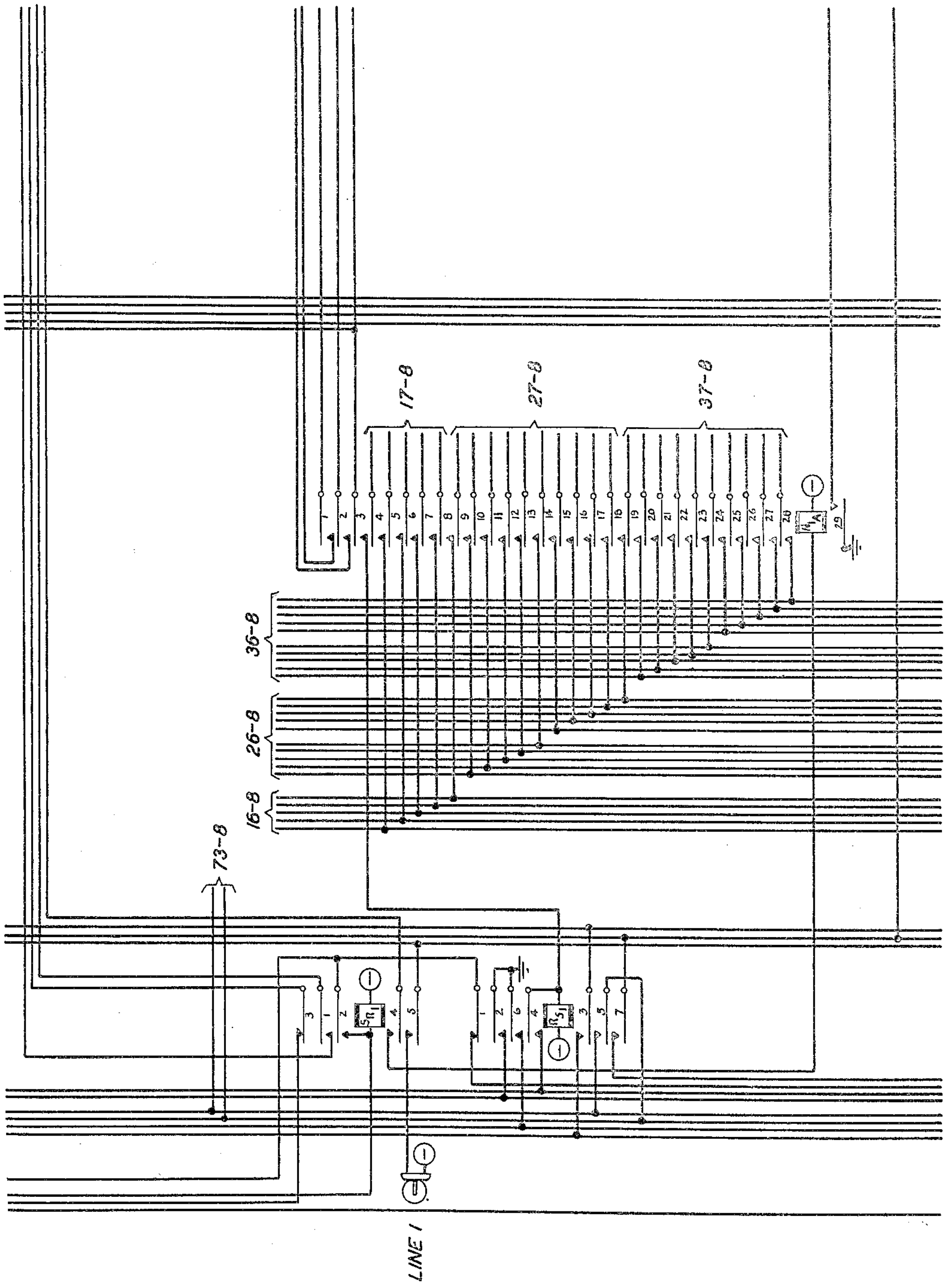
Figure 9:
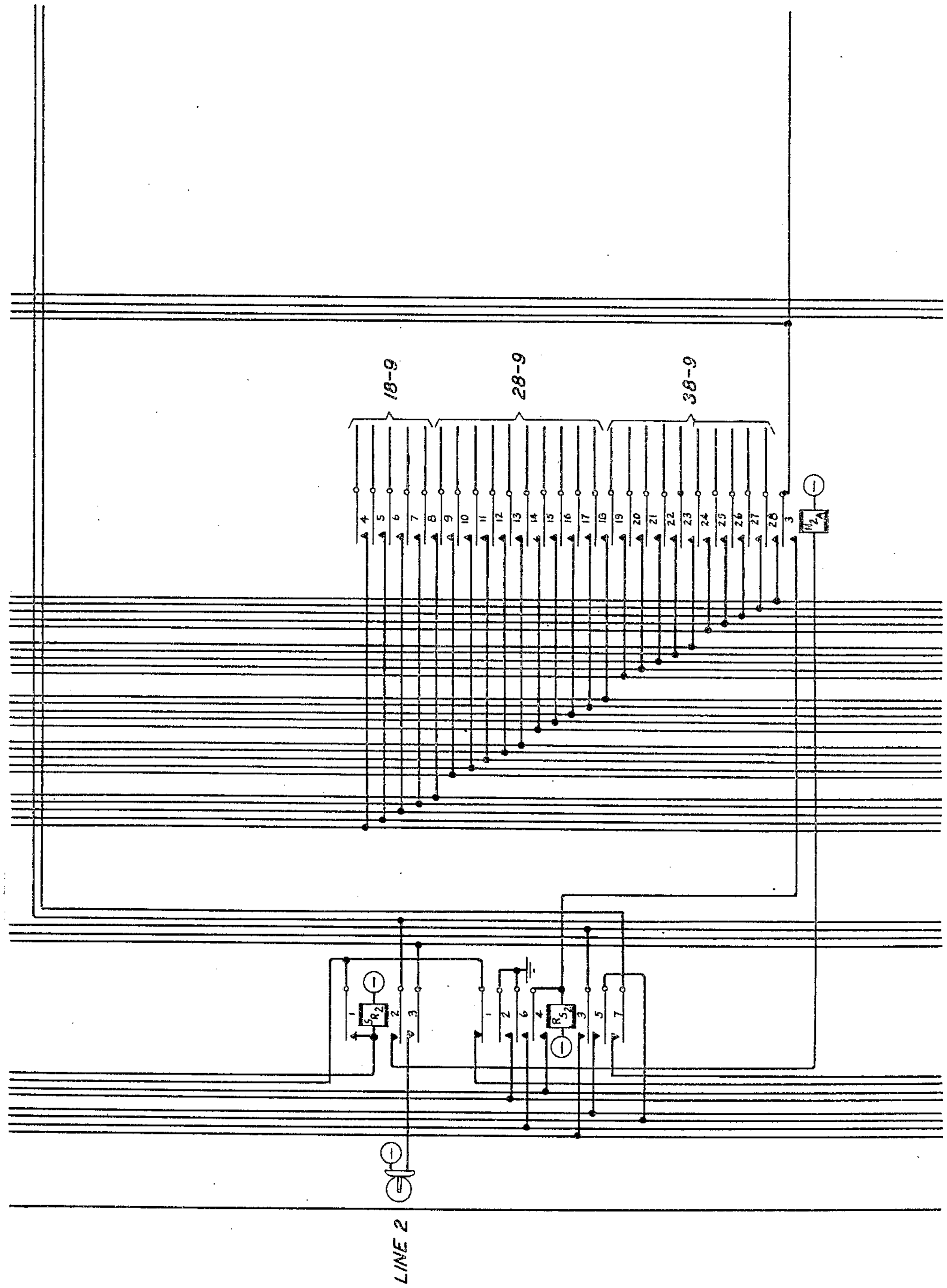
Figure 10:
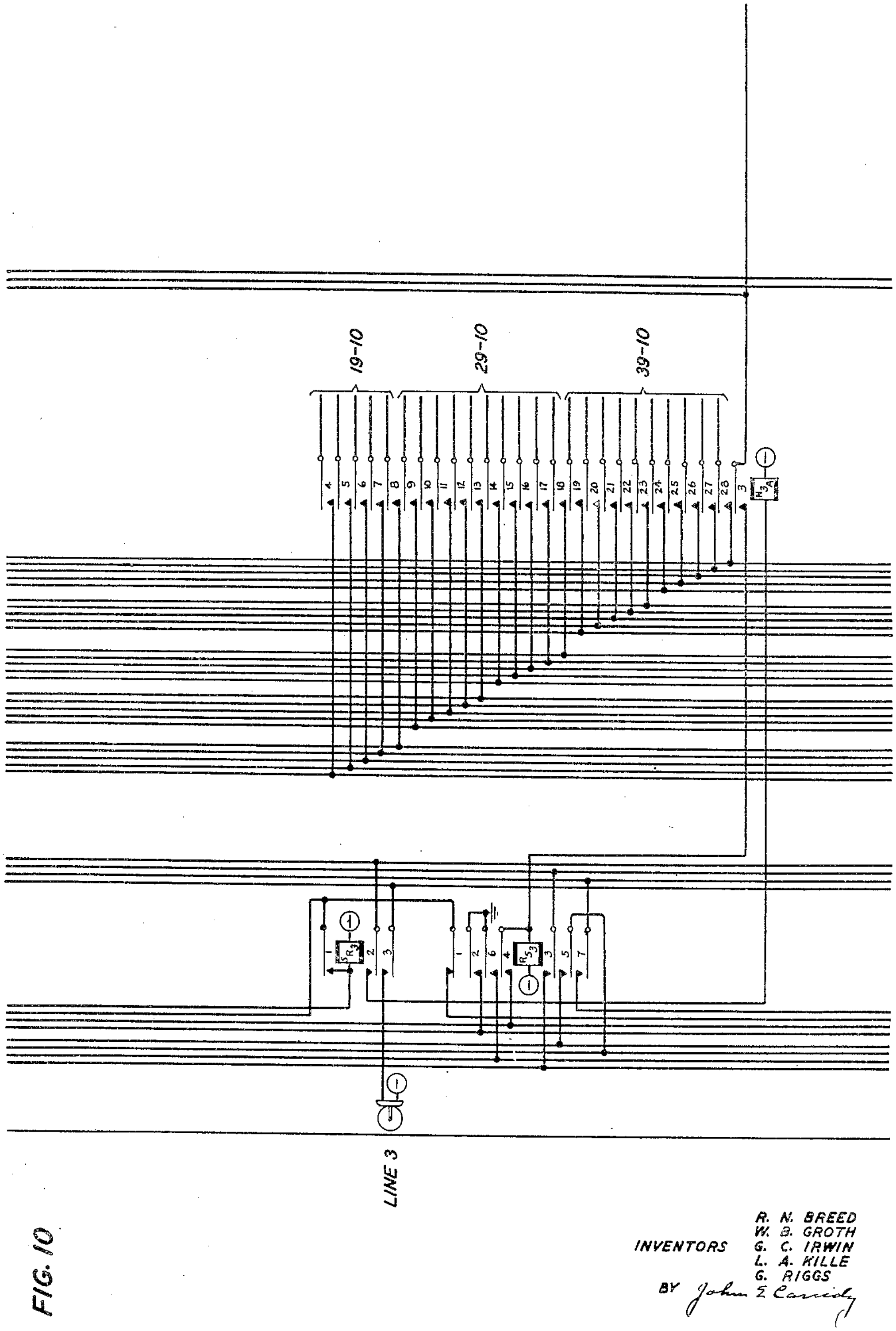
Figure 11:
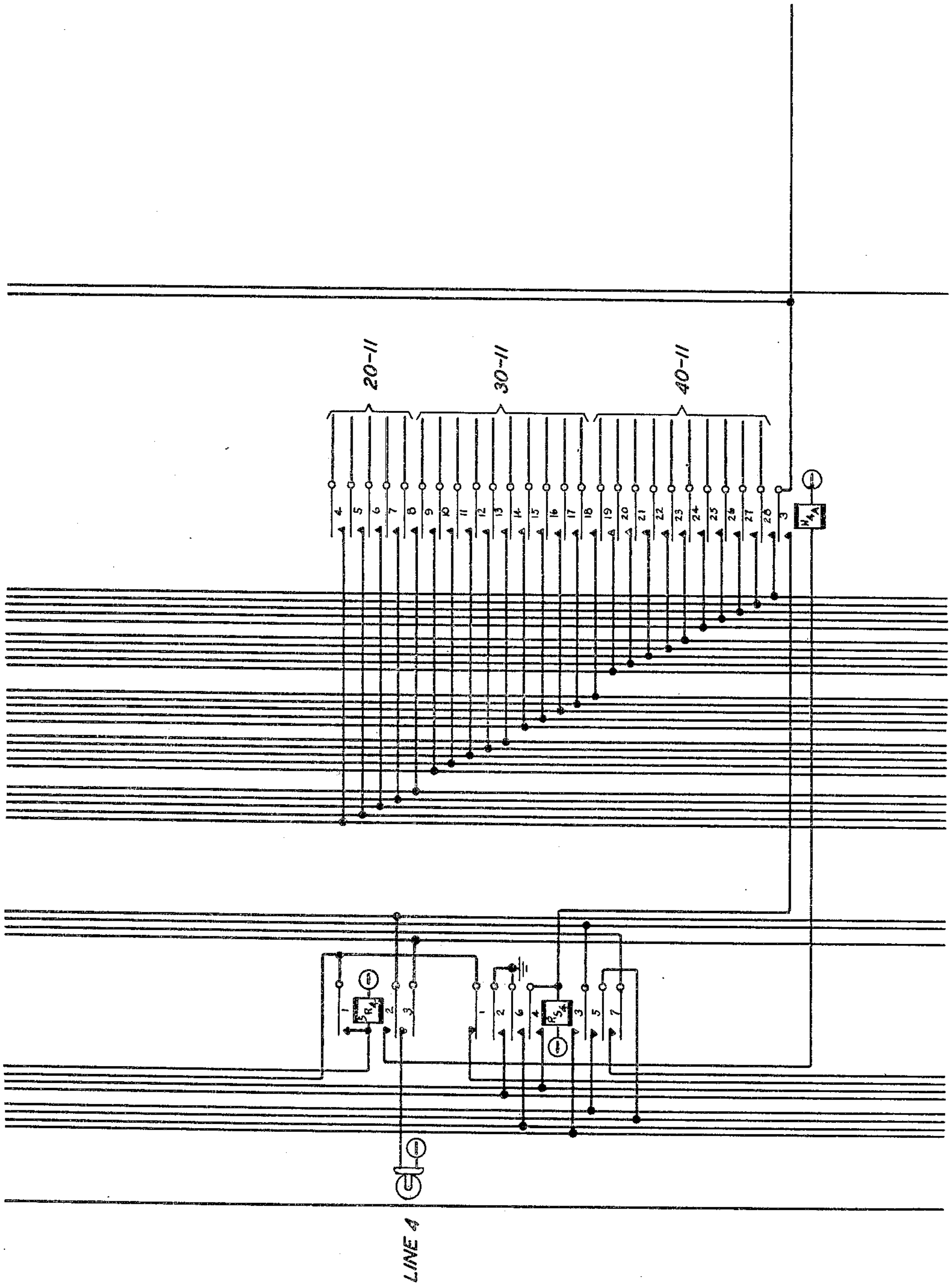
Figure 12:
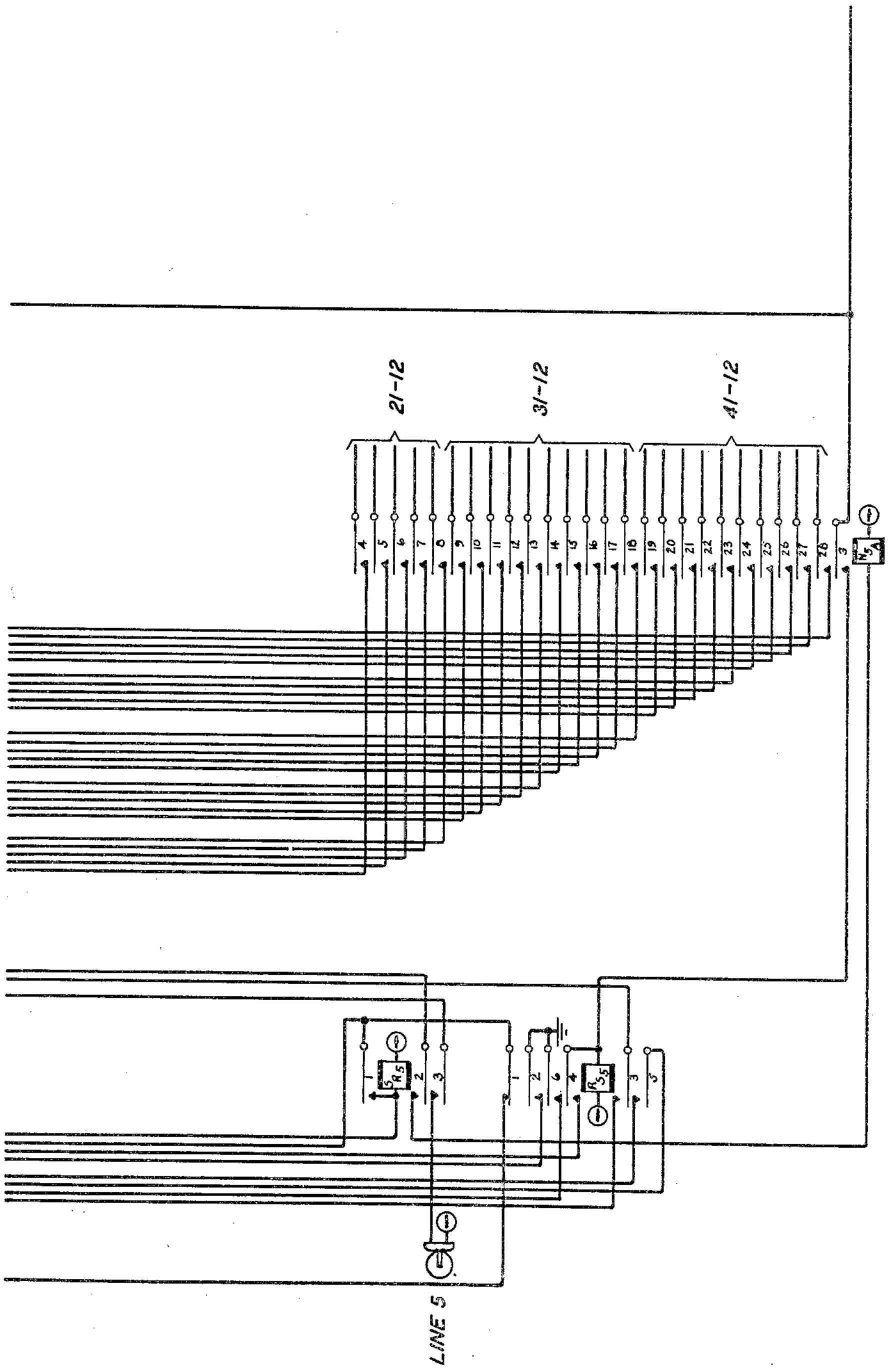

*Input UP CK lamp.*—When all five lines of the input register are filled and the sixth line has had the A digit checked, a ground from contact 3 of relay LPG operated passes through make contacts 3 of relay 6CK, 2 of relay UC5, 2 of relay UC4, 2 of relay UC3, 2 of relay UC2, 2 of relay UC1 and the lamp filament to battery to light the Input Up-Check lamp, Fig. 7. Relay LPG is operated whenever an alarm is in or whenever the start circuit is normal.

When summary tapes are being processed make contact 1 on relay SA shorts around the portion of the path just traced through contacts of relays 6CK, UC5, UC4 and UC3 so that the Input Up-Check lamp lights when the first two lines of the register only are filled.

*Output UP CK lamp.*—Whenever the output registers are filled in a proper combination an up-check operates relay RUC in a manner to be described. A ground from contact 3 of relay LPG, which operates whenever there is an alarm or the start circuit is normal, passes through contact 7 of relay RUC and the filament of the lamp to light the Output Up-Check lamp.

*Set-up check lamps.*—The set-up check lamps, Fig. 34, are lighted, as explained under the heading Set-Up Check in the foregoing, whenever the set-up switches, Figs. 32 and 42, are changed after the first tape identity has been checked.

*Tape type lamp.*—The Tape Type lamp, Fig. 34, lights when the Tape Type switch, Fig. 32, is changed. Ground from contact 6 of relay RUC normal, contact 2 of relay CL9 normal, contact 9 of relay TIE operated, contact 4 of relay OTT, contact 4 of relay ETT normal and the filament of the lamp to battery lights the Tape Type lamp.

*Marker group tens lamp.*—The marker group tens lamp, MKR GRP Tens, Fig. 34, lights when the marker group tens switch Marker GRP Tens, Fig. 32, is changed. Ground from contact 6 of relay CL9 normal, contact 9 of relay TIE operated, contact 4 of relay OGT, contact 4 of relay EGT normal and the filament of the lamp to battery lights the MKR GRP Tens lamp.

*Marker group units lamp.*—The marker group units lamp, MKR GRP Units, Fig. 34, lights when the marker group units switch Marker GRP Units, Fig. 32, is changed. Ground from contact 1 of relay RUC and contact 2 of relay CL9 normal, contact 9 of relay TIE operated, contact 4 of relay OGU, contact 4 of relay EGU normal and the filament of the lamp to battery lights the MKR GRP Units lamp.

*Central office lamp.*—The central office lamp Cent. Office, Fig. 34, lights when the central office switch Cent. Office is changed. Ground from contact 1 of relay RUC and contact 1 of relay CL9 normal, contact 9 of relay TIE operated, contact 4 of relay OCO, contact 4 of relay ECO normal and the filament of the lamp to battery lights the Cent. Office lamp.

*Last day tens lamp.*—The Last Day Tens lamp, Fig. 44, lights when the Last Day Tens switch, Fig. 42, is changed. Ground from contact 1 of relay RUC and contact 2 of relay CL9 normal, contact 9 of relay TIE operated, contact 4 of relay ODT, contact 4 of relay EDT normal and the filament of the lamp lights the Last Day Tens lamp.

*Last day units lamp.*—The Last Day Units lamp, Fig. 44, lights when the Last Day Units switch, Fig. 42, is changed. Ground from contact 1 of relay RUC and contact 2 of relay CL9 normal, contact 9 of relay TIE operated, contact 4 of relay ODU, contact 4 of relay EDU normal and the filament of the lamp lights the Last Day Units lamp.

*Month tens lamp.*—The Month Tens lamp, Fig. 44, lights when the Month Tens switch, Fig. 42, is changed. Ground from contact 1 of relay RUC and contact 2 of relay CL9 normal, contact 9 of relay TIE operated, contact 4 of relay OMT, contact 4 of relay EMT normal and the filament of the lamp lights the Month Tens lamp.

*Month units lamp.*—The Month Units lamp, Fig. 44, lights when the Month Units switch is changed. Ground from contact 1 of relay RUC and contact 2 of relay CL9 normal, contact 4 of relay TIE operated, contact 4 of relay OMU, contact 4 of relay EMU normal and the filament of the lamp to battery lights the Month Units lamp.

Figure 52:
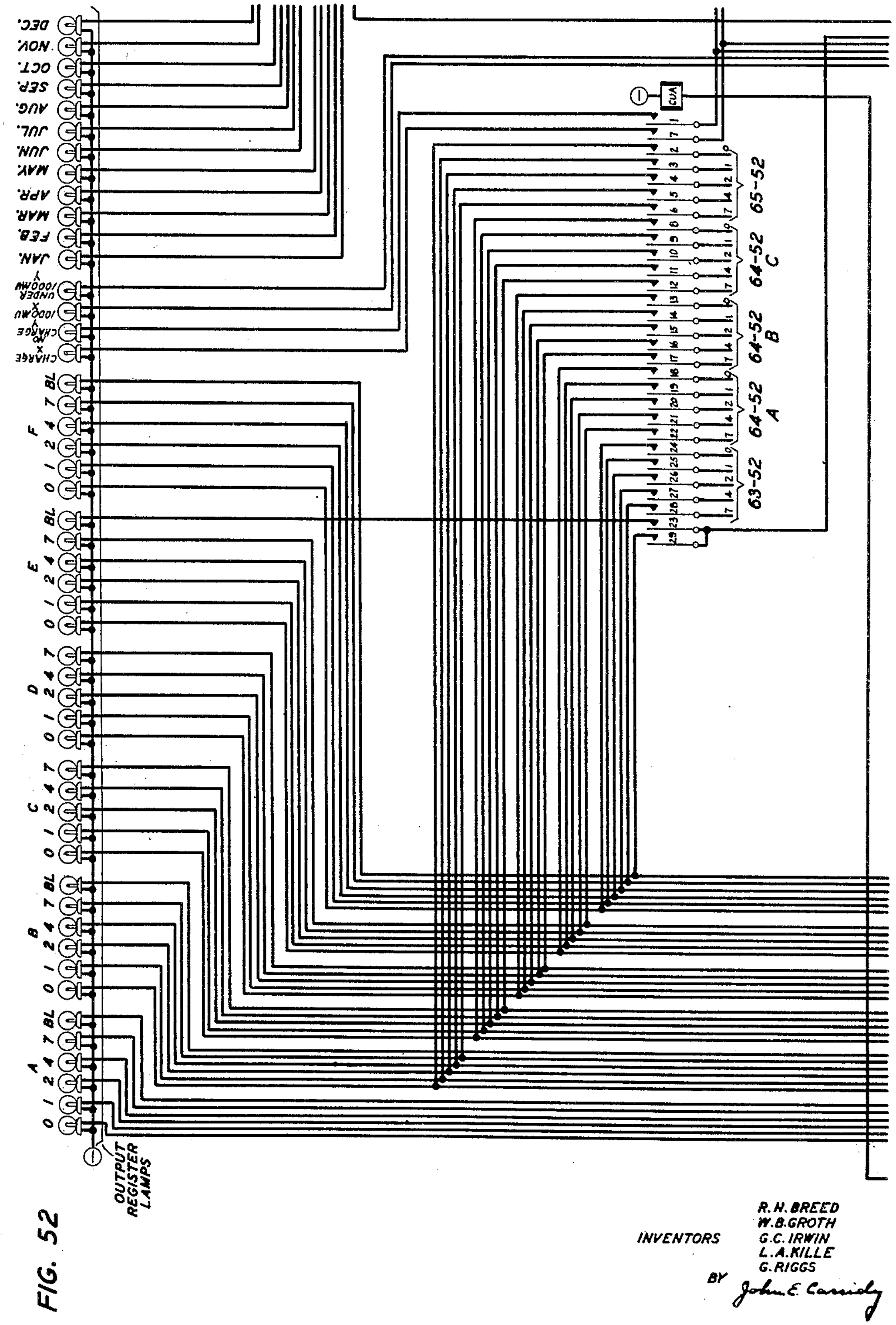
Figure 53:
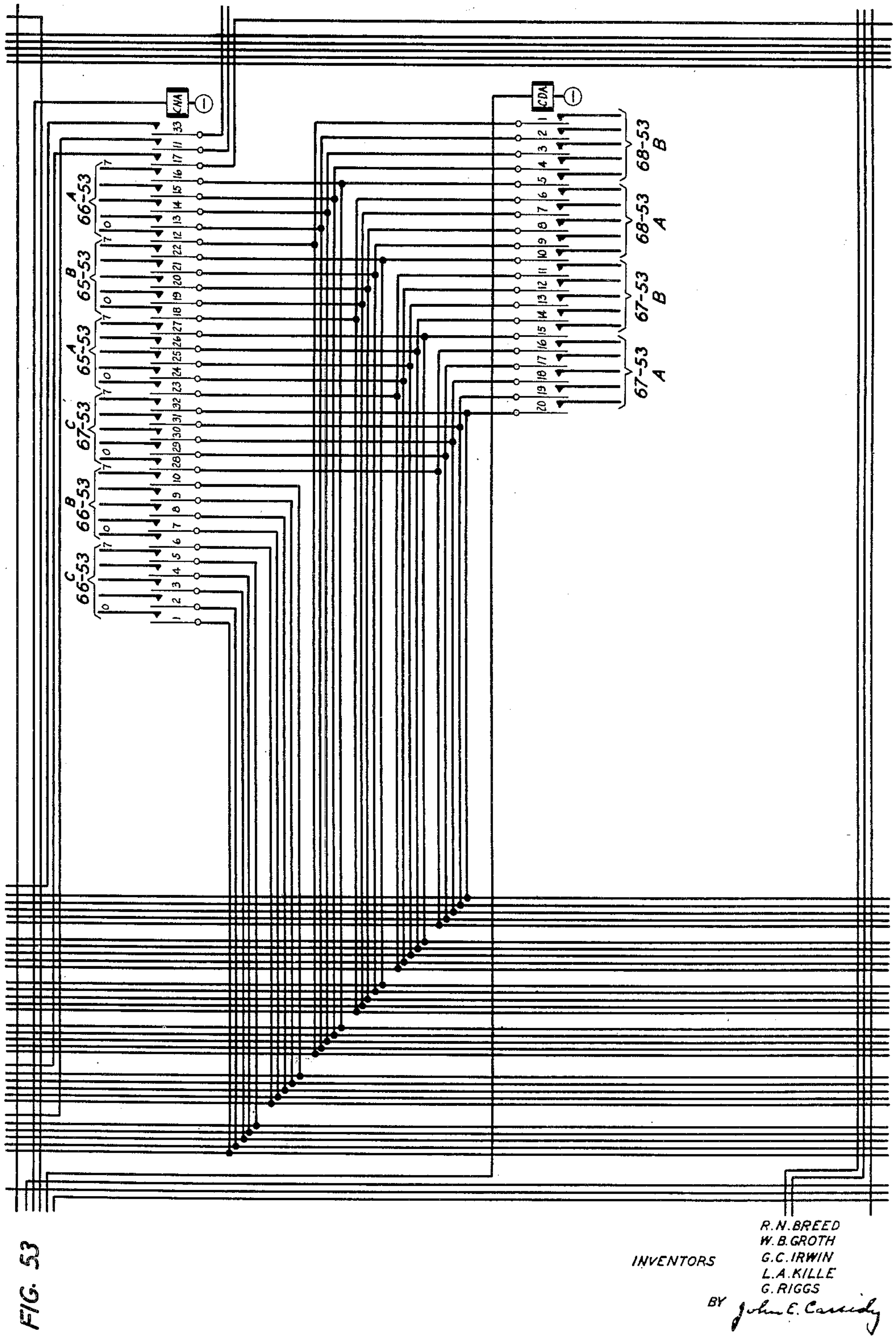

*Output register lamp display.*—The output register lamps, Fig. 52, of the tape to card converter and the associated keys, Fig. 13, and the lamp connector relays, Figs. 52 to 62, make it possible to observe various items of information stored in the output registers, Figs. 63 to 72. Lamp leads are brought out from the registers, on a two-out-of-five basis and under control of the keys are connected to some one particular set of six sets of lamps arbitrarily designated A through F. The lamps are arranged on a two-out-of-five digit basis. Associated with the 0, 1, 2, 4 and 7 lamps for each digit is a sixth lamp which may be of a distinctive color and which when lighted indicates that the lamp group with which it is associated will not be lighted as there is no corresponding information as the controlling register is not to be filled. The exceptions to the two-out-of-five rule are the month, and X punches which will be described below. The items of information to be observed may be identified if desired by means of a chart, not shown, associated with the lamps. A lamp may be lighted at either end of the line to be read under control of the associated key.

The keys associated with the output register are supplied with ground from contact 10 of relay LPG operated, contact 3 of relay TCM released and through a chain circuit through a break contact of each of seven keys in the group to a make contact on the eighth or last key of the chain as follows: break contacts 1, 4, 1, 4, 4, 4 and 4 of keys Calling Office, Calling No., Called Office, Called No., CHG Time MU & CL, ANS Time, and Summary, respectively, to make contact 2 of key Month. If a key is operated, say the Calling Office key, the ground is transferred from this to a path which extends through the make contact 1 of the Calling Office key, break contacts 3 of the keys Calling No., Called Office, Called No., CHG Time MU & CL, ANS Time, and Summary and break contact 1 of key Month to parallel paths which connect to two make contacts in parallel on seven of the eight keys. These make contacts are contacts 2 and 3 of Calling Office key, contacts 3 and 4 of Called Office key and contacts 1 and 2 of keys CHG Time MU & CL, Calling No., Called No., ANS Time and Summary. With the key circuit thus arranged an operating circuit can be established only if one key is operated and all seven others of the group are normal.

Figure 72:
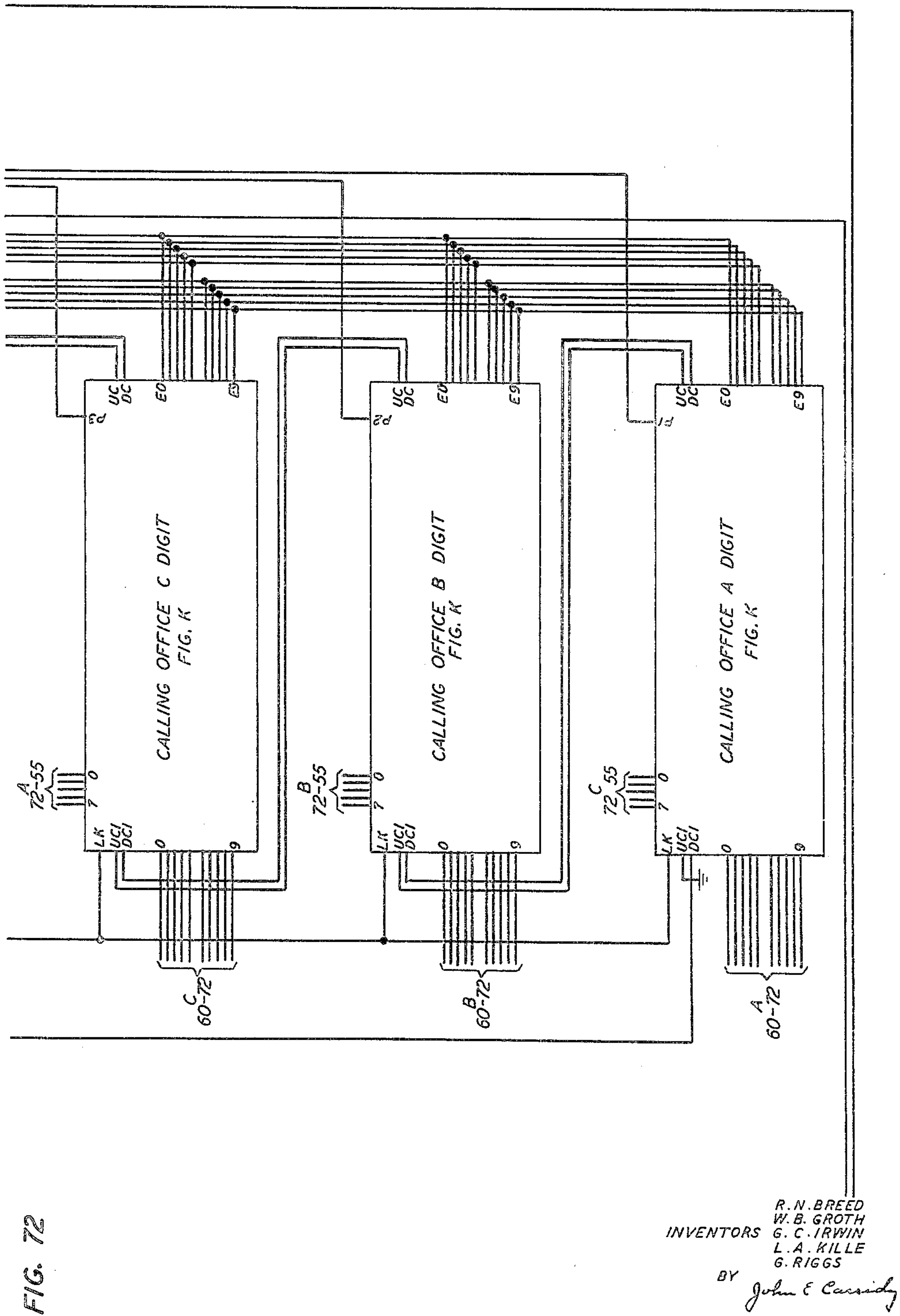

*Calling office key.*—The operation of the Calling Office key for detail calls or summaries will close a circuit from battery through the filament of line three lamps L3L and L3R in parallel, Fig. 13, to the ground shown to be connected in the circuit last traced to contact 3 of the Calling Office key, assuming this key only operated, to light the lamps. The operation of the Calling Office key also extends the ground connected to its make contact 2 through the winding of relay OFA, Fig. 55, to battery operating the relay. The A, B and C digits of the calling office may then be read from the D, E and F digit lights, respectively. For instance, in the case of lamp 1 of the D digit lamp group, a circuit may be traced from battery through the filament of lamp 1, contact 2 of relay OFA to the Calling Office A Digit register, Fig. 72, represented by a rectangle, the details of which are shown in Fig. K, where it is connected to ground through a contact on a relay in the register circuit, the operation of which and of the other register circuits shown in Figs. 63 to 72 will be made clear hereinafter. Calling office designation is derived from a translator in a manner to be described.

*Calling number key.*—The operation of the calling number key, Calling No., Fig. 13, will connect battery through the filaments of line 1 lamps, L1L and L1R, in parallel to contact 1 of the key, to which ground is connected when this key alone is operated, lighting the lamps. Simultaneously, ground is extended through contact 2 of the key and the winding of relay NA, Fig. 55, to battery operating relay NA. The operation of relay NA connects battery through the filament of each of the lamps in groups B, C, D and E, Fig. 52, through the contacts of relay NA to ground in the Calling Number Thousands, Calling Number Hundreds, Calling Number Tens registers, Fig. 71, and Calling Number Units register, Fig. 70, respectively. The registers are indicated by a rectangle in these figures and are shown in detail in Fig. D. The calling number thousands, hundreds, tens and units may then be read from the B, C, D and E digit lamps, respectively. The calling number for both detail calls and summaries is derived from the C, D, E and F digits of the first line of the entry.

*Called office key.*—The operation of the Called Office key for detail calls connects battery through the filaments of line 3 lamps, L3L and L3R, in parallel, and contact 13 of relay DA to contact 4 of the key, to which ground is connected when this key alone is operated to light the lamps for line 3. The operation of the key will also connect ground through its contact 3 and the winding of the lamp connector relay CDA to battery to operate the relay. The operation of relay CDA connects registers for Called Area and Called Office A Digit, Fig. 68, and Called Office B Digit and Called Office C Digit, Fig. 67, to the C, D, E and F digit lamps, respectively. The registers are shown in detail in Fig. D. The area and three called office digits are read from the B, C, E and F digits, respectively, of the third line of a detail call entry.

*Called number key.*—The operation of the Called Number key for detail calls connects battery through the filaments of line 1 lamps L1L and L1R in parallel through contact 12 of relay DA and contact 2 of the key, to which ground is connected as described to light the lamps for line 1. The operation of the key will also connect ground through its contact 2 and the winding of the lamp connector relay CNA to operate the relay. The operation of relay CNA connects the registers for the Called Number Units, Called Number Tens, Fig. 65, Called Number Hundreds, Called Number Thousands, Called Number Ten Thousands, Fig. 66, and Called Party, Fig. 67 to the Output Register lamps, Fig. 52. The registers are shown in detail in Figs. C, D, E and F as indicated in the corresponding rectangle on the drawing. The called number may then be read from the A through F digit lamps as follows:

*a.* A three-digit number will light the C, D and E digit Output Register Lamps for hundreds, tens and units, respectively. Ground from contacts 2 and 1 of relay NPY operated in the Called Party register, Figs. 67 and F through contacts 11 and 33, respectively, of relay CNA will light lamp BL in lamp group A and lamp BL in lamp group F, Fig. 52, while ground from contact 5 of relay 3DN operated through contact 17 of relay CNA and the filament of lamp BL in group B will light this lamp.

*b.* A four-digit number will light the B, C, D and E digit lamps for thousands, hundreds, tens and units, respectively. Ground from NPY operated will light lamp BL in lamp group A and BL in lamp group F, Fig. 52, as described in the foregoing.

*c.* A four-digit number with a party letter will light the B, C, D and E digit lamps, Fig. 52, as above and in addition two F digit lamps to indicate the IBM underpunch equivalent of the party letter. Ground from the operated relay in the party output register will light lamp BL in group A, Fig. 52 as described in the foregoing.

*d.* A five-digit number will light the A, B, C, D and E digit lamps for ten thousands through units, respectively. Since a five-digit number will never have a party letter, lamp BL in group F will not be lit. Called number for a detail call is read from the B through F digits of the fourth line of the tape entry.

*Charge time MU and class key.*—The operation of the charge time, message units and class, CHG Time, MU and CL, key will connect battery through lamps L4L and L4R in parallel and contact 15 of relay DA operated to ground on contact 1 of the key to light the lamps. Simultaneously ground will be supplied from contact 2 of the key through contact 16 of relay DA and the winding of lamp connector relay CUA, Fig. 52, to operate relay CUA. Automatic message accounting class, minute, tens and units of chargeable time and tens and units of message units may then be read for detail calls from the B, C, D, E and F digit lamps, respectively. When message units are to be blanked, a ground from contact 5 of relay NMU operated, Fig. 62, will ight lamps BL of group E and BL of group F. For charge calls, ground through contact 1 of relay 11X, Fig. A, Fig. 63, and contact 7 of relay CUA, Fig. 62, will light lamp Charge X. For no charge calls, ground through contact 1 of relay 12Y, Fig. A, Fig. 63, and contact 1 of relay CUA will light lamp No Charge Y. Automatic message accounting class is derived from a translator and tens and units of chargeable time and message units are read from the C through F digits of the fifth line of a detail call entry.

Figure 54:
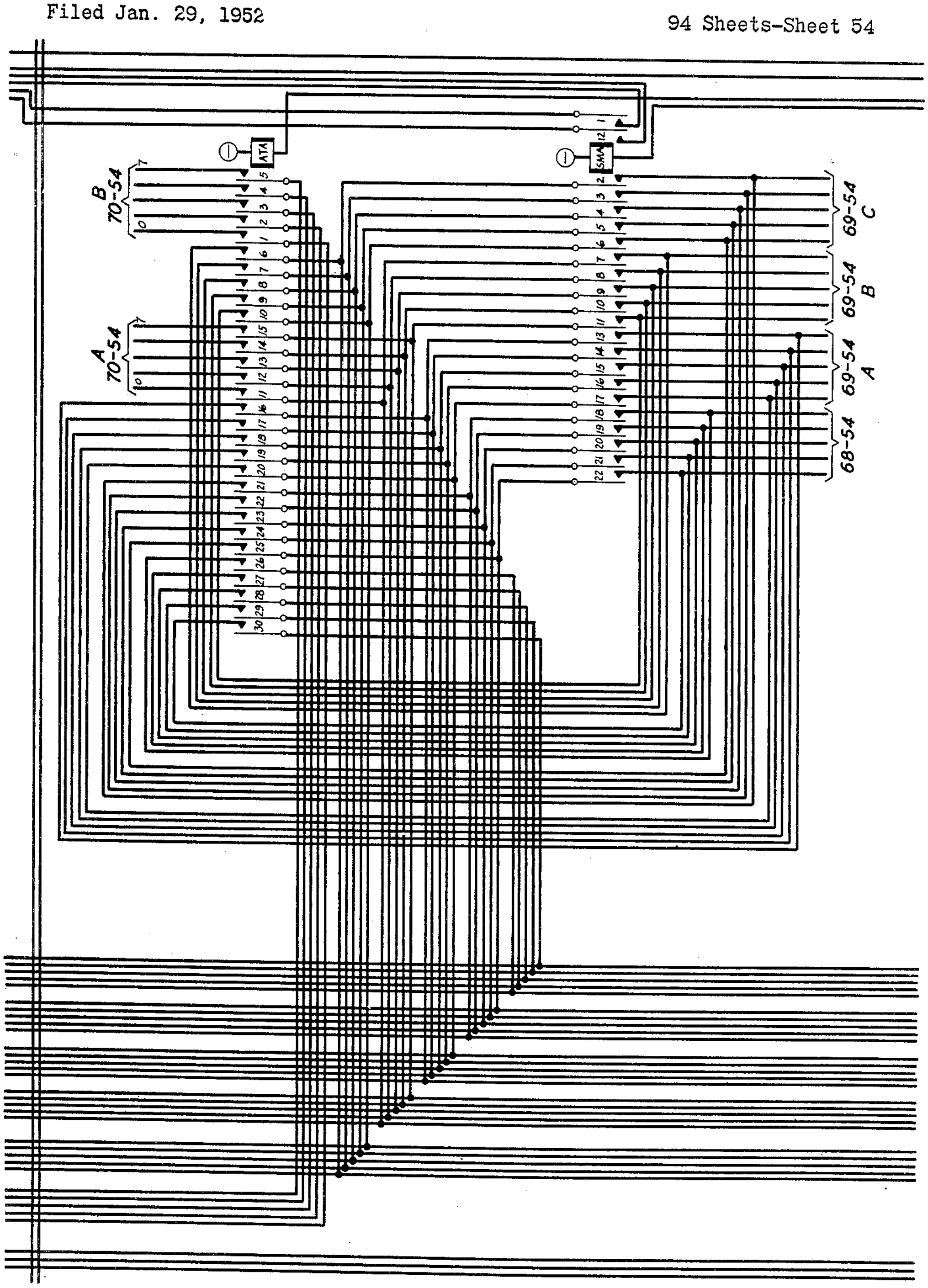
Figure 55:
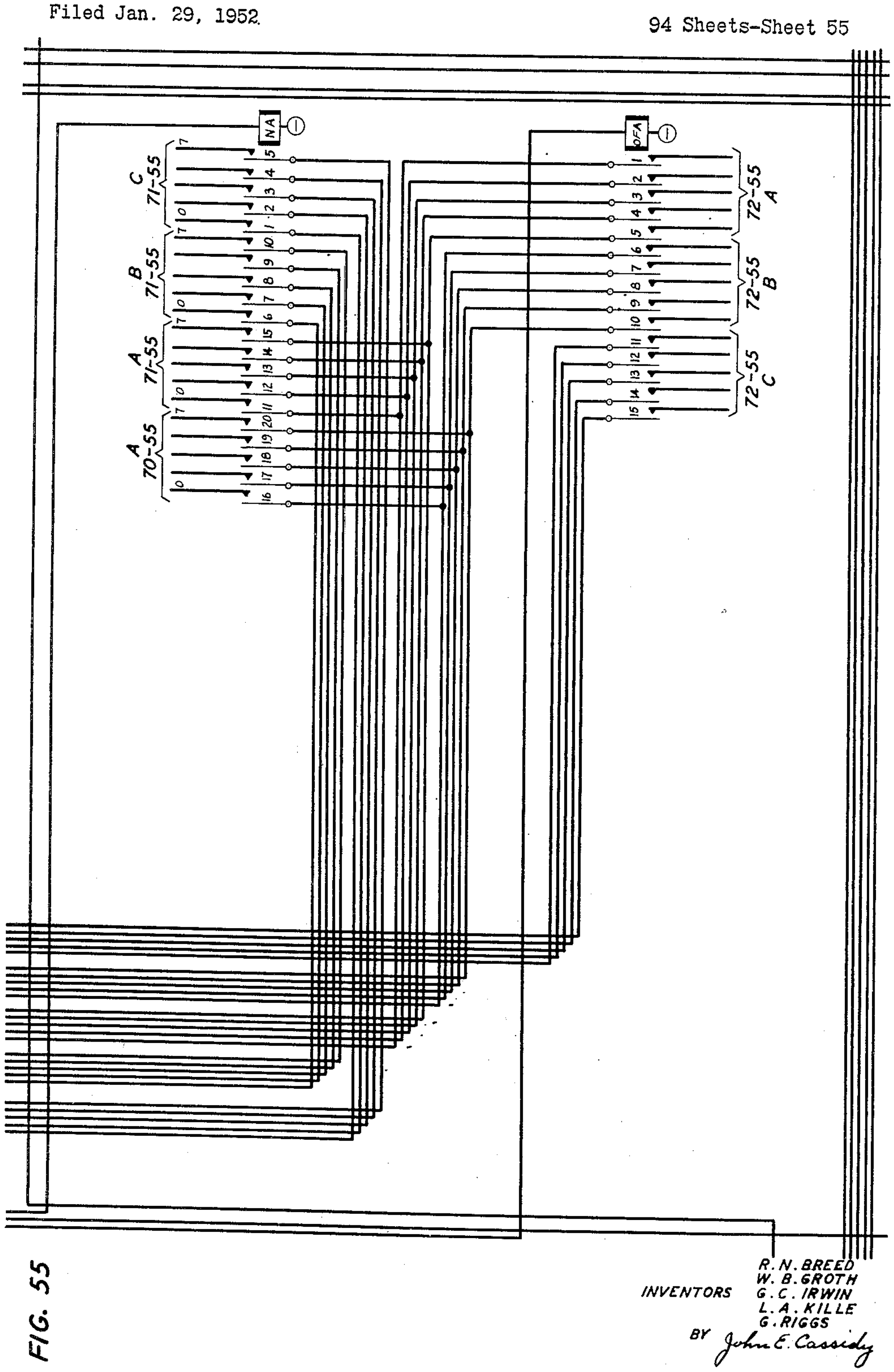

*Answer time key.*—The operation of the answer time ANS Time key for detail calls will light the lamps for line 2 L2L and L2R through contact 14 of relay DA and contact 1 of the key and will operate the lamp connector relay ATA, Fig. 54, through contact 2 of the key and contact 11 of relay DA. The operation of relay ATA will connect the registers for Answer Day Tens, Fig. 70, Fig. J, Answer Day Units, Fig. 69, Fig. D, Answer Hour Tens, Fig. 70, Fig. H, Answer Hour Units, Fig. 69, Fig. D, Answer Minute Tens, Fig. 69, Fig. G and Answer Minute Units, Fig. 68, Fig. D to the A through F digit lamps, Fig. 52, respectively. The three units digits of answer time are taken directly from the D, E and F digits of the second line of a detail entry. The three tens digits are derived from a translator.

Figure 63:
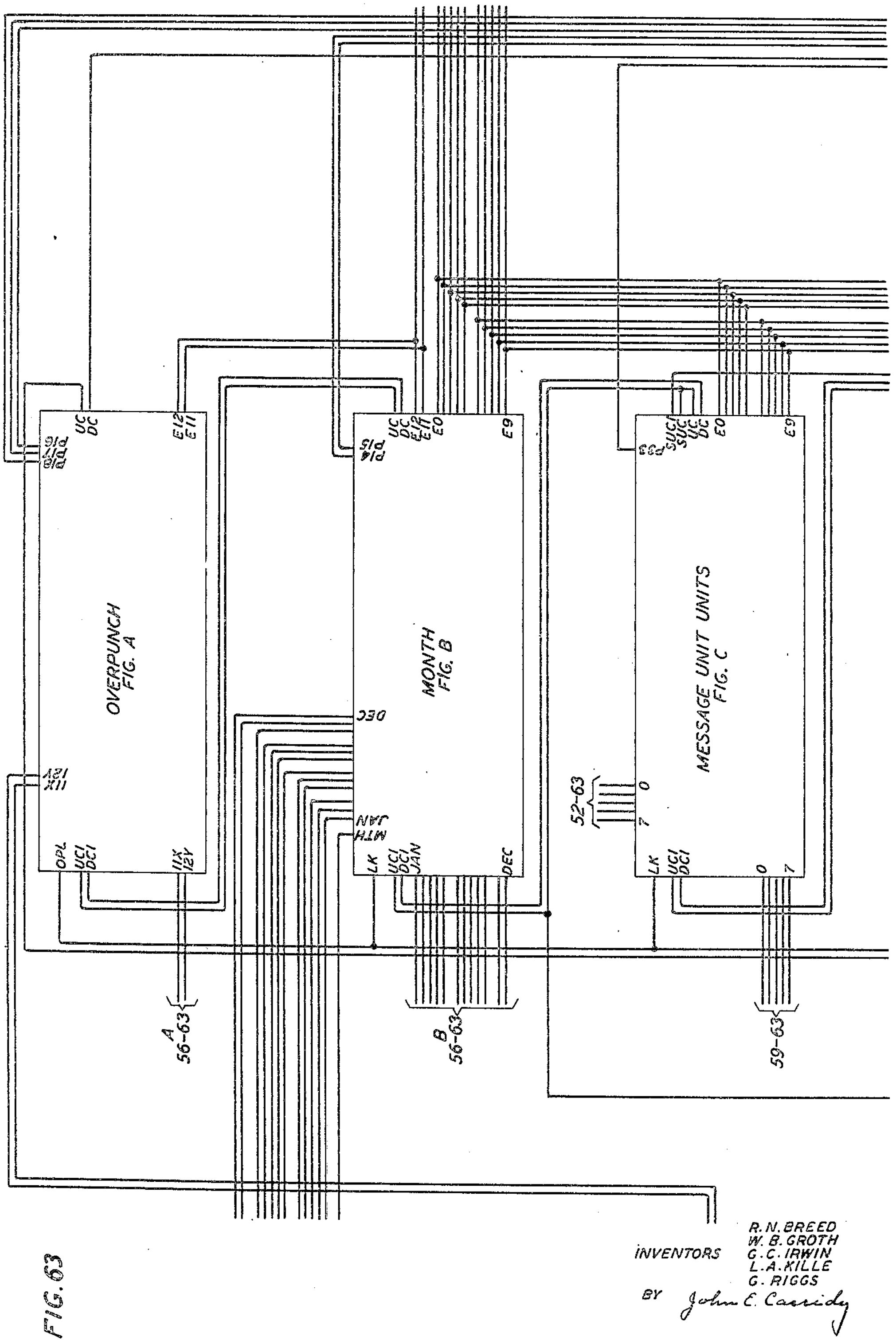

*Month key.*—The operation of the Month key for detail calls or summaries will extend ground through contact 1 of some one of the twelve relays JAN to DEC in the month register, Fig. B in Fig. 63, to light a corresponding one of the twelve JAN to DEC lamps. The JAN–DEC month is derived from the set-up switches.

*Summary key.*—The operation of the Summary key for summaries only will light the lamps for line 1, L1L and L1R through contact 21 of relay SA and contact 1 of the key and will operate the lamp connector relay SMA from ground through contact 2 of the key and contact 22 of relay SA. The operation of relay SMA will connect the registers for the Summary Thousands, Fig. G, Fig. 69, Summary Hundreds, Fig. D, Fig. 69, Summary Tens, Fig. D, Fig. 69, and Summary Units, Fig. D, Fig. 68 to the groups of lamps for the B, C, D and E digit, respectively. The message units of a summary entry are read contact 1 of relay 12Y operated in register A, Fig. 63 directly from the C, D, E and F digits of the second line. If there are fewer than 1000 message units, ground from contact 1 of relay 12Y operated in register A, Fig. 63, through contact 1 of relay SMA operated will light lamp Under 1000 MU Y, Fig. 52. If there are 1000 message units in the summary ground from contact 1 of relay 11X operated in the Overpunch register Fig. A, Fig. 63, through contact 12 of relay SMA operated will light lamp 1000 MU X.

*Types of tapes and tape identity checking.—Detail type tape.—Reading and checking leading tape identity.*—When the reader has stepped the tape by all the 081010 lines of splice pattern the next line read is the first line of leading tape identity. The operating ground of the L1 to L9 relays is a path which will hereafter be called the 289 check. The 289 check starts from ground through G1 contact closed and break contact 1 of relay RK released or G2 contact closed and make contact 2 of relay RK operated, through contact 9 of relay ST3 operated, contact 8 of relay RCD operated, through two-out-of-five check of the B, C, D, E and F digit reading relays, contact 3 of relay A0, contact 2 of relay A1 released, contact 2 of relay A2 operated, contact 2 of relay B7 and contact 2 of relay B1 operated, contact 2 of relay C7 and contact 3 of relay C2 operated and contact 1 of relay SR1 operated at which point it is steered to the proper L1 to L9 relays by the particular D digit reading relays, Fig. 26, which are operated.

In anticipation, and as an elaboration of the detailed description to follow, it will be observed that the so-called 289 check, which checks the lines of tape identity, starts from ground on the G1 or G2 contact of the reader, passes through the contacts of several control relays and then through a two-out-of-five check of the B, C, D, E and F sections of the tape reading relays shown in Figs. 16, 26 and 36. This insures first that there is a plausible operation of these sections of the tape reading relays. Then the path is required to pass through contacts of a relay which identifies a 2 in the A section, and through contacts of two relays in each of the B and C sections which identify an 8 in the B section and a 9 in the C section of the same reading relays. Since each of the nine consecutive lines on the tape assigned to tape identity has 289 for its first three digits, after completing the two-out-of-five check for each line, the relays identifying 2, 8 and 9 in the A, B and C sections, respectively, of the tape reading relays must be found to be operated when checked for each of the nine lines. Following the first three or A, B, C digits, that is following 289, the fourth or D digit corresponds to the number of the line in the nine line sequence of tape identity. For the first line, the number following 289 is 1, for the second line, following 289 the number is 2, that is the first four digits of the first line are 2891 and of the second line they are 2892, and so on for the nine lines of tape identity. The path extends through the contacts of two relays in the D section of the line reading relays identifying 1 for the first line, a 2 for the second line and so on consecutively for each of the nine lines. The path after passing through this fourth or D digit section of the line reading relays is then further extended through a contact on each of a group of check line relays, identified as CL9 to CL1 in Figs. 35 and 45, to operate an individual L– or line relay for each line corresponding to the number of the tape identity line being read. These relays, shown in Figs. 35 and 45, are designated as relays L1 to L9 inclusive for tape identity lines 1 to 9, respectively. Each of these nine L– relays must be operated in numerical sequence by the nine lines of tape identity.

It will be observed that only four, the left-hand four, of the six digits appearing in each line of tape identity are required to effect the operation of the L– relay corresponding to the particular line. In the case of certain of the lines of tape identity the digits in the E and F, or fifth and sixth positions of the line are significant and in other lines they are not. In the case of the first line of leading tape identity the fifth digit identifies the type of tape and must be compared with a setting of the tape type switch shown in Fig. 32. As mentioned heretofore, the tape type switch, and other switches, shown at the top of Figs. 32 and 42, are set manually before a tape is run to certain positions corresponding to those which identify the type of tape and which check other information which identifies the tape expected to be run. It is assumed that the number 5 in the fifth or E digit position identifies the tape being presently considered. After the L1 relay, corresponding to line 1, is operated, the 289 check path is again extended through contacts of two relays corresponding to the digit 5 in the E section of the reading relays and through a corresponding contact on the tape type switch. It will be observed that there are four banks on the tape type switch. Each of the four banks has six terminals thereon. In the unoperated position of the switch, the manually operated rotary contact individual to each bank is in engagement with the top or number 1 terminal of each bank. There are five active terminals on each of the four banks. The second to the sixth terminals inclusive, in each instance correspond to tape types which are identified by digits 1 to 5. When the rotors of the tape type switches are manually operated to engage the lowest or sixth terminal in each bank they are in position to check tapes whose identifying number is 5. This is checked against the information in the fifth or E digit position of the number appearing in the first of the nine lines of tape identity. Thus, of the digits appearing in the first line of leading tape identity, namely 28915X, the 2, 8 and 9 constitute the 289 check. This appears in each of the nine lines of tape identity, both leading and trailing. The fourth digit, which is 1, identifies line 1. The fifth digit which is 5 identifies the tape type. The setting of the E group of relays for this line must be checked against the setting of the tape type switch. The sixth digit X is without significance in the present machine, except that the position must be filled with some digit to afford the two-out-of-five check.

In the second line the digits are 2892MG. The 289 affords the 289 check and identifies the entry as one of the nine lines of tape identity. The 2 in the fourth, or D digit, position identifies the second line. It operates relays in the D section of the register and then the relay L2 for line 2. The operation of relay L2 in turn checks the information in the fifth or E digit position and in the sixth or F digit position recorded in the second line of tape identity in the tape and in the E and F groups of reading relays against the setting of the marker group tens and marker group units switches which have been preset manually. To identify the marker group, in which marker group the tape being processed originates, requires a two-digit number. Therefore two marker group switches are required, one for the digit in the tens position of the marker group number and one for the digit in the units position. Therefore the operation of relay L2 in turn checks the digit in the fifth or E section of the second line of tape identity and reading register against the setting of the marker group tens switch and also checks the digit in the sixth position against the setting of the marker group units switch.

The digits in the E and F positions of the third, fourth, fifth and sixth lines of leading tape identity, even when specific digits are indicated in these positions in any of these lines, are without significance in the present machine. Where specific digits are indicated they have significance in other types of machines employed in tape processing.

In the case of the seventh line of leading tape identity, the digit in the fifth or E position and the digit in the sixth or F position of the number are checked against the setting of the last day tens and last day units switches at the top of Fig. 42. The tape identity information includes an item which identifies the last day of the period on which the tape being run applies. This is checked by means of a comparison of the digits in the E and F sections of the line reading relays against the setting of the last day tens and last day units switches after relay L7 is operated in the usual manner.

In the ninth line of tape identity the E and F digits represent the month tens and month units and are checked against the setting of the corresponding switches at the top of Fig. 42.

Each of the six digit numbers in each of the nine lines of trailing tape identity is the same as the number of the corresponding line of leading tape identity. Each tape is thus double checked once before and once after being run. This affords insurance against the erroneous splicing of portions of two different tapes should a tape be torn in processing for instance.

*Line 1 (Tape type)*.—The first line of tape identity is 28915X. X is any number in the F digit. Relay L1 operates from ground through the 289 check through contact 2 of relay D0 and contact 4 of relay D1 operated, through contact 4 of relay CL9, contact 3 of relay CL8, contact 5 of relay CL7, and contact 3 of each of relays CL6, CL5, CL4, CL3, CL2, CL1 and the winding of relay L1 to battery. Relay L1 operated locks through its contact 4 around contact 3 of relay CL1 to its operating path. The operation of relay L1 by opening its contact 1 releases relay SKP and closes a ground from 289 check through contact 12 of relay TIE released, contact 2 of relay L1 operated, contact 2 of relay E1 and contact 5 of relay E4 operated, contact 6 and arm 1 of Tape Type switch, contact 8 of relay L1 operated, arm 2 and contact 6 of Tape Type switch, contact 7 of relay L1 operated through terminal 16, Column 7, Fig. 83, through the punch plug board connector, through terminal 15, column 7, Fig. 83, and the winding of relay RS, Fig. 15, to battery to operate relay RS which locks through its terminals 3 to H3 break contact of the reader. Relay L1 through its contact 10 also closes a ground to operate relay T1, Fig. 35, which locks through its contact 2, contact 13 of relay TIE released and contact 11 of relay ST3 operated to ground. The operation of relay RS closes ground from contact 9 of relay SKP released, contact 6 of relay RS, contact 5 of relay L1 operated and the winding of relay CL1 to battery to operate relay CL1 and by closing contact 1 of relay RS operates the STEP magnet of the reader. Relay CL1 operated locks through its contact 2 operated, contacts 2 of relay CL2 to CL6, respectively, contact 4 of relay CL7, contact 2 of relay CL8, contact 3 of relay TIE and contact 11 of relay ST3 to ground. Relay CL1 operated closes a path from ground through contact 11 of relay MON through Tape Type switch arm 4, contact 6, contact 4 of relay CL1 operated and the winding of relay ETT to battery to operate relay ETT which locks through its contact 2 and resistor 345 to the operating path around contact 4 of relay CL1. Relay L1 releases when the reading relays release.

*Line 2 (marker group)*.—The second line of tape identity is 2892MG. M is the marker group tens in the E digit and G is the marker group units in the F digit. Delay L2 operates from ground through the 289 check through contact 2 of relay D0 and contact 4 of relay D2 operated, contact 1 of relay CL1 operated and the winding of relay L2 to battery and locks through its contact 3 to the operating path around contact 1 of relay CL1. Relay L2 closes a ground from contact 1 of relay L2 operated, through two E digit reading relays operated, such as contact 3 of relay E2 and contact 4 of relay E7 for digit 9 to lead 9, through marker group tens, Marker GRP Tens, switch contact 11, arm 1, contact 5 of relay L2 operated, marker group units, Marker GRP Units, switch arm 1, some contact such as 8 corresponding to digit 6, through two F digit reading relays operated, for digit 6, contact 4 of relay F4 and contact 2 of relay F2, contact 2 of relay L2 operated and the winding of relay RS to operate relay RS which locks to the H3 break contact of the reader. The marker group tens and marker group units switches are preset to positions in accordance with information received with the tape. If the tape digits E and F respectively match the positions of the switches when reading the second line, the path will be closed through. The operation of relay RS by closing its contact 6 closed ground from contact 9 of relay SKP released through contact 4 of relay L2 operated and the winding of relay CL2 to operate relay CL2 and operates magnet STEP of the reader. Relay CL2 locks from ground on contact 11 of relay ST3 operated, contact 3 of relay TIE released, through a path traced through contacts of relays CL3 to CL8 released and contact 2 of relay CL2. Relay CL2 operated, by opening its back contact 2, releases relay CL1. Relay CL2 also closes ground from contact 17 of relay MON operated, through arm 3 and the odd or even contacts of the Marker Group Tens switch, contact 7 or 6 of relay CL2 operated and the winding of relay OGT or EGT to battery to operate either relay OGT or EGT, respectively. The operated relay then locks through its respective contact 2 and resistance 342 or 346 to the operating path around the contact of relay CL2. At the same time ground is closed from contact 17 of relay MON operated, through arm 3 and the odd or even contacts of the Marker Group Units switch, contacts 5 or 4 of relay CL2 operated and the winding of relay OGU or EGU, respectively, to operate either relay OGU or EGU. The operated relay locks through its respective contact 2 and resistance 343 or 347 to the operating path around the contact of relay CL2. The operation of relay OGT or EGT and OGU or EGU depends on the positions of the switch settings. Relay L2 releases when the reading relays release.

*Line 3*.—The third line of tape identity is 2893XX. X represents any number in the E and F digits. Relay L3 operates from ground through the 289 check, contact 2 of relay D1, contact 3 of relay D2 operated, contact 1 of relay CL2 operated and the winding of relay L3 to battery and locks to the operating path around contact 1 of relay CL2. Relay L3 operated closes a ground to operate relay RS over a path which should be understood from the foregoing. Relay RS operated locks to H3 break contact of reader. The operation of relay RS closes ground from contact 9 of relay SKP released, through contact 6 of relay RS, contact 3 of relay L3 operated and the winding of relay CL3 to operate relay CL3. The operation of relay RS also operates the Step magnet of the reader. Relay CL3 locks to relay ST3 operated, relay TIE released and through contacts of relays CL4 to CL8 released and unlocks relay CL2. Relay L3 releases when the reading relays release. These operations should be apparent from the detailed descriptions under previous headings.

*Line 4*.—The fourth line of tape identity is 2894XX. X represents any number in the E and F digits. Relay L4 operates from ground through the 289 check, contact of relay D0 and contact of relay D4 operated, contact 1 of relay CL3 operated and locks to the operating path around contact 1 of relay CL3. Relay L4 closes a ground to operate relay RS which locks to H3 break contact of the reader. The operation of relay RS closes ground through relay SKP released and relay L4 operated to operate relay CL4 and operates the Step magnet of the reader. Relay CL4 locks to relay ST3 operated, TIE released and through contacts of relays CL5 to CL8 released and unlocks CL3. Relay L4 releases when the reading relays release. The circuits are similar to circuits heretofore traced. These operations should be understood from the foregoing.

*Line 5 (central office)*.—The fifth line of tape identity is 289500. Relay L5 operates from ground through the 289 check, contact 2 of relay D1, contact 4 of relay D4 operated, contact 1 of relay CL4 operated and the winding of relay L5 to battery and locks to the operating path around contact 1 of relay CL4. Relay L4 closes a ground from contact 1 through contact 4 of relay L5 operated, contact 10 of relay DA operated, through contact 1 and arm 1 of Central Office switch normal, contact 5 of relay L5 operated and the winding of relay RS to operate relay RS which locks to H3 break contact of the reader. The operation of relay RS closes ground from relay SKP released and through relay L5 operated to operate relay CL5 and operates the Step magnet of the reader. Relay CL5 locks to relay ST3 operated, relay TIE released and through contacts of relays CL6 to CL8 released and unlocks relay CL4. Relay CL5 also closes ground from contact 17 of relay MON operated, through arm 1 and the odd contacts of the Central Office switch, contact 5 of relay CL5 operated and the winding of relay OCO to operate relay OCO which locks to the operating path around contact 5 of relay CL5. Relay L5 releases when the reading relays release.

*Line 6*.—The sixth line of tape identity is 289690. Relay L6 operates from ground through the 289 check through contact 2 of relay D2 and contact 3 of relay D4 operated, contact 1 of relay CL5 operated and the winding of relay L6 to battery and locks to the operating path around contact 1 of relay CL5. Relay L6 closes a ground to operate relay RS which locks to the H3 break contact of the reader. The operation of relay RS closes ground from relay SKP released and through a contact of relay L6 operated to operate relay CL6 and operate the Step magnet of the reader. Relay CL6 locks to relay ST3 operated, relay TIE released and through contacts of relays CL7 and CL8 released, and unlocks relay CL5. Relay L6 releases when the reading relays release. Corresponding circuits have heretofore been traced for other "lines."

*Line 7 (last day)*.—The seventh line of tape identity is 2897LD. L is the Last Day Tens in the E digit and D is the Last Day Units in the F digit. Relay L7 operates from the ground through the 289 check through contact 2 of relay D7 and contact 3 of relay D0 operated, contact 1 of relay CL6 operated and the winding of relay L7 to battery and locks to the operating path around contact 1 of relay CL6. Relay L7 closes a ground from its contact 1 through contact 18 of relay DA operated, and the winding of relay RS to operate relay RS which locks to the H3 break contact of the reader. The operation of relay RS closes ground from contact 9 of relay SKP released, contact 6 of relay RS, contact 4 of relay L7 operated and the winding of relay CL7 to operate relay CL7 and operates the Step magnet of the reader. Relay CL7 locks to relay ST3 operated, relay TIE released and relay CL8 released and unlocks relay CL6. Relay CL7 also closes ground from contact 3 of the TH selector normal, through contact 4 of relay DA operated, contact 7 of relay CL7 operated and the winding of magnet ROT to energize the rotary, ROT, magnet of the TH selector. The ROT magnet steps the TH selector off-normal which opens contact 3 of the TH selector which in turn de-energizes the magnet ROT. The TH selector closes a ground through contact 2 and the winding of relay MLK1 to operate relay MLK. Relay CL7 closes ground from contact 18 of relay MON operated through arm 4 of Last Day Units switch, odd or even contacts of the switch depending on the setting, through contacts 10 or 9 of relay CL7 and the winding of relay ODU or EDU to battery operating either relay ODU or EDU. The operated relay locks through its respective contact 2 and resistor 442 or 446 around the contact of relay CL7 in its operating path. Corresponding circuits may be traced through the Last Day Tens switch to operate and lock relay ODT or EDT. Relay L7 releases when the reading relays release.

*Line 8* (*thousands and flexible*).—The eighth line of tape identity is 2898X0. X represents any number in the E digit and since the circuit, as shown, is arranged for processing on a flexible basis rather than a round basis the F digit is 0. Relay L8 operates from ground through the 289 check, contact 2 of relay D7 and contact 1 of relay D1 operated, contact 3 of relay CL7 operated and the winding of relay L8 to battery and locks to the operating path around contact 3 of relay CL7. Since processing is on a flexible period basis the operating path of relay RS is from ground on contact 1 of relay L8 operated through contact 5 of relay DA operated and the winding of relay RS to operate relay RS. The operation of relay RS closes ground from contact 9 of relay SKP released through contact 6 of relay RS, contact 4 of relay L8 operated and the winding of relay CL8 to operate relay CL8 and operates the Step magnet of the reader. Relay CL8 locks to relay ST3 operated and relay TIE released and unlocks relay CL7. Relay L8 releases when the reading relays release.

*Line 9* (*month*).—The ninth line of tape identity is 2899M0. M represents Month Tens in the E digit and 0 represents Month Units in the F digit. Relay L9 operates from ground through the 289 check through contact 2 of relay D2 and contact 3 of relay D7 operated, contact 1 of relay CL8 operated and the winding of relay L9 to battery and locks to the operating path around contact 1 of relay CL8. Relay L9 closes a ground from contact 1 of relay L9 operated, through contacts of two E digit reading relays operated, such as relay E7, contact 5 and relay E4, contact 3, through contact 1 of the Month Tens switch, switch arm 1, contact 5 of relay L9 operated, Month Units switch arms 1 and contact 1, through the contacts of two F digit reading relays operated, for the 0 digit, contact 3 of relay F7 and contact 2 of relay F4, contact 2 of relay L9 operated and the winding of relay RS to battery to operate relay RS which locks to H3 break contact of the reader. If the tape digits E and F, respectively, match the positions of the Month Tens and Month Units switches when reading the ninth line, the path will be closed through. The operation of relay RS closes ground from contact 9 of relay SKP released, contact 6 of relay RS, contact 4 of relay L9 operated and the winding of relay CL9 to battery to operate relay CL9 which locks to relay CL8 operated. Relay CL9 operates relay TIE from ground through contact 1 of relay CL9 and closes ground from contact 19 of relay MON operated, through switch arm 3 and say contact 2 of the Month Tens switch and contact 7 of relay CL9 operated and the winding of relay EMT to battery or through contact 3 of the switch and contact 8 of relay CL9 and the winding of relay OMT to operate either relay EMT or OMT. The operated relay locks to the operating path around the contact of relay CL9 in its operating path. At the same time ground is closed from contact 19 of relay MON operated, through arm 4 and either the odd or even contacts of the Month Units switch and contact 6 or 5 of relay CL9 operated and the winding of relay OMU or EMU to operate either relay OMU or EMU. The operated relay locks to the operating path around the contact of relay CL9 in its respective operating path. The operation of relay OMT or EMT and relay OMU or EMU depends on the position of the switch settings. Relay TIE locks from battery through its winding and contact 6, through contact 21 of relay MON operated, contact 1 of relay SP6 and contact 10 of relay L1 to ground. The operation of relay TIE by opening its contact 3 unlocks relays TI and CL8, the latter which in turn by opening its contact 4 unlocks relay CL9. Relay L9 releases when the reading relays release. Relay TIE by closing its contact 2 also operates relay CTI which locks through its contact 4 and contact 7 of relay MLK operated to ground.

*Reading and checking trailing tape identity*.—When the reader has stepped the tape by the last call entry, the next line read is the first line of trailing tape identity.

*Line 1*.—The first line of tape identity is 28915X. X represents any number in the F digit. Relay L1 operates from 289 check through D0 and D1 operated and through CL9 to CL1 released and locks through its contacts 4 and 6 and contact 11 of relay TIE operated to ground. When the late make contact J0 of the reader opens, relay TIE releases which in turn unlocks relay L. On the next cycle of the reader the first line is re-read and operation is the same as line 1 of leading tape identity.

*Line 2–line 6*.—Operation is the same as line 2 to line 6 of leading tape identity.

*Line 7*.—Operation is the same as line 7 of leading tape identity except for the operation of CL7 does not energize the ROT magnet.

*Line 8–line 9*.—Operation is the same as line 8 and line 9 of leading tape identity.

*Message unit detail type tape.—Reading and checking leading tape identity*.—When the reader has stepped the tape by all the 081010 lines of splice pattern the next line read is the first line of leading tape identity.

*Line 1*.—The first line of tape identity is 28913X. Operation is the same as line 1 of leading tape identity of detail tapes except the operating path of relay RS is from ground through the 289 check, through contact 12 of relay TIE released, contact 2 of relay L1 operated, contact 2 of relay E1 and contact 4 of relay E2 operated, contact 4 and arm 1 of Tape Type switch, contact 8 of relay L1 operated, arm 2 and contact 4 of the Tape Type switch, contact 7 of relay L1 operated, contact 16 of column 7, Fig. 83, the Punch Plug Board Connector, contact 15 of column 7 and the winding of relay RS to battery.

*Line 2–line 9*.—Operation is the same as line 2 to line 9 of leading tape identity of detail tapes.

*Reading and checking trailing identity*.—When the reader has stepped the tape by the last call entry, the next line read is the first line of trailing tape identity.

*Line 1*.—The first line of tape identity is 28913X. Operation is the same as line 1 of trailing tape identity of detail tapes except the operating path of relay RS is ground from 289 check, through contact 12 of relay TIE released, contact 2 of relay L1 operated, contact 2 of relay E1 and contact 4 of relay E2 operated, contact 4 and arm 1 of Tape Type switch, contact 8 of relay L1 operated, arm 2 and contact 4 of Tape Type switch, contact 7 of relay L1 operated, through contact 16 of column 7, through punch plug board connector, through contact 15 of column 7 and the winding of relay RS to battery operating relay RS.

*Line 2–line 9.*—Operation is the same as line 2 to line 9 of leading tape identity of detail tapes.

*Toll type tape.—Reading and checking leading tape identity.*—When the reader has stepped the tape by all the 081010 lines of splice pattern the next line read is the first line of leading tape identity.

*Line 1.*—The first line of tape identity is 28912X. Operation is the same as line 1 of leading tape identity of detail tapes except as follows: The operating path of RS is ground from 289 check, through contact 12 of relay TIE release, contact 2 of relay L1 operated, contact 2 of relay E0 and contact 5 of relay E2 operated, contact 3 and arm 1 of Tape Type switch, contact 8 of relay L1 operated, arm 2 and contact 3 of Tape Type switch, contact 7 of relay L1 operated, through contact 16 of column 7, through the punch plug board connector, contact 15 of column 7 and through the winding of relay RS to battery. Ground is connected from contact 17 of relay MON operated, through arm 4 and an odd contact of Tape Type switch, contact 5 of relay CL1 operated and the winding of relay OTT to operate relay OTT instead of relay ETT. Relay OTT locks through resistor 341 to its operating path around CL1 contact.

*Line 2–line 9.*—Operation is the same as line 2 to line 9 of leading tape identity of detail tapes.

*Reading and checking trailing tape identity.*—When the reader has stepped the tape by the last call entry, the next line read is the first line of trailing tape identity.

*Line 1.*—The first line of tape identity is 28912X. Operation is the same as line 1 of trailing tape identity of detail tapes except as follows: Operating path of relay RS is ground from 289 check, through contact 12 of relay TIE released, contact 2 of relay L1 operated, contact 2 of relay E0 and contact 5 of relay E2 operated, contact 3 and arm 1 of Tape Type switch, contact 8 of relay L1 operated, arm 2 and contact 3 of Tape Type switch, contact 7 of relay L1 operated, through contact 16 of column 7, through the punch plug board connector, contact 15 of column 7 and the winding of relay RS to battery operating relay RS. Relay OTT remains locked.

*Line 2–line 9.*—Operation is the same as line 2 to line 9 of trailing tape identity of detail tapes.

*Observing type tape.—Reading and checking leading tape identity.*—When the reader has stepped the tape by all the 081010 lines of splice pattern the next line read is the first line of leading tape identity.

*Line 1.*—The first line of tape identity is 28914X. Operation is the same as line 1 of leading tape identity of detail tapes except as follows: The operating path of relay RS is ground from 289 check, through relay TIE released, relay L1 operated, contact 3 of relay E4 and contact 3 of relay E0 operated, contact 5 and arm 1 of Tape Type switch, contact 8 of relay L1 operated, arm 2 and contact 5 of Tape Type switch, contact 7 of relay L1 operated, through contact 16 of column 7, through the punch plug board connector, contact 15 of column 7 and the winding of relay RS to battery, operating relay RS. Relay CL1 closes a ground from contact 17 of relay MON operated, through arm 4 and contact 5 of Tape Type switch and contact 5 of relay CL1 operated to operate relay OTT instead of relay ETT. Relay OTT locks through resistance 341 to its operating path around contact 5 of relay CL1.

*Line 2–line 9.*—Operation is the same as line 2 to line 9 of leading tape identity of detail tapes.

*Reading and checking trailing tape identity.*—When the reader has stepped the tape by the last call entry, the next line read is the first line of trailing tape identity.

*Line 1.*—The first line of tape identity is 28914X. Operation is the same as line 1, of trailing tape identity of detail tapes except as follows: Operating path of relay RS is ground from 289 check, through contact 12 of relay TIE released, contact 2 of relay L1 operated, contact 3 of relay E4 and contact 3 of relay E0 operated, contact 5 and arm 1 of Tape Type switch, contact 7 of relay L1 operated, arm 2 and contact 5 of Tape Type switch, contact 7 of relay L1 operated, contact 16 of column 7, through the punch plug board connector, contact 15 of column 7 and the winding of relay RS to battery operating relay RS. Relay OTT is not required to be operated as it is locked since its earlier operation.

*Line 2–line 9.*—Operation is the same as line 2 to line 9 of trailing tape identity of detail tapes.

*Message unit summary tape.—Reading and checking leading tape identity of first tape.*—When the reader has stepped the tape by all the 081010 lines of splice pattern the next line read is the first line of leading tape identity.

*Line 1.*—The first line of tape identity is 289117. Relay L1 operates from 289 check, through contact 2 of relay D0 and contact 4 of relay D1 operated, through a path heretofore traced, through the contact of relays CL9 to CL1 released and the winding of relay L1 to battery and locks to its operating path around contact 3 of relay CL1 contact. Relay L1 releases relay SKP and closes a ground from the 289 check, through contact 12 of relay TIE released, contact 2 of relay L1 operated, contact 2 of relay E0 and contact 3 of relay E1 operated, contact 2 and arm 1 of Tape Type switch, contact 8 of relay L1 operated, arm 2 and contact 2 of Tape Type switch, contact 4 of relay F0 and contact 2 of relay F7 operated, contact 3 of relay L1 operated, through contact 17 of column 7, through the punch plug board connector, contact 15 of column 7 and the winding of relay RS to operate relay RS which locks to H3 break contact of the reader. Contact 10 of relay L1 also closes a ground through the winding of relay T1 to operate relay T1 which locks through contact 3 of relay TIE released and contact 11 of relay ST3 to ground. The operation of relay RS closes ground from contact 9 of relay SKP released and through contact 6 of relay RS, contact 5 of relay L1 operated and the winding of relay CL1, to operate relay CL1 and operates the Step magnet of the reader. Relay CL1 locks through contacts of relays CL2 to CL8 released, contact 3 of relay TIE released and contact 6 of relay ST3 to ground. A ground is supplied from contact 17 of relay MON operated, through arm 4 and contact 2 of Tape Type switch, contact 4 of relay CL1 operated and the winding of relay ETT to battery to operate relay ETT which locks to its operating path around contact 3 of relay CL1 contact. Relay L1 releases when the reading relays release.

*Line 2-line 4.*—Operation is the same as line 2 to line 4 of leading tape identity of detail tapes.

*Line 5.*—The fifth line of tape identity is 2895–OFF–0. OFF represents Central Office in the E digit. Relay L5 operates from ground through the 289 check, contact 2 of relay D1 and contact 4 of relay D4 operated, contact 1 of relay CL4 operated and the winding of relay L5 to battery and locks to its operating path around contact 1 of relay CL4. Relay L5 closes a ground from contact 1 of relay L5 operated, through the contacts of two E digit reading relays operated for the digit in the fifth or E position which it will be assumed is 3. The circuit therefore extends through contact 2 of relay E1 and contact 4 of relay E2, Central Office switch contact 4, which, it will be noted, corresponds to E digit 3, and arm 1, contact 5 of relay L5 operated and the winding of relay RS to battery to operate relay RS which locks to H3 break contact of the reader. The operation of relay RS closes ground from contact 9 of relay SKP released, contact 6 of relay RS, through contact 3 of relay L5 and the winding of relay CL5 to battery to operate relay CL5 and operates the Step magnet of the reader. Relay CL5 through its contact 2 locks from ground on contact 11 of relay ST3 operated, through contact 3 of relay TIE released and through contacts of relays CL6 to CL8 released. Relay CL5 in turn unlocks relay CL4. Relay CL5 operated also closes ground from contact 18 of relay MON operated through arm 3 and, for the condition assumed, contact 4 of Central Office switch, contact 4 of relay CL5 operated and the winding of relay EC0 to battery to operate relay EC0 which locks to its operating path around contact 4 of relay CL5. The operation of relay OC0 or EC0 depends on the position of the Central Office switch setting. Relay L5 releases when the reading relays release.

*Line 6.*—Operation is the same as line 6 of leading tape identity of detail tapes.

*Line 7.*—The seventh line of tape identity is 2897LD. L is the last day tens in the E digit and D is the last day units in the F digit. Relay L7 operates from ground through the 289 check, contact 2 of relay D7 and contact 3 of relay D0 operated, contact 1 of relay CL6 operated and the winding of relay L7 to battery and locks to its operating path around contact 1 of relay CL6. When processing on a flexible period basis, the operating path of relay RS is from ground through contact 1 of relay L7 operated, contact 18 of relay SA operated, contacts of two E digit reading relays operated such as contact 2 of relay E1 and contact 4 of relay E2, contact 4 and arm 1 of Last Day Tens switch, contact 5 of relay L7 operated, arm 1 and say contact 3 of Last Day Units switch, contacts of two F digit reading relays operated such as contact 4 of relay F1 and contact 2 of relay F0 and the winding of relay RS to battery to operate relay RS. The operation of relay RS closes ground from contact 9 of relay SKP released through contact 6 of relay RS, contact 4 of relay L7 operated and the winding of relay CL7 to battery to operate relay CL7. The operation of relay RS also operates the Step magnet of the reader. Relay CL7 locks from ground through contact 11 of relay ST3 operated, contact 3 of relay TIE released, a contact of relay CL8 released and its contact 4 through its winding to battery and unlocks relay CL6. When processing on a flexible period basis, the operation of relay CL7 closes ground from contact 17 of relay MON operated through arm 4 and, for the conditions assumed, contact 4 of Last Day Tens switch, contact 1 of relay CL7 operated and the winding of relay EDT to battery to operate relay EDT which locks to its operating path around contact 1 of relay CL7. Depending upon the position of switch Last Day Tens relay EDT or ODT would have been operated. At the same time ground is closed from contact 17 of relay MON operated through arm 4 and an odd or even contact of Last Day Units switch depending upon its setting, contact 9 or 10 of relay CL7 operated and the winding either of relay ODU or EDU to battery to operate either relay ODU or EDU which locks to its operating path around its respective contact on relay CL7. The operation of relay ODT or EDT depends on the position of the Last Day Tens switch setting. The operation of relay ODU or EDU depends on the position of the Last Day Units switch setting. Relay CL7 also closes ground from J1 late make contact of reader, through contact 8 of relay SA operated, contact 6 of relay CL7 operated, contact 5 of relay CTI released, contact 1 of relay FTH released and the winding of the ROT magnet of the TH selector to energize the magnet. The TH selector steps one step each time the J1 late make contact closes and opens. This continues until the TH selector position corresponds to the setting of the First Thousand switch. At this time ground is closed from contact 4 of relay SA operated, contact 6 of relay L8 released, through say contact 10 and arm 2 of TH selector arc, arm 1 and contact 11 of the First Thousand switch and contact 1 of relay HTH released and the winding of relay FTH to battery to operate relay FTH which by opening its contact 1 opens the operating path of the ROT magnet and stops stepping of the TH selector. When the TH selector stepped off-normal ground from the off-normal contact 2 of the selector was closed through to operate relay MLK. Operation of relay FTH also closes ground through its contact 2 and the winding of relay CTI to battery to operate relay CTI which locks through its contact 4 to ground on contact 7 of relay MLK operated.

*Line 8.*—In the meantime the eighth line of tape identity, 2898–TH–0, is being read. TH is the tape thousand number in the E digit and when processing on a flexible period basis, 0 is in the F digit. Relay L8 operates from ground through the 289 check through contact 2 of relay D7 and contact 3 of relay D1 operated, contact 3 of relay CL7 operated and the winding of relay L8 to battery and locks to its operating path around contact 3 of relay CL7 contact. Relay L8 will release and reoperate each cycle while the TH selector is stepping. When processing on a flexible period basis, the operating path of relay RS is from ground through contact 1 of relay L8 operated, through contact 11 of relay SA operated, contacts of two E digit reading relays operated, such as contact 2 of relay E0 and contact 3 of relay E1, contact 2 and arm of the TH selector, contact 1 of relay CTI operated, contact 5 of relay SSE, contact 5 of relay L8 operated and the winding of relay RS to battery to operate relay RS. The operation of relay RS closes ground from contact 9 of relay SKP released, contact 6 of relay RS operated and through contact 4 of relay L8 operated and the winding of relay CL8 to battery to operate relay CL8 and operates the Step magnet of the reader. Relay CL8 locks to ground on contact 11 of relay ST3 operated, through contact 3 of relay TIE released and unlocks relay CL7. Relay L8 releases when the reading relays release.

*Line 9.*—Operation is the same as line 9 of leading tape identity of detail tapes.

*Reading and checking trailing tape identity of first tape.*—When the reader has stepped the tape by the last call entry, the next line read is the first line of trailing tape identity.

*Line 1.*—The first line of tape identity is 289117. Operation is the same as Line 1 of trailing tape identity of detail tapes except the operating path of relay RS is from ground through the 289 check, contact 12 of relay TIE released, contact 2 of relay L1 operated, contact 2 of relay E0 and contact 3 of relay E1 operated, contact 2 and arm 1 of the Tape Type switch, contact 8 of relay L1 operated, arm 2 and contact 2 of the Tape Type switch, contact 4 of relay F0 and contact 2 of relay F7 operated, contact 3 of relay L1 operated, contact 17 of column 7, punch plug board connector, contact 15 of column 7 and the winding of relay RS to battery.

*Line 2–line 6.*—Operation is the same as line 2 to line 6 of leading tape identity of first message unit summary tape.

*Line 7.*—The seventh line of tape identity is 2897LD. Relay L7 operates from ground through the 289 check, contact 2 of relay D7 and contact 3 of relay D0 operated, contact 1 of relay CL6 operated and the winding of relay L7 to battery and locks to its operating path around contact 1 of relay CL6 contact. The operation of relay RS is the same as described for line 7 under Leading Tape Identity of First Tape, Message Unit Summary Tape. The operation of relay RS closes ground from contact 9 of relay SKP released, contact 6 of relay RS, contact 4 of relay L7 operated and the winding of relay CL7 to battery to operate relay CL7 and operates the Step magnet of the reader. Relay CL7 locks to ground on contact 11 of relay ST3 operated, through contact 3 of relay TIE released and relay CL8 released and unlocks relay CL6. Relay L7 releases when the reading relays release.

*Line 8.*—The eighth line of tape identity is 2898–TH–0. TH represents the tape thousand number in the E digit. When processing on a flexible period basis, 0 is in the F digit. Relay L8 operates from ground through the 289 check, contact 2 of relay D7 and contact 3 of relay D1 operated, contact 3 of relay CL7 operated and through the winding of relay CL7 to battery and locks to its operating path around contact 3 of relay CL7. When processing on a flexible period basis, the operating path of relay RS is from ground through contact 1 of relay L8 operated, through contact 11 of relay SA operated, contacts of two E digit reading relays operated, such as contact 2 of relay E0 and contact 3 of relay E1, contact 2 and arm 1 of the TH selector, contact 1 of relay CTI operated, contact 3 of relay SSE released, contact 5 of relay L8 operated and the winding of relay ES to battery to operate relay RS. The operation of relay RS closes ground from contact 9 of relay SKP released, through contact 6 of relay RS, contact 4 of relay L8 operated and the winding of relay CL8 to battery to operate relay CL8 and operates the Step magnet of the reader. Relay CL8 locks to ground on contact 11 of relay ST3 operated, through contact 3 of relay TIE released and unlocks relay CL7. Relay L8 releases when the reading relays release.

*Line 9.*—Operation is the same as line 9 of leading tape identity of detail tapes.

*Reading and checking leading tape identity of intermediate tape.—Line 1–line 6.*—Operation is the same as line 1 to line 6 of leading tape identity of first message unit summary tape.

*Line 7.*—The seventh line of tape identity is 2897LD. Relay L7 operates from ground through the 289 check, contact 2 of relay D7 and contact 3 of relay D0 operated, contact 1 of relay CL6 operated and the winding of relay L7 to battery and locks to its operating path around contact 1 of relay CL6. The operation of relay RS is the same as above described. The operation of relay RS closes ground from relay SKP released, relay RS operated and through relay L7 operated to operate relay CL7 and operates the Step magnet of the reader. Relay CL7 locks from ground through contacts on relays ST3 operated, TIE released and CL8 released and unlocks relay CL6. Relay L7 releases when the reading relays release.

*Line 8.*—The eighth line of tape identity is 2898–TH–0. Relay L8 operates from ground through the 289 check, contact 2 of relay D7 and contact 3 of relay D1 operated, contact 3 of relay CL7 operated and the winding of relay L8 to battery and locks to its operating path around contact 3 of relay CL7 contact. Ground is closed from contact 7 of relay SA operated through contact 7 of relay L8 operated, contact 6 of relay SSE operated, contact 5 of relay LTH released and contact 2 of relay CTI operated and the winding of relay HTH to battery to operate relay HTH. The operation of relay HTH closes ground from contact 1 of relay L8 operated, through contact 11 of relay SA operated, contacts of two E digit reading relays operated, such as contact 2 of relay E0 and contact 3 of relay E1, contact 2 of relay HTH operated, contact 1 and arm 2 of the TH selector, contact 6 of relay L8 operated, contact 3 of relay LTH released and the winding of relay TMM to battery to operate relay TMM which locks to relay CL7 operated. Relay TMM at its contact 3 opens a locking path of relay SSE which, however, remains locked until late make contact J2 of the reader opens. Relay TMM also closes ground through its contact 2 to energize magnet ROT of selector TH. Selector TH steps one position. When processing on a flexible period basis, the operating path of relay RS is from ground through contact 1 of relay L8 operated, contact 11 of relay SA operated, contacts of two E digit reading relays operated, such as contact 2 of relay E0 and contact 3 of relay E1, contact 2 and arm 1 of the TH selector, contact 1 of relay CTI operated, contact 5 of relay L8 operated and the winding of relay RS to battery to operate relay RS. The operation of relay RS closes ground from contact 9 of relay SKP released, contact 6 of relay RS, contact 4 of relay L8 operated and the winding of relay CL8 to battery to operate relay CL8 and operates the Step magnet of the reader. Relay CL8 locks to ground through relays ST3 operated, TIE released and unlocks relay CL7. The release of relay CL7 by opening its contact 8 unlocks relay TMM which in turn by opening its contact 2 de-energizes magnet ROT of selector TH. Relay L8 releases when the reading relays release.

*Line 9.*—Operation is the same as line 9 of leading tape identity of the first message unit summary tape.

*Reading and checking trailing tape identity of intermediate tape.—Line 1–line 9.*—Operation is the same as line 1 to line 9 of trailing tape identity of first message unit summary tape.

*Reading and checking leading tape identity of last tape.—Line 1–line7.*—Operation is the same as line 1 to line 7 of leading tape identity of first message unit summary tape.

*Line 8.*—The eighth line of tape identity is 2898–TH–0. Relay L8 operates from ground through the 289 check, through contact 2 of relay D7 and contact 3 of relay D1 operated, contact 3 of relay CL7 operated and locks to its operating path around contact 3 of relay CL7. Ground is closed from contact 7 of relay SA operated, through contact 7 of relay L8 operated, contact 6 of relay SSE operated, contact 5 of relay LTH released, contact 2 of relay CTI operated and the winding of relay HTH to battery to operate relay HTH. The operation of relay HTH closes ground from contact 1 of relay L8 operated through contact 11 of relay SA operated, contacts of two E digit reading relays operated, such as contact 2 of relay E0 and contact 3 of relay E1, contact 2 of relay HTH operated, contact 1 and arm 2 of the TH selector, contact 6 of relay L8 operated, contact 3 of relay LTH released and the winding of relay TMM to battery to operate relay TMM which locks to relay CL7 operated. Relay TMM opens a locking path of relay SSE which, however, remains locked until late make contact J2 of the reader opens. Relay TMM also closes ground to energize magnet ROT of selector TH and selector TH steps one position. When selector TH has stepped to the next higher position, which should correspond to the setting of the Last Thousand switch, ground is closed from contact 4 of relay SA operated, through contact 6 of relay L8 released, arm 2 and assume contact 2 of the TH selector, contact 3 and arm 1 of the Last Thousand switch and the winding of relay LTH to battery to operate relay LTH which locks to contact 4 of relay MLK operated. The operation of relay LTH by opening its contact 5 releases relay HTH and closes ground through its contact 1 to light the Last Section lamp. Relay L8 releases when the reading relays release. When late make contact J2 of the reader opens relay SSE releases. On the next cycle of the reader relay L8 reoperates over the same path as described above. When processing on a flexible period basis, the operating path of relay RS is from ground through contact 1 of relay L8 operated, contact 11 of relay SA operated, contacts of two E digit reading relays operated, such as contact 2 of relay E0 and contact 3 of relay E1, contact 2 and arm 1 of the TH selector, contact 1 of relay CTI operated, contact 1 of relay L8 operated and the winding of relay RS to battery to operate relay RS. The operation of relay RS closes ground from contact 9 of relay SKP released through contact 6 of relay RS, contact 4 of relay L8 operated and the winding of relay CL8 to battery to operate relay CL8 and operates the Step magnet of the reader. Relay CL8 locks from ground through contacts of relays ST3 operated and TIE released and unlocks relay CL7. The release of relay CL7 unlocks relay TMM which in turn de-energizes the ROT Magnet of the TH selector. Relay L8 releases when the reading relays release.

*Line 9.*—Operation is the same as line 9 of leading tape identity of the first message unit summary tape.

*Reading and checking trailing tape identity of the last tape.—Line 1–line 9.*—Operation is the same as line 1 to line 9 of trailing tape identity of first message unit summary tape.

*Reading and registering.—Reading and registering (general).*—The manner in which the tape to card converter reads the call entries as they are encountered on the tape and stores the information contained therein in the relays of the input register will now be described. After the machine has been started and the reader connector relays RCA and RCD, Fig. 6, have operated the reading relays, Figs. 16, 26 and 36, are connected permanently to the reader. These relays then merely give an accurate representation of the holes that are punched in the perforated tape by operating from the grounds that are supplied by the reader pins to the reading relays. The reading relays in turn pass the information as to what holes were perforated in the tape through contacts of relays in the steering circuit, Figs. 8–12, which guide the information to the proper input register relays, Figs. 17–21, 27–31 and 37–41. The reading relays in passing the information along are responsible for checking the validity of the reading which is to say that one out of three of the relays of the A digit group and two out of five of the relays of each of the B, C, D, E and F digit groups must be operated to afford a plausible pattern. The information is registered as read so that it can be translated and so that all lines of the entry will be ready at once to pass along to the output registers from the input registers and translators as soon as the circuit is in a condition to transfer. Let us consider first a detailed tape or one containing five-line call entries only.

*Reading and registering first line of five line entry.*—Before any information can be stored in the input register relays the machine must first have passed over the splice pattern and leading end tape identity perforations as described in the foregoing. After completing splice pattern and input tape identity the machine normally will encounter a call section, that is a section in which information pertaining to actual telephone calls is perforated. The type of calls that it is expected will be recorded in the tape determines the positions in which the set-up switches on the switch panel are set manually by the attendant. For a call in which five perforated lines of tape are employed, relay DA will be operated indicating that five-line calls are to be expected. Relay TIE will be operated as described as soon as tape identity has been completed. To get the steering circuit Figs. 8 to 12 in condition to steer the information of the first call line to Figs. 17, 27 and 37 it is necessary to operate relay SR1. This relay operates as soon as the off-normal relays have provided grounds to operate the down-check relay NDC, Fig. 7, of the input register control circuit. The ground for SR1 is supplied by reader contact K4 through parallel back contact 3 of each of relays TP and TC, make contact 4 of relay NDC, make contact 4 of relay RLM and the winding of relay SR1 to battery operating relay SR1. As soon as the first line of a call is encountered it will be steered to the input register for the first line of the call, Figs. 17, 27 and 37.

When the first good line of a call entry is received the reading relays of the B–F digits pass their two-out-of-five check along to the A digit reading relays. This two-out-of-five check starts with the reader G1 contact through the back contact 1 of relay RK or from the reader G2 contact through the make contact 4 of relay RK. The G1 or G2 ground is carried through make contact 9 of relay ST3 then through make contact 8 of relay RCD to the symmetric network on the contacts of the reading relays for the B–F digits. This symmetric network begins with contact 3 of relay B0 and ends with contacts 5 of relay F7. If two relays and only two of the relays corresponding to each digit have been operated the path will be closed and the ground will be extended to the A digit reading relays in Fig. 17 where it will pass through contact 3 of relay A0 released, contact 2 of relay A1 operated, contact 3 of relay A2 released, and then through contact 1 of relay DA and contact 10 of relay TIE operated, as previously explained. This checking ground then continues through contact 3 of relay SKP released, contact 4 of relay SR1 operated and the winding of relay N1A to battery operating relay N1A, Fig. 8. This relay is the cut-in relay for line 1 which will connect the information already waiting in the form of grounds on the reading relay contacts, that is, on the contacts of the relays of Figs. 16, 26 and 36 to operate the register relays of Figs. 17, 27 and 37 in the same combination as that of the reading relays.

A special case which has not been mentioned is that for observing tapes. These tapes are handled in the same manner as are detail tapes but in one special class of observing tapes the A digit will be a 3 rather than a 1. In this case the checking path of the two-out-of-five check from the relays corresponding to digits B–F is extended through contact 3 of relay A0, contact 3 of relay A1 and contact 5 of relay A2 all operated and then through relay contact 1 of relay OBS, contact 1 of relay DA, contact 10 of relay TIE operated, contact 3 of relay SKP released, contact 4 of relay SR1 operated and the winding of relay N1A to battery to operate the connector relay N1A.

After the operation of relay N1A circuits are established from ground on contacts of the operated reading relays through the contacts of relay N1A and the windings of individual corresponding relays in corresponding groups of the input registers to battery, to operate such relays in Figs. 17, 27 and 37. For instance, a circuit may be traced from ground through contact 1 of relay B4, contact 5 of relay N1A and the winding of relay 1B4 to battery. In the case of reading relays A0, A1 and A2, there are but two corresponding register relays, 1A1, which is controlled from ground through contact 2 of relay A0 released and contact 4 of relay A1 operated through contact 2 of relay N1A and the winding of relay 1A1 to battery, and relay 1A3, which is controlled from ground through contact 2 of relay A0, contact 5 of relay A1, contact 6 of relay A3, all operated, contact of relay N1A and the winding of relay 1A3 to battery. As soon as the first line check relays have operated in the correct combination, another check chain is established from ground on make contact 1 of relay LK, Fig. 7, through another symmetric network on the contacts of relays corresponding to the F–B digits of Figs. 37, 27 and 17. This two-out-of-five check starts with contact 2 of relay 1F7 and extends through two make contacts and three break contacts, in any combination, of the 1F–, 1E–, 1D–, 1C– and 1B– relays. The two-out-of-five up-check, as this circuit is called, continues through contacts 2 of relay 1A1 operated and 1A3 released and through the winding of the input register line 1 up-check relay UC1 to battery to operate relay UC1. This same up-check ground is extended through contact 3 of relay N1A and the winding of relay RS1 to battery to operate relay RS1. Relay RS1 in operating removes one of the locking paths for relay SR1 which path extended through a train of back contacts 4 on each of relays RS1, RS2, RS3, RS4, RS5, contact 12 of relay LPG or contacts of the input register release INP REG RLS key to a ground on contact 15 of relay MON. This leaves relay SR1 locked operated through contact 5 of relay RCD to reader make contact K0. Relay RS1 also sends out a ground through its contact 2, contact 1 of relay RSF, winding of magnet STP and contact 1 of relay MST to battery to step the reader to the next line on the tape. Relay RS1 also closes its contact 7 in preparing a path to operate relay SR2 when the next reader break occurs. On the next reader break, reader make contact H3, which was locking up SR1, opens so that relay SR1 now releases and at the same time a ground is passed along from reader break contact K4 through the parallel back contacts 3 of relays TP and TC through make contact 7 on relay RS1 and the winding of relay SR2 to battery to operate relay SR2. Relay SR2 steers the next line of the tape entry into second line input register, Figs. 18, 28 and 38.

*Reading and registering 2nd–5th line of 5 line entry.*—When the next line of the tape has been read the same checking ground as described for the first line of the entry is passed through the reading relays corresponding to digits B–F to the A digit reading relays. This time, however, the check path through the A digit is through contact 3 of relay A0 operated, contact 3 of relay A1 and contact 4 of relay A2 released, through make contact 2 of relay SR2, which is now operated, and the winding of relay N2A to battery to operate relay N2A. This is the cut-in relay of the second line of the input register which steers the information which is perforated in the second line of the tape, which has been recorded temporarily in the reading relays into the input register relays corresponding to the second line. Again, the register relays operate in accordance with the registration on the reading relays and this time a check ground is started from a make contact 3 of relay LK and passed through the symmetric networks on the B–F relays to operate relay UC2, the up-check relay for line 2. Again the up-check ground is passed through contact 3 of the cut-in relay N2A and the winding of relay RS2 to operate relay RS2. Relay RS2 in operating in the same manner as does RS1, originates a ground which steps the reader, prepares a path for the operation of the next SR– relay, opens one of the locking lock paths for the presently operated SR– relay and, in turn, as before for relay RS1, locks to a break contact on the reader. When the reader make contact opens it releases relay SR2 and the reader break contact holds relay RS2 and operates relay SR3 through make contact of 17 of relay DA. From here on exactly the same procedure is followed for registering the information of the third, fourth, and fifth line of the five-line entry. The make contact of relay DA appears only in the operate path of relay SR3. The steering circuit of Fig. 10 advances one step each line until the fifth line of the entry is read and registered.

*Checking line following five-line entry.*—After a five-line entry is read and registered, the circuit checks to be sure that the next line after a five-line entry begins with a 2, or 1 or a 3 in the A digit. When relay RS5 operated as the previous RS– relays have operated it arranged the circuit so that the reader could step to the next line. However, this time there is no SR– relay to steer to the next register line. This time it is required only that the relays corresponding to the A digit of the new line on the tape be operated so as to indicate digit 1,2 or 3. Under such condition, relay 6CK is operated. The operate path is the same as that of fifth line up-check relay UC5, except this up-check chain must now pass through relays of the A digit reading relays, Fig. 17, in the proper combination. A combination of relays A0, A1 and A2 all operated, or A0 and A1 released with A2 operated, or A0 and A2 released with A1 operated will all pass the up-check ground from UC5 on to operate relay 6CK.

*Input register up-check signals.*—Relays UC1, UC2, UC3, UC4, UC5 and 6CK having been operated, two paths through two sets of contacts of these six relays all operated, provide two indications to be of use at a slightly later time. One of these series chains indicates to the transfer control circuit, Fig. 7, that it is satisfactory to transfer information from the input registers to the output registers when conditions elsewhere in the circuit are satisfactory. The other series chain of contacts through all except relay 6CK indicates to the IBM punch that it is satisfactory to start another card cycle, by reclosing the operate path to the punch start relay winding. These operations will be described hereinafter.

*Registering two-line summary entries.*—The registration of a two-line summary entry is very similar to and somewhat simpler than the registration of a five-line entry from a detail tape. In this case relay SA is operated as a result of the setting of the set-up switches instead of relay DA, both in Fig. 47. Under this condition the first call entry in the tape must have a 2 in the A digit of the first line and a 0 in the B digit, the latter corresponding to the operation of relays B7 and B4. When the first line of a call is read the check chain through the B–F digits of the reading relays is passed through the A digit reading relays of Fig. 16 through contact 3 of relay A0 released, contact 2 of relay A1 released and contact 2 of relay A2 operated and then back to the relays corresponding to the B digit. The up-check ground is passed through contact 2 of relay B7 and contact 2 of relay B4 both operated, contact 12 of relay SA operated, contact 10 of relay TIE operated, contact 3 of relay SKP released, contact 4 of relay SR1 operated and the winding of relay N1A to operate relay N1A. Relay SR1 was operated in this case the same as it was for a five-line entry and the information is registered in Figs. 17, 27 and 37, the same as it was for a five-line entry. The up-check ground from contact 1 of relay LK extends through the relays for the F to B digits of the first line register but this time is then carried from break contact 2 of relay B0 through make contact 16 of relay SA operated, since there is no registration in the A digit register relays 1A1 and 1A3 at the left in Fig. 17 as neither can be operated when relay A2 only, Fig. 16, is operated. This ground is then carried through contact 3 of relay N1A and the winding of relay RSL to battery to operate relay RS1 as in the case of a five-line entry. The RS1 relay directs the reader to step to the second line of the entry which is registered again exactly the same as it was registered in a five-line entry. Since relay DA is not operated on a summary tape relay SR3 is not operated and the remaining registers 3 to 5 are not used for summary tapes. Now that registration of this two-line entry is complete it is necessary to give a signal to the circuit similar to the up-check signal for the five-line entry. This time since registers of lines 1 and 2 only are operated a ground originating on make contact 1 of relay UC1 is carried through make contact 1 of relay UC2 and then through contact of the summary indicating relay SA, directly to the transfer control portion of Fig. 7 which will eventually operate the connector relays to transfer the information from the input registers to the output registers. This will be described in the section under Transfer Control. Another up-check chain which directs the IBM punch to remain with its clutch magnet operated also passes through relays UC1, UC2 and SA, which will be described hereinafter.

*Register release and down-check.*—In the case of both the two-line entry and the five-line entry, after the information has been used that is stored in the input registers, by transferring to the output registers, a signal is received as described under the heading Transfer Control to release all of the input registers. When relays TC and TP both operate, by opening their contacts, they remove ground supplied from relay MON, contact 15 to the winding of relay LK, provided there is an up-check in the output registers. Any relay which was operated in the input register was locked through resistors 171, 172, 271, 272, 371 or 372 to contact 2 of relay LK. The release of relay LK removes locking ground from all the input registers. The removal of the locking ground allows any relays that may have been operated in the input registers to release. The input register down-check relay is relay NDC, Fig. 7. Its operate path originates with make contact 9 on relay MON and goes through a series chain of break contacts on each relay corresponding to each of the digits of all five lines, including relays 1A1 and 1A3. When relay NDC has operated it indicates that all relays in the input register have released. This prepares a path for the operation of relay SR1 again. This relay operates as soon as either relay TP or relay TC has released and the reader break contact K4 closes. With relay SR1 operated the steering chain is again ready to place a line of an entry in the input register Figs. 17, 27 and 37 provided that the A digit has a 1 for detail tapes or a 2 in the A digit and a 0 in the B digit for summary tapes.

*Input to output register transfer.—First call cycle and 1 card call.*—It is the function of the transfer control portion of Fig. 7 to transfer information from the input registers to the output registers and to do it only when the input registers are properly filled and the output registers are in a receiving condition Another function of this portion of the Fig. 7 control circuit is to check that the lock of the output register has succeeded in holding the output registers operated. It does this by releasing the connectors between the input registers and the output registers and waiting a certain specified time before allowing the information in the input registers to be released. Let us consider first the first good call on the tape and let us assume that that call requires only one card to be made.

As soon as the off-normal relay MON has operated the down-check relay NDC will operate in the input register control circuit, Fig. 7. The circuit may be traced from ground through contact 9 of relay MON, Fig. 5, through a chain which extends through a break contact on each of the input register relays for each of the digits for each of the five lines of the register. This starts at contact 1 of relay 5F7, Fig. 41, passes through break contacts of each of the other 5F relays, then through break contacts of the 5E–, 5D–, 5C–, and 5B– relays of line 5 before entering the line 4 register relays at break contact 1 of relay 4F7, Fig. 40. It passes through break contacts of each of the relays of the line 4, line 3, line 2, and line 1 and finally through contacts 4 of relay 1A1 and 1A3, Fig. 17 and the winding of the input register down-check relay NDC to battery, operating the relay. The continuity of this path indicates that all relays of the input register are released. Output register down-check relay, RDC, Fig. 24, will operate in the output register control circuit. This circuit may be traced from ground on contact 14 of relay MON into the Calling Office A Digit output register on lead DC1, Fig. 72 and Fig. K. It extends through a chain of break contacts on relays 0 to 9 in the register and out of the register on down-check lead DC. It continues through each one of the other 29 output registers in Figs. 72, 71, 70, 69, 68, 67, 66, 65, 64 and 63, entering each on the DC1 lead, extending through a break contact of each relay of the register and emerging on the DC lead. It continues into Fig. 62 passing through contacts 4 of each of relays 3DN and NMU, then into Fig. 81 and through a pair of left-hand or break contacts and armature of check punch relay CP1, through corresponding contacts of each of check punch relays CP1 to CP33 and CP40 and through the winding of output register down-check relay RDC to battery operating the relay. The continuity of this circuit indicates that all output registers and all check punch relays as well as relays 3DN and NMU, which latter will be described hereinafter, are released and that the output registers are in proper condition to be filled. This tends to lessen false registration. Also relay LK in the input register control circuit, Fig. 7, will operate from ground on contact 12 of off-normal relay MON through the contact on the input register release INP REG RLS key and back contact 12 of relay LPG in parallel in series with parallel contacts 1 on relays TC and TP and through the winding of relay LK to battery. Relay 1T operates as a result of the operation of relay NDC over a path from ground on contact 3 of relay NDC and through the winding of relay 1T to battery and it locks through break contact 4 on relay RUC, Fig. 24 to ground on contact 12 of relay MON. Relay 1T is a check relay that will release after information has been successfully transferred once from the input registers to the output registers. Relay 1T cannot be reoperated until the input registers have been checked down, that is, checked in their released positions to insure that all are released. There is, however, one special case which will be mentioned later. Also operated at the same time as relay 1T is relay 1TH from ground through contact 2 of relay NDC, but in the case of the first card cycle this relay plays no part in the transfer function and will release as soon as the down-check condition in the input registers is no longer in effect. At the start of processing a tape, the transfer control circuit must wait until the machine has read over splice pattern and tape identity and until the input registers have been filled in accordance with the section on reading and registering. When the input registers have been filled the five up-check relays UC1–5 all operate as previously described. For detail type tape operation, presently being considered, as soon as the fifth line of information has been registered, the relays corresponding to the B digit in the class translator, Fig. 51, to be described hereinafter, supplies ground to operate relay 1CD, Fig. 46. On message unit detail, toll and summary tapes, relay 1CD is permanently operated from ground through resistor 252 or 251 and contact 1 of relay MUD or TOL, all in Fig. 25, or through resistor 471 and contact 23 of relay SA in Fig. 47, respectively. Relay TP now operates from ground through make contact 7 of relay RDC and make contact 2 of relay 1CD. On the next reader make cycle relay 6CK operates and closes the last contact in the operate path of the connector operate relay CRA. This is the up-check signal mentioned in the paragraphs on reading and registering. The operate path of relay CRA is as follows. Ground is passed through make contacts 1 on relay UC1, 1 on relay UC2, 3 on relay DA, 1 on relay UC3, 1 on relay UC4, 1 on relay UC5, 1 on relay 6CK, break contact 11 on relay LPG, make contact 1 on relay 1T, contact 5 on relay 2CD, released, contact 1 on relay 1CD operated, contact 7 on relay TP and contact 3 on relay RDC both operated and the winding of relay CRA to battery operating relay CRA. Relay CRA locks to ground on make contact 12 of relay MON through break contact 4 of relay RUC in series with parallel break contacts 2 on relay LPG and 1 on output register release key OUT REG RLS. The output register connector relays, Figs. 52 to 62, operate in a combination for the particular call involved through make contacts on relay CRA. With the output register connector relays operated the output register relays operate in accordance with the translations on the various translator circuits and the relays that are operated in the input register circuit. As soon as output register relays begin to operate relay RDC releases and after all of the output register relays have been operated in the correct combinations, output register up-check relay RUC operates in a manner to be made clear hereinafter. The operation of relay RUC by opening its contact 4 simultaneously releases relays CRA and 1T. The release of relay 1T insures that relay CRA cannot operate again until the input registers have entirely released. Relay CRA released, by closing its contact 4, prepares a path for the operation of relay TA as soon as the reader comes to a make cycle. When the reader comes to a make cycle relay TA operates from ground on make contact K1 of the reader through contact 1 of relay RUC operated, contact 4 of relay CRA released, contact 6 of relay TP operated and the winding of relay TA to battery. Relay TA operated locks to ground on make contact 5 of relay TP. This is the beginning of a timing function to insure that the output registers remain operated and that their up-check path remains closed. The next reader break cycle operates relay TB from ground through reader break contact K3 through make contact 2 of relay TA and the winding of relay TB to battery and this relay also locks to contact 4 of relay TP operated. The following reader make cycle operates relay TC from ground through reader make contact K2 make contact 2 on relay TB and the winding of relay TC to battery. Relay TC also locks to contact 5 of relay TP operated. Now that both relays TC and TP are operated relay LK releases removing locking grounds from the input register relays. Should the output register up-check path have opened prematurely, relay RUC would have released before the timing cycle was completed and a ground would have been connected from contact 15 on relay MON through the Input Reg. RLS key normal and break contact 5 of relay RUC on the operate lead of relay LK. This would have retained the input register locked so as to afford information to assist in operating and maintenance.

Release of the input register relays puts them in a condition ready for the next call cycle. During the next refill of the input registers the output registers are being held for the IBM punch to use during its normal punch cycle.

*Input register to output register transfer any except first card cycle, one card call.*—When the input register down-check relay NDC operates, at the end of any normal card cycle and release of the input registers, it closes ground through its contact 3 to operate relay 1T and through its contact 2 to operate relay 1TH. Relay 1T locks through resistor 701, break contact 4 on relay RUC and contact 12 of relay MON to ground and to a make contact 2 on relay 1TH. Relay 1TH locks through resistor 702, break contact 5 of relay RDC and contact 11 of relay MON to ground. Also when relay NDC operates, by opening its contact 5, it removes locking ground from relay TP which releases at this time. Relay TP, of course, releases the timer relays TA, TB and TC by opening its contacts 4 and 5 but it also restores the operating ground for relays SR1 and LK by closing its contacts 3 and 1 respectively. Relay LK reoperates immediately but relay SR1 waits until the reader arrives at a break contact. It then operates from the reader ground contact K4 through the parallel break contacts 3 on relays TP and TC, make contact 4 on relay NDC operated contact 4 of relay RLM and the winding of relay SR1 to battery. At this time the input registers are refilled with information from the tape as described under reading and register. During a normal card cycle while the input registers are being refilled the output registers have been held operated for the normal punch cycle which will not finish until shortly after the input registers have been refilled. As the input registers operate, relays UC1–5 operate as heretofore described. Relay 1CD may be operated at this time after the fifth line of the input register has operated and the class translator, Fig. 51, has operated. However, relay 1CD may have been operated from the switch settings under control of relay TOL or relay MUD operated in the tape index register, Fig. 25. After the A digit of the next line following the five-line entry has been checked, the input registers are ready and waiting to transfer their information to the output registers. Shortly thereafter, the output registers will release at the end of the punch cycle. When the output registers have performed their function and are no longer required by the IBM punch they release and, in turn, release relay RUC. Relay RDC operates through a series chain of break contacts in the output registers and the operation of RDC by opening its contact 5 releases relay 1TH. This leaves relay 1T locked only to break contact 4 on relay RUC. The operation of relay RDC supplies ground through its contacts 7 through make contact 2 on relay 1CD and the winding of relay TP to battery operating relay TP. Relay CRA operates at this time from ground on make contact 1 of relay UC1, contact 1 of relay UC2, contact 3 of relay DC, contact 1 of relay UC3, contact 1 of relay UC4, contact 7 of relay UC5, contact 1 of relay 6CK all operated, contact 11 of relay LPG released, contact 1 of relay 1T operated, contact 5 of relay 2CD released, contact 1 of relay 1CD operated, contact 7 of relay TP operated, contact 3 of relay RDC operated and the winding of relay CRA to battery. Relay CRA locks to break contact 4 of relay RUC. As mentioned under reading and registering the operate path of relay CRA for a summary tape from the summarizer does not go through contacts of all of the up-check relays but instead goes through contact 1 of relay UC1, contact 1 of relay UC2, contact 13 of relay SA operated, contact 11 of relay LPG released, contact 1 of relay 1T operated, contact 1 of relay 1CD operated, contact 5 of relay 2CD released, contact 7 of relay TP operated, contact 3 of relay RDC operated, and the winding of relay CRA to battery.

In this operate path break contact 11 of relay LPG opens in case of an alarm thus preventing the transfer of any information from the input registers to the output registers. In case trouble has occurred during an attempted transfer of information from the input registers to the output registers, relay 1T will have released if the output register relay RUC has ever operated. This means that it would be impossible to transfer the information from the input registers to the output registers after the trouble has been cleared. In fact the start circuit is arranged so that the machine cannot start unless both input and output registers are released.

Getting back to normal operation, after relay CRA has operated, the output register connector relays in Figs. 52 to 62 operate in combination as determined by the type of call being processed and subsequently the output register relays operate. The operation of the connector relays will be described in detail hereinafter. The output register relays operate from ground on the contacts of the input registers or translators through the contacts of the connector relays and the windings of the relays in the output registers to battery. After the output register relays operate relay RDC releases and RUC operates. This is the case because when any output register relay is operated the down-check path is open releasing relay RDC. If the output relays are operated in a proper pattern the up-check relay RUC operates. Relays CRA and 1T release when relay RUC operates as the locking path for each extends through contact 4 of relay RUC. Relay CRA releases the output register connectors and the release of relay 1T makes it impossible to transfer information from the input registers to the output registers again until the input registers have completely released. On the next reader make cycle after relay CRA has released, relay TA operates through contact 4 of relay CRA and starts the timing cycle as previously described. Relay TB operates through contact 2 of relay TA operated, and reader contact K3 on the next reader break and relay TC operates through contact 2 of relay TB operated, and reader contact K2 on the next reader make cycle. Relays TA, TB, TC all lock to relay TP operated, relays TA and TC to its contact 5 and relay TB to its contact 4. Relay TC operated by opening its contact 1 now releases relay LK provided the up-check in the output registers keeps relay RUC operated. The release of relay LK removes locking ground from the input registers and allows any relays that are operated therein to release. The release of all input register relays reoperates the input register down-check relay NDC and the circuit is ready for another card cycle.

*Input to output register transfer for any cycle with two card call.*—For any call on which two punched cards are required, the transfer control portion of the input reegister control circuit, Fig. 7, functions very similarly to the way it operates for a one card call. However, since two cards are required from the same set of information in the input registers the transfer control circuit functions in a slightly different manner to care for the two cards. When the information in the input registers is to be used for a second time, the input registers are prevented from releasing when the output registers have been filled for the first card. When two cards are to be made from the same information, relay 2CD is operated instead of relay 1CD. Relay 2CD is operated always from the class translator Fig. 51 after the fifth line of information has been registered. When relay 2CD is operated there is no operate path for relay TP until the card count relays of Fig. 46 have functioned and operated relay C. This is explained under the heading Card Count. Relay C in the card count circuit operates after the second down-check in the output registers following the operation of relay 2CD. After the output registers have been released, reoperated, and released a second time, relay TP operates from ground through make contact 7 on relay RDC, contact 5 of relay C and the winding of relay TP to battery. This starts the timer which will release the input registers. This means that the information has remained in the input registers for two output card cycles.

One function of relay 1T, when a single card is to be punched, is to prevent a reuse of input register information due to a case of trouble. When two cards are to be punched from the same input register information, it is necessary to allow the input register information to be transferred to the output registers a second time. This is done by reoperating relay 1T over a circuit from ground on make contact 4 of relay 2CD through contact 2 of relay B operated, contact 7 of relay C released and the winding of relay 1T to battery. The operating sequence of these relays in the operating path of relay 1T is described more in detail under the heading Card Count but relay 1T is reoperated almost immediately after it has released and shortly after relay RUC has operated in the output registers. The operate path remains closed until shortly after relay RUC has released to restablish the normal locking path for relay 1T. The release of relay 1T is the same on the second card cycle as it is on a normal one card cycle.

For the first card cycle, since relay TP is not operated, the operate path for relay CRA is from a ground on make contact 1 of relay UC1 through contact 1 of relay UC2, contact 3 of relay DA, contacts 1 or relays UC3, UC4, UC5 and 6CK all operated, contact 11 of relay LPG released, contact 1 of relay 1T operated, contact 5 of relay 2CD operated, contact 1 of relay 1CD released, contact 1 of relay B released, contact 1 of relay 2CD operated, contact 3 of relay RDC operated and the winding of relay CRA to battery. On the second card cycle since TP is operated, as it is on any normal one card cycle, the operate path of relay CRA passes through make contact 7 of relay TP rather than through contact 1 of relay B released, and contact 1 of relay 2CD operated.

*Card count.*—Only one IBM card is made for most calls that appear on tapes coming to the tape to card connector. However, in two cases it is desirable to make two cards for one call. The indication of the number of cards is shown by which of the two relays, 1CD or 2CD is operated. These two relays are shown in Fig. 46 and the detailed operate path from them is explained under Class Translator.

Message unit detail, toll and observing tapes from the computer and summary tapes from the summarizer contain entries on which one card only is made. For three of these tapes the 1CD relay is operated at the beginning of the tape and remains operated throughout the running of the tape.

New detailed tapes from the assembler computer may contain entries requiring the punching of one card or the punching of two cards. In case of this tape the determination as to whether to punch one or two cards is made after the fifth line of a call has been read and registered in the input registers. On these tapes the following conditions operate relay 2CD, all others operate relay 1CD.

On new detail tapes from assembler computer:

1. Any message unit detail call that is charged and observed.

2. Any toll call that is charged and observed.

The operation of the card count circuit for one card calls has been covered under Input Register to Output Register Transfer Control. A make contact of relay 1CD is in the operate path of relay TP, and a one and one only check of relays 1CD and 2CD is in the operate path of relay CRA.

For two card calls the relays A, B, C in Fig. 46 operate as follows. Relay 2CD operates after the class translator circuit relays are operated to indicate a 5 or a 6 as the B digit of the fifth line shortly after the fifth line is registered and the card count circuit as well as the transfer control circuit waits until the output registers have released indicating they are finished with the previous call. When the output registers have released, the output register down-check relay RDC operates, completing the operate path for relay A in the card count circuit. Relay A operates from ground through contact 4 of relay 2CD, contact 3 of relay RDC, contact 3 of relay 2CD and the winding of relay A to battery. Relay A locks to contact 4 of relay 2CD operated. Relay RDC operated also completes the operate path for the connector operate relay CRA. Since relay TP could not operate on this current cycle, it is necessary to provide a bypass around make contact 7 of relay TP which is in the operate path of relay CRA. This by-pass circuit is through contact 1 of relay B released and contact 1 of relay 2CD operated. When the transfer control circuit has functioned and the output registers are again full, the output register up-check relay RUC operates and completes the operate path for relay B which extends from ground on contact 2 of relay CD2 through contact 2 of relay RUC, contact 1 of relay A and the winding of relay B to battery. Relay B also locks to ground on contact 2 of relay 2CD operated. When relay B operates, relay C has not operated, so the operate circuit for relay 1T is closed. This permits the ouput registers to be filled a second time without requiring the release of the input registers. At the end of the first card cycle the output registers release and again operate relay RDC which completes the path to operate relay C. The path may be traced from ground through contact 4 of relay 2DC, contact 2 of relay RDC, contact 4 of relay B and the winding of relay C to battery. Relay C also locks to contact 4 of relay 2CD. Relays RDC and C operate relay TP from ground on contact 7 of relay RDC through contact 5 of relay C and the winding of relay TP to battery. Relay TP operated completes the operate path for relay CRA in this case since the by-pass circuit through relays B released and 2CD operated is now opened by the operation of relay B. From this point the transfer control circuit operates the same as described for a one card call under input register to output register transfer. When the input registers release the translator, Fig. 51, relay 2CD is released which unlocks relays A, B, and C restoring the card count circuit, Fig. 46, to normal.

*Translators.—Tape index and entry type registers.*—The tape index register is a storage circuit by means of which the tape-to-card converter can recognize the type of tape being run. Tape index register relays receive operate ground through the tape type switch set up prior to the running of the tape. One of the set-up check relays OTT and ETT, Fig. 34, is operated as described in the section on checking tape identity to provide operate ground through its respective contact 3, arm 3 and some particular contact of the Tape Type switch, Fig. 32, and through the winding of a particular primary tape index register relay, Fig. 25, to battery to operate the relay as shown in the following table:

| Tape Type | Tape Switch Arm 3 Contact Setting | Primary Tape Index Register Relay Operated Fig. 32 |
|---|---|---|
| Summary | 2 | SA |
| Toll | 3 | TOL |
| Message Unit Detail | 4 | MUD |
| Observing | 5 | OBS |
| New Detail | 6 | ND |

The summary tape is the output of the AMA summarizer. Toll, message unit detail and observing tapes are the output of the AMA computer. Tapes referred to as new detail are the output of the assembler computer. Secondary tape index register relay DA is operated for all detail type tapes, receiving operate ground from contact 6 of each of relays TOL, MUD, OBS and contact 3 of relay ND.

The proper tape index register relays are operated throughout the running of a given tape. A locking ground is provided for whichever primary tape index register relay is operated through contact 10 of relay RUC operated. If during call processing the Tape Type switch should be moved, locking ground supplied through contact 17 of relay MON and arm 4 of the Tape Type switch would be disconnected and relay OTT or ETT would release and remove operate ground, supplied through the respective contact 3 of the relay and arm 3 of the Tape Type switch, from the winding of the particular tape index register relay which is operated. The locking path would hold the particular primary relay operated until contact 10 of relay RUC released at the completion of the call in the process of being punched.

The tape index register relays perform several functions as follows:

1. They provide connector contacts between output registers and various translators.

2. They provide class and card count signals for those tapes with which the class translator does not function.

3. They rearrange control leads for input registers, output register lamp connectors, skip splice control, tape section register, and tape identity reading progress.

4. They provide operate ground for several output register connectors.

Each of the functions listed above is described in detail in sections pertaining to the various circuits.

The entry type register comprising relays 1A1 and 1A3, Fig. 17, is an input register which follows the A digit reading relays for the first line of a detail call entry. It is included in the up-check and down-check chains of input registers. Entry type register relay contacts aid in the determination of AMA class discussed hereinafter.

*The class translator.*—The class translator, in conjunction with the tape index register, uses information derived from the AMA tape to form a distinguishing number for each type of detail call, called AMA class. In addition, these circuits provide a signal to indicate to the output the number of cards to be punched for a particular call. The class translator and the tape index register also indicate for each detail call whether it is "charge" or "no charge."

The manner in which class, card count, and charge output signals are determined varies with the type of detail tape being run. The types of tape which may be handled and the method of determining these items is described below. First, however, class number assignments for the various types of detail calls are presented in the following table. This table applies to detail calls for all types of detail tapes.

| AMA Class No. | Type of Detail Call |
|---|---|
| 0 | Toll. |
| 1 | Observing Answered. |
| 2 | Observing Not Answered. |
| 3 | Observing Cancel Charge. |
| 4 | Message Unit Detail. |

Toll tapes from the AMA computer contain calls, all of which are classified as Toll. Consequently, ground is supplied over two paths from contacts 2 and 3 of relay TOL through contacts 8 and 3, respectively, of relay C, normal, in the card count circuit, contacts 41 and 40, respectively, of the output register connector relay DCD operated and the windings of relays 4 and 7 to battery to operate relays 4 and 7 in the AMA output Class register, Figs. 65 and D, indicating a class 0. The class is determined by a path through the operated contacts of relays 4 and 7. This will be described hereinafter. This operation is repeated for every call. In addition relay TOL supplies ground through its contact 5, contact 15 of relay DCD and the winding of relay 11X, Figs. 63 and A, to battery to operate relay 11X, in the Overpunch output register, once per call, to indicate "Charge." Relay TOL also establishes a circuit from ground through resistor 251 and contact 1 of relay TOL through the winding of relay 1CD to battery to operate relay 1CD directly, indicating that one card is to be punched for each call.

In a similar fashion message unit detail tapes from the AMA computer use relay MUD to ground leads for all calls indicating class 4, "no charge" and one card. Class 4 will be established by the operation of relays 0 and 4 in the Class register, Figs. 65 and D. Relay 0 is operated from ground through contact 2 of relay MUD, contact 37 of relay DCD and the winding of relay 0 to battery. Relay 4 is operated from ground through contact 3 of relay MUD, contact 3 of relay C, contact 40 of relay DCD and the winding of relay 4 in the Class register. Relay 1CD is operated from ground through resistor 252 through contact 1 of relay MUD and the winding of relay 1CD to battery to produce the one card condition. Ground through contact 5 of relay MUD, contact 16 of relay DCD and the winding of relay 12Y in the Overpunch register, Figs. 63 and A, operates relay 12Y to produce the "no charge" condition.

Observing tapes from the AMA computer contain several types of calls each of which may be identified by information in the individual call entry. This information is contained in the 1A and 5B digits and is interpreted by several of the class translator relays B0T–B6T, Fig. 51, which are operated from a decimal translation of the 5B input register relays.

An observing answered call on an observing tape, for example, is distinguished by a 1 in the 1A digit and a 0 in the 5B digit. When the input registers are operated for such a call, relay B0T will be operated from the zero decimal lead of the 5B input register relays which extends from ground through contact 7 of relay 5B7, contact 6 of relay 5B4, contact 3 of relay OBS, which is operated for observing tapes only, and the winding of relay B0T to battery. Relay B0T will ground AMA class lead 0 which extends from contact 1 of relay B0T through contact 37 of connector relay DCD, into the Class register per Fig. D in Fig. 65, and through the winding of relay 0 to battery. Relay B0T will close a ground from contact 1 of entry type register relay 1A1 to AMA class lead 1 which extends through contact 2 of relay B0T, contact 38 of connector relay DCD, when the connector relay is operated into the same Class register and through the winding of relay 1 to battery to operate relay 1 which establishes a circuit to form class 1. Relay B0T will close ground through its contact 3 and the winding of relay 1CD to battery to operate the one card relay, 1CD. A make ground on contact 5 of relay OBS, contact 16 of relay DCD and the winding of relay 12Y in the Overpunch register will operate relay 12Y for each call on an observing tape when connector relay DCD operates thus indicating "no charge."

An observing not answered call on an observing tape is distinguished by 3 and 0 in the 1A and 5B digits respectively. Relay 1A3 will connect ground through its contact 1, contact 39 of relay DCD and the winding of relay 2 in the Class register to operate 2 and relay B0T will operate as described above and ground class lead 0, so that the two operated relays cooperate to form class 2. Relay 1CD will again be operated, as described, by relay B0T.

An observing cancel charge call on an observing tape is identified by 1 and 3 in the 1A and 5B digits respectively. Relay B3T will ground class lead 1 through contact 1 of relay B3T, contact 2 of relay OBS operated, contact 38 of relay DCD and the winding of relay 1 in the Class register. Relay B3T will connect ground through its contact 2, contact 39 of relay DCD and the winding of relay 2 in the Class register to operate relay 2. Relays 1 and 2 operated together in the Class register form AMA class 3. Relay B3T, by closing its contact 3, will also operate relay 1CD.

Detail tapes from the AMA assembler-computer, commonly referred to as new detail tapes, contain toll, message unit detail and several varieties of observing calls, each of which may be identified by a number in the 5B digit as described below.

Message unit detail calls on new detail tapes are identified by 1 in the 5B digit. Relay B1T will connect ground through its contact 1, contact 37 of relay DCD and the winding of relay 0 in the Class register. Relay B1T will connect ground also through its contact 3, contact 3 of card count relay C normal, contact 40 of relay DCD and the winding of Class register relay 4 when output register connector relay DCD operates. Relay B1T will also connect ground through its contact 4, contact 16 of relay DCD and the winding of relay 12Y in the Overpunch register to operate relay 12Y for "no charge" when the connector relay DCD is operated and in addition will connect ground through its contact 3 to operate the one card relay 1CD.

Toll calls on new detail tapes are marked with a 2 in the 5B digit. Relay B2T will be operated for these calls from ground through make contact 9 of relay 5B2, contact 6 of relay 5B7 normal make contact 7 of relay 5B0 and the winding of relay B2T to battery. Relay B2T operated will connect ground through its contacts 1 and 2, contacts 3 and 8 of relay C normal, contacts 40 and 41 of relay DCD and the windings of relays 4 and 7, respectively, to battery in the Class register, operating relays 4 and 7, to form class 0, when the connector relay DCD is operated. Relay B2T will also connect ground through its contact 4, contact 15 of relay DCD and the winding of relay 11X in the Overpunch register to operate relay 11X for "charge." Relay B2T will also connect ground through its contact 3 and the winding of relay 1CD to battery to operate relay 1CD directly.

Observing not-charged calls on new detail tapes may be recognized by a 3 in the 5B digit. Relay B3T will be operated for these calls from ground through contact 9 of relay 5B2 operated, contact 7 of relay 5B1 operated, and the winding of relay B3T to battery and will ground class lead 0 through relay ND which is operated for new detail tapes only. The circuit may be traced from ground through contact 4 of relay B3T operated, contact 1 of relay ND operated, contact 37 of relay DCD operated and the winding of relay 0 in the Class register. Relay B3T will also ground class lead 2 directly to form AMA class 2 when the connector operates. The circuit extends from ground through contact 2 of relay B3T operated, contact 39 of relay DCD operated and the winding of relay 2 in the Class register. Relay B3T also operates relay 12Y from ground on its contact 5, contact 16 of relay DCD and the winding of relay 12Y in the Overpunch register.

Relay B3T also closes ground through its contact 3 and the winding of relay 1CD to battery to operate relay 1CD.

Observing message unit charge calls on new detail tapes are identified by 4 in the 5B digit. Relay B4T will operate for such a call. The circuit extends from ground through contact 9 of relay 5B4, contact 6 of relay 5B0, both operated and the winding of relay B4T to battery. Relay B4T operated grounds class leads 0 and 1 to form class 1 when the connecting relay DSD is operated. The circuits may be traced from ground through contacts 1 and 2 of relay B4T, contacts 37 and 38 of relay DCD and the windings of relays 0 and 1, respectively, in the Class register. Relay B4T will also operate relay 12Y from ground through its contact 4 and contact 16 of relay DCD. Relay B4T will connect ground also through its contact 3 and the winding of relay 1CD to operate relay 1CD.

Observing message unit detail charge calls on new detail tapes are marked with a 5 in the 5B digit. Relay 5BT will be operated for such calls over a circuit from ground through contact 8 of relay 5B4, contact 8 of relay 5B1, both operated, and the winding of relay 5BT to battery. Relay 5BT operated will operate class relay 0 directly and class relay 4 through card count relay C normal to form AMA class 4 when the output register connector relay DCD is operated. The circuit for relay 0 may be traced from ground through contact 1 of relay 5BT, contact 37 of relay DCD and the winding of relay 0 in the Class register. The circuit for relay 4 extends from ground through contact 2 of relay 5BT, contact 3 of relay C, contact 40 of relay DCD and the winding of relay 4 in the Class register. Relay 5BT will connect ground through its contact 4, contact 16 of relay DCD and the winding of relay 12Y to battery to operate relay 12Y for "no change." Relay 5BT will also operate the two-card relay 2CD from ground through contact 4 of relay B5T and the winding of relay 2CD. When one card has been satisfactorily punched for a call of this type, relay C in the card count circuit will be operated as described hereinbefore under the heading Input to Output Register Transfer. Relay C by opening its contact 3 will open class lead 4 to the connector and by closing its contact 2 will connect ground to class lead 1 to form AMA class 1 when connector relay DCD is again operated, preparatory to the punching of the second card for the call. In review then, card number 1 is class 4, "no charge" and is for the message unit detail stream of cards, while card number 2 is class 1, "no charge" and resembles any other observing charged card.

Observing toll charged calls on new detail tapes are marked with a 6 in the 5B digit. Relay B6T will be operated for such a call from ground through contact 7 of relay 5B4, contact 7 of relay 5B2 and the winding of relay B6T to battery and will operate the two-card relay 2CD from ground through contact 4 of relay B6T and the winding of relay 2CD. Operated relay B6T will also connect ground through its contacts 2 and 3, make contacts 3 and 8 of relay C, contacts 40 and 41 of relay DCD operated and the windings of relays 4 and 7 in the Class register, respectively, to battery to operate relays 4 and 7 to form AMA class 0 for the first card. Relay B6T will also connect ground through its contact 1, contact 4 of relay C normal, contact 15 of relay DCD and the winding of relay 11X to battery to operate relay 11X to indicate "charge" on the first card. When relay C operates leads to relays 4 and 7 in the Class register will be opened and leads to relays 0 and 1 will be grounded at contacts 1 and 2 of relay C in their place to form class 1 for the second card. At the same time relay C when operated will transfer the ground, which extends from contact 1 of relay B6T, from its break contact 4 to its make contact 4 to operate relay 12Y instead of relay 11X to indicate "no charge" on the second card. Card No. 1 then will be class 0, "charge" for the toll card stream and card No. 2 will be class 1, "no charge" for the observing card stream.

AMA call entry identification and output class for all types of detail calls which may be encountered and handled by the tape to card converter are described above in detail. This information is repeated below in tabular form to provide a convenient reference.

In the column on the right headed 5EF are tens and units of message units as found in the entry, XX indicating any number, 00 indicating none and that message units are not to be punched on the card. This is described in detail hereinafter under blanking. Where two lines are used for one call they indicate that either of two conditions can exist for a given call or that both exist in the case of two card calls.

Further, some of the information, such as that in columns headed 1A and 5B for toll tape calls, is inserted to give a complete picture but is not necessarily used to control the circuit action.

| Tape | Call | Digit 1A | Digit 5B | AMA Class | One Card Relay 1CD Operated | Two Cards Relay 2CD Operated | Charge X | No Charge Y | Card No. | 5EF |
|---|---|---|---|---|---|---|---|---|---|---|
| Toll | Toll | 1 | 0 | 0 | √ | | √ | | | 00 |
| MUD | MUD | 1 | 0 | 4 | √ | | | √ | | XX |
| OBS | Obs. Ans. | 1 | 0 | 1 | √ | | | √ | | 00 |
| | | | | 1 | | | | √ | | XX |
| OBS | Obs. Not Ans. | 3 | 0 | 2 | √ | | | √ | | 00 |
| OBS | Cancel Chg. | 1 | 3 | 3 | √ | | | √ | | 00 |
| | | | | 3 | | | | √ | | XX |
| ND | Toll | 1 | 2 | 0 | √ | | √ | | | 00 |
| ND | MUD | 1 | 1 | 4 | √ | | | √ | | XX |
| ND | Obs. MU Chg. | 1 | 4 | 1 | √ | | | √ | | XX |
| ND | Obs. MUD Chg. | 1 | 5 | 4 | | √ | | √ | 1 | XX |
| | | | | 1 | | | | √ | 2 | |
| ND | Obs. Toll Chg. | 1 | 6 | 0 | | √ | √ | | 1 | 00 |
| | | | | 1 | | | | √ | 2 | |
| ND | Obs. Not Chg. | 1 | 3 | 2 | √ | | | √ | | 00 |

*Start time translator.*—Each call entry of detail, message unit detail, toll and observing type tapes contains the day, hour and minute of the answer time of the call. This time information is recorded on the tape in the 5 digits, B to F, of the second line. The units digit of the minute appears in the F digit. The units digit of the hour appears in the E digit. The units digit of the day appears in the D digit. The tens digit of the hour is indicated by the C digit. The tens digit of the day is indicated by the B digit. The tens digit of the minute is indicated by the B and C digits. The use of the B and C digits to indicate the tens digit of the day, hour and minute is as follows:

0, 4, 5 or 9 in the B digit indicates 0 day tens
1 or 6 in the B digit indicates 1 day tens
2 or 7 in the B digit indicates 2 day tens
3 or 8 in the B digit indicates 3 day tens
0, 3 or 6 in the C digit indicates 0 hour tens
1, 4 or 7 in the C digit indicates 1 hour tens
2, 5 or 8 in the C digit indicates 2 hour tens
0, 1 or 2 in the C digit indicates 0 or 3 minutes tens
2, 4 or 5 in the C digit indicates 1 or 4 minutes tens
6, 7 or 8 in the C digit indicates 2 or 5 minutes tens
0, 1, 2, 3 or 4 in the B digit indicates low, that is, 1 or 2 minutes tens
5, 6, 7, 8 or 9 in the B digit indicates high, that is, 3, 4 or 5 minutes tens This translation is necessary to obtain the six digits of time from the five digits, B to F, of the tape. As an example, the seventeenth minute of the twenty-second hour of the fourteenth day would appear on the second line of the call entry as follows:

015427

7 in the F digit indicates 7 minutes units
2 in the E digit indicates 2 hour units
4 in the D digit indicates 4 day units
5 in the C digit indicates 2 hour tens
1 in the B digit indicates 1 day tens
5 in the C digit and
1 in the B digit indicates 1 minute tens When two of the five 2B0, 2B1, 2B2, 2B4 and 2B7 input register relays operated, Fig. 18, two grounds are closed from contacts on the two operated relays through individual contacts on relay DA operated Fig. 47, to operate two of the five TB0, TB1, TB2, TB4 and TB7 relays, Fig. 48. In a like manner when two of the five 2C0, 2C1, 2C2, 2C4 and 2C7 input register relays operate, Fig. 28, two grounds are closed through individual contacts on relay DA operated to operate two of five TC0, TC1, TC2, TC4 and TC7 relays, Fig. 48.

The selective operation of two of the five TB0, TB1, TB2, TB4 and TB7 relays closes a ground to a selected one of four leads to indicate the day tens. When relay DCA, Fig. 58, operates these leads are connected through individual contacts thereon and the selected grounded lead operates one corresponding relay in the Answer Day Tens register, Figs. 70 and Fig. J.

The operation of two of the five TC0, TC1, TC2, TC4 and TC7 relays closes a ground to one of three leads to indicate the hour tens. When relay DCA operates these leads are connected through individual contacts on relay DCA and the selected grounded lead operates one corresponding relay in the Answer Hour Tens register, Figs. 70 and Fig. H.

The operation of two of the five TC0, TC1, TC2, TC4 and TC7 relays also closes ground from two of five 2B0, 2B1, 2B2, 2B4 and 2B7 relays operated to one of six leads to indicate the minute tens. When relay DCA operates these leads are connected through to operate one of the minute tens output register relays.

Tracing the circuits in detail, for the second line digits, assumed in the foregoing, requiring translation, will disclose how the 5 in the C digit indicates 2 hours tens, the 1 in the B digit indicates 1 day tens and the 5 in the C digit and the 1 in the B digit cooperatively indicate 1 minute tens.

Digit 5 appearing in the second line digit position effects the simultaneous operation of relays 2C1 and 2C4 in the input register. Relay 2C1 operated connects ground through its contact 7, contact 39 of relay DA and the winding of relay TC1 to battery operating relay TC1 in the translator, Fig. 48. Relay 2C4 operated connects ground through its contact 7, contact 37 of relay DA and the winding of relay TC4 to battery, operating relay TC4 in the translator. With relays TC1 and TC4 operated, ground is connected through contact 10 of relay TC1, contact 10 of relay TC4, contact 7 of relay DCA and the winding of relay 2 in the Answer Hour Tens register, Figs. 70 and H, to establish a circuit corresponding to 2 answer hour tens.

Digit 1 appearing in the second line B digit position effects the simultaneous operation of relays 2B0 and 2B1. The operation of relay 2B0 connects ground through its contact 9, contact 35 of relay DA and the winding of relay TB0 to battery, operating relay TB0 in the translator, Fig. 48. The operation of relay 2B1 connects ground through its contact 10, contact 34 of relay DA and the winding of relay TB1 to battery operating relay TB1. Ground is then connected through contact 6 of relay TB0, contact 6 of relay TB1, contact 2 of relay DCA and the winding of relay 1 in the Answer Day Tens register, Figs. 70 and J, to indicate 1 day tens. Ground is connected also through contact 6 of relay 2B1, contact 5 of relay 2B0, contact 7 of relay TC1, contact 6 of relay TC4, contact 9 of relay DCA and the winding of the Minutes Tens register relay 1, Figs. 69 and G, to indicate 1 minute tens. Thus by means of the translation digits appearing in two positions of the number, namely the B and C positions, have been employed to afford information for an extra position.

*Calling office translator* (*Figs. 37, 39, 40, 41 and 42*).—The purpose of the calling office translator is to obtain an arbitrary three-digit number corresponding to the calling office. The information from which this number can be obtained is the calling office index and the marker group. In all cases the marker group is a fixed one for the duration of any given tape. The marker groups unit Marker GRP Units and marker group tens Marker GRP Tens switches, Fig. 32, are manually set to the marker group that is applicable to the tape being processed. As soon as the off-normal relays have operated the switch settings cooperate to effect the operation of one marker group relay out of a group of one hundred relays OT00 to OT99, Fig. 50, corresponding to the setting of the switches. Actually the setting of the marker group tens switch operates one of the ten relays in the group OTT0 to OTT9, Fig. 49. For instance assuming that the marker group tens switch is set to engage its first wired contact, contact 2, a circuit may be traced from ground through contact 3 of relay OGT or contact 3 of relay EGT, depending upon which is operated, through arm 2 and contact 2 of the switch and the winding of relay OTT0 in Fig. 49 operating relay OTT0. The marker group units switch sends out a ground on one of ten leads depending on its setting to pass through the contacts of the particular one of the OTT0 to OTT9 relays that is operated. For instance, assuming the marker group units switch set on its first wired contact, a path may be traced from ground through contact 37, relay OGU or EGU, arm 2 and contact 2 of the marker units switch, contact 1 of relay OTT0 and the winding of relay OTT0 to battery, operating the relay. This one ground that goes to one contact only on each of the OTT0 to OTT9 relays therefore will find only one circuit closed and will operate one of the OT00 to OT99 relays. This particular one of the OT00 to OT99 relays then represents the marker group that is set on the switches.

The office index indication is given by the relay that is operated in the office index circuit in the left-hand relay column in Fig. 50. In the case of summary tapes from the summarizer one out of these ten relays OT0–OT9 will be operated directly from the central office switch as soon as the off-normal relays have operated. The circuit may be traced from ground through contact 3 of relay EC0 or relay OC0, contact 17 of relay SA, arm 2 and top wired contact of switch Cent. Office and the winding of relay OT0 to battery operating relay OT0. This is possible on the summary tapes since the entire tape originates in the same central office.

In the case of detail tapes, that is any tape other than a summary tape, the office index relays OT0 to OT9 are operated from a decimal translation on the B digit of the first line register, Fig. 17, through make contacts of relay DA in Fig. 47. For example, the circuit for operating the 9 relay in this group, relay OT9, requires the simultaneous operation of relays 1B7 and 1B2, in the line register, Fig. 17. The circuit may be traced from ground through contact 9 of relay 1B2 operated, contact 8 of relay 1B7 operated, contact 5 of relay 1B0 normal, contact 28 of relay DA and the winding of relay OT9 to battery, operating relay OT9. Therefore on the detail tapes the office index relay may change from call to call. The office index relays originate three grounds each, one for the A, one for the B and one for the C digits of the calling office, which are sent out to individual contacts on all OT00 to OT99 relays. Each of the OT00 to OT99 relays is indicated as having thirty contacts, three for each of the ten class register relays. It is to be understood, of course, that the relay arrangement may be changed to suit particular conditions.

The three grounds that are originated on the particular office index relay that is operated will therefore find only one closed circuit for each depending on which of the hundred OT00 to OT99 marker group relays is operated. Each one of these three grounds is now individual to the particular combination of marker group and office index and therefore each of these grounds can be used to represent the A, B or C digit of the calling office. The output from the marker group relays therefore is brought to a cross connection field shown at the right of Fig. 50. Each of the A leads is brought to one set of 10 terminals, each of the B leads to a second set and each of the C leads to a third set. From these cross connection terminals leads are code cross connected in accordance with an arbitrary numbering scheme representing the calling office A, B and C digits to particular terminals in a cross connecting terminal field shown at the left of Fig. 60. On the output side of the cross connection field at the left of Fig. 60 the terminals are grouped in three groups, from top to bottom, the top group for the A or first digit of the calling office number, the middle group for the B or second digit of the calling office number and the bottom group for the C or third of the calling office number.

Figure 60:
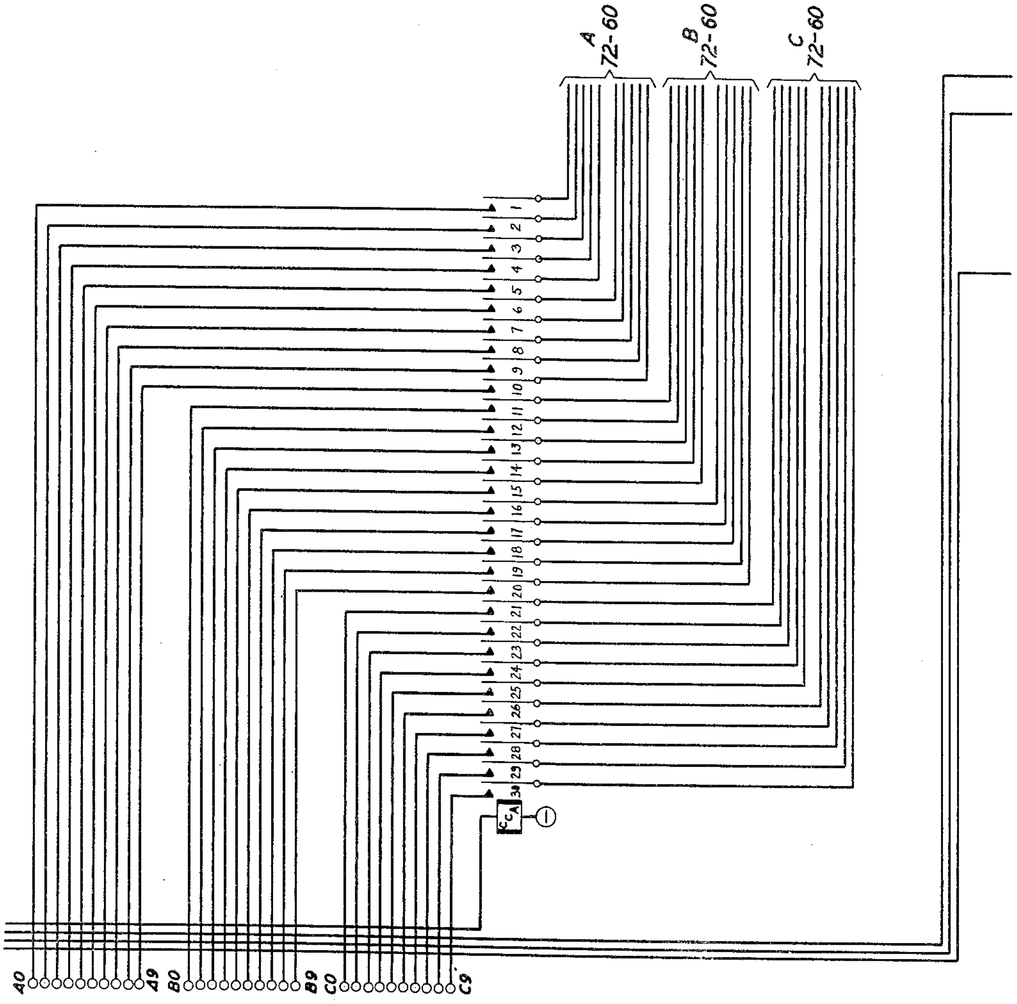

The leads from this output cross connection field at the left in Fig. 60 are carried through contacts of the calling office output register connector relay CCA to operate one relay in each of the calling office output registers, Calling Office A Digit, Calling Office B Digit and Calling Office C Digit, Fig. 72 and Fig. K. One and only one relay in each of the three calling office output registers will be operated for any one call. For example, a circuit may be traced from ground on contact 2 of relay OT0 through contact 2 of relay OT00, assuming these two relays operated, to terminal 0 of the B lead terminals, which it will be assumed is cross connected to terminal 0 of the B leads in Fig. 60, then through contact 11 of relay CCA, into the Calling Office B digit register, Fig. 72 and Fig. K, and through the winding of relay 0 in the register to battery operating relay 0.

*Called number.—General discussion.*—The numerical portion of the called line number, herein referred to as called number, is found for each detail call in the fourth line of the entry on the tape. The called number may be one of three different types, that is a three-digit number, a four-digit number with or without party letter or a straight five-digit number. In order that each type may be handled differently, an indication of the type, referred to as the called number index, is found in the C digit of the third line of each detail call entry. The numbers 0, 1 and 2 have been chosen to indicate three-digit, four-digit and five-digit numbers respectively. The tape to card converter stores in its input registers six digits, namely 3C, 4B, 4C, 4D, 4E and 4F, for handling called number for each detail call. If the 3C digit, or called number index is 0 the digits, 4B, 4C and 4D make up the three-digit called number and may be transferred directly, at the proper time, to the Called Number Hundreds, Called Number Tens and Called Number Units registers, Fig. 66 and Fig. D, Fig. 65 and Fig. D and Fig. 65 and Fig. D, respectively, for punching. For example, assuming relays 4B1 and 4B0 operated simultaneously, circuits may be traced from ground through contact 5 of relay 4B0 and contact 6 of relay 4B1, respectively, through contacts 1 and 2 of relay CD, Fig. 61, into the Called Number Hundreds register, Fig. 66 and Fig. D, and through the windings of relays 0 and 1 in this register to battery, operating relays 0 and 1, respectively. Relays of the group 4C0 to 4C7 and 4D0 to 4D7 will control relays in the Called Number Tens and Units registers, respectively, over similar paths. Digits 4E and 4F, as read from the tape, will be 0 in this case and will not be transferred to the output. The ten thousands and thousands called number columns and party column on the output card will in this case be blank. If the called number index is 1, indicating a four-digit number the digits 4B, 4C, 4D and 4E may be transferred at the proper time to the output registers Called Number Thousands, Called Number Hundreds, Called Number Tens and Called Number Units in a similar manner for punching. Digit 4F will in this case be one of several values. A 0 will indicate no party letter and cause the party column to be blank. A 1, 2, 3, 4 or 8 will be treated in the same manner as a 0. Nos. 5, 6, 7 or 9, as read from the tape, indicate a party letter of J, M, R or W respectively. For example, assuming that the 4F digit is 5 corresponding to party J, a circuit may be traced from ground through contact 8 of relay 4F4, contact 8 of relay 4F1, contact 23 of relay C1, Fig. 61, and the winding of relay 5J1 to battery in the Called Party register, Fig. 67 and Fig. F, operating relay 5J1 corresponding to party J. Corresponding paths may be traced to operate relays NPY, 6M4, 7R9 and 9W6 to indicate No Party, party M, party R and party W respectively. Digit F in this case is translated to the underpunch of the IBM two-hole code for letters and placed in the party output register which will cause a hole to be punched in a column to represent the correct party letter. This will be made clear hereinafter. If the called number index is 2 the digits 4B to 4F, inclusive, are connected straight through to the Called Number Ten Thousands, Fig. 66 and Fig. E, Called Number Thousands, Fig. 66 and Fig. C, Called Number Hundreds, Fig. 66 and Fig. D, Called Number Tens, Fig. 65 and Fig. D and Called Number Units, Fig. 65 and Fig. D, output registers, respectively.

A description of the IBM card and the two-hole code for letters at this point will explain the basis for punching party letter. The IBM card, as heretofore mentioned, has 80 columns, each of which may be punched for a number or letter. The columns are divided into twelve horizontal rows designated 12, 11, 0, 1, 2, 3, 4, 5, 6, 7, 8 and 9. A hole may be punched in a particular column in any position from 0 to 9, inclusive, to represent a numerical digit. A letter is indicated in any particular column by two holes one of which is in horizontal row 12, 11 or 0 and the other in one of the horizontal rows 1 to 9. A hole in the upper group, 12, 11 and 0 is known as an overpunch; a hole in the lower group, 1 to 9, inclusive, is known as an underpunch. The combination of overpunch and underpunch required for each of the letters in the alphabet is shown in the table below:

| | | Underpunch | | | | | | | | |
|---|---|---|---|---|---|---|---|---|---|---|
| | | 1 | 2 | 3 | 4 | 5 | 6 | 7 | 8 | 9 |
| | 12 | A | B | C | D | E | F | G | H | I |
| Overpunch | 11 | J | K | L | M | N | O | P | Q | R |
| | 0 | | S | T | U | V | W | X | Y | Z |

The tape to card converter for simplicity of circuit arrangement, was designed to use only the underpunch of the two-hole letter code. The IBM tabulator is arranged to print the letters J, M, R and W from the underpunches 1, 4, 9 and 6, respectively at a later stage in processing.

*Detailed operation for called number.*—A further detailed description at this point of the circuit operation for handling called number will facilitate its understanding. Let us assume a called number of 1234M. Call entry information will then be registered in the tape and in the input register as follows: 1 in digit 3C to indicate a four-digit number, as heretofore explained, 1 in the 4B digit, 2 in the 4C digit, 3 in the 4D digit and 4 in the 4E digit for the number 1234 and a 6 in the 4F digit to represent the party letter M. Input registers relays 3C0 and 3C1 which compose the called number index will pass ground from contact 6 of relay 3C1 through contact 5 of relay 3C0, contact 7 of relay CRA, Fig. 24, and the winding of relay C1 to battery, Fig. 61, operating register connector relay C1 when connector control relay CRA is operated. This relay will operate when the output registers have been down-checked and the input registers have been up-checked, as described in the section on transfer control.

The output registers will then be filled with complete call information. The digits for the called number will be cut through as follows.

Figure 66:
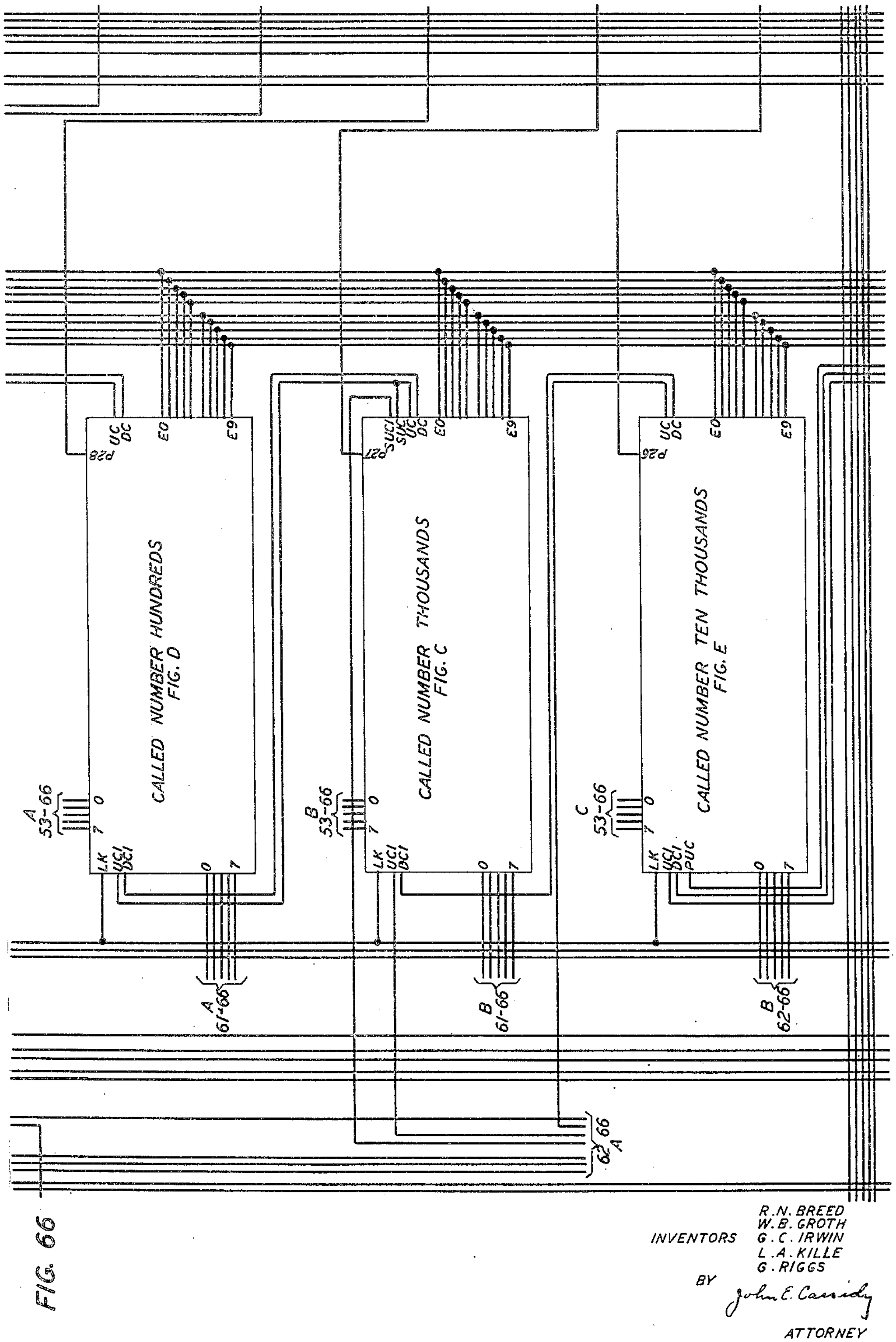
Figure 67:
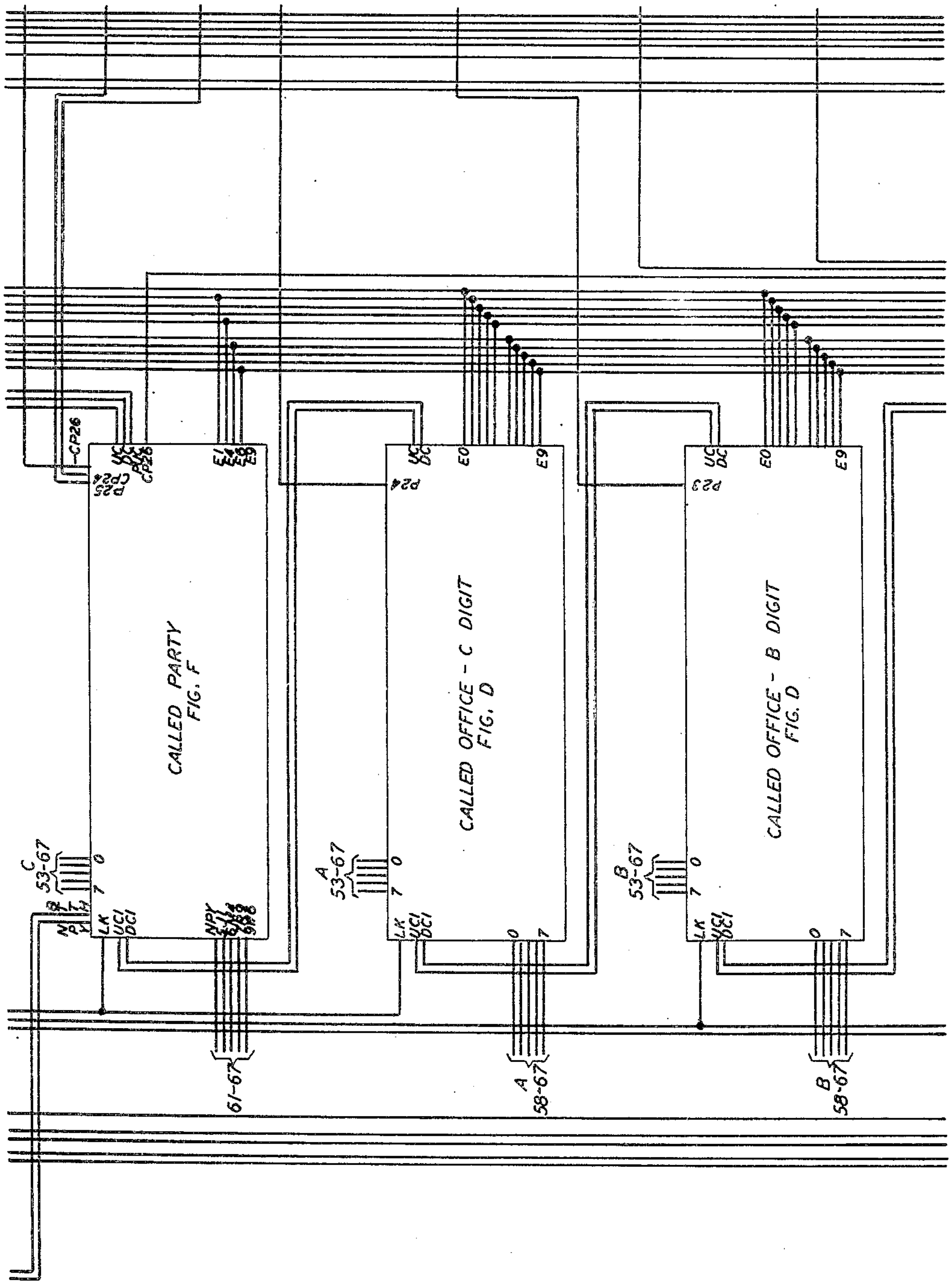

With relays 4B0 and 4B1 operated simultaneously to indicate numeral 1 in the thousandths digit, grounds are supplied from contact 5 of relay 4B0 and contact 6 of relay 4B4 through circuits which extend through contacts 1 and 2 of relay C1 into the Called Number Thousands register, Fig. 66 and Fig. C, and through the windings of relays 0 and 1, respectively, in the register to register the numeral 1 on a two-out-of-five basis.

To indicate the hundreds digit 2, relays 4C0 and 4C2 will be operated simultaneously. Two circuits will thus be established from ground on contact 5 of relay 4C0 and ground on contact 7 of relay 4C2, through contacts 6 and 8 respectively of relay C1 into the Called Number Hundreds register, Fig. 66 and Fig. D, and through the windings of relays 0 and 2 respectively in the register, operating relays 0 and 2 simultaneously to indicate the hundreds digit 2 on a two-out-of-five basis.

Figure 65:
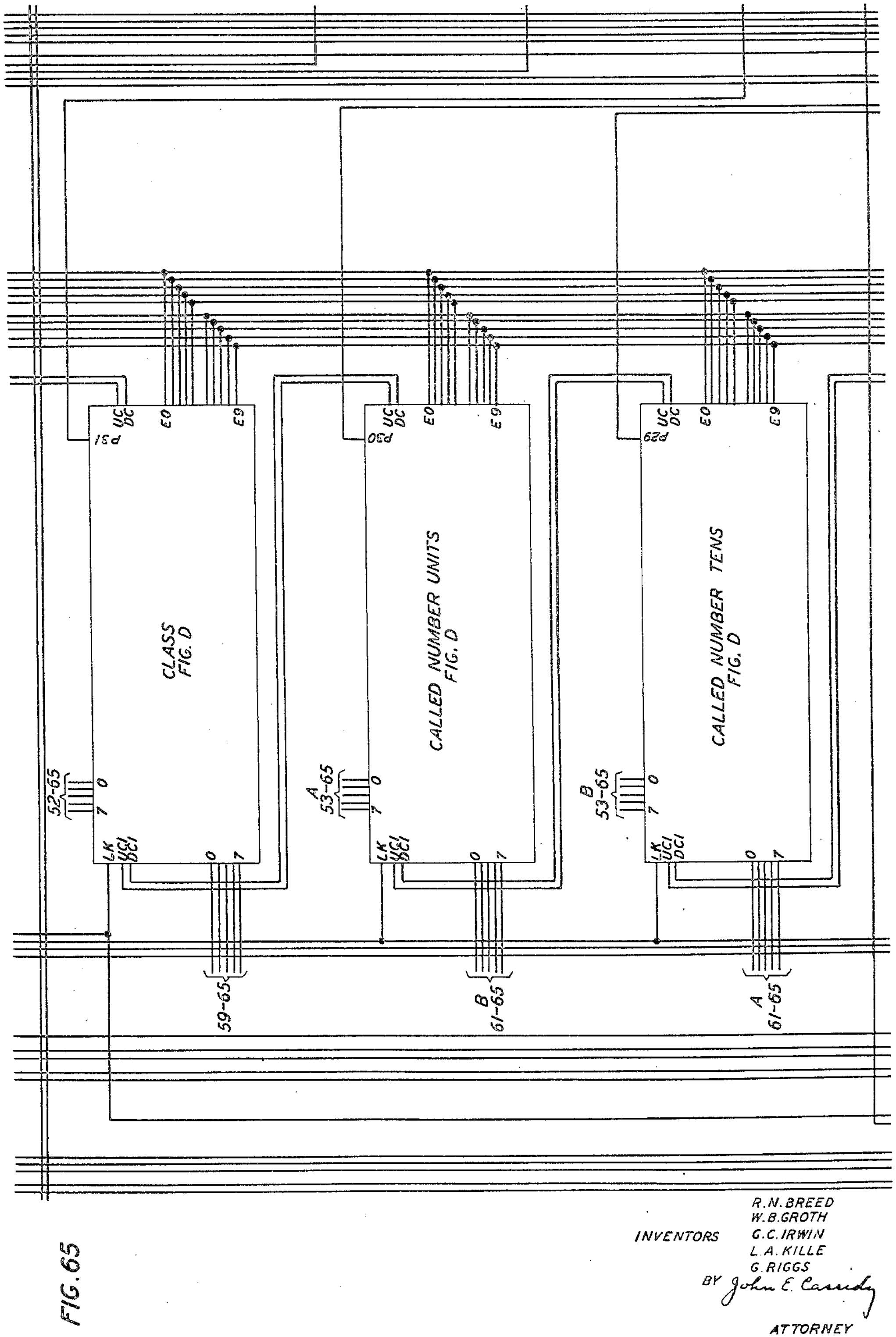

To indicate the tens digit 3, relay 4D1 and 4D2 will be operated simultaneously establishing two circuits from ground on contact 6 of relay 4D1 and ground on contact 7 of relay 4D2 through contacts 12 and 13 of relay C1 into the Called Number Tens register, Fig. 65 and Fig. D, and through the windings of relays 1 and 2 in the register, respectively, to battery operating the relays to indicate the tens digit 3 on a two-out-of-five basis.

To indicate the units digit 4, relays 4E0 and 4E4 will be operated simultaneously establishing two circuits from ground on contact 5 of relay 4E0, and ground on contact 6 of relay 4E4 through contacts 16 and 19, respectively, of relay C1 into the Called Number Units register, Fig. 65 and Fig. D, and through the windings of relays 0 and 4 in the register, respectively, to battery operating the relays to indicate the units digit 4 on a two-out-of-five basis.

To indicate the party letter M relays 4F2 and 4F4 will be operated simultaneously since the letter M as explained in the foregoing is indicated by a 6 in the F digit of the fourth line. A single circuit may then be traced from ground through contact 7 of relay 4F4, contact 7 of relay 4F2, contact 23 of relay C1 into the Called Party register, Fig. 67 and Fig. F, and through the winding of relay 6M4 to battery, operating the relay which corresponds to party M.

Shortly after all output registers, including those enumerated above for called number have operated a card will be punched, in a manner to be explained, with this information. The called number registers, thousands, hundreds, tens and units will cause assigned vertical columns of the IBM card to be punched with 1, 2, 3 and 4, respectively, thus effecting a translation by the configuration of their contacts from a two-out-of-five registration to a one-hole punch. Meanwhile party register relay 6M4 will cause a 4 to be punched in the party column on the card signifying the party letter M thus effecting a translation from a decimal registration of the dialed equivalent of party letter to the underpunch of the IBM code for that letter. The Called Number Ten Thousands register will not be filled for this call. The complete output register up-check however will be continuous since either the called number ten thousands register or the called party register may be filled alternatively to afford a check as described hereinafter.

A three-digit called number will be registered in the output in a similar manner using output register connector relay C0 operated from a called number index of 0. The circuit may be traced from ground through contact 5 of relay 3C7, contact 6 of relay 3C4, contact 8 of relay CRA and the winding of register connector relay C0 to battery, operating the relay. As may be understood from the foregoing the called number hundreds, tens and units registers are then filled from the B, C and D digits of the line 4 input register. Relay C0 from ground on its contact 17 will also operate relay NPY in the Party register indicating no party, and from ground on its contact 16 will operate relay 3DN, Fig. 62, indicating a three-digit number in the output register grouping circuit. These relays enable an output register up-check. The called number ten thousands and the called number thousands will not be filled for this kind of call.

A four-digit called number without a party letter will be transferred to the output through register connector relay C1 as described above for a four-digit number with party. Relay C1, however, will extend a lead from ground through any of various combinations of operated relays, corresponding to digits 0, 1, 2, 3, 4 and 8 in the line 4F digit input register, through contact 21 of relay C1 and the winding of relay NPY in the Called Party register, Fig. 67 and Fig. F, to indicate no party. This fills the party register as described above for a three-digit number. Actually only a zero should be encountered in the 4F digit if there is no party letter. In this case the ground is connected through contact 6 of relay 4F7 and contact 6 of relay 4F4.

A five-digit number will be transferred to the output through register connector relay C2 operated from a called number index of 2. The circuit may be traced from ground through contact 7 of relay 3C2, contact 6 of relay 3C7 released, contact 6 of relay 3C0, contact 6 of relay CRA and the winding of relay C2 to battery, Fig. 62, operating the relay. The ten thousand, thousand, hundreds, tens and units called number registers will then all be filled from the B through F digits of the line 4 input register. The party register will not be filled in this case.

When processing a summary tape the last day is registered since the circuit is arranged on a flexible period basis. The last day is not registered when processing detail tapes.

On a flexible period basis, ground is connected from contact 3 of relay ODT, or contact 3 of relay EDT, operated, through contacts 9 and 10 in parallel of relay SA operated. From contact 9 the path extends to arm 2 and from contact 10 to arm 3 of the Last Day Tens switch. It will be assumed that the switch arm engages its top wired contact. This extends arm 2 through contact 9 of relay SCA into the Last Day Tens register, Fig. 64 and Fig. D, and through the winding of relay 7 therein to battery, operating the relay. The path through arm 3 extends through contact 8 of relay SCA into the same register to operate relay 4 therein. The operation of relays 4 and 7 simultaneously, according to the two-out-of-five code, register 0 tens. By moving both switch arm 2 and 3 simultaneously into successively lower positions 1, 2, or 3 tens will be registered according to the code, the registration of 0, 1, 2 or 3 in the register corresponding to the setting of the switch. At the same time ground is connected from contact 3 of relay ODU or contact 3 of relay EDU through contact 14 of relay SA, operated, in parallel to arms 2 and 3 of the Last Day Units switch. It will be assumed that arms 2 and 3 of this switch also are in engagement with their effective top contacts. A circuit may then be traced from arm 2 through contact 14 of relay SCA into the Last Day Units register and through the winding of relay 7 to battery, operating relay 7. Switch arm 3 extends through contact 13 of relay SCA and the winding of relay 4 to battery in the same register, operating relay 4. Relays 4 and 7 together register the numeral 0 according to the two-out-of-five code. As the switch arms 2 and 3 are actuated simultaneously to engage successively lower terminals of the switch, digits 1 to 9 will be successively registered in the register according to the two-out-of-five code to designate the last day of a period, the registration corresponding to the positions of the switch arms.

*Month.*—The month is derived from the month set-up switches, the settings of which are checked against tape identity on the input tape. For example, it will be assumed that the month to be registered is January. The Month Tens switch will be set so that its arms engage its top wired terminal and the Months Units switch is set so that its arm 3 engages its top wired terminal. A circuit may then be traced from ground on relay OMT contact 3, operated, arm 2 and top wired terminal of Month Tens switch, terminal 4 of relay OMU operated, arm 3 and top wired terminal of Month Units switch, terminal 1 of relay SMC and the winding of the relay JAN in the Month register, Fig. 63 and Fig. B. As a second example it will be assumed that the month November is to be registered. The Month Tens switch will be set on its second wired terminal from the top. The Month Units switch will be set so that its arm 2 engages its second wired terminal from the top. A circuit may then be traced from ground through contact 3 of relay OMT through arm 2 and its second wired terminal from the top, contact 3 of relay OMU operated, arm 2 of switch Month Units, contact 11 of relay SMC and the winding of relay NOV in the Month register, Fig. 63 and Fig. B.

On detail calls it is necessary to advance the month registration by 1 for instance from January to February or from November to December if a particular call is made on the first day of the following month. The day tens digit of the start time line determines if the month is registered as on the month set-up switches or one higher than the setting on the month set-up switches. This is determined by the appearance of a 4 or a 9 in the B digit of the start time line. The 2B0, 2B1, 2B2, 2B4 and 2B7 relays of the input register, Fig. 18, each connect an individual ground through contacts 31 to 35 of relay DA, Fig. 47, and the windings of translator relays TB0, TB1, TB2, TB4 and 2B7, Fig. 48, which operate as do the corresponding input register relays. If a 4 appears in the translator, ground is connected through contact 3 of relay TB0 and contact 3 of relay TB4. If a 9 appears ground is connected through contact 3 of relay TB2 and contact 4 of relay TB7. The branches are joined and extend through contact 9 of relay CRA operated and the winding of relay NMC, operating the relay, Fig. 56. There are twelve sets of contacts on each of relay SMC and NMC numbered 1 to 12 on each relay. Each of their upper contacts is connected in parallel to correspondingly numbered contacts on the other. The lower contacts 1 to 12 of relay SMC extend to the windings of relays January to December respectively in the Month register. Reference to the lower terminals of relay NMC discloses that each is formed in parallel to a one higher numbered terminal of relay SMC, so that when relay NMC is operated the next succeeding month is registered. If any digit other than 4 or 9 appears in this translator, such for instance as 2, a circuit may be traced from ground through contact 1 of relay TB0, contact 10 of relay CRA and the winding of relay SMC to battery operating the relay which effects a normal registration of the month as set up on the switches.

On summary calls ground is closed through contact 20 of relay SA operated and contact 10 of relay CRA operated and the winding of relay SMC to battery to operate relay SMC which registers the month as set on the month set-up switches.

*Output registers and output register connectors.—Output registers general.*—The output registers of the tape to card converter are designed to store information which is in a form that may be used by the IBM punch and to control the punching of individual cards for detail calls and subscriber summaries. Since it is desirable that the tape to card converter read information for individual detail calls or summaries at AMA tape reader speed, and since the converter must feed and control the IBM punch at its maximum speed of 100 cards per minute, a two-step arrangement using input and output storage registers with a transfer circuit has been adopted. Since part of the information for detail calls or summaries which is read from the AMA tape and stored in input registers must be altered for the output, some of the input registers lead directly into translator circuits. The output of the translators and the output of the remaining input registers which do not require translation compose complete information for any given detail call or summary which may be transferred to the output registers when the signal is given that the output registers have been emptied and the input registers are filled. In general, the design is such that an output register must be provided and filled for every hole to be punched on a card. The information required on a card is mostly numerical or a single numerical representation of a letter which calls for one hole per column and therefore one output register per column. In alternate columns on both detail and summary cards a so-called X or Y punch is required for identification. This information stored in the output is confined to one register. An X or Y punch and numeral may be placed in one column. Punching this column then requires the use of two output registers. Another irregularity in the register per column arrangement is the month register which controls the punching of two columns.

A tape to card converter will be equipped with 30 output registers. These are indicated on the ten figures, Fig. 63 to Fig. 72, inclusive, 3 registers to each figure. The registers themselves are shown on ten lettered figures, Figs. A to H, inclusive and Figs. J and K. As is apparent from the foregoing, certain of the registers are operated on a two-out-of-five basis and others on a decimal basis. The selection of output register type, that is two-out-of-five or decimal, for a given register, has been made for simplicity of circuit operation and/or economy in the use of apparatus. Registers of the two-out-of-five type show a direct saving in relays. Registers for calling office, start time tens and party have been made decimal type for simplicity of translator circuit design. Special registers such as month and overpunch are operated on a one relay only basis and therefore resemble decimal registers.

The arrangement, connections and designations of the output registers are shown in Figs. 63 to 72 inclusive. Each output register carries the designation of its register. The register designation indicates the item which is to be punched on the card. The order in which the registers have been laid out was chosen to resemble the order in which information is found in the tape entry. The order of the registers is fixed by the up-check and down-check leads which thread through the system of registers and through the contacts of the individual relays within the registers. The up-check lead designated UC and the down-check lead designated DC are each shown entering the individual registers on their right-hand side. If the proper number of relays within a register is operated a continuous path is afforded through contacts of each register for the up-check lead. The up-check lead is shown emerging from each individual register on its left-hand side designated UC1. The down-check lead finds a continuous path through the various registers and through contacts of all individual relays within each register when all relays in the registers are released. After passing through the relay contacts of a particular register it is shown emerging at the left-hand side of the register designated DC1. The direction of passage through a register for both the UC and the DC leads is from right to left except that the DC lead passes through contacts from left to right for registers operating on a two-out-of-five code basis to afford an economy of total required contacts for both up-check and down-check in an arrangement which is also proof against the formation of spurious paths.

*Sources of information and associated connectors.*—The output registers of the tape to card converter, as heretofore explained, derive their information from input registers, translators, and set-up switches through output register connectors. The detailed circuit operation of these switches has been described hereinbefore in appropriate sections. The object of this section, which is largely a general summation of the input to output register operation, is to tie in the input circuits of the converter with the output registers in groups and by name and to describe the manner in which the associated connectors are operated.

*Calling office.*—The designation of the calling office is presented as an arbitrary three-digit number on a decimal basis by the marker group translator units circuits, Figs. 49 and 50, through a cross connection field, Figs. 50 and 60, and output register connector relay CCA, Fig. 60, to output registers Calling Office A Digit, Calling Office B Digit and Calling Office C Digit. The purpose of the cross connection field is to make the selection of the digits representing calling office purely arbitrary. The output register connector relay CCA is operated directly from ground on contact 1 of connector control relay CRA, Fig. 24. The common connector relay CCA is operated for each call on any type of tape. The calling office output registers for the A, B and C digits are therefore filled for any summary or detail call.

Figure 57:
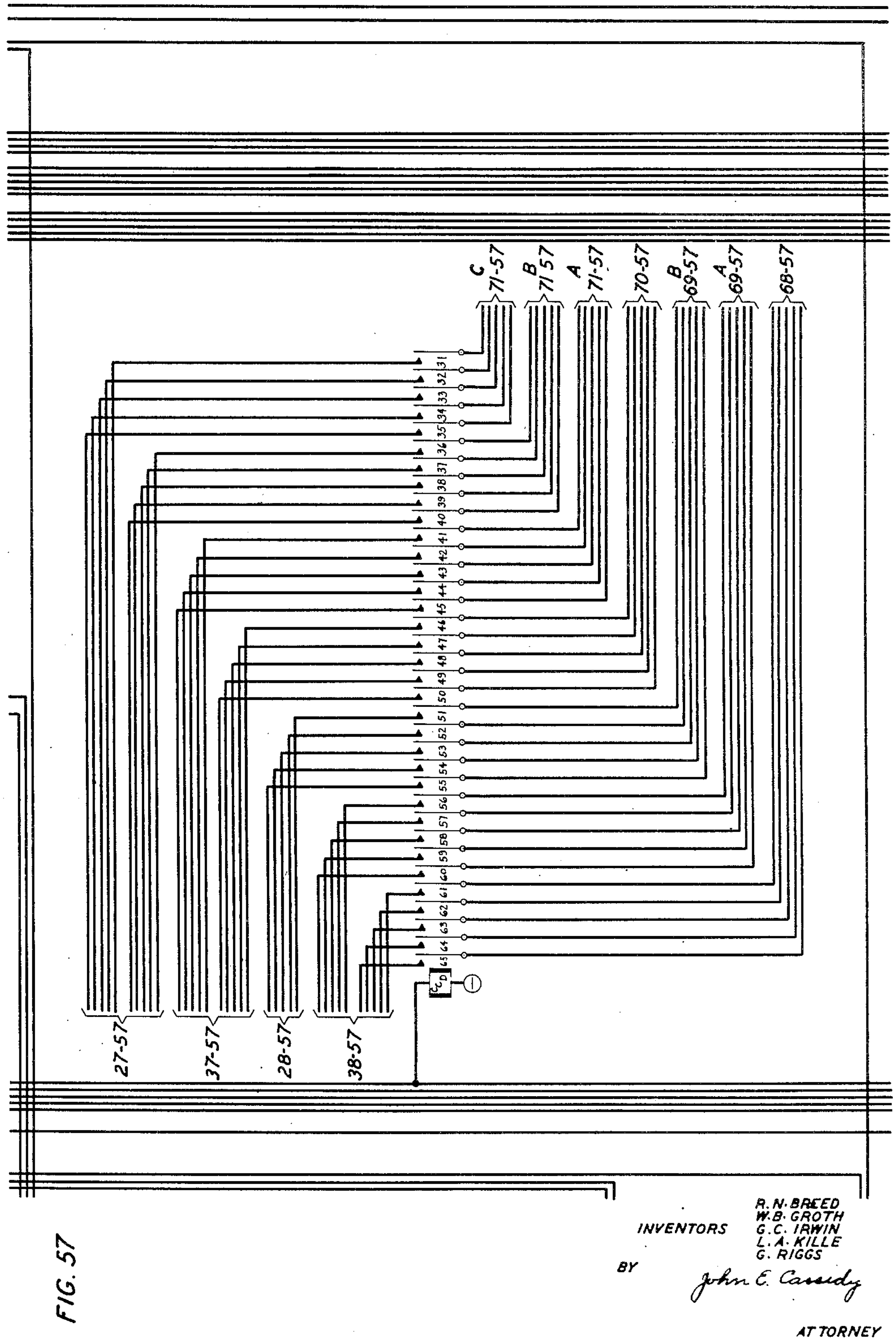

*Calling number.*—The calling number is passed to the output by the line 1 input register, Figs. 17, 27 and 37, as a four-digit number on a two-out-of-five basis through output register connector relay CCD, Fig. 57, to fill output registers Calling Number Thousands, Calling Number Hundreds, Calling Number Tens and Calling Number Units, Fig. 66 and Fig. C, Fig. 66 and Fig. D, Fig. 65 and Fig. D, and Fig. 65 and Fig. D, respectively; the connector relay CCD is operated directly from ground through contact 1 of connector control relay CRA. Relay CCD is also a common connector which is operated for every call on all tapes. The calling number output registers for the thousands, hundreds, tens and units are therefore operated for every summary and detail call. The information in these registers will be exactly as found in the first line of the input tape entry.

Figure 58:
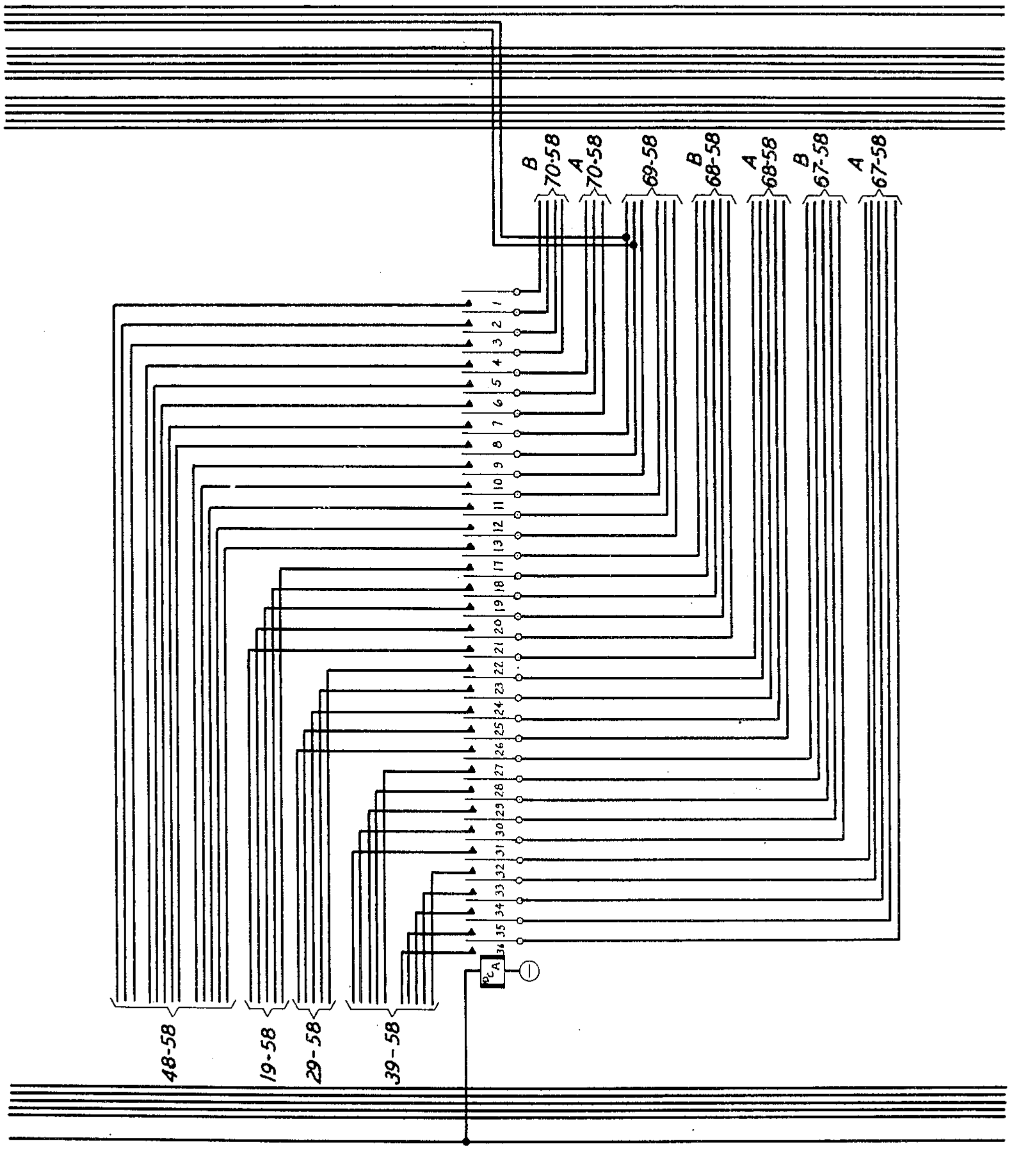

*Start time.*—The start time is transferred from the start time translator, Fig. 48, and the line 2 input register, Figs. 18, 28 and 38, as a six-digit number through output register connector relays to output registers Answer Day Tens, Answer Hour Tens, Answer Minute Tens, Answer Day Units, Answer Hour Units and Answer Minute Units. The output registers for the three tens digits are abbreviated decimal registers, that is each has fewer than ten relays, whose information is taken from the start time translator. These registers are abbreviated since the day tens cannot exceed three, the hour tens two and the minute tens five. The three units digits are transferred from the line 2 input register relays 2D0 to 2D7, Fig. 28, relays 2E0 to 2E7, Fig. 38, and relays 2F0 to 2F7, Fig. 38, on a two-out-of-five basis exactly as read in a tape entry. The output register connector relay DCA, Fig. 58, is used to pass the information for day tens, hour tens and minute tens and is operated from ground on contact 8 of relay DC through contact 3 of relay CRA operated. The relay DC is part of a detail connector which is operated for every detail call. The information stored in the input register for day units, hour units and minute units is connected to the output registers through common connector relay CCD which is operated directly from the ground on contact 1 of connector control CRA. The registers for the three tens digits will be filled for detail calls only, while those for the units digits will be filled for every detail call or summary. Their use in connection with summary is described in the next succeeding paragraph.

Figure 68:
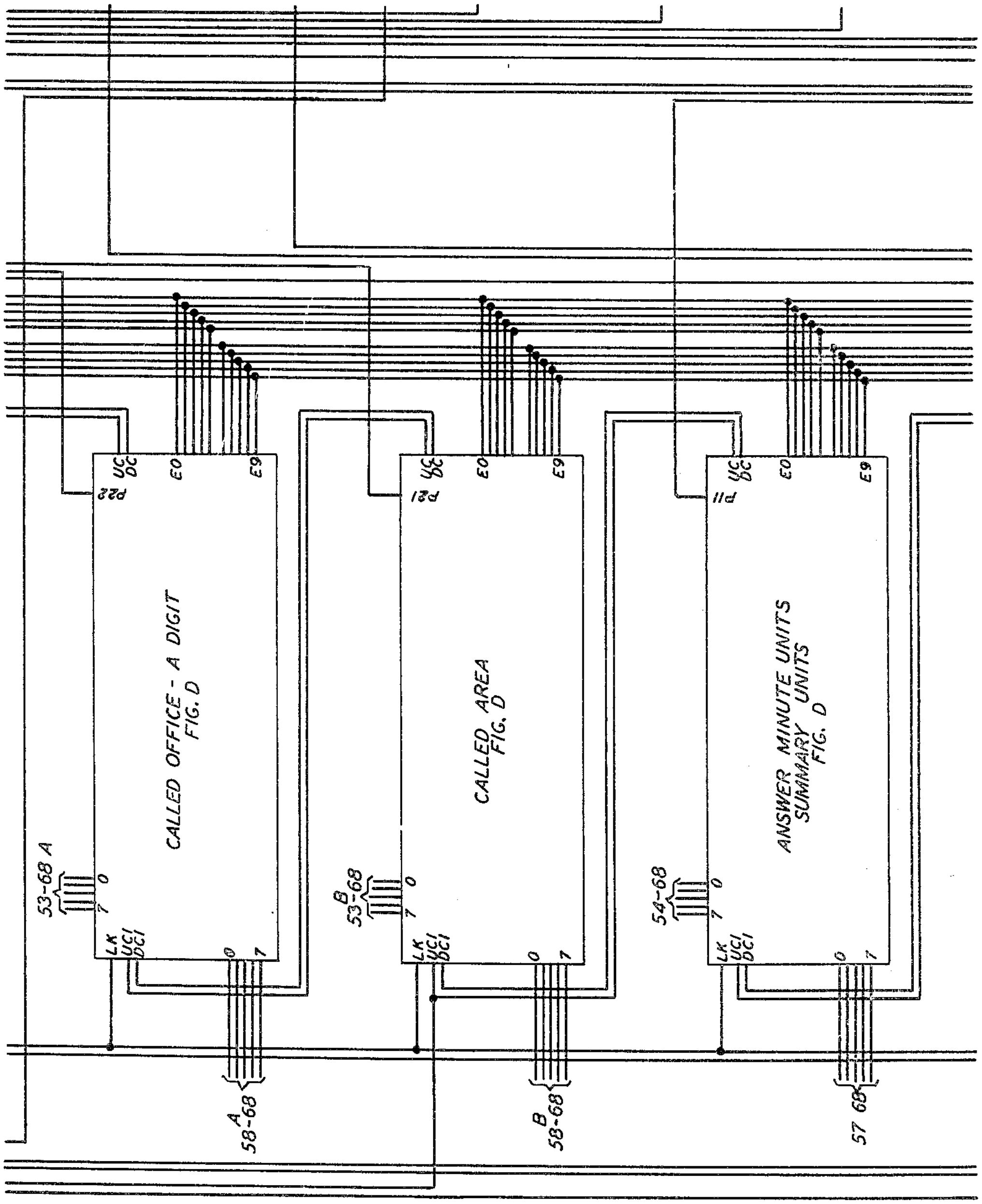
Figure 69:
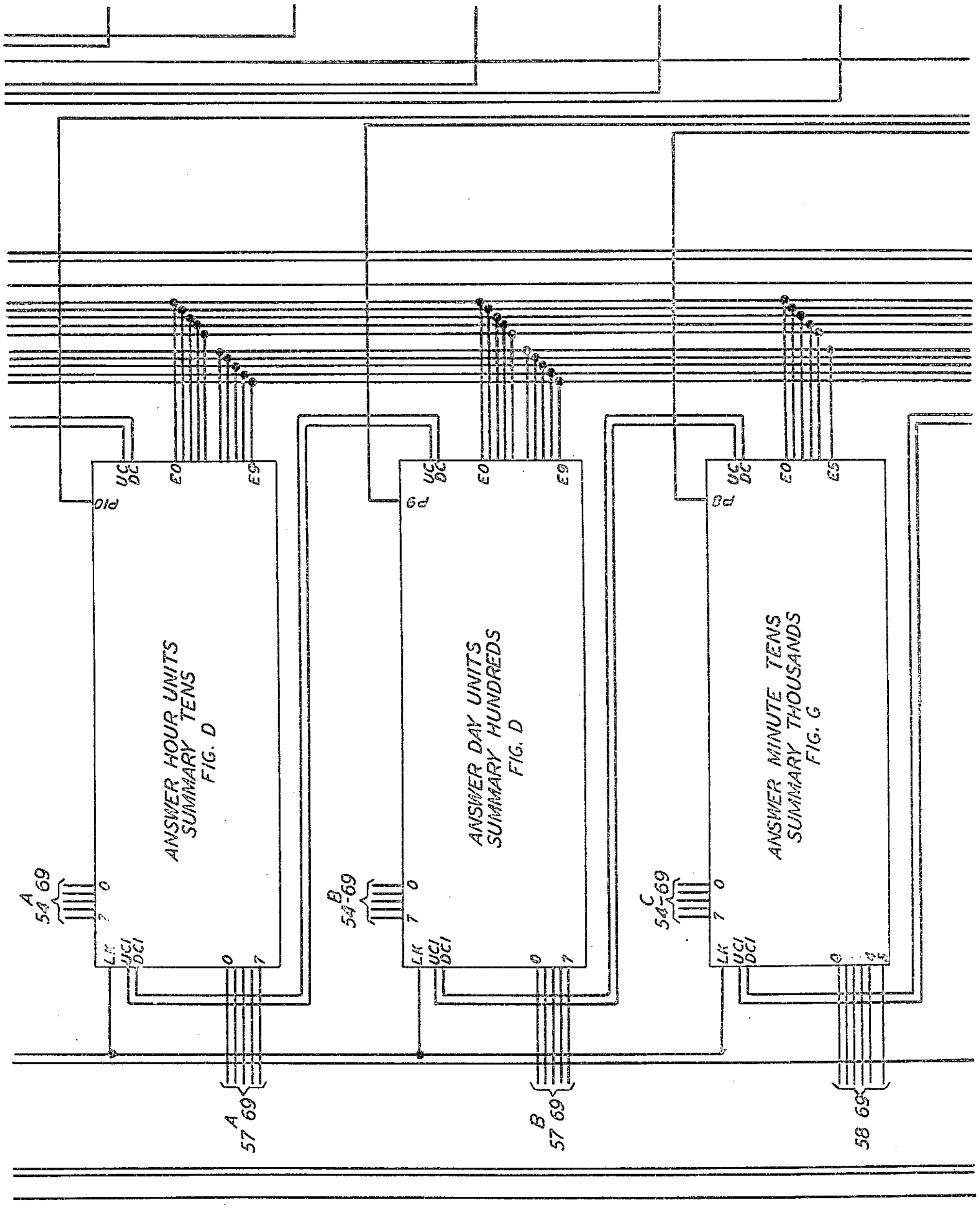
Figure 70:
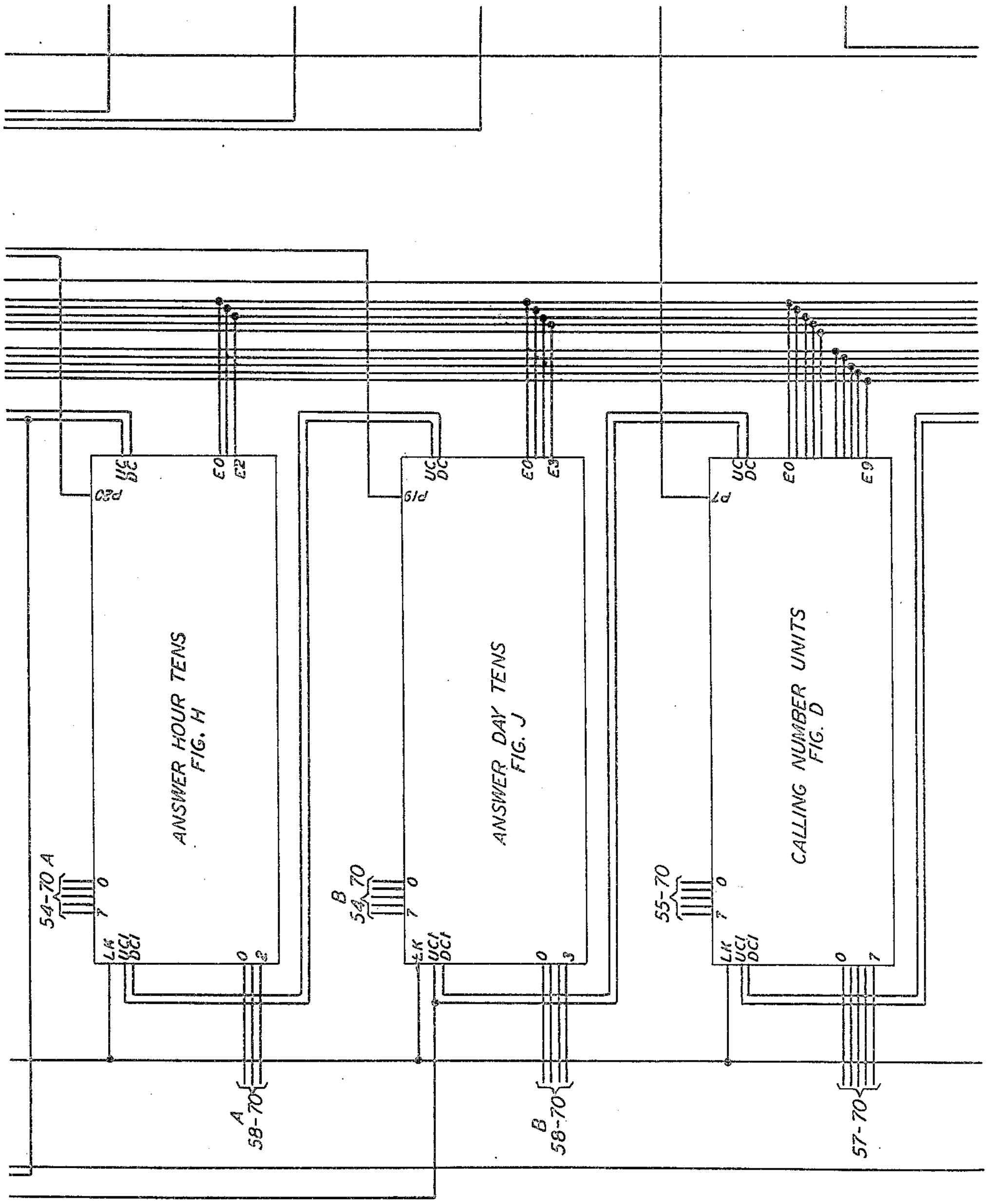
Figure 71:
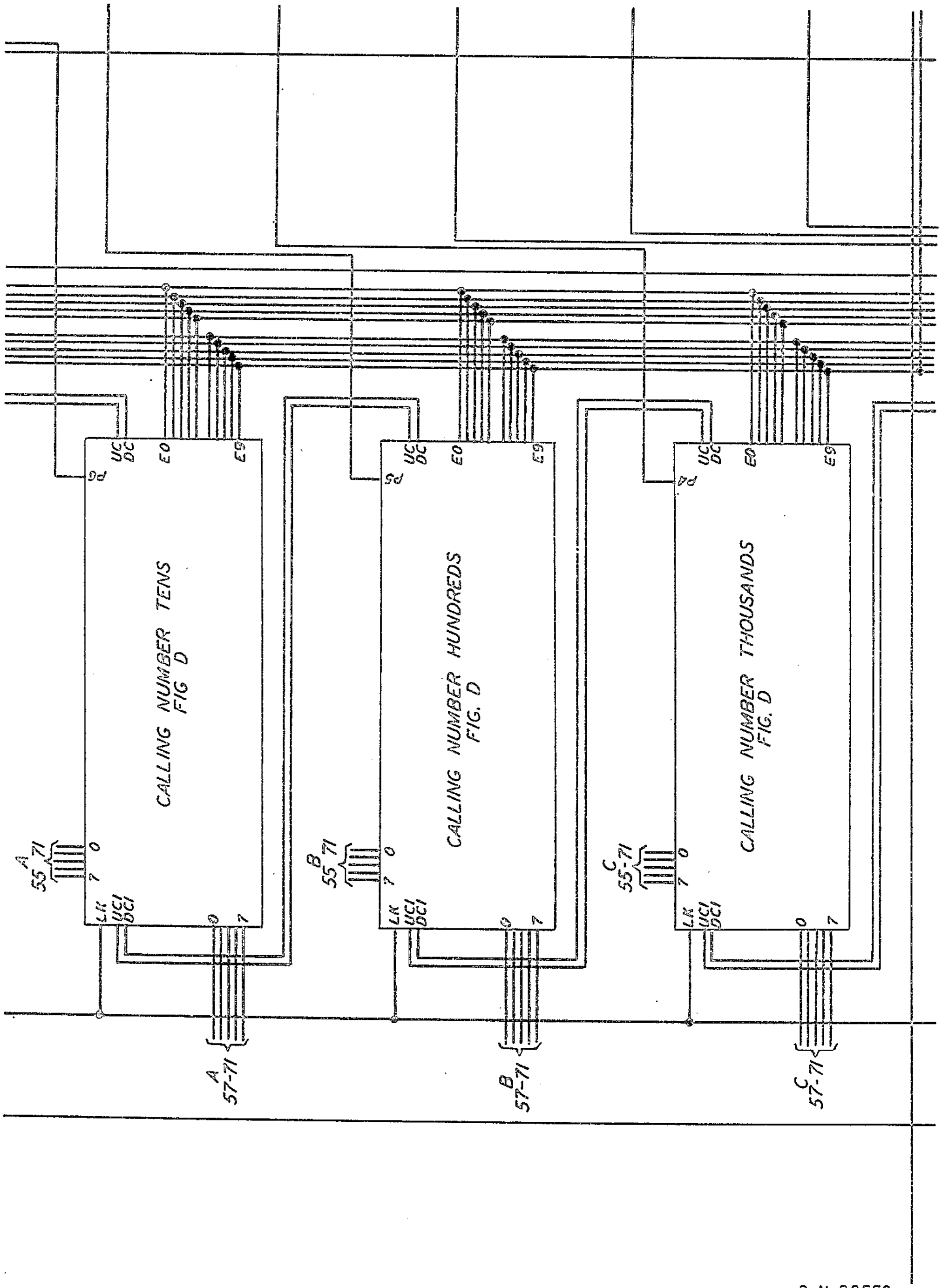

*Summary.*—A summary of message units for a given entry on a summary tape is transferred directly from line 2 of the input register as a four-digit number, namely, thousands, hundreds, tens and units, on a two-out-of-five basis for the latter three digits and a decimal of 0 or 1 for thousands through various output register connector relays to fill output registers Summary Thousands, Summary Hundreds, Summary Tens and Summary Units, Fig. 69 and Fig. B, Fig. 69 and Fig. D, Fig. 69 and Fig. D, and Fig. 68 and Fig. D, respectively. The circuits having the information for the thousands digit are closed through connector relay SCA, Fig. 56, which is operated for summaries only, from ground on contact 19 on tape index register relay SA through contact 2 of connector control relay CRA. The hundreds, tens and units digits are closed through connector relay CCD as described in the preceding paragraph. The output registers used for the four digits of summary were chosen so that the input register digits 2C, 2D, 2E and 2F might be transferred to the same output registers directly or indirectly for both summaries and detail calls.

*Called office and area.*—The three digits used to indicate called office and the single digit for area are transferred directly from the line 3 input register on a two-out-of-five basis through output register connector relays DCA to fill the output registers. The Called Area register, Fig. 68 and Fig. D, is controlled by relays 3B0 to 3B7, Fig. 19. The Called Office A Digit register, Fig. 68 and Fig. D, is controlled by relays 3D0 to 3D7, Fig. 29. The Called Office B Digit register, Fig. 67 and Fig. D, is controlled by relays 3E0 to 3E7, Fig. 39. The Called Office C Digit register, Fig. 67 and Fig. D, is controlled by relays 3F0 to 3F7, Fig. 39. The connections between the input registers and the output registers pass through contacts of relay DCA in each instance to operate the registers directly, that is without translation, exactly as read from the input tape. The connector relay DCA is operated for detail calls only, as described, from ground on contact 8 of the tape index register relay DA through contact 3 of connector control relay CRA. The four registers described in this paragraph are not filled when summary tapes are being processed.

*Called number and party.*—The derivation of called number has been described hereinbefore, in the description of the input part of the circuit. A description of the connectors and the disposition of called number digits in the output registers will complete the description of this feature.

Figure 61:
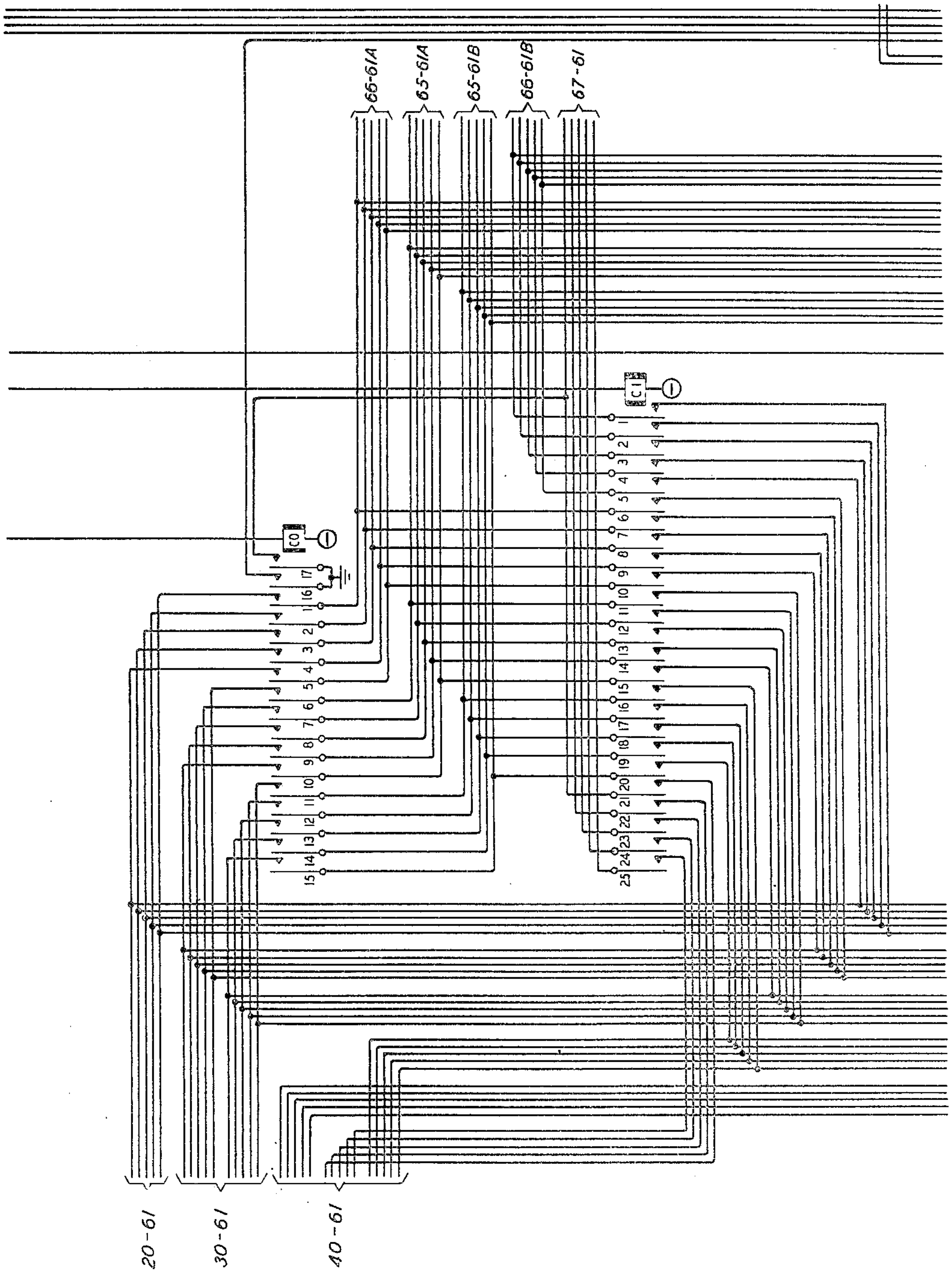

A three-digit called number is transferred directly from line four of the input register on a two-out-of-five basis through output register connector relays C0, Fig. 61, to fill output registers Called Number Hundreds, Fig. 66 and Fig. D, Called Number Tens, Fig. 65 and Fig. D, and Called Number Units, Fig. 65 and Fig. D. The called number hundreds, tens and units registers are controlled by input register relays 4B0 to 4B7, Fig. 20, 4C0 to 4C7, Fig. 30, and 4D0 to 4D7, Fig. 30, respectively. The remaining called number registers, Called Number Ten Thousands, Fig. 66 and Fig. E, and Called Number Thousands, Fig. 66 and Fig. C and the Called Party register, Fig. 67 and Fig. F, will not be set up for punching in this case. Called number index zero connector relay CO, which identifies a three-digit called number, is operated from ground through contact 5 of relay 3C7, Fig. 29, contact 6 of relay 3C4, these relays being operated for a zero registration in the C digit of the third line of the input register and through contact 8 of relay CRA.

A four-digit called number is identified by the appearance of the digit 1 in the office index, that is, in the C digit position of the third line of the input register. This effects the operation of relays 3C0 and 3C1, Fig. 29. The operation of these relays in turn operates output register connector relay C1, Fig. 61, over a path from ground on contact 6 of relay 3C1, contact 5 of relay 3C0, contact 7 of relay CRA and the winding of relay C1. The four-digit number has its thousands, hundreds, tens and units digits stored in the 4B0 to 4B7, 4C0 to 4C7, 4D0 to 4D7 and 4E0 to 4E7 relays, respectively, Figs. 20, 30 and 40. Combinations appearing on these relays are then transferred on a two-out-of-five basis through the operated register connector relay C1 to the output registers Called Number Thousands, Fig. 66 and Fig. C, Called Number Hundreds, Called Number Tens and Called Number Units, respectively. If there is a party letter it is stored in the relays for the F digit of the fourth line, relays 4F0 to 4F7, and will be transferred on a decimal basis, also through connector relay C1, to the Called Party register, Fig. 67 and Fig. F, to operate one of the party output register relays 5J1, 6M4, 7R9 and 9W6, the first number 5, 6, 7 or 9, in each of these designations being the dialed equivalent of the party letter, the last number 1, 4, 9 or 6 being the corresponding underpunch of the IBM two-hole code for letters. When there is no party designation following a four-digit number, as dialed relay 4F0 will be operated in the input register. This in turn will operate relay NPY in the Party register through relay C1, indicating no party. This relay has no output from the output register, that is to say its operation does not affect punching of the card. The Called Number Ten Thousands register will not be used in this case.

A five-digit number is transferred when a 2 appears in the office index relays, 3C0 to 3C7, which actuates relays 3C0 and 3C2, connecting ground through contact 7 of relay 3C2, contact 6 of relay 3C7 released, contact 6 of relay 3C0, contact 6 of relay CRA and the winding of relay C2, Fig. 62, operating relay C2. This transfers the information stored in relays 4B0—4B7, 4C0 to 4C7, 4D0 to 4D7, 4E0 to 4E7 and 4F0 to 4F7 through the output register connector relay C2, Fig. 62, to the output registers on a two-out-of-five basis, to output registers Called Number Ten Thousands, Called Number Thousands, Called Number Hundreds, Called Number Tens and Called Number Units. The party register will not be filled in this case.

*AMA class.*—The single digit representing AMA class is transferred from the class translator, Fig. 51, or tape index register, Fig. 25, as discussed in the section on class translation on a two-out-of-five basis through the card count circuit, Fig. 46, or directly from the translator through the output register connector relay DCD to fill the Class output register, Fig. 65 and Fig. D. The detail connector relay DCD, Fig. 59, is operated from ground on contact 8 of relay DC through contact 3 of relay CRA.

Figure 59:
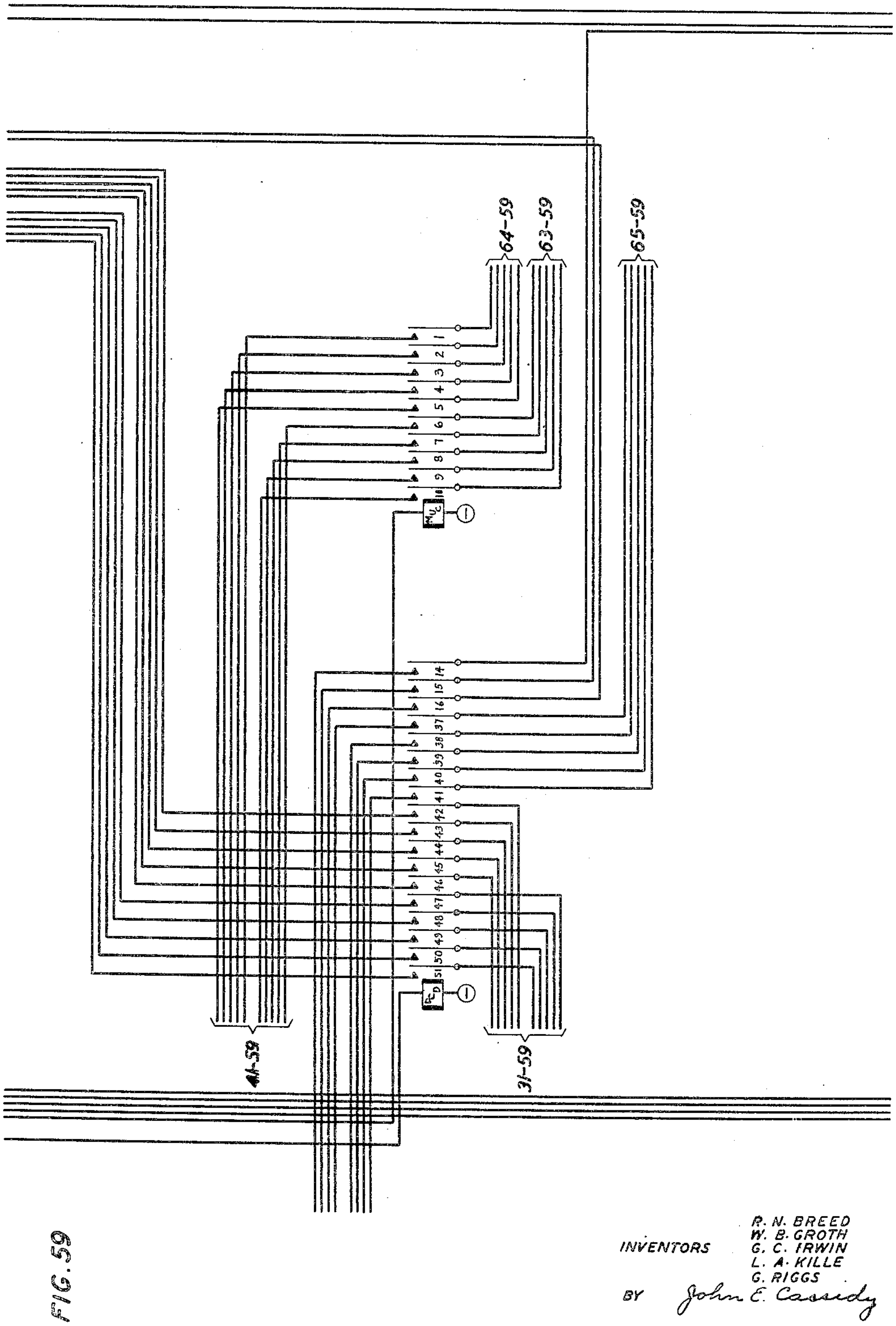
Figure 64:
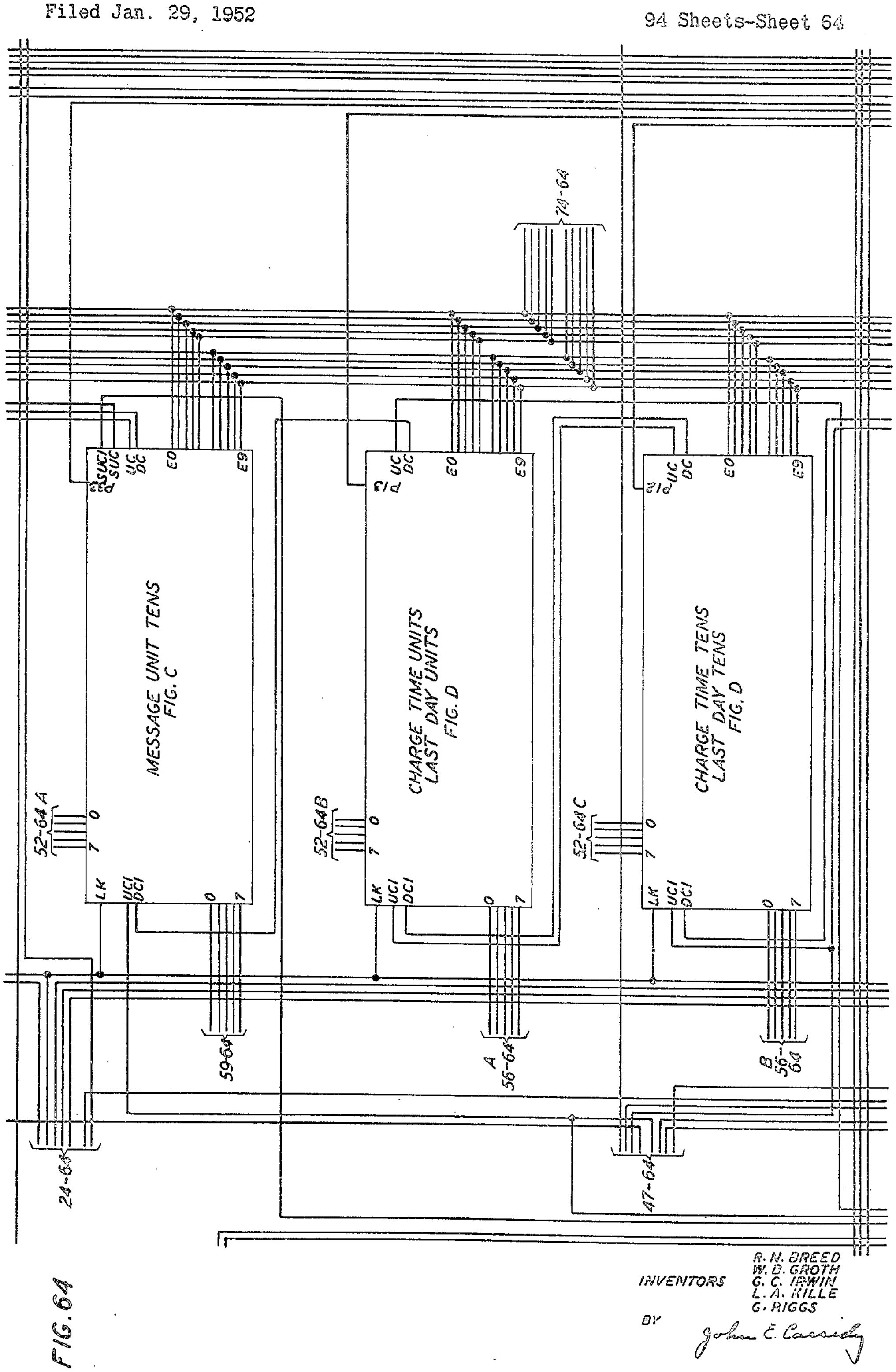

*Chargeable time.*—Minute tens and units of chargeable time as read from the tape entry are transferred from the line 5 input register on a two-out-of-five basis through output register connector relay DCD, Fig. 59, to fill output registers Charge Time Tens and Charge Time Units, Fig. 64 and Fig. D. The detail connector relay DCD is operated from ground on contact 8 of relay DC through contact 3 of relay CRA. These registers are set up for punching on all detail calls including those for which there is no chargeable time that is for calls on which the chargeable time is registered as 00.

*Last day.*—Tens and units of last day as recorded in a tape are transferred directly from the Last Day set-up switch settings on a two-out-of-five basis through output register connector relay SCA to fill output registers Last Day Tens and Last Day Units, Fig. 64 and Fig. D. The connector relay SCA is part of a summary connector. It is operated from ground on contact 19 of relay SA through contact 3 of relay CRA. The Last Day Tens register is not punched on the card but is used to provide an up-check for this register for summary cards. Registers Charge Time Tens and Charge Time Units are designated for their detail use, charge time, but are filled for any kind of card.

*Message units.*—When message units are to be punched for a detail call a two-digit number, tens and units is transferred on a two-out-of-five basis directly from line five of the input register through output register connector relay MUC to fill output registers Message Unit Tens, Fig. 64 and Fig. D, and Message Units Units, Fig. 63 and Fig. D. The message unit connector relay MUC, Fig. 59, is operated from ground on line five of the input register, for example, from ground through contact 6 of relay 5E1, contact 5 of relay 5E0 operated, contact 11 of relay CRA and the winding of relay MUC to battery. It will be observed that the ground which operates relay MUC originates in the relays corresponding to the E and F digits of the fifth line of the input register to which the lead extending from the winding of relay MUC through contact 11 of relay CRA is connected in parallel. The relay MUC will be operated in response to the appearance of the combination corresponding to any digit in either of these input register sections other than 0 in both positions simultaneously. The output registers Message Units Tens and Message Units Units are used for detail calls only. They are not filled for 00 message units.

Figure 56:
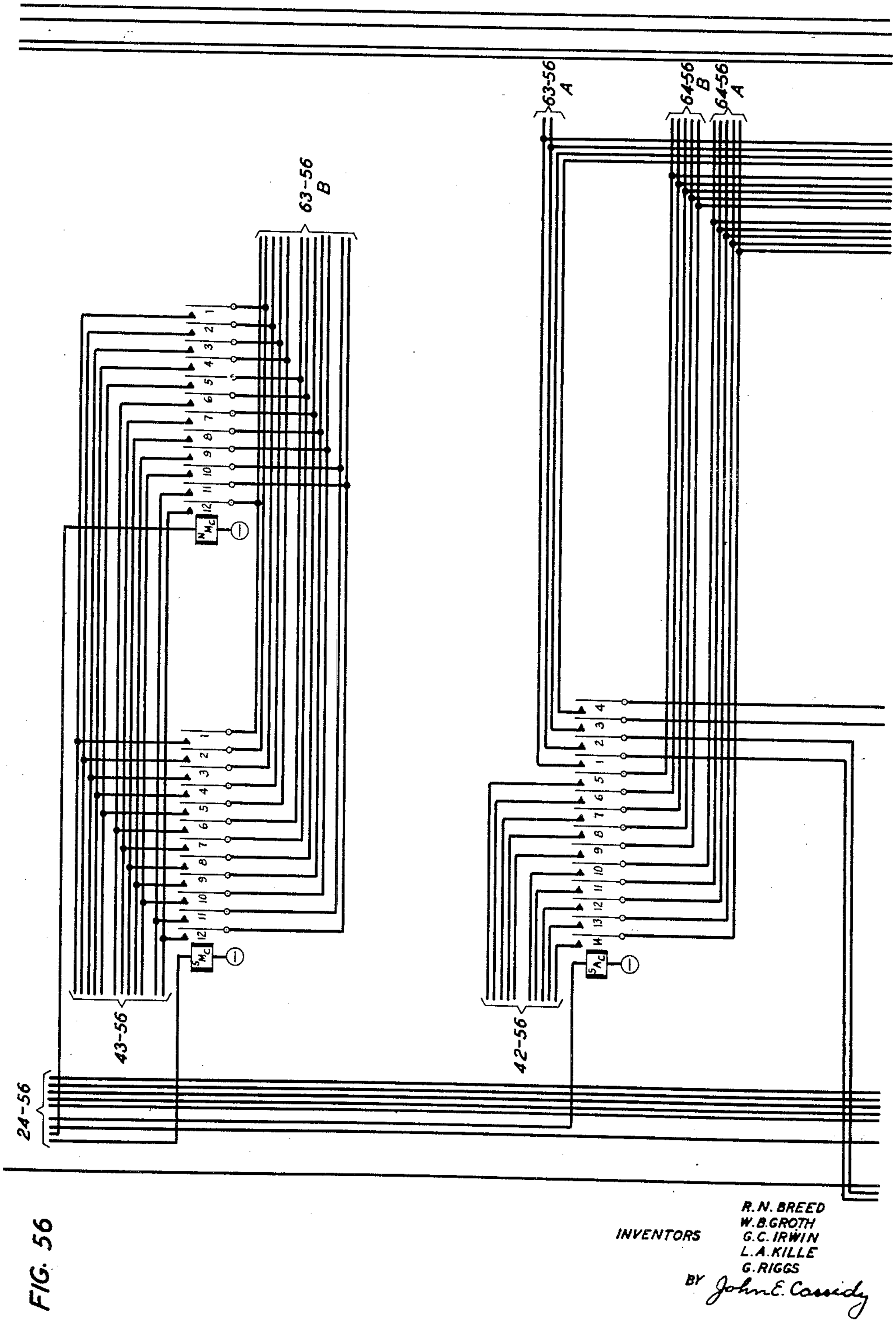

*Month.*—Month is taken directly from the Month set-up switch settings on a one-only basis through one of the output register connector relays SMC or NMC, Fig. 56, to fill the Month output register. The same month connector relay SMC or the next month connector relay NMC will be operated as described above. The output for month will match the Month switch setting when relay SMC has been operated and will be advanced by one when relay NMC has been operated. The Month output register is set up to punch two columns, namely, collate month and month. Information is punched in these columns in accordance with the following table:

| Month | Hole position in card | |
|---|---|---|
| | Collate Month Column | Month Column |
| January | 1 | 12 |
| February | 2 | 11 |
| March | 3 | 0 |
| April | 4 | 1 |
| May | 5 | 2 |
| June | 6 | 3 |
| July | 0 | 4 |
| August | 0 | 5 |
| September | 0 | 6 |
| October | 0 | 7 |
| November | 0 | 8 |
| December | 0 | 9 |

Month is punched in two columns to permit single digit month collating in a later stage of the IBM processing. The Month output register is used for all summaries and detail calls.

*X and Y punchings.*—Each card put out by the tape to card converter, summary or detail, bears an X or a Y punch as a result of the operation of the relay 11X or relay 12Y in the Overpunch output register, Fig. 63 and Fig. A.

In the case of a detail call, relay 11X or relay 12Y is operated from the tape index register, Fig. 25, or the class translator, Fig. 51, through detail connector relay DCD operated to indicate "charge" for a toll call or "no charge" for message unit detail or observing calls, respectively.

In the case of a summary, relay 11X is operated from ground on contact 8 of relay 2B2 through contact 7 of relay 2B1, Fig. 18, and contact 1 of summary connector relay SCA, Fig. 56, and the winding of relay 12Y in the Overpunch register to indicate 1000 message units. Relay 12Y is operated from ground through contact 9 of relay 2B4 through contact 6 of relay 2B0, contact 1 of relay SCA and the winding of relay 12Y in the Overpunch register to indicate less than 1000 message units. An additional X punch is made on any card as a result of the operation of either relay 11X or relay 12Y on any card, summary or detail, to indicate that the card originated in AMA.

*Output register control and grouping.*—The output registers of the tape to card converter are controlled in a manner such that their operation is synchronized with that of the input circuits as well as the IBM punch. Relays of the output register control cause the output registers to be operated and released when certain signals are received from the input register control and the punch control respectively. The output register control also indicates when a check has been made that there is either a complete registration or a complete release of all relays in the various output registers. In addition this control circuit times the operation and release of grouping relays which simulate up-checks for registers not used in any particular call or summary.

A detailed description of the operation of the output portion of the circuit will be given hereinafter. Briefly first, however, a cycle of operation for the output registers is as follows: An output register down-check plus an input register up-check indirectly causes the operation of output register connector relays to transfer information from the input circuits to the output registers. An output regiser up-check causes the release of the connectors and leaves the output registers locked to an indirect supply of off-normal ground. Shortly thereafter, when the output register lock is considered to be secure, the input registers are released. When the output register up-check is made, a signal is given to the punch sequence control to be ready for punching. The output registers remain operated until the punch check signals that a card has been punched successfully. At this time the output register lock grounds are removed and the output registers are released. A down-check is then made of the output registers to indicate that they are ready for another cycle.

*Detailed circuit operation.*—An output register down-check is made at the beginning of tape to card converter operation and between calls or summaries when the output registers are released, by extending ground through contact 14 of relay MON operated, Fig. 5, thence through contacts in series of all relays released in all output registers, Figs. 73, 72, 71, 70, 69, 68, 67, 66, 65, 64 and 63, entering each register at the left on lead DC1 and emerging at the right on lead DC, thence into the output register grouping circuit and through contact 4 of relay 3DN and contact 4 of relay NMU, Fig. 62, continuing through contacts of each of relays CP1 to CP33 and CP40, Figs. 81, 80, 79, 78, 77, 76 and 75 and through the winding of the output register down-check relay RDC, Fig. 24, to battery operating the relay. Relay RDC operated, signals the card count and input register control as described in the section on transfer control, to operate the connector control relay CRA, preparatory to operating the output register connectors. Relay CRA is locked to off-normal ground through output register up-check relay RUC normal. When relay CRA is operated, grounds prepared by various input circuits are extended to operate output register connectors required for the particular call or summary. The input circuits referred to are the set-up switches, tape index register, the line 3 input register, and the start time translator. These sources of connector operate ground are used in various combinations as described in the section, Output Registers and Output Register Connectors. The output registers are then operated through their connectors to close ground through a series chain of one only or two-out-of-five relays operated in each register to operate relay RUC. The circuits will be traced in detail hereinafter. An up-check for those registers which are not operated for a particular call is provided by a relay in the grouping circuit as described under the next succeeding heading Output Register Grouping. The operated relay or relays in each of the output registers are locked to ground from the pair of relays, LGA and LRA, Fig. 24. The ground is supplied through contacts 1 and 2 of relay LGA operated and extended through break contacts 1 and 2 in parallel and 3 and 4 in parallel, respectively, on locking relay LRA and thence over four separate leads to the output registers. Relay LGA is operated from ground through contact 14 of relay MON operated and contact 1 of relay LPG normal. Relay LPG in the off-normal and start circuit is operated from ground through contact 2 of relay ST3 normal, contact 16 of relay MON operated and contact 4 of relay TCM normal or relay LPG may be operated directly from ground through contact 3 or relay AL operated.

Back contact 1 of relay LPG in the operate path for the locking ground relay LGA, however, is shunted by a back contact 2 on the output register release, OUT REG RLS key, Fig. 4. In this manner locking ground is provided for the output registers only when the machine is off-normal and it may be removed by the operation of the output register release key following an alarm or a machine release.

The output registers have been filled and locked as a result of their down-check. When the up-check is made, relay RUC removes locking ground from the connector control relay CRA and it releases causing in turn the release of the output register connector relays. If relay RUC remains operated for a predetermined period the input registers will be released. The operation of relay RUC closes start ground from back contact 7 of relay RDC through contact 9 of relay RUC, contact 1 of relay 9E, Fig. 82, contact 5 of relay AL, Fig. 1, through a chain circuit extending through the armature and contact 1 of each of punch sequence control relays 8E, 7E, 6E, 5E, 4E, 3E, 2E, 1E, 0E, 11E and 12E, and terminal 11 column 2, Fig. 74, to emitter terminal 12. This is called emitter lead E12. A branch of the emitter lead E12 circuit extends through the winding of relay 12F, Fig. 73, to battery operating relay 12F which in turn supplies ground through its contact and the winding of relay ET12 to battery operating relay ET12. Another branch is multipled into the Month and Overpunch registers. The purpose of this will be made clear hereinafter. When the information stored in the output registers has been used for punching a card, relay 9E in the punch sequence control and relay OCP in the punch check will have been operated as described hereinafter. Ground, through contact 7 of relay RDC normal and contact 9 of relay RUC operated, which was formerly the punch sequence control start ground, is then closed through contact 2 of relay 9E and contact 1 of relay OCP, both operated, contact 1 of relay SAL, Fig. 1, and the windings of relay LRA, Fig. 24, and relay 9EH, Fig. 73, in parallel, to battery operating the relays. Relay LRA operated removes locking ground from the output registers which are then released. Relay RUC is then released in turn. The locking relay operate path remains intact, however, through a shunt around make contact 9 of relay RUC which shunt extends through contact 3 of relay 9E operated until the operation of relay RDC indicates that all register relays are released. Relay LRA is then released and locking ground is then restored to the output registers for a new registration. Relay 9EH is also released at this time and causes the release of relay 9E which completes the cycle in the punch sequence control.

*Output register grouping.*—Certain output registers of the tape to card converter are not used for all detail calls while some of the same and other registers are never used for summaries. Since a complete up-check of all output registers is required for output register control, the up-check must be extended artificially for these unused registers. Several circuit arrangements are used to accomplish this grouping function.

When the output registers are operated for any type of detail call whose called number is given in three digits, output registers Called Number Ten Thousands and Called Number Thousands will not be filled. The Called Party register will not be set up for punching but will be filled by the operation of relay NPY for no party from ground through contact 17 of relay C0, which will be operated for the called number index zero. Relay C0 will also operate relay 3DN in the grouping circuit from ground on contact 16 of relay C0 to indicate the three-digit number. The Called Party and Called Number Ten Thousands registers are up-checked on an alternate basis, that is, one relay operated in the Called Party register plus no relays operated in the Called Number Ten Thousands register or no relays operated in the party register and two-out-of-five relays operated in register Ten Thousands will close alternate paths to afford an up-check. In this case relay NPY operated will cause up-check ground lead UC1, Fig. F, to be carried through the four other relays of the Party register, from left to right, then over lead PUC through all of the relays in the Called Number Ten Thousands register normal. The operation of relay 3DN, at its armature 1, will transfer the up-check from its regular path through the Called Number Thousands register, which path is closed through to lead UC when two-out-of-five relays of the register are operated, when the register is used, to lead SUC1 which is closed through this register to lead SUC when all of the relays of this register are normal when the register is not used. This latter lead as it emerges from the register is connected to the regular up-check lead UC1, and extends through the other registers on the regular up-check for the remainder of the output register digits.

When a call has a four-digit called number, the Called Number Ten Thousands register will not be filled. The Called Patry register will be filled by the operation of the no party relay NPY or one of the party relays. This register and the Called Number Ten Thousands register are up-checked on an alternate basis as explained in the preceding paragraph.

When a call has a five-digit called number the Called Party register will not be filled but its up-check will be taken care of by the Called Number Ten Thousands register on the alternate basis described above.

Figure 41:
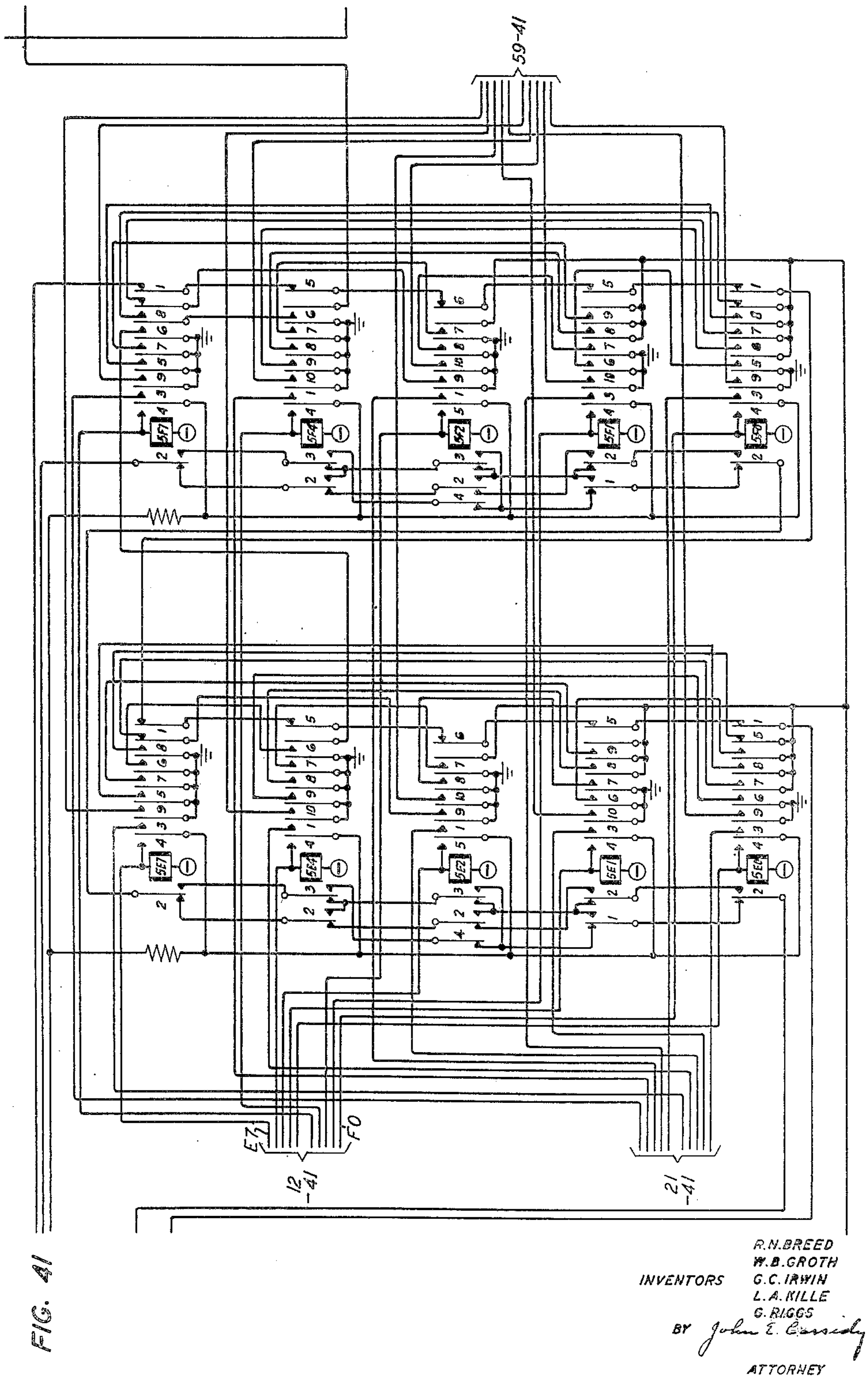

When a call entry has 00 in the E and F digits of line 5 indicating no message units, relay NMU in the grouping circuit, Fig. 62, will be operated from ground through contact 6 of relay 4F7, contact 6 of relay 4F4, contact 6 of relay 5F7, contact 6 of relay 5F4 of the line 5 input register, Fig. 41, contact 14 of the detail connector relay DCD operated and the winding of relay NMU to battery to switch the regular up-check lead UC at armature 1 of the relay after it emerges from the Charge Time Units register and before it enters the Message Units Tens register on the UC1 lead, to the SUC1 lead, which is closed through the register as well as the Message Unit Units register when all relays in each are normal, when the register is not used and then connects to the regular up-check lead UC1 for the up-check of the remaining registers.

Grouping relays 3DN and NMU, when used, lock in the same manner and for the same time as output register relays. In addition they are used to short leads in the punch control circuit whose function is described in a later section.

Grouping for the processing of summary tapes is accomplished in the tape index register, Fig. 25, through its control of the output register connector relays as described hereinbefore.

Up-checks for the following groups of output registers which are never used for summaries are shunted by contacts on relay SCA as follows:

1. Answer Day Tens and Answer Hour Tens.

The up-check path through these registers in series is shunted by contact 25 of relay SCA operated.

2. Called Area, Called Office A, Called Office B, Called Office C, Called Party, Called Number Ten Thousands, Called Number Thousands, Called Number Hundreds, Called Number Tens, Called Number Units and Class.

The up-check path through these registers in series is shunted by contact 26 of relay SCA operated.

3. Message Unit Tens and Message Unit Units.

The up-check path through these registers in series is shunted by contact 27 of relay SCA operated.

*Converter control of punch.—General description of punching.*—When the output registers of the tape to card converter have been filled with information to be punched on an IBM card, the output register up-check gives a start signal to the punch sequence control to ground the first emitter lead, which connects to contact 12 of the Emitter, Fig. 74, the path has been traced in the foregoing. The punch emitter controls the connection of ground successively through emitter contacts 12, 11, 0, 1, 2, 3, 4, 5, 6, 7, 8 and 9 one at a time and through the rotatable arm of the emitter. When the grounding period of the last emitter contact 9 has ended, all required punches will have been made in the IBM card in the manner described below. The relay contacts operated corresponding to any number stored in any given output register will close the correspondingly designated E lead, of the group E0 to E9 and E11 and E12, shown entering the lower right-hand portion of the various registers, as required, to a punch and check punch relay in series for the column on the IBM card in which the information in the output register in question is to be punched. While the E12 lead is grounded a path is closed through the Month register and the windings of the check punch relay CP14 and punch relay P14 or check punch relay CP15 and punch relay P15 depending upon the registration. At the same time a parallel path will be closed through contacts of the Overpunch register to check punch relays CP16, CP17 or CP18 and punch relays P16, P17 or P18, respectively, depending on the manner in which the Overpunch register relays are operated. As another example, consider the Called Number Units register, Fig. 65 and Fig. D and the lead E5. If relays 1 and 4 in the register are operated simultaneously, the E5 lead is connected through contact 8 of relay 1 and contact 7 of relay 4 to the common punch lead P30, which extends through the top winding of check punch relay CP30 and through the winding of punch relay P30 to battery, operating punch relay P30. While any E lead is grounded, the punch relay in the converter will be operated to close circuit breaker ground to the punch magnet. The circuit may be traced from the symbol for positive battery, which is grounded, through interrupter contacts C11, C12, C13, Fig. 74, terminal 16 column 1, contacts of all of the punch magnets which are operated for the particular row, into Fig. 83, through terminals of columns 4 and 5, which may be cross connected to the windings of punch magnets 1 to 80 in any manner desired, to punch any vertical row or rows of the card as desired. Only thirty-four punch relays P1—P33 and P40 are shown and only thirty-four of the eighty columns will be punched. A hole will appear in the assigned vertical column in that horizontal row which bears the same designation as the E lead, that is, the emitter lead, in question since the motion of the card in the punch is synchronized with the grounding of the E leads. In order to punch any given number under the control of a given register all emitter leads must appear at this register. Consequently each of the emitter leads from the punch sequence control is multipled to all output registers which may store the number assigned to the emitter lead being considered.

*Punch checking.*—When a given punch lead from an output register is grounded the associated punch relay P– and check punch relay CP– will be operated in series. The relays CP– are constructed to remain operated until restored as described below. Shortly after the connection of ground to the E9 lead in the punching of a particular card, a CP– relay will have been operated for every output register used in punching. The E9 lead of the punch sequence control is then carried through make contacts of all relays CP1 to CP33 in series, Figs. 81, 80, 79, 78, 77, 76 and 75 and through the windings of relay CP40 and relay P40 to battery to operate relay P40 and relay CP40 in series. Relay P40 is assigned to a column in which a 9 is punched to indicate a good card. Relays CP– for output registers not used for the punching of a particular card will not be operated and therefore their make contacts in the series chain must be shunted to effect a good card check by the operation of P40 and CP40. Contacts on one and only one of the CP16 and CP17 relays for billing X and non-billing Y will be closed for any given card. The make contacts of these two relays are, therefore, placed in parallel in the check chain. Contacts on CP24 and CP25 relays for called party and relay CP26 for called number ten thousands are also in parallel since they are closed on a one only basis. Shunting these two CP– relay contacts is a contact on relay NPY in the Party register to close the check path for a three-digit number or a four-digit number without party letter. The called number thousands relay CP27 is shunted by contact 3 of relay 3DN for three-digit numbers. The message units relays CP32 and CP33 are shunted by contact 3 of relay NMU, Fig. 62, for no message units. Relays CP– not used for summary cards are shunted by contacts of relay SC.

*Converter control of the IBM punch.*—Several relays are operated in the IBM punch as a result of the operation of both the Motor Start key and the machine start kay Mach. Start, Fig. 4, in the tape to card converter. These controls are discussed in detail in the section on the IBM punch. In addition the converter must give a start signal to the punch for every punching cycle. This signal in effect becomes a priming pulse when the punch is kept in continuous operation. The start signal in the converter is the closure of a series chain of contacts, to be traced in the next paragraph, which short the IBM punch terminals 5 and 6 of column 1, Fig. 74. During continuous operation a closure between these terminals 5 and 6 keeps the punch clutch operated during that portion of the punching cycle for which the clutch control relays are not locked.

During continuous operation, the start signal is made in the converter through the following series chain: IBM punch terminal 6, column 1 through contact 6 of relay AL normal, through an input register up-check, to be described in detail immediately hereinafter, through contact 2 of relay CUL normal, contact 1 of relay OCL and contact 1 of relay NC operated, and contact 1 of relay PT normal to IBM punch terminal 5, column 1. If relay AL is operated, indicating an alarm in the machine, its normally made contact will be opened and the start signal cannot be given for a new punch cycle. The input register up-check indicates during the current cycle that a complete set of information is registered and is soon to be transferred to the output registers for punching. Thus the input up-check enables a signal for the new punching cycle during which that very information will be punched. The input up-check path for detailed calls which is interposed between contact 6 of relay AL and contact 2 of relay CUL consists of a series chain through contact 3 of relay UC1, contact 3 of relay UC2, contact 2 of relay DA, contact 3 of relay UC3, contact 3 of relay UC4, and contact 3 of relay UC5 all operated. The input up-check for a summary consists of a series chain through contact 3 of relay UC1, contact 3 of relay UC2 and contact 5 of relay SB all operated interposed between the same points. For the case of card servicing stoppage on the last call there is a by-pass around the contacts of relays UC1—UC5 through make contacts 9 of relay L1 and 8 of relay RUC. Relay CUL is operated once per card cycle over a path from ground through terminal 14 of column 1, cam operated contact C9 in the IBM machine, Fig. 74, terminal 13, column 1 and the winding of relay CUL, Fig. 73, to battery to open its back contact and thereby guarantee the release of relay OCL, the locking path of which extends through contact 2 of relay CUL. The operate clutch relay, OCL is operated in parallel with the operate check punch relay OCP, when a check has been made that a good card has been punched. This feature is described in a previous section on checking. Relay OCL has been locked to IBM ground on the signal path through its own front contact 2 and its top on secondary winding. This winding is energized with IBM power supply. The signal path will remain closed, except for an alarm, until CUL operates.

Relay OCL will not be operated to close the signal path for the first punching operation after the converter has been emptied of information. This condition might arise due to stopping the converter or to the passage of splice pattern through the reader of the converter. In this case the punch start relay PST, Fig. 73, will operate and by closing its contact 2 will short contact 1 of relay OCL. Relay PST is operated directly from ground through contact 2 of the machine start key Mach. Start or from ground through contact 1 of relay SK operated and contact 1 of relay RDC operated and through the winding of relay PST to battery. Relay PST will lock to ground through contact 1 of relay CUL normal and contact 8 of relay MON operated. Thus it will be held until the punch has completed one card cycle.

*Operation of summary punch.—General description of summary punch.*—The summary punch is an electrically operated machine for punching business machine cards from signals obtained over connections usually through a cable from another machine. The summary punch is equipped with a card handling unit known as a punching unit.

*Operating principles of summary punch.*—The IBM Summary Punch Models 514 and 523 are well-known commercial accounting machines and it is not considered that a detailed description of their operation is necessary to an understanding of how they cooperate with the present tape to card converter circuit and it is considered that a general description of the functions of the machine will be all that is required for an understanding of the present invention.

In operation, cards move through the punching unit from the punch feed hopper where blank cards are stored to the stacker where punched cards are deposited in three card-feed cycles. Each of these cycles except the last is broken into fourteen equal intermittent motions. This is necessary because the nature of the machine requires that a card being punched must be stationary while each row of holes, 12, 11, and 0 to 9, inclusive, is being punched. While only twelve punching positions are used, two extra intermittent motions are required to clear the edges of adjacent cards and the spacing between cards, making fourteen in all. These positions are numbered 14, 12, 11, 0, 1, 2, 3, 4, 5, 6, 7, 8, 9 and 13. The driven portion of the punching unit stands at rest in position 13.5, that is, between positions 13 and 14 in the cycle when not in use, is picked up by the driving mechanism in this position by means of a single position clutch of the pawl and one-tooth ratchet type and comes to rest again in position 13.5 when the machine is stopped for any reason. Cards flow through the punching unit in tandem. When the machine is started one complete card-free cycle is required to move the first card out of the card-feed hopper into position where it is available for punching, which position is called the die-card position. On the second card-feed cycle the first card moves past the punching dies, the first card is not punched, and into position where it is available for checking or sensing if required by the punch brushes, which position is called the punch card position, while a second card moves out of the feed hopper into the die-card position. On the third cycle the first card is "sensed" or checked as it moves past the punch brushes. The second card is punched as it moves past the punch dies into the "punch card" position and a third card moves out of the feed hopper into the die-card position. This pattern of card motion then continues as long as the machine continues in operation with cards flowing from the feed hopper past the punching, checking and into the stacker as just described, all cards except the first being punched and checked. When the machine is stopped at the end of the processing run, two punched cards, which have not yet reached the stacker, will remain in the machine one in the "punch card" position, and one in the pre-stacker position. To obtain these cards it is necessary to operate the Start key of the punch twice or to hold the Start key while the machine completes two card-feed cycles, as subsequently described.

*Preliminary operation of summary punch.*—Before starting the operation of the tape to card converter it is necessary to prepare the summary punch for such operation. This is accomplished by inserting a punch plugboard connector, having the proper cross connecting field, Fig. 83, inserting blank cards into the punch unit card-feed hopper and operating the Start key of the punch which moves cards into a position for punching and reading. These two card-feed cycles cause two blank cards to move out of the punch unit feed hopper, the first moving past the punching dies without being punched into the punch card position. The second card moves into the die-card position where it is available for punching when the tape to card converter is started. The insertion of blank cards into the punch unit card-feed hopper operates a lever in the machine called the punch magazine card lever. If the Start key of the machine is operated momentarily it ordinarily advances all cards one position.

If the Start key is held operated, the clutch remains operated and cards continue feeding. When the Start key is released the clutch releases in a manner to stop the machine in its normal position 13.5.

The second momentary operation of the Start key causes another card-feed cycle. On this cycle the first card moves past the punching dies without being punched into the punch card position and a second card is picked up and moves out of the card-feed hopper into the die-card position. Near the end of this card-feed cycle the progress of the first card causes the closing of the punch brush card lever. When the power is connected to the machine, preliminary start relay 22 is operated over a path from positive battery through terminals 2 and 9, column 1, Fig. 74, and through the winding of relay 22 to negative battery.

*Starting summary punch.*—When the Motor Start key of the converter is operated, the operation of motor start relay MST operates relay NC in Fig. 1. The path may be traced from ground through contact 7 of relay MST, terminal 11 of column 1, Fig. 74, through contact 5 of relay 2, contact 4 of relay 3, both of which are operated following the operation of relay 22 in the machine, through contact 12 of column 1 and the winding of relay NC, Fig. 1, to battery. Relay NC operated partially completes the input register up-check control circuit for the operation of the punch clutch as subsequently described. When the Machine Start key of the converter unit is operated, the operation of relay RCD of Fig. 6 establishes a circuit from positive battery through terminal 2, column 1, Fig. 74, through contact 6 of relay RCD, contact 4, column 1 and the winding of start control relay 23 of the punch, operating the relay.

*Card processing.*—As previously described the tape to card operation is started by inserting the tape to be processed into the reader and operating the Machine Start key of the converter. When the input register of the converter unit is filled as a result of this operation a fundamental up-check circuit is closed between terminals 5 and 6, column 1, Fig. 74, operating a clutch control relay of the punch. In case the tape being processed contains detailed message entry patterns, this fundamental circuit for the operation of punch clutch is as follows: Starting from negative battery in the punch machine through the top or so-called pick winding of clutch control relay 10, Fig. 74, terminal 5 of column 1, contact 1 of relay PT normal, contact 1 of operated relay NC, Fig. 1, contact 2 of operated relay PST, contact 2 of normal relay CUL, contact 3 of each of operated relays UC5, UC4 and UC3, contact 2 of operated relay DA, contact 3 of each of operated relays UC2 and UC1, contact 6 of normal relay AL to terminal 6, column 1 and into the punching machine where it goes through a series of control contacts and finally to positive battery. In case the tape being processed contains message unit summary entries the UC5, UC4, UC3 and DC relays mentioned in this up-check chain are replaced by the single operated relay SB, the path passing through its contact 15. This circuit being closed initiates the operation of the punch drive motor and subsequently the clutch.

In the meantime while the driven portion of the punch unit is being picked up and moved toward the first punching position 12, a separate input register up-check circuit is effective in causing the filling of the output register. When this process has been completed the associated output register up-check relay RUC is operated, causing the operation of a pattern of punch relays P– in the converter as determined by the requirements of the output register setting, one punch relay being operated for each column of the IBM card requiring a "12" hole to be punched, that is, a hole in horizontal row 12 of the card. The operation of the output register up-check relay RUC also operates a relay to control the start of the card checking operation described in a later paragraph and starts the operation of the control circuits which function to dismiss the input register and translator relay registrations of the first call and to register instead the details of the second call. Each punch relay operated connects a particular terminal of column 4 or column 5, Fig. 83, through an individual connected terminal, known as a counter-total-exit hub, through the operated punch relay P– contact and terminal 16 of column 1 to the summary punch circuit breaker contacts C11, C12, C13 and each counter-total-exit hub used is cross connected to another particular terminal known in the art as a punch-direct hub and from the latter through the winding of a particular punch magnet individual thereto, according to the desired card column arrangement. When the punch unit rotating mechanism reaches position 12 of the index gear the circuit breaker closes, connecting positive potential to all punch magnets required to be operated for the particular "12" row of holes, the magnets operated being determined by the setting of the punch relays and the plugboard hub connections as just described. Those punch magnets operated cause punch rods to be associated with the tongue of the common punch bail which is driven downward shortly after the operation of the punch magnets. Each punch rod so associated punches a hole in its particular column on horizontal row 12 of the card which is momentarily stationary in the horizontal row 12 position. At position 12 relay PR, Fig. 73, in the converter is also operated by the closure of the circuit breaker since its right-hand terminal is permanently connected to negative battery through contact 10 of column 1 and its left-hand terminal is connected through contact 16 to the circuit breaker contacts which are closed in position 12. The operation of this relay causes the punch sequence control circuit to function when the circuit breaker opens, since a circuit is closed through position 12 of the emitter, releasing the punch relays required to be operated for the "12" row of holes and operating those required to be operated for the "11" row. This emitter lead control of the punch operation is described in detail in the paragraphs hereunder covering Punch Sequence Control, Punch Check-Down and Punch Relay Operation. When punch position 11 is reached the circuit breaker again closes, operating those punch magnets required for punching the "11" row of holes, the punch magnets operated being again determined by the setting of the punch relays and the plugboard connections and the card being stationary at this time in the "11" row punching position.

In a similar manner the "0" to "9" rows of holes are also punched. During the punching of the final or "9" row of holes the functioning of the output register punch check relays causes the operation of relays OCL and OCP and the punching of a "9" hole in a particular column as a card check punch, provided the punch check relays have successfully checked down the output register as described in the paragraphs on Punch Sequence Control, Punch Check-Down and Punch Relay Operation. This check-down operation if successful also releases the output register and also closes through the loop circuit to the punch clutch provided the details of the next call have been registered in the input registers and the corresponding up-check circuit completed. This fundamental input register up-check circuit for the punch clutch is the same as previously described except that the PST relay is not operated at this time and the part of the chain through contact 2 of relay PST is completed instead through contacts 1 of the operated relay OCL. During the progress of the punching cycle the punch clutch control relay is operated so that the punch clutch magnet is reoperated thus preventing the disassociation of the driving portion of the machine from the driven portion of the punch unit and causing the machine to start another perforation cycle. The dismissing of the output register, in conjunction with a separate input register up-check previously mentioned causes the output register to be refilled, this time with the data of the second call. When this process is completed, the associated circuits cause the operation of all punch relays associated with the "12" row of holes as determined by the setting of the output register relays and the perforation cycle for the card for the second call entry, the third card now having moved into the die-card position, that is, the position for punching and the second card into the punch card position, that is, the position for checking. When position 14.3 is reached the closing of the punch cam operates relay CUL, over a circuit from negative battery through the winding of relay CUL, Fig. 73, through contact 13 of column 1, cam contact 69, contact 14 of column 1 to ground. Relay CUL operated opens the fundamental start control circuit releasing relay OCL for reasons outlined in the paragraph on Punch Sequence Control, Punch Check-Down and Punch Relay Operation.

*Card punch check.*—As mentioned in the paragraph on the operating principles of the summary punch, cards are checked as they pass under the punch brushes during the third cycle of each card's excursion through the punch unit of the machine. By means of the double punch and blank column detection apparatus, column splits and the proper plugboard wiring, columns of the card may be checked for the correct number of punches. When incorrect punching is detected, the progress of the summary punch is stopped at the end of the card cycle, an alarm lamp is lighted in the summary punch and the punch trouble lamp is lit in the converter.

*Stopping summary punch.—Machine release key operated.*—Once started the tape reading and card punching process proceeds to the end of the AMA tape as just described as long as blank cards are in the punch unit feed hopper and the punch unit stacker is not filled. The machine release key Mach. RLS, Fig. 4, is operated if it is desired to stop the machine for any reason. The operation of this key prevents the refilling of the input registers of the converter after the tape information currently registered or being registered has produced an up-check. The machine continues in operation until the information currently registered or being registered in the input has been transferred to the output registers and punched into an IBM card as previously described and the input register is released. The machine operations are then brought to a halt because of the lack of the input register up-check operating circuit for the summary punch clutch. This also results in stopping the drive motor. To restart after such a stop it is only necessary to operate the Motor Start and Mach. Start keys. This operation will start the reading and registering of the data of the next call in the input register and start the operation of the punch as described hereinbefore.

*Stop for card servicing.*—In case the blank card supply is exhausted the machine will be automatically stopped as follows: The last card in moving from the punch unit causes the release of the punch magazine card lever which in turn releases a relay in the punch. The release of this relay releases relay RC, Fig. 1, a portion of the operate path of which extends through the punch between terminals 11 and 12 of column 1, Fig. 74. The release of relay NC establishes a path from ground through contact 6 of relay TCM Fig. 5 and contact 2 of relay NC and through the filament of the No Cards lamp to light the lamp. The release of relay NC interrupts the fundamental input register up-check circuit which was traced through its contact 1 thus causing the punch clutch to be released by the opening of a cam contact when position 9.5 of the current punch cycle is reached. Releasing the clutch stops all punching and tape reading operations. The release of relay NC also prevents bringing an alarm at this time as described in paragraph on Punch Stoppages. The machine is restarted by filling the punch unit feed hopper, removing the punched cards from the stacker and operating the Motor Start and Mach. Start keys as elsewhere described.

In case the stacker becomes filled before the blank card supply is exhausted the opening of the stacker contact interrupts the fundamental input register up-check circuit, causing the release of the clutch which functions to stop the machine as previously described. In this case however, due to the fact that relay NC does not release, a general alarm will be given. It will then be necessary to operate the Mach. RLS key Fig. 4 of the converter in addition to removing the cards from the stacker in order to restart. It is advisable to card service before the card stacker contact operates to avoid having to log call data and release the input and output registers before restarting.

*Stop because of card feed failure.*—In case the cards should fail to feed properly at any time the machine will also be stopped and an alarm sounded by the opening of the die-card lever or punch brush card lever contacts. The opening of the die-card lever contacts releases relays in the punch which release relay NC of the converter which in turn lights the No Cards lamp and opens the fundamental input register up-check circuit for the operation of the clutch, causing the machine to stop at the end of the current punching cycle as previously described. Opening of the punch brush card lever contact effects the opening of the circuit breaker lead to the punch relay contacts and the PR relay of the converter unit, thus preventing further punching and check-down of the output register on the punching cycle in progress at this time. Due to the non-operation of the punch sequence control relay PR the output register punch check-down operation as described in detail hereinafter, for the punching cycle in progress will not be completed. The non-completion of the check-down operation prevents the closing of the input register up-check circuit to operate the clutch, thus causing the machine to stop and an alarm to be sounded as previously described. After restoring the alarm by the operation of the Mach. RLS key and clearing the trouble in the punch it will be necessary to insure that blank cards are in the die-card and punch-card positions by use of the Start key of the punch. Starting is then accomplished by operation of the Motor Start and Mach. Start keys of the converter the machine functioning as previously described.

*Normal stop at end of processing.*—When the last entry on the AMA tape has been read, registered and transferred to the output register, the summary punch will complete the punching of the details of this last call entry but will then stop due to the lack of the input register up-check which permits the clutch to release. When the machine stops, the driven portion of the punch unit stops in position 13.5 whereas the driving portion coasts to a stop somewhere between positions 6 and 9.

Since the machine halts immediately after the perforation of the last card, two cards, including the last card perforated and the last card checked will still be in the punch unit mechanism. The last card perforated will be resting in the punch card or card sensing position and the last card checked will be in the pre-stacker position. To obtain these two cards it is necessary for the operator to operate the Start key of the summary punch so as to operate the machine through two complete card-feed cycles before operating the End of Tape key of the converter. During the first of these two extra card-feed cycles the last card to be punched will be checked as previously described. During the second of these extra card-feed cycles blank cards will be fed past the punch brushes as previously described for preliminary operation on starting as described hereinbefore. However, due to the fact that the output register up-check relay RUC of the converter is not operated, a punch circuit is actuated preventing a false indication of blank column error while the blank cards are passing under the punch brushes. It will be noted that after the operation of the Tape End key the summary punch is in condition to process the next tape without the necessity for further preliminary operations as described in a previous paragraph, since blank cards are now already in the die-card and punch-card positions.

*Stop because of card check failure.*—When the summary punch card check as described in paragraph on Card Punch Check fails, it impresses a potential between terminals 8 and 10 of column 1, Fig. 74, operating relay PT of the converter. Relay PT operated closes a circuit from ground through contact 6 of relay TCM, contact 3 of relay PT and the filament of the punch trouble lamp Punch TBL, Fig. 1, to light the lamp and at contact 1 of relay PT opens the input register start pulse circuit described in the paragraph on Card Processing, causing the machine to stop after the card cycle in progress at the time. When the machine stops the card which caused the card check failure will be resting in the pre-stacker position while a card which has just been punched but not checked will be resting in the punch card position. To obtain the defective card for examination it is necessary to operate the Reset and Start keys of the punch. The operation of the Start key of the summary punch causes the circuit to function as described in a previous paragraph, causing the card on which the error was made to be fed through the pre-stacker position while the last card punched is checked as it is fed past the punch brushes and the blank card which was in the die-card position is fed past the punch dies without punching and into the punch-card position. If this last card punched passes the card check satisfactorily the machine may be restarted by operating the Motor Start and Mach. Start keys, Fig. 4, of the converter unit. If the last card checked proves to have been defective the card check features will function as described above. This second defective card is cleared into the stacker by operating the Reset and Start keys of the IBM machine. The circuit functions once more as just described except that the check for double punch and blank column will not be made. Upon clearing the trouble the machine is restarted by operating the Motor Start and Mach. Start keys of the converter. When restarting, the machine functions as described to omit the double punch and blank column check for the blank card which is now in the punch brush position.

*Punch sequency control, punch check-down and punch relay operation.*—As covered in the paragraphs on the Output Register, the complete information to be punched into each IBM card is set up in the output register relays either in two-out-of-five or decimal form before the punching is started. In converting this information into IBM punched hole form in which each column represents a numerical digit, or a numerical digit with overpunch, it is necessary to punch the information one horizontal row at a time as covered by the paragraph on the Operating Principles of the Summary Punch. The punch sequence control, Figs. 73 and 82, the punch control, Figs. 75 to 81, and the punch check control, that is the OCL, OCP, PST and CUL relays at the left in Fig. 73, provide a means for directing circuit breaker pulses from the punch so as to operate the correct punch magnets in the punch machine for the punching of each row of holes as determined by the setting of the output register relays. This selecting and steering operation must be completed for each row before the circuit breaker of the punch closes to punch that row of holes. A further function of these circuit figures is to provide an output register check-down for all twelve rows punched and cause a check punch in the "9" or last row in a particular column, provided this check is satisfactorily completed. The circuit arrangement also insures that the punching operation is at all times in synchronism with the position of the emitter of summary punch. These operations will now be more fully described.

*Preparation for punching.*—When the output register is completely filled at the start of each punch cycle the operation of the up-check relay RUC, Fig. 24, connects ground from contact 7 of relay RDC through contact 6 of relay RUC into the punch sequence control circuit. All relays of this circuit except relay ONB being normal at this time, this ground is directed through the back contact 1 of relay 9E, back contact 5 of relay AL and back contact 1 of each of relays 8E, 7E, 6E, 5E, 4E, 3E, 2E, 1E, 0E, 11E and 12E and over the "E12" lead to the contacts of the output register relays, where it is multipled to make contacts of all register relays which may be required to operate to register a "12" or "Y" punch. Each "12" punch register relay so operated connects this ground supplied over the "E12" lead through the secondary winding of a CP– relay and CR– resistor in parallel to battery through an associated R– resistor and P– relay. Both the P– relays and their associated CP– relays operate. The circuit breaker C11, 12, 13, Fig. 74, of the punch is connected through terminal 16 and multipled to the armatures of all P– relays. Each P– relay operated, therefore, connects the circuit breaker to a particular Counter Total Exit Hub of the punch, each of these hubs being connected by means of plugboard straps to a Punch Direct Hub, Fig. 83, connecting to the correct punch magnet for the column desired. In register columns containing only numerical digits there will be one P– relay and one CP– relay per column. For columns containing overpunch information there will be one P– and CP– relay pair for the over-punch section of the column and another similar pair for the numerical section, the contacts of both P– relays being connected by means of the control panel of the punch to a common punch magnet. Each CP– relay operated provides one opening in a down-check circuit which connects in series through the back or left-hand contacts of all CP– relays. Each CP– relay operated also closes one contact, its front or right-hand contact, of an up-check chain. The function of these two check chains will be explained later. The connection of ground to the "E12" lead also operates the 12F relay, Fig. 73, which in turn operates the ET12 relay. When the emitter of the punch reaches position 14.3 cam contact C9 closes supplying ground to operate relay CUL Fig. 73. Relay CUL' operated opens the locking circuit of relay OCL which was operated on the previous card punch cycle as described previously.

*Punching sequence.*—Approximately 4 milliseconds after the emitter of the punch reaches the "12" contact point as described in the section on Card Processing, circuit breaker C11, 12, 13, Fig. 74, of the punch closes, operating all of the punch magnets which are connected to the contacts of operated P– relays and also operating relay PR, Fig. 73. Relay PR operated connects the ground from the "E12" lead to the ER12 resistor to discharge the 12C condenser through the winding of relay 12E over the following circuit. From the grounded "E12" lead through terminal 11, column 1 to terminal 12 and the rotatable arm of the emitter of the summary punch, through terminal 15 of column 1 and back contacts 2 of all ET– relays except ET12, through make contact 2 of relay ET12 through make contact 2 of operated relay PR thence through make contact 4 of the operated relay ET12 to the top terminal of resistor EC12 the bottom terminals of which are connected to negative battery. It will be observed that the chain circuit, which extends through the top contacts of the ET– relays and is extended through the bottom contacts of ET– relays when relay PR is operated, is arranged so that it will be continuous when one only of the ET– relays is operated and that the particular operated relay terminates the chain through its lower contact in a resistor corresponding to resistor 12P. Since the left-hand or positive side of the 12E relay winding is connected to a source of potential which may be, for instance, approximately 26 volts obtained from the junction of the potential dropping resistors B and G, and its right-hand or negative side is connected through the 12C condenser and the EC12 resistor to a source of potential which may be, for instance, 52-volt battery, the grounding of the top terminal of the EC12 resistor will change the potential on condenser 12P by approximately 52 volts, thus causing a current surge through the winding of relay 12E. This surge, however, is in such a direction as to keep the armature of relay 12E in the non-operated condition, in engagement with its left-hand contact as shown in Fig. 73. Relay PR operated, through its contact 1, also operates relay RT. The operation of relay RT provides one closure to the alarm timing circuit to keep the short alarm from operating as long as the machine is running, as described in the section on Alarms hereinbefore.

The circuit breaker of the summary punch remains closed for approximately 13 milliseconds to insure the operation of all connected punch magnets and then opens, releasing all operated punch magnets and also releasing relay PR. Relay PR released releases relay RT to terminate the pulse to the alarm timing circuit and disconnects ground from the EC12 resistor. The disconnection of ground from resistor EC12 permits condenser 12C to be recharged to its original voltage relationship. This change of voltage on condenser 12C causes a surge current through the winding of relay 12E, the surge this time being in the direction to operate relay 12E. The design of relays 12E, 11E, and 0E to 9E inclusive is such that once operated by a current surge in the operate direction they will remain operated until they receive a current flow in the opposite direction. Relay 12E operated disconnects ground from the "E12" lead to the output registers and connects ground instead to the "E11" lead. The disconnection of ground from the "E12" lead releases relay 12F which in turn releases relay ET12 and also releases all of the punch relays which had been operated for the punching of the "12" row of holes. The CP– relays which had been operated in preparation for the punching of the "12" row of holes do not release. The design of the CP– relays is such that once operated they will remain operated until they receive a current flow in the restore direction. The connection of ground to the "E11" lead operates relay 11F which in turn operates relay ET11 and also operates all P– and CP– relays associated with the punching of the "11" row of holes as determined by the settings of the output register relays. The operated P– relays prepare the circuit paths for operating the punch magnets of the summary punch when the circuit breaker closes as previously described. Shortly after the emitter of the summary punch reaches position 11 the circuit breaker closes to operate the punch magnets of the summary punch and to operate relay PR.

Relay PR operated again operates relay RT to pulse the alarm timing circuit. On this cycle, however, due to the fact that relay ET11 is operated in place of relay ET12, the EC11 resistor is grounded in place of the EC12 resistor and, when the circuit breaker opens and relay PR releases, relay 11E operates in the same manner as previously described for relay 12E. Relay 11E operated disconnects ground from the "E11" lead to the output registers and connects ground instead to the "E0" lead.

The disconnection of ground from the "E11" lead releases relay 11F which in turn releases relay ET11 and also releases all the punch relays which had been operated for the punching of the "11" row of holes. As before the CP relays, which had been operated in preparation for the punch of the "11" row of holes, remain operated. The connection of ground to the "E0" lead operates relay OF which in turn operates relay ET0 and also operates all P– and CP– relays to be associated with the punching of the "0" row of holes as determined by the settings of the output register relays.

*Register check-down and check punch.*—The punching operation continues in this manner for the punch preparation and punching of the "0," "1," "2," "3," "4," "5," "6," "7," and "8" rows, the corresponding E0 to E8 inclusive relays operating in sequence as determined by the operated relays ET0 to ET8 and CP– relays corresponding to the output register registrations for each row of the card 0 to 8 being operated. The operation of relay E8, when the circuit breaker opens releasing relay PR after the punching of the "8" row of holes, will disconnect ground from the "E8" lead and connect ground instead to the "E9" lead as previously described, releasing relays 8F and ET8 and the punch relays which had been associated with the punching of the "8" row of holes and operating relays 9F and ET9 and P– and CP– relays associated with the "9" row punching as determined by the setting of the output register relays.

At this time there should be a CP– relay operated for each numerical digit or overpunch which had been registered in the output register. For each digit or overpunch section of the register in which data is not required to be registered, the make contacts of the associated CP– relays are shunted by by-pass circuits through the contacts of operated SC, NPY, 3DN or NMU relays. Therefore, when the punch preparation sequence and check relay operations just described have been completed an additional circuit is completed from the "E9" lead, through the right-hand contacts of all operated CP– relays, CP1 to CP33, inclusive, to operate relays P40 and CP40. Relay CP40 operated, operates relays OCP and OCL through their primary windings in parallel. The P40 relay has its make contact connected through the plugboard of the summary punch to a punch magnet controlling the punching of a particular column of the card. A "9" punch in this particular column is construed by other business machines in later stages of card processing as an indication of satisfactory punching in the tape to card stage.

*Punch cycle completion.*—When the circuit breaker of the summary punch closes to punch the "9" holes of the card as determined by the pattern of the P– relays and the particular "9" hole "check punch" previously mentioned, relay PR operates as before, this time being directed by the operated relay ET9 to ground the EC9 resistor and discharge condenser 9C. The release of relay PR upon the opening of the circuit breaker this time operates relay 9E. Relay 9E operated disconnects ground from the "E9" lead, releasing relays 9F and ET9 and the P– relays which had been operated in preparation for the punching of the "9" row of holes and also releasing relays P40 and CP40. Relays OCP and OCL do not release at this time both relays being locked through their secondary windings. Relay OCP is locked temporarily over a path from negative battery through its top winding and contact 2, contact 2 of the operated relay 9E, contact 9 of the operated relay RUC and contact 7 of the normal relay RDC to ground. Assuming that the details of the next call have now been registered in the input register, the operation of relay OCL closes the fundamental input register up-check circuit for the holding of the clutch of the summary punch as described in the paragraph on card processing by the summary punch, thus giving the punch the start signal for the next punching cycle. Relay OCL is locked in a circuit starting with negative potential in the punching machine through contact 10 of column 1, top winding and make contact 2 of relay OCL, break contact 2 of normal relay CUL, thence through the input register up-check path through the UC– relays, break contact 6 of relay AL relay normal and through terminal 6 of column 1 into the punching machine to positive potential. Relay OCP operated operates relay LRA Fig. 24, and relay 9EH, Fig. 73, in parallel as heretofore described. Relay LRA operated releases all operated output register relays.

Figure 75:
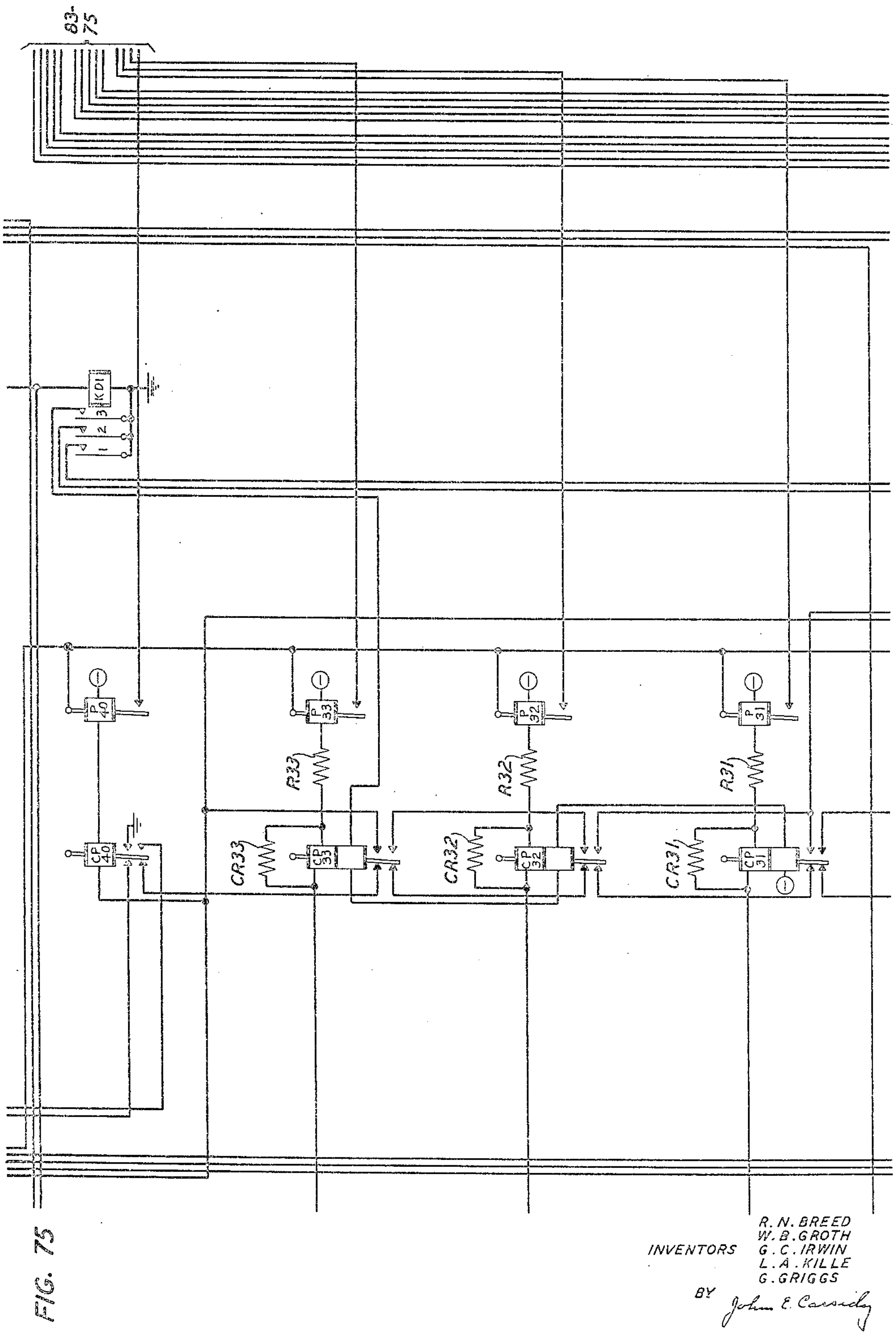
Figure 76:
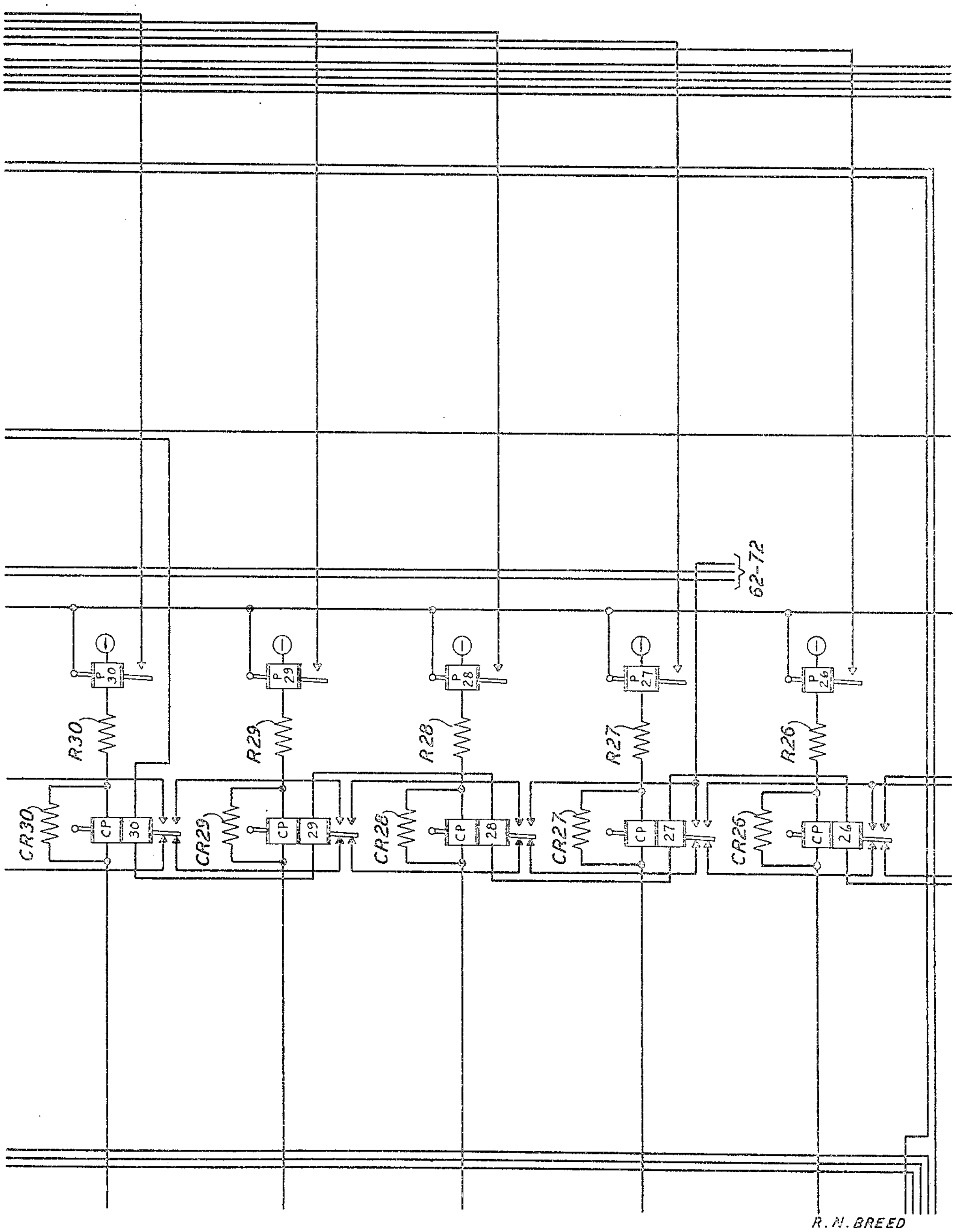
Figure 77:
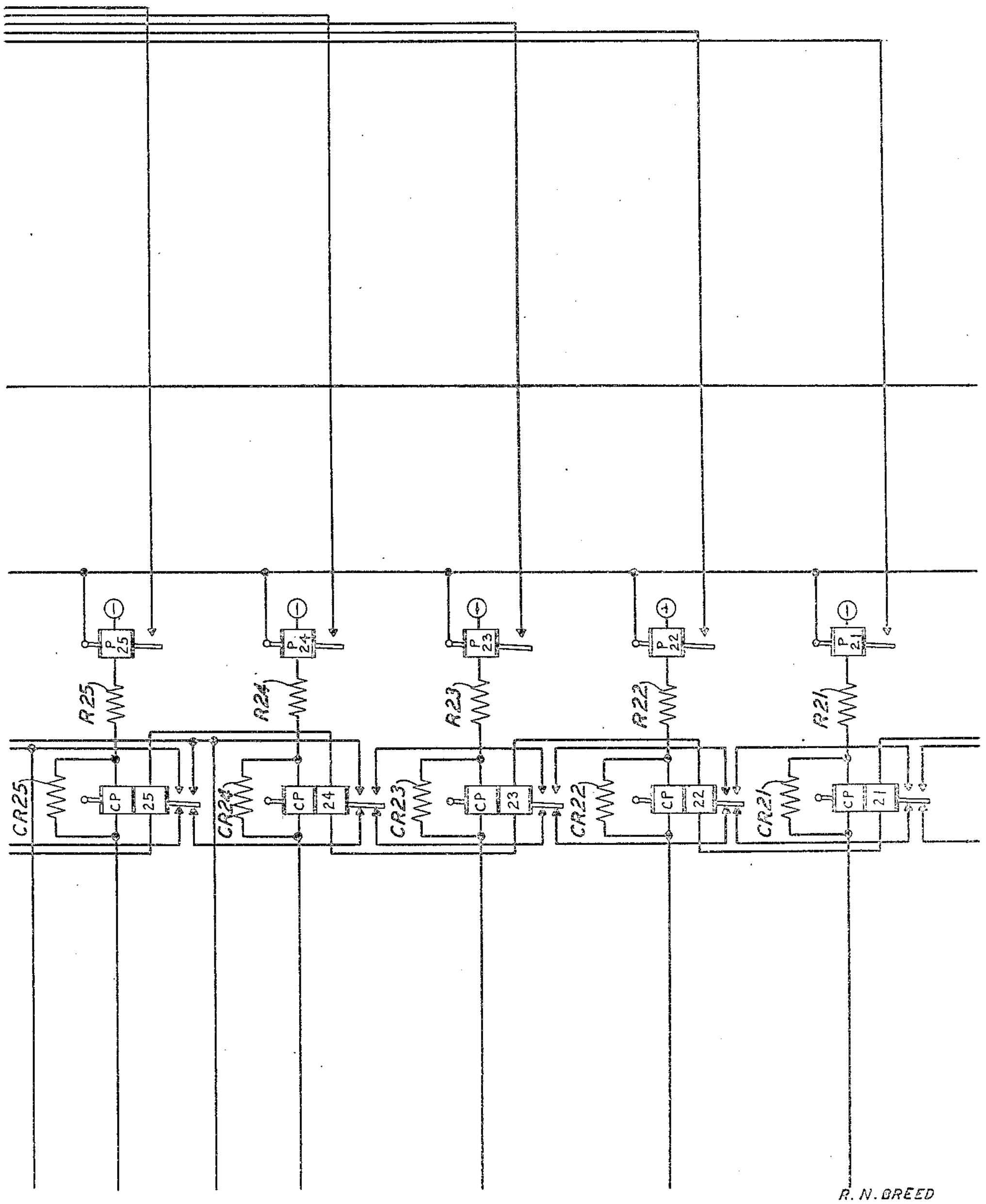
Figure 78:
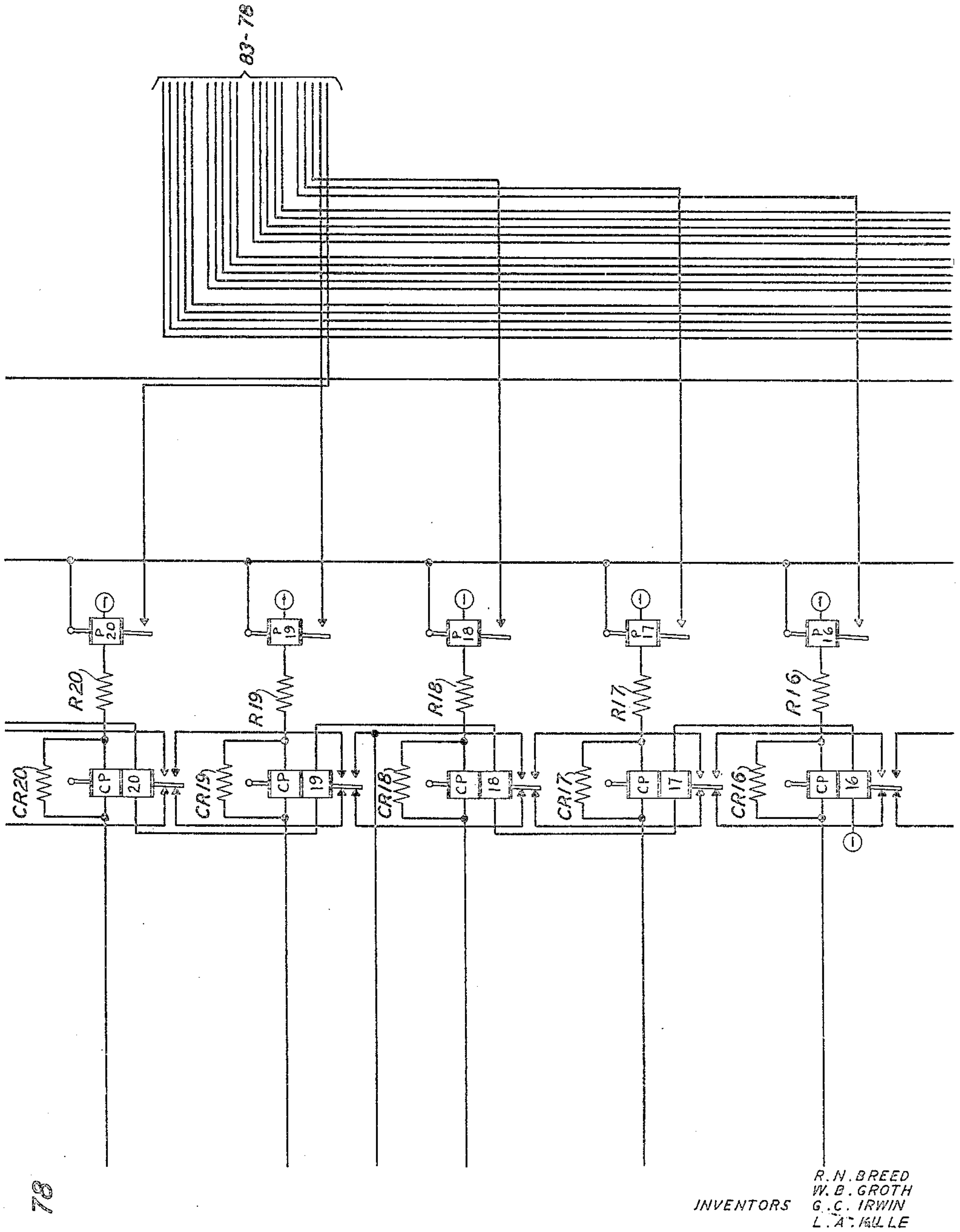
Figure 79:
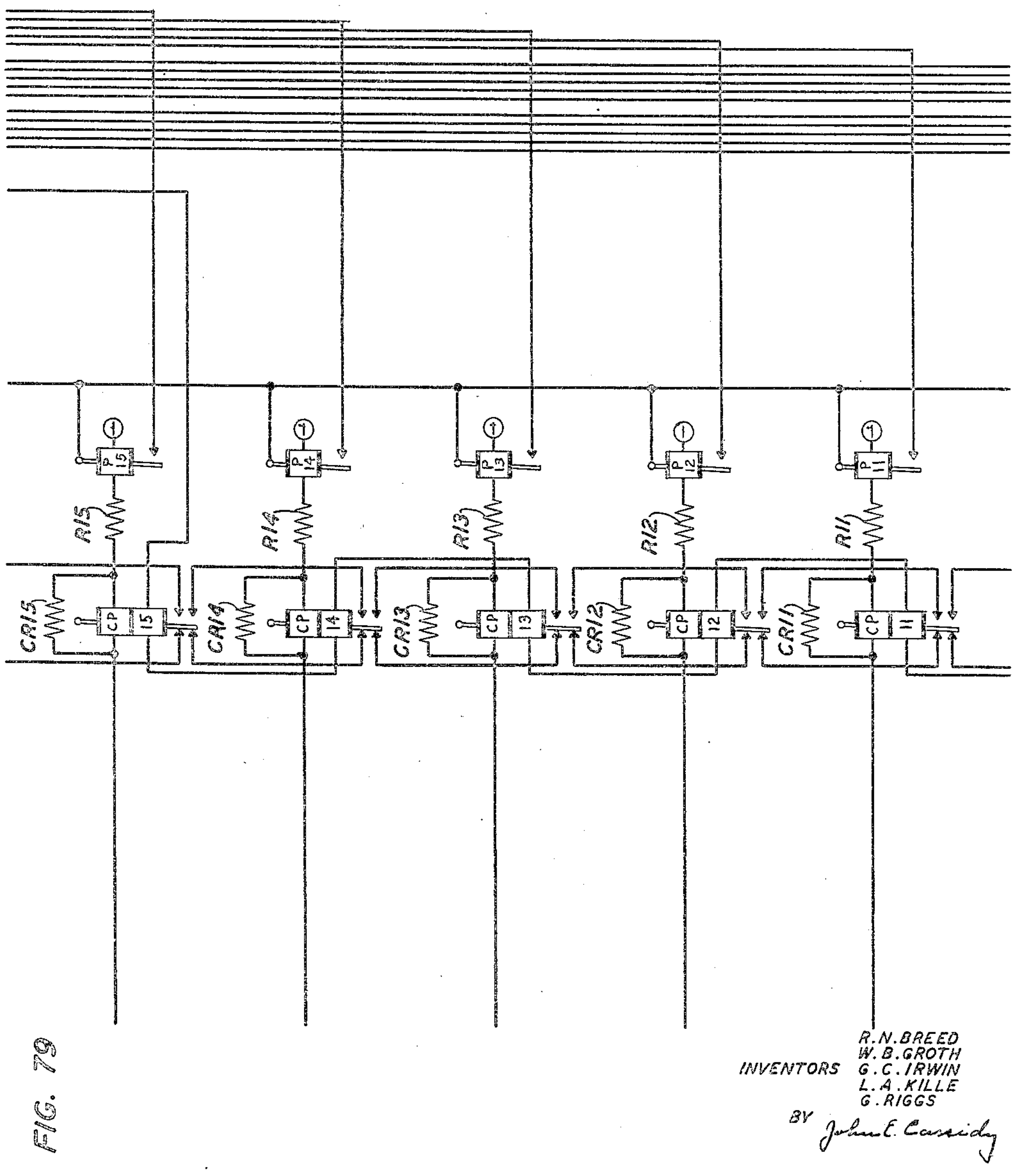
Figure 80:
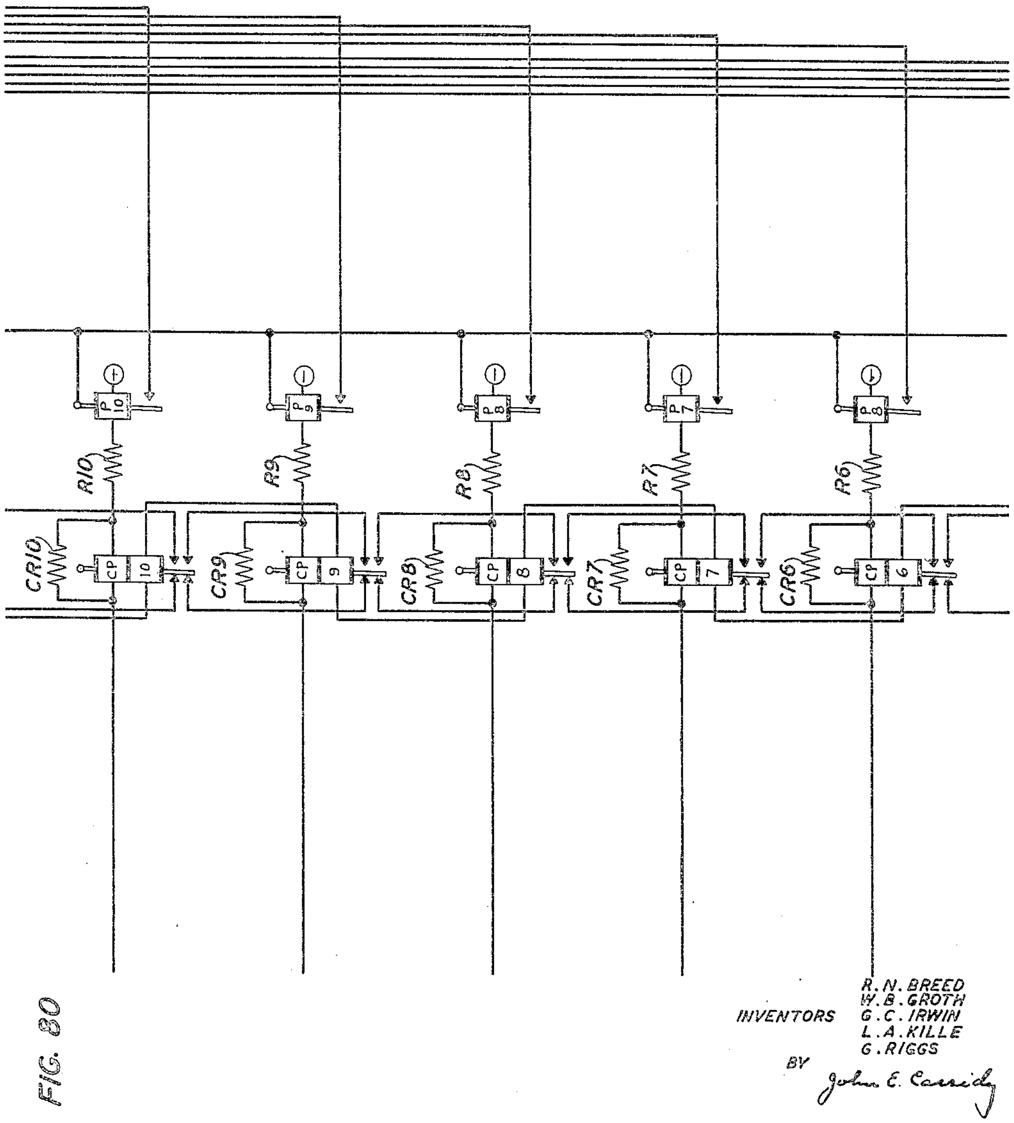
Figure 81:
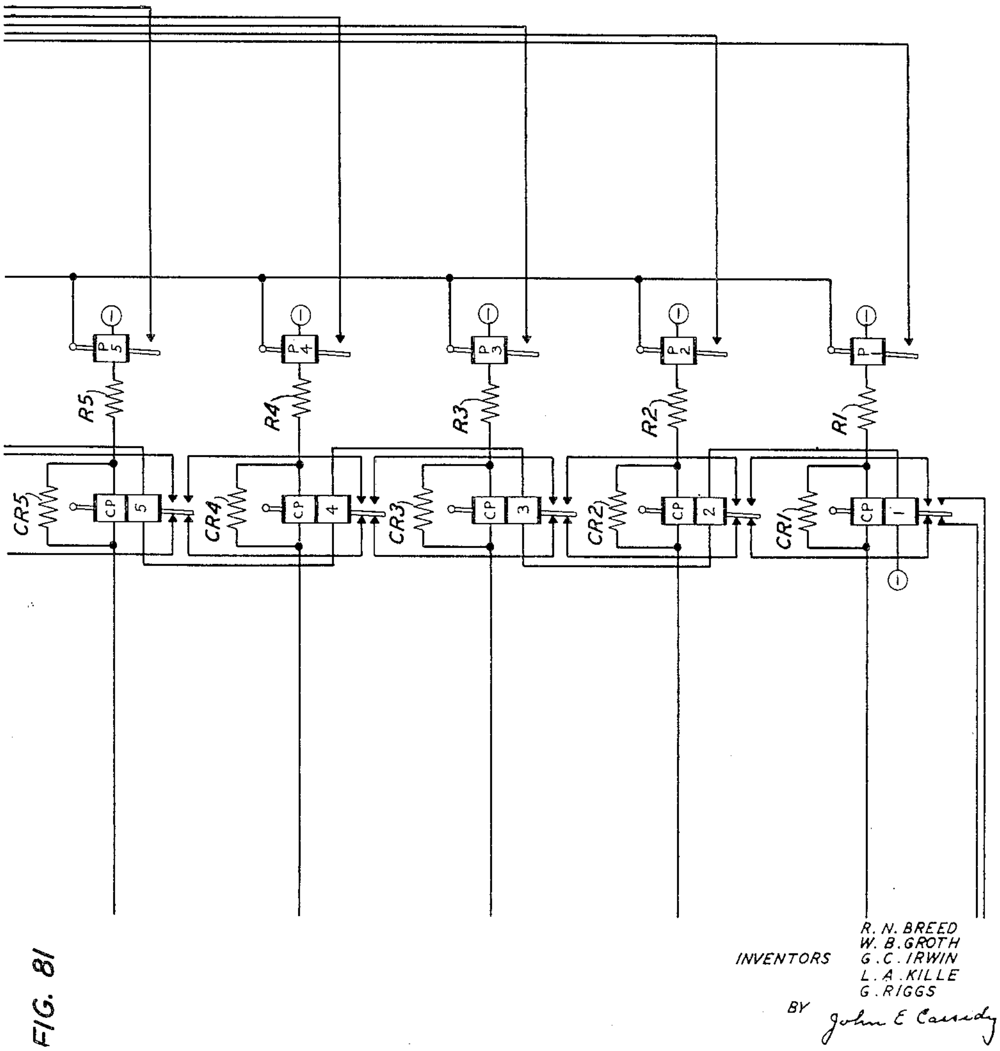

Relay 9EH operated operates relay KD1, Fig. 75, over a path from battery through the front contacts of relays ONB and 9EH and the winding of relay KD1 to ground and opens the 52-volt battery leg of the potential dropping combination of resistances B and G, thus increasing the charges on condensers 12C, 11C and 0C to 9C inclusive. The charging currents to compensate for this change of potential on the 12C, 11C and 0C to 9C condensers flow in all cases through the windings of relays 12E, 11E and 0E to 9E, respectively. These charging currents, however, are in such direction as to cause relays 12E, 11E and 0E to 9E relays to remain operated. The release of the output register relays releases relay RUC. Relay RUC released disconnects ground from relay 9E armature thus releasing relays LRA and 9EH. Relay LRA released, re-establishes holding circuits for the output register relays in preparation for receiving the details of the next call. Relay 9EH released reconnects the battery leg of the potential dropping B and G resistances thus reducing the voltage on condensers 12C, 11C and 0C to 9C inclusive, to the original approximate 26 volts. The surge currents caused by this voltage change on condensers 12C, 11C and 0C to 9C pass through the windings of relays 12E, 11E and 0E to 9E, respectively. These surge currents are in such direction that all of these relays restore. The KD1 relay operated connects ground through its contact 1 and the bottom or primary windings of relays CP1 to CP15, inclusive, in series, to battery, connects ground through its contact 2 and the bottom or primary windings of relays CP16 to CP30, inclusive, in series, to battery and connects ground through its contact 3 and the primary windings of relays CP31, CP32 and CP33 in series to battery. The CP– relays restore on this current flow in preparation for the next card punching cycle. When all output register relays and all CP– relays are normal, a down-check circuit through all CP– and output register relays is established to operate relay RDC.

The operation of this relay causes the output register to be refilled from the information registered by the input register and translator relays. This process opens the output register down-check circuit releasing relay RDC and, when completed, operates relay RUC. The release of relay RDC and the operation of relay RUC connects ground to the "E12" lead. Ground on the "E12" lead functions as described in the paragraph on Preparation for Punching to operate the CP– and P– relays in preparation for the punching of the "12" holes and to operate relays 12F and ET12. When the emitter of the summary punch reaches position 14.3 a cam contact of the punch closes operating relay CUL. Relay CUL operated, opens the locking circuit of relay OCL. When the punch emitter reaches position 12 the circuits proceed with the punching of the next card in the manner already described. In position 0.3 of the punch emitter the cam contacts reopen releasing relay CUL. The release of relay CUL prepares the holding circuit previously described for OCL relay OCL in preparation for the completion of the next register check-down operation.

What is claimed is:

1. In a recording system, the combination of an input register having a whole number *n* separate sections, each of said sections having a plurality of groups of elements, each of said groups of elements selectively operable, according to a code, to register an encoded item of information, said sections successively operable to register *n* coded lines of information comprising a first single complete transaction, *n* other elements connected individually to each of said sections, each of said other elements actuable to a first of two conditions in response to the registration of a line in its respective section, and an operable circuit, said circuit having a path extensible through said *n* other elements, when all of said *n* other elements are actuated to said first condition, to control a succeeding function in said system.

2. A system in accordance with claim 1 having another operable circuit, said circuit having a path extensible through *n*—*a* of said other elements, *a* being a whole number less than *n*, when said *n*—*a* elements are actuated to said first condition in response to the registration of a second complete transaction having *a* fewer lines of information, to control a succeeding function in said system.

3. In a registering system, a plurality of registers divisible into a first and a second group, a plurality of switches in each of said registers, means for selectively operating the switches of said first group in accordance with a predetermined pattern, a first circuit path extensible through all of said switches of all of said registers of said first group responsive to their operation according to said pattern, means for preventing the operation of any of said switches of any of the registers of said second group when said switches of said first group are operated, a second circuit path extensible through all of said switches of said registers of said second group when none of the switches of said registers of said second group is operated, and means for interconnecting said paths to test the plausibility of the operation of said register.

4. In a system of registers, an input register comprising a first and a second group of line registers, means for operating each of said registers of said first and said second groups to a first condition at a first time, means for operating each of said first group of registers to a first condition and maintaining each of said second group of registers in a normal unoperated condition at a second time, a first and a second group of switches, one of said switches of said first and said second group of switches individual to one of said line registers in said first and said second group of registers, respectively, for checking the condition of said line registers, means responsive to the actuation of each of said registers of said first and said second groups to said first condition for operating its respective switch to a first condition at said first time, a first checking circuit responsive to said operation of each of said switches to said first condition at said first time, means responsive to the operation of each of said registers of said first group to said first condition and the non-operation of any of said second group of registers for operating each of said first group of switches to said first condition and maintaining each of said second group of switches in its normal unoperated condition and a second checking circuit responsive to said operation of said first group of switches and the non-operation of said second group of switches at said second time.

References Cited in the file of this patent

UNITED STATES PATENTS

| | | |
|---|---|---|
| 2,124,178 | Lasker | July 19, 1938 |
| 2,540,026 | Daly et al. | Jan. 30, 1951 |
| 2,543,869 | Rees | Mar. 6, 1951 |
| 2,550,600 | Rehm | Apr. 24, 1951 |
| 2,558,476 | Carpenter et al. | June 26, 1951 |
| 2,559,390 | Blaisdell | July 3, 1951 |
| 2,572,132 | Giroud et al. | Oct. 23, 1951 |
| 2,576,903 | Imm | Nov. 27, 1951 |
| 2,595,889 | Ryffel | May 6, 1952 |
| 2,635,807 | Flint | Apr. 21, 1953 |